US008934550B2

(12) United States Patent
Ono et al.

(10) Patent No.: US 8,934,550 B2
(45) Date of Patent: Jan. 13, 2015

(54) DATA PROCESSING APPARATUS, DATA PROCESSING METHOD, AND PROGRAM FOR PROCESSING IMAGE DATA OF A MOVING IMAGE

(75) Inventors: Takaya Ono, Kanagawa (JP); Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1991 days.

(21) Appl. No.: 11/674,411

(22) Filed: Feb. 13, 2007

(65) Prior Publication Data
US 2007/0198931 A1 Aug. 23, 2007

(30) Foreign Application Priority Data

Feb. 17, 2006 (JP) ................................. 2006-040173

(51) Int. Cl.
| | |
|---|---|
| H04N 11/02 | (2006.01) |
| H04N 21/434 | (2011.01) |
| H04N 21/2368 | (2011.01) |
| H04N 21/41 | (2011.01) |
| H04N 21/43 | (2011.01) |
| H04N 21/4402 | (2011.01) |
| H04N 21/442 | (2011.01) |
| H04N 21/462 | (2011.01) |
| H04N 21/854 | (2011.01) |

(52) U.S. Cl.
CPC ....... *H04N 21/4341* (2013.01); *H04N 21/2368* (2013.01); *H04N 21/4135* (2013.01); *H04N 21/4305* (2013.01); *H04N 21/440263* (2013.01); *H04N 21/4424* (2013.01); *H04N 21/4621* (2013.01); *H04N 21/854* (2013.01)
USPC ....... 375/240.26; 715/720; 715/726; 715/833

(58) Field of Classification Search
USPC ........ 375/240.26, 240.16; 715/833, 720, 723, 715/726
See application file for complete search history.

(56) References Cited

U.S. PATENT DOCUMENTS

| | | | | | |
|---|---|---|---|---|---|
| 6,005,621 | A | * | 12/1999 | Linzer et al. ............. | 375/240.11 |
| 6,637,031 | B1 | * | 10/2003 | Chou .............................. | 725/87 |
| 7,509,030 | B2 | * | 3/2009 | Hirose et al. .................. | 386/353 |
| 7,616,868 | B2 | * | 11/2009 | Hosoda et al. ................. | 386/241 |
| 7,657,911 | B2 | * | 2/2010 | Kondo et al. .................... | 725/93 |
| 7,660,476 | B2 | * | 2/2010 | Ishikawa ........................ | 382/240 |
| 7,733,962 | B2 | * | 6/2010 | Weiss et al. .............. | 375/240.25 |
| 7,796,693 | B2 | * | 9/2010 | Bushell .................... | 375/240.23 |
| 7,925,138 | B2 | * | 4/2011 | Ando et al. .................... | 386/240 |
| 8,498,520 | B2 | * | 7/2013 | Pejhan .......................... | 386/343 |
| 2002/0161798 | A1 | * | 10/2002 | Kanda et al. ............... | 707/501.1 |
| 2007/0206917 | A1 | | 9/2007 | Ono et al. | |

FOREIGN PATENT DOCUMENTS

| | | |
|---|---|---|
| JP | 10-162556 | 6/1998 |
| JP | 11-18057 | 1/1999 |
| JP | 11-331754 | 11/1999 |
| JP | 2000-350156 | 12/2000 |

(Continued)

*Primary Examiner* — Zachary A Davis
(74) *Attorney, Agent, or Firm* — Oblon, Spivak, McClelland, Maier & Neustadt, L.L.P.

(57) ABSTRACT

A data processing apparatus that processes image data of a moving image is disclosed. The data processing apparatus includes: acquiring means for acquiring variations representing degrees of change in the image data, in a unit of picture; display-type determining means for determining, on the basis of the variations, display types, which represent display methods in displaying pictures, in a unit of picture; and display control means for causing a display to display type information representing display types of pictures and position information representing a position of a picture designated by picture-designation operating means operated in designating a picture to be displayed.

18 Claims, 66 Drawing Sheets

(56) References Cited

FOREIGN PATENT DOCUMENTS

| JP | 2001-306579 | 11/2001 |
| JP | 2002-77780 | 3/2002 |
| JP | 2004-56582 | 2/2004 |
| JP | 2004-242267 | 8/2004 |
| JP | 2005-277733 | 10/2005 |
| JP | 2005-295426 | 10/2005 |

* cited by examiner

FIG. 20

| DISPLAY TYPE | DISPLAY METHOD |
|---|---|
| $V_1$ (STILL IMAGE TYPE) | DISPLAY AS STILL IMAGE |
| $V_2$ (NORMAL TYPE) | DISPLAY AT DISPLAY RATE IDENTICAL WITH FRAME RATE (NORMAL RATE) AND WITH RESOLUTION OF MAIN LINE IMAGE (NORMAL RESOLUTION) |
| $V_3$ (HIGH DISPLAY RATE/ LOW RESOLUTION TYPE) | DISPLAY AT DISPLAY RATE HIGHER THAN NORMAL RATE AND WITH RESOLUTION LOWER THAN NORMAL RESOLUTION |

FIG. 26

| Frame Number | Time code | Variation (Motion information) | Display type |
|---|---|---|---|
| 1frame | 00:00:01 | 3 | $V_2$ |
| 2frame | 00:00:02 | 3 | $V_2$ |
| 3frame | 00:00:03 | 3 | $V_2$ |
| 4frame | 00:00:04 | 2 | $V_2$ |
| 5frame | 00:00:05 | 1 | $V_1$ |
| 6frame | 00:00:06 | 1 | $V_1$ |
| 7frame | 00:00:07 | 0 | $V_1$ |
| 8frame | 00:00:08 | 1 | $V_1$ |
| 9frame | 00:00:09 | 1 | $V_1$ |
| 10frame | 00:00:10 | 3 | $V_2$ |
| 11frame | 00:00:11 | 5 | $V_2$ |
| 12frame | 00:00:12 | 4 | $V_2$ |
| 13frame | 00:00:13 | 3 | $V_2$ |
| 14frame | 00:00:14 | 5 | $V_3$ |
| 15frame | 00:00:15 | 5 | : |
| 16frame | 00:00:16 | 5 | |
| 17frame | 00:00:17 | 6 | |
| 18frame | 00:00:18 | 6 | |
| 19frame | 00:00:19 | 5 | |
| : | | | : |
| 50frame | 00:00:20 | 5 | $V_3$ |
| 51frame | 00:00:11 | 4 | $V_2$ |
| 52frame | 00:00:12 | 4 | $V_2$ |
| 53frame | 00:00:13 | 3 | $V_2$ |
| 54frame | 00:00:14 | 3 | $V_2$ |
| 55frame | 00:00:15 | 2 | $V_2$ |
| 56frame | 00:00:16 | 2 | $V_2$ |
| 57frame | 00:00:17 | 1 | $V_1$ |
| 58frame | 00:00:18 | 0 | $V_1$ |
| 59frame | 00:00:19 | 0 | $V_1$ |
| 60frame | 00:00:20 | 0 | $V_1$ |
| : | | | |

Fy FILE

FIG. 27

| DISPLAY TYPE | DISPLAY METHOD |
|---|---|
| $V_{11}$<br>(STILL IMAGE TYPE) | DISPLAY AS STILL IMAGE |
| $V_{12}$<br>(NORMAL TYPE) | DISPLAY AT DISPLAY RATE IDENTICAL WITH FRAME RATE (NORMAL RATE) AND WITH RESOLUTION OF MAIN LINE IMAGE (NORMAL RESOLUTION) |
| $V_{13}$<br>(HIGH DISPLAY RATE/ NORMAL RESOLUTION TYPE) | DISPLAY AT DISPLAY RATE TWICE AS HIGH AS FRAME RATE AND WITH NORMAL RESOLUTION |
| $V_{14}$<br>(ULTRAHIGH DISPLAY RATE/LOW RESOLUTION TYPE) | DISPLAY AT DISPLAY RATE THREE TIMES AS HIGH AS FRAME RATE AND WITH RESOLUTION OF PROXY IMAGE |
| $V_{15}$<br>(ULTRA-ULTRAHIGH DISPLAY RATE/LOW RESOLUTION TYPE) | DISPLAY AT DISPLAY RATE FOUR TIMES AS HIGH AS FRAME RATE AND WITH RESOLUTION OF PROXY IMAGE |

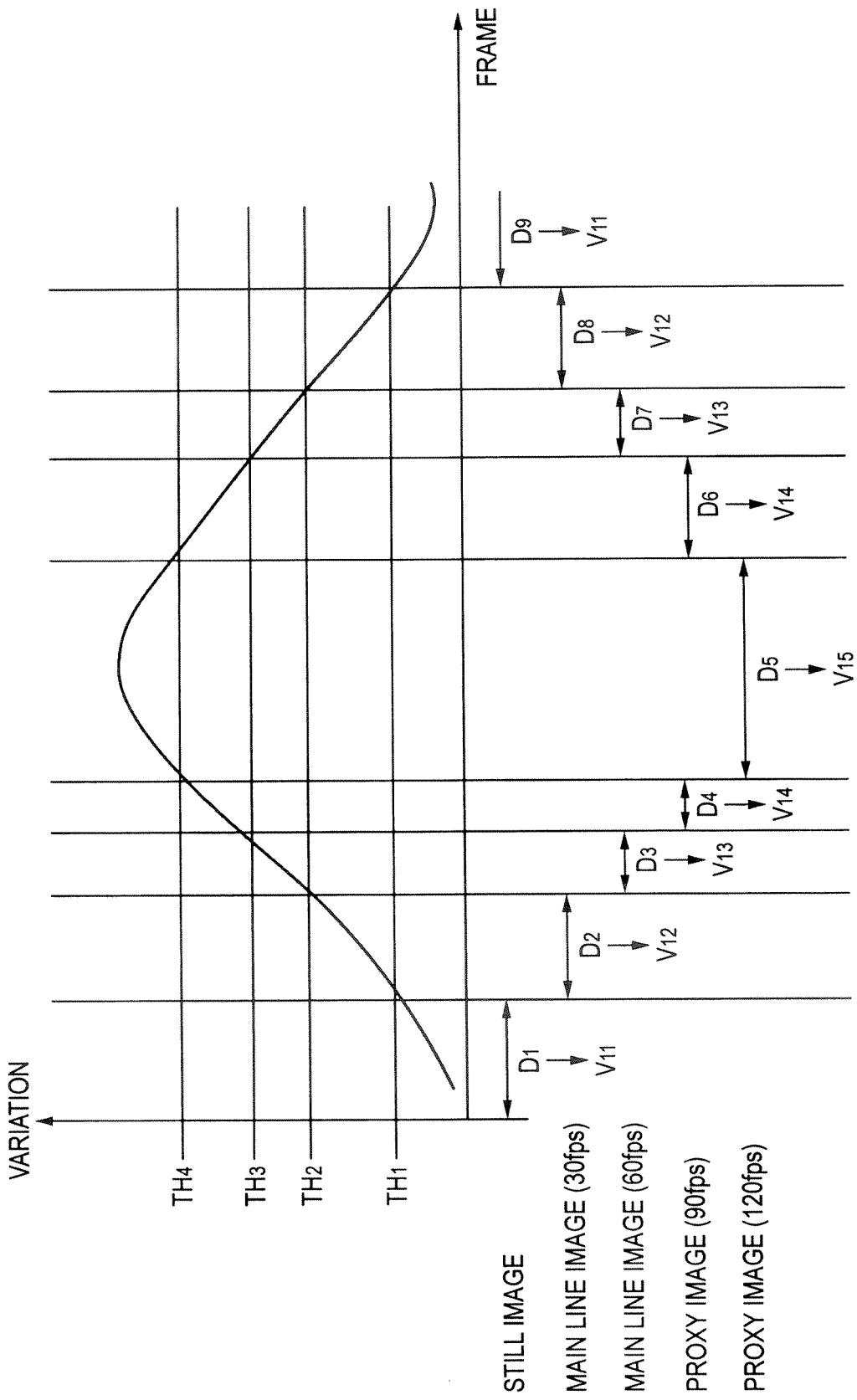

FIG. 31

| DISPLAY TYPE | DISPLAY METHOD |
|---|---|
| $C_1$ (LOW RESOLUTION/ NORMAL DISPLAY RATE TYPE) | DISPLAY AT DISPLAY RATE IDENTICAL WITH FRAME RATE (NORMAL RATE) AND WITH RESOLUTION LOWER THAN RESOLUTION OF MAIN LINE IMAGE |
| $C_2$ (NORMAL TYPE) | DISPLAY AT DISPLAY RATE DISPLAY AT NORMAL RATE AND WITH NORMAL RESOLUTION |
| $C_3$ (NORMAL RESOLUTION/ LOW DISPLAY RATE TYPE) | DISPLAY AT DISPLAY RATE LOWER THAN NORMAL RATE AND WITH NORMAL RESOLUTION |

FIG. 35

| Frame number | Time code | Motion information | Fineness information | Display type (Based on motion information) | Display type (Based on fineness information) |
|---|---|---|---|---|---|
| 1frame | 00:00:01 | D1 | K1 | Sm1 | Sa1 |
| 2frame | 00:00:02 | D2 | K2 | Sm2 | Sa2 |
| 3frame | 00:00:03 | D3 | K3 | Sm3 | Sa3 |
| 4frame | 00:00:04 | D4 | K4 | Sm4 | Sa4 |
| 5frame | 00:00:05 | D5 | K5 | Sm5 | Sa5 |
| 6frame | 00:00:06 | D6 | K6 | Sm6 | Sa6 |
| 7frame | 00:00:07 | D7 | K7 | Sm7 | Sa7 |
| 8frame | 00:00:08 | D8 | K8 | Sm8 | Sa8 |
| 9frame | 00:00:09 | D9 | K9 | Sm9 | Sa9 |
| 10frame | 00:00:10 | D10 | K10 | Sm10 | Sa10 |
| 11frame | 00:00:11 | D11 | K11 | Sm11 | Sa11 |
| 12frame | 00:00:12 | D12 | K12 | Sm12 | Sa12 |
| 13frame | 00:00:13 | D13 | K13 | Sm13 | Sa13 |
| 14frame | 00:00:14 | D14 | K14 | Sm14 | Sa14 |
| 15frame | 00:00:15 | D15 | | | |
| 16frame | 00:00:16 | D16 | | | |
| 17frame | 00:00:17 | D17 | | | |
| 18frame | 00:00:18 | D18 | | | |
| 19frame | 00:00:19 | D19 | | | |
| ... | | | | | |
| 50frame | 00:00:20 | D50 | K50 | Sm50 | Sa50 |
| 51frame | 00:00:11 | D51 | K51 | Sm51 | Sa51 |
| 52frame | 00:00:12 | D52 | K52 | Sm52 | Sa52 |
| 53frame | 00:00:13 | D53 | K53 | Sm53 | Sa53 |
| 54frame | 00:00:14 | D54 | K54 | Sm54 | Sa54 |
| 55frame | 00:00:15 | D55 | K55 | Sm55 | Sa55 |
| 56frame | 00:00:16 | D56 | K56 | Sm56 | Sa56 |
| 57frame | 00:00:17 | D57 | K57 | Sm57 | Sa57 |
| 58frame | 00:00:18 | D58 | K58 | Sm58 | Sa58 |
| 59frame | 00:00:19 | D59 | K59 | Sm59 | Sa59 |
| 60frame | 00:00:20 | D60 | K60 | Sm60 | Sa60 |
| ... | | | | | |

Fy FILE

FIG. 36

| Frame Number | Time code | Motion information | Fineness information |
|---|---|---|---|
| 1frame | 00:00:01 | D1 | K1 |
| 2frame | 00:00:02 | D2 | K2 |
| 3frame | 00:00:03 | D3 | K3 |
| 4frame | 00:00:04 | D4 | K4 |
| 5frame | 00:00:05 | D5 | K5 |
| 6frame | 00:00:06 | D6 | K6 |
| 7frame | 00:00:07 | D7 | K7 |
| 8frame | 00:00:08 | D8 | K8 |
| 9frame | 00:00:09 | D9 | K9 |
| 10frame | 00:00:10 | D10 | K10 |
| 11frame | 00:00:11 | D11 | K11 |
| 12frame | 00:00:12 | D12 | K12 |
| 13frame | 00:00:13 | D13 | K13 |
| 14frame | 00:00:14 | D14 | K14 |
| 15frame | 00:00:15 | D15 | : |
| 16frame | 00:00:16 | D16 | |
| 17frame | 00:00:17 | D17 | |
| 18frame | 00:00:18 | D18 | |
| 19frame | 00:00:19 | D19 | |
| : | | : | : |
| 50frame | 00:00:20 | D50 | K50 |
| 51frame | 00:00:11 | D51 | K51 |
| 52frame | 00:00:12 | D52 | K52 |
| 53frame | 00:00:13 | D53 | K53 |
| 54frame | 00:00:14 | D54 | K54 |
| 55frame | 00:00:15 | D55 | K55 |
| 56frame | 00:00:16 | D56 | K56 |
| 57frame | 00:00:17 | D57 | K57 |
| 58frame | 00:00:18 | D58 | K58 |
| 59frame | 00:00:19 | D59 | K59 |
| 60frame | 00:00:20 | D60 | K60 |
| : | | | |

Fy FILE

FIG. 37

| Frame Number | Time code | Display type (Based on motion information) | Display type (Based on fineness information) |
|---|---|---|---|
| 1frame | 00:00:01 | Sm1 | Sa1 |
| 2frame | 00:00:02 | Sm2 | Sa2 |
| 3frame | 00:00:03 | Sm3 | Sa3 |
| 4frame | 00:00:04 | Sm4 | Sa4 |
| 5frame | 00:00:05 | Sm5 | Sa5 |
| 6frame | 00:00:06 | Sm6 | Sa6 |
| 7frame | 00:00:07 | Sm7 | Sa7 |
| 8frame | 00:00:08 | Sm8 | Sa8 |
| 9frame | 00:00:09 | Sm9 | Sa9 |
| 10frame | 00:00:10 | Sm10 | Sa10 |
| 11frame | 00:00:11 | Sm11 | Sa11 |
| 12frame | 00:00:12 | Sm12 | Sa12 |
| 13frame | 00:00:13 | Sm13 | Sa13 |
| 14frame | 00:00:14 | Sm14 | Sa14 |
| 15frame | 00:00:15 | : | : |
| 16frame | 00:00:16 | | |
| 17frame | 00:00:17 | | |
| 18frame | 00:00:18 | | |
| 19frame | 00:00:19 | | |
| : | : | : | : |
| 50frame | 00:00:20 | Sm50 | Sa50 |
| 51frame | 00:00:11 | Sm51 | Sa51 |
| 52frame | 00:00:12 | Sm52 | Sa52 |
| 53frame | 00:00:13 | Sm53 | Sa53 |
| 54frame | 00:00:14 | Sm54 | Sa54 |
| 55frame | 00:00:15 | Sm55 | Sa55 |
| 56frame | 00:00:16 | Sm56 | Sa56 |
| 57frame | 00:00:17 | Sm57 | Sa57 |
| 58frame | 00:00:18 | Sm58 | Sa58 |
| 59frame | 00:00:19 | Sm59 | Sa59 |
| 60frame | 00:00:20 | Sm60 | Sa60 |
| : | | | |

Fy FILE

FIG. 38

| DISPLAY TYPE | DISPLAY METHOD |
|---|---|
| $VC_1$ (STILL IMAGE TYPE) | DISPLAY AS STILL IMAGE |
| $VC_2$ (NORMAL TYPE) | DISPLAY AT DISPLAY RATE IDENTICAL WITH FRAME RATE (NORMAL RATE) AND WITH RESOLUTION OF MAIN LINE IMAGE (NORMAL RESOLUTION) |
| $VC_3$ (HIGH DISPLAY RATE/ LOW RESOLUTION TYPE) | DISPLAY AT DISPLAY RATE HIGHER THAN NORMAL RATE AND WITH RESOLUTION OR PROXY IMAGE (LOW RESOLUTION) |
| $VC_4$ (NORMAL DISPLAY RATE/ LOW RESOLUTION TYPE) | DISPLAY AT NORMAL RATE AND WITH LOW RESOLUTION |

FIG. 41

| Frame Number | Time code | Motion information | Fineness information | Display type (Based on motion information and fineness information) |
|---|---|---|---|---|
| 1 frame | 00:00:01 | D1 | K1 | Sma1 |
| 2 frame | 00:00:02 | D2 | K2 | Sma2 |
| 3 frame | 00:00:03 | D3 | K3 | Sma3 |
| 4 frame | 00:00:04 | D4 | K4 | Sma4 |
| 5 frame | 00:00:05 | D5 | K5 | Sma5 |
| 6 frame | 00:00:06 | D6 | K6 | Sma6 |
| 7 frame | 00:00:07 | D7 | K7 | Sma7 |
| 8 frame | 00:00:08 | D8 | K8 | Sma8 |
| 9 frame | 00:00:09 | D9 | K9 | Sma9 |
| 10 frame | 00:00:10 | D10 | K10 | Sma10 |
| 11 frame | 00:00:11 | D11 | K11 | Sma11 |
| 12 frame | 00:00:12 | D12 | K12 | Sma12 |
| 13 frame | 00:00:13 | D13 | K13 | Sma13 |
| 14 frame | 00:00:14 | D14 | K14 | Sma14 |
| 15 frame | 00:00:15 | D15 | : | : |
| 16 frame | 00:00:16 | D16 | | |
| 17 frame | 00:00:17 | D17 | | |
| 18 frame | 00:00:18 | D18 | | |
| 19 frame | 00:00:19 | D19 | | |
| : | | : | : | : |
| 50 frame | 00:00:20 | D50 | K50 | Sma50 |
| 51 frame | 00:00:11 | D51 | K51 | Sma51 |
| 52 frame | 00:00:12 | D52 | K52 | Sma52 |
| 53 frame | 00:00:13 | D53 | K53 | Sma53 |
| 54 frame | 00:00:14 | D54 | K54 | Sma54 |
| 55 frame | 00:00:15 | D55 | K55 | Sma55 |
| 56 frame | 00:00:16 | D56 | K56 | Sma56 |
| 57 frame | 00:00:17 | D57 | K57 | Sma57 |
| 58 frame | 00:00:18 | D58 | K58 | Sma58 |
| 59 frame | 00:00:19 | D59 | K59 | Sma59 |
| 60 frame | 00:00:20 | D60 | K60 | Sma60 |
| : | | | | |

Fy FILE

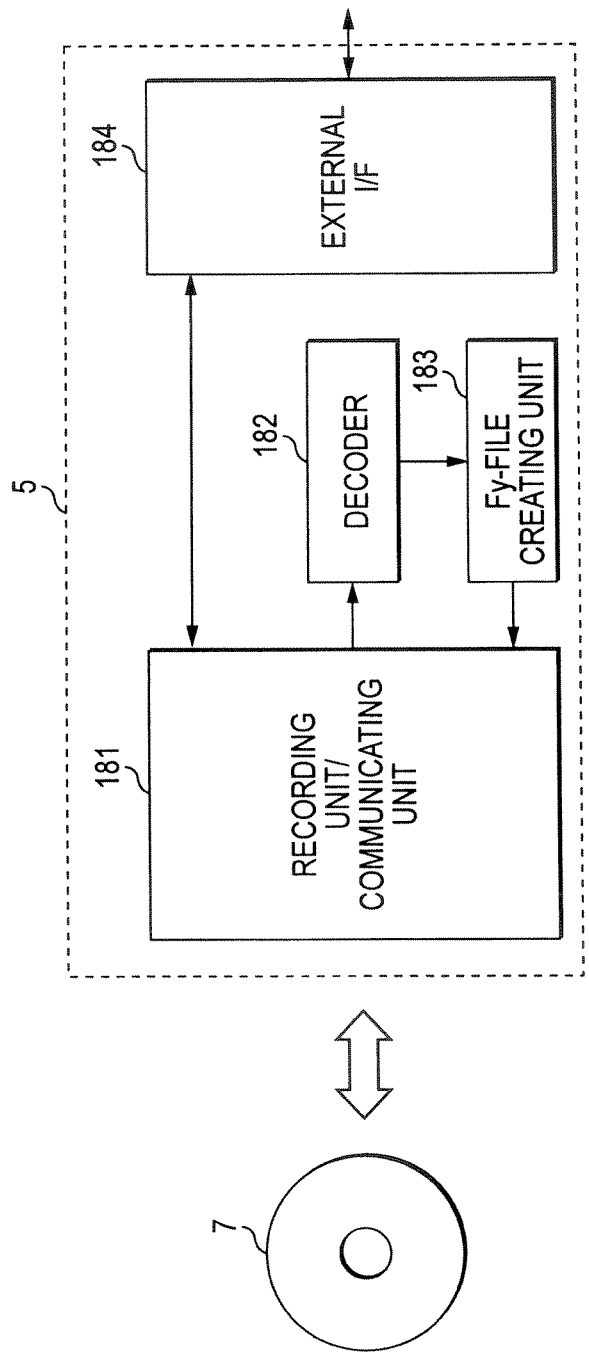

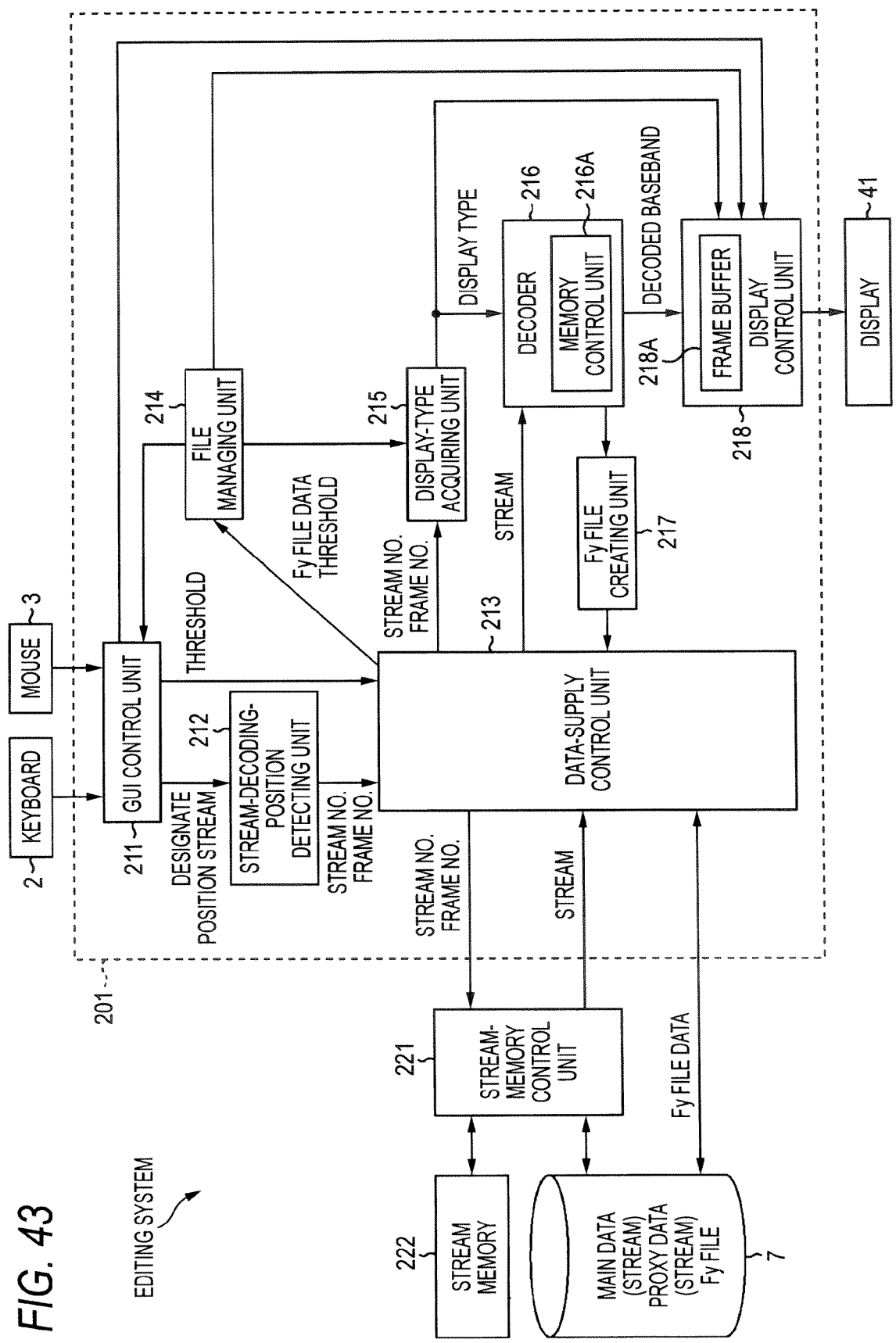

FIG. 66

| Frame Number | Time code | Variation (Motion information) | Display type |
|---|---|---|---|
| 1frame | 00:00:01 | 3 | $V_2$ |
| 2frame | 00:00:02 | 3 | $V_2$ |
| 3frame | 00:00:03 | 3 | $V_2$ |
| 4frame | 00:00:04 | 2 | $V_2$ |
| 5frame | 00:00:05 | 1 | $V_1$ |
| 6frame | 00:00:06 | 1 | $V_1$ |
| 7frame | 00:00:07 | 0 | $V_1$ |
| 8frame | 00:00:08 | 1 | $V_1$ |
| 9frame | 00:00:09 | 1 | $V_1$ |
| 10frame | 00:00:10 | 3 | $V_2$ |
| 11frame | 00:00:11 | 5 | $V_2$ |
| 12frame | 00:00:12 | 4 | $V_2$ |
| 13frame | 00:00:13 | 3 | $V_2$ |
| 14frame | 00:00:14 | 5 | $V_3$ |
| 15frame | 00:00:15 | 5 | $V_3$ |
| 16frame | 00:00:16 | 5 | $V_3$ |
| 17frame | 00:00:17 | 6 | $V_3$ |
| 18frame | 00:00:18 | 6 | $V_3$ |
| 19frame | 00:00:19 | 5 | $V_3$ |
| ⋮ | | | ⋮ |
| 50frame | 00:00:20 | 5 | $V_3$ |
| 51frame | 00:00:11 | 4 | $V_2$ |
| 52frame | 00:00:12 | 4 | $V_2$ |
| 53frame | 00:00:13 | 3 | $V_2$ |
| 54frame | 00:00:14 | 3 | $V_2$ |
| 55frame | 00:00:15 | 2 | $V_2$ |
| 56frame | 00:00:16 | 2 | $V_2$ |
| 57frame | 00:00:17 | 1 | $V_1$ |
| 58frame | 00:00:18 | 0 | $V_1$ |
| 59frame | 00:00:19 | 0 | $V_1$ |
| 60frame | 00:00:20 | 0 | $V_1$ |
| ⋮ | | | |

Fy FILE

DATA PROCESSING APPARATUS, DATA PROCESSING METHOD, AND PROGRAM FOR PROCESSING IMAGE DATA OF A MOVING IMAGE

CROSS-REFERENCES TO RELATED APPLICATIONS

The present invention claims priority to Japanese Patent Application JP 2006-040173 filed in the Japanese Patent Office on Feb. 17, 2006, the entire contents of which being incorporated herein by reference.

BACKGROUND OF THE INVENTION

1. Field of the Invention

The present invention relates to a data processing apparatus, a data processing method, and a program, and, more particularly to, for example, a data processing apparatus, a data processing method, and a program that make it possible to provide an appropriate user interface in variable speed reproduction including so-called scrub.

2. Description of the Related Art

In recent years, in the world of AV apparatuses such as a recorder and a video camera that treat image data of moving images, AV apparatuses that can treat HD (High Definition) image data have been realized both for the broadcasting industry and for consumer use.

In such AV apparatuses, for example, HD image data is encoded by the MPEG (Moving Picture Experts Group) 2 system, the MPEG IMX50 system, and the like in a unit of long GOP (Group Of Picture) (HD Long GOP). Encoded data obtained as a result of the encoding is recorded in recording media such as a tape, a hard disk, and an optical disk. Further, in the AV apparatuses, the encoded data recorded in the recording media is subjected to MPEG decoding and (an image corresponding to) image data obtained as a result of the MPEG decoding is output to a display and displayed.

The long GOP is, for example, a GOP having fifteen or more pictures as one GOP. The MPEG IMX50 system is an encoding system having a maximum bit rate of 50 Mbps and conforming to MPEG2 4:2:2P@ML (Profile @ Level). A format of the MPEG IMX50 system is approved by the SMPTE (Society of Motion Picture and Television Engineers) and registered in SMPTE365M as a D-10 format. In the MPEG IMX50 system, all pictures are encoded as I pictures.

In the world of AV apparatuses, other than the recorder and the video camera, there is an editing apparatus that edits a moving image (including a program (software) that is executed by a computer to cause the computer to function as an editing apparatus).

The editing apparatus that edits a moving image has, in general, a function of scrub for allowing a user (an editor) to check contents of the moving image and search for a so-called edition points (an in point and an out point).

Scrub means reproduction of a frame or a field that is a picture designated by the user. The user designates a picture by, for example, performing operation such as movement of a dial serving as a GUI (Graphical User Interface).

In the editing apparatus having the function of scrub, for example, a frame is designated according to a position of the dial and reproduced. Therefore, when the user performs operation for slowly moving the dial, since a frame designated by (a position of) the dial slowly changes, so-called slow reproduction is performed. When the user performs operation for quickly moving the dial, since a frame designated by the dial quickly changes, so-called high-speed reproduction is performed. Moreover, when the user does not move the dial, since a frame designated by the dial does not change, so-called still reproduction is performed (the editing apparatus is in a pause state). Therefore, it can be said that the scrub is a kind of variable speed (special) reproduction.

In a technique proposed in JP-A-11-331754, an image having a high resolution is recorded in a random-accessible first recording medium, an image having a low resolution corresponding to the image recorded in the first recording medium is recorded in a second recording medium, the image having a low resolution recorded in the second recording medium is displayed in normal reproduction, and the image having a high resolution recorded in the first recording medium is displayed at the time of a pause.

SUMMARY OF THE INVENTION

When scrub is performed in the editing apparatus with, for example, a disc having encoded data recorded therein as an object, it is necessary to seek a position on the disc where encoded data of a frame designated by the dial is recorded, read out the encoded data from the disc, decode the encoded data as image data, and display (an image corresponding to) the image data on a display.

Therefore, it takes time to display a frame on the display after the frame is designated by the dial. Thus, when encoded data recorded in the disc is, for example, data having a high bit rate obtained by encoding HD image data in a unit of long GOP, depending on performance of the editing apparatus (the computer that executes an editing program), processing such as decoding is late for display. This causes a large gap between a frame presently designated by the dial and a frame displayed on the display. As a result, the user may feel a sense of incongruity (stress).

On the other hand, since so-called nonlinear edition is generally adopted at present, the function of scrub as means for easily checking contents of a moving image and determining edition points is becoming more and more important. A function of scrub for allowing the user to check contents of a moving image more in detail and smoothly is demanded. In realizing such a function of scrub, a user interface is important.

Therefore, it is desirable to provide an appropriate user interface in variable speed reproduction such as scrub.

According to an embodiment of the invention, there is provided a data processing apparatus that processes image data of a moving image. The data processing apparatus includes: display-type determining means for determining, on the basis of variations, display types, which represent display methods in displaying pictures, in a unit of picture, the variations representing degrees of change in the image data; and display control means for causing a display to display type information representing the display types of pictures and position information representing a position of a picture designated by picture-designation operating means operated in designating a picture to be displayed.

According to the embodiment of the invention, there is provided a data processing method of processing image data of a moving image or a program for causing a computer to execute processing of image data of a moving image. The data processing method or the program includes the steps of: determining, on the basis of variations in pictures, display types, which represent display methods in displaying pictures, in a unit of picture, the variations representing degrees of change in the image data; and causing a display to display type information representing the display types of pictures and position information representing a position of a picture designated by picture-designation operating means operated in designating a picture to be displayed.

In the data processing apparatus, the data processing method, or the program according to the embodiment, display types, which represent display methods in displaying pictures, is determined in a unit of picture on the basis of variations in pictures representing degrees of change in the image data in a unit of picture. Type information representing the display types of pictures and position information representing a position of a picture designated by picture-designation operating means operated in designating a picture to be displayed are displayed.

According to another embodiment of the invention, there is provided a data processing apparatus that processes image data of a moving image. The data processing apparatus includes display control means for causing a display to display type information representing display types of pictures in a unit of picture and position information representing a position of a picture designated by picture-designation operating means operated in designating a picture to be displayed, the display types being determined on the basis of variations in a unit of picture, which represent degrees of change in the image data, and representing display methods in displaying pictures.

According to the embodiment of the invention, there is provided a data processing method of processing image data of a moving image or a program for causing a computer to execute processing of image data of a moving image. The data processing method or the program includes the step of causing a display to display type information representing display types of pictures in a unit of picture and position information representing a position of a picture designated by picture-designation operating means operated in designating a picture to be displayed, the display types being determined on the basis of variations in a unit of picture, which represent degrees of change in the image data, and representing display methods in displaying a picture.

In the data processing apparatus, the data processing method, or the program according to the embodiment, type information representing display types of pictures in a unit of picture and position information representing a position of a picture designated by picture-designation operating means operated in designating a picture to be displayed. The display type is determined on the basis of variations in a unit of picture, which represent degrees of change in the image data, and represent display methods in displaying pictures.

According to still another embodiment of the invention, there is provided a data processing apparatus that processes image data of a moving image. The data processing apparatus includes: acquiring means for acquiring variations representing degrees of change in the image data, in a unit of one or more pictures; display-type determining means for determining, on the basis of the variations, display types, which represent display methods in displaying a picture, in a unit of plural pictures; and display control means for causing a display to display type information representing the display types of pictures and position information representing a position of a picture designated by picture-designation operating means operated in designating a picture to be displayed.

In the data processing apparatus according to the embodiment, variations representing degrees of change in the image data in a unit of one or more pictures is acquired. Display types, which represent display methods in displaying pictures, are determined in a unit of plural pictures on the basis of the variations. Type information representing the display types of pictures and position information representing a position of a picture designated by picture-designation operating means operated in designating a picture to be displayed are displayed.

According to still another embodiment of the invention, there is provided a data processing apparatus that processes image data of a moving image. The data processing apparatus includes: acquiring means for acquiring display types, which represent display methods in displaying pictures, determined on the basis of variations in a unit of one or more pictures representing degrees of change in the image data in a unit of plural pictures; and display control means for causing a display to display type information representing the display types of pictures and position information representing a position of a picture designated by picture-designation operating means operated in designating a picture to be displayed.

In the data processing apparatus according to the embodiment, display types, which represent display methods in displaying pictures, determined on the basis of variations in a unit of one or more pictures representing degrees of change in the image data in a unit of plural pictures is acquired. Type information representing the display types of pictures and position information representing a position of a picture designated by picture-designation operating means operated in designating a picture to be displayed are displayed.

It is possible to record the program in a recording medium.

According to the embodiments of the invention, it is possible to provide an appropriate user interface in variable speed reproduction such as scrub.

In the data processing apparatus according to an embodiment there is included acquiring means for acquiring variations, the variations representing degrees of change on a frame by frame basis in the image data, display-type determining means for dividing the image data of the moving image into sections based on comparing the variations in the frames with a predetermined number of thresholds and judging the continuity of the variations in the frames, and for determining, on the basis of the variations and for each section, which way of a plurality different ways of displaying frames is the image data to be displayed for the respective section, and display control means for causing a display to display type information representing the plurality of different ways of displaying frames and position information representing a position of each section in the image.

In the data processing apparatus according to an embodiment there is included circuitry configured to acquire variations representing degrees of change on a frame by frame basis in the image data, divide the image data of the moving image into sections based on comparing the variations in the frames with a predetermined number of thresholds and judging the continuity of the variations in the frames, and to determine, on the basis of the variations and for each section, which way of a plurality of different ways of displaying frames is the image data displayed for the respective section, and cause a display to display type information representing the plurality of different ways of displaying frames and position information representing a position of each section in the image data.

In the data processing apparatus according to an embodiment, the plurality of different ways of displaying frames represent different resolutions in displaying frames or display rates in displaying frames.

In the data processing apparatus according to an embodiment, the variations are fineness information representing a degree of spatial change in a picture, and the circuitry, when the fineness information of a subject picture indicates that a degree of spatial change is larger than a predetermined threshold of the plurality of predetermined thresholds, determines that a corresponding section will be displayed with a high resolution/low display rate having a high resolution with respect to an unmodified moving image resolution or a low display rate with respect to an unmodified moving image display rate.

In the data processing apparatus according to an embodiment, the variations are motion information representing degrees of temporal change between frames, and the circuitry, when the motion information of a subject picture indicates that a degree of temporal change is larger than a predetermined threshold of the plurality of predetermined thresholds, determines that a corresponding section will be displayed with a low resolution/high display rate having a low resolution with respect to an unmodified moving image resolution or a high display rate with respect to an unmodified moving image display rate.

In the data processing apparatus according to an embodiment, the plurality of different ways of displaying frames include displaying frames as a still image, and the section is displayed as a still image for frames having a small variation with respect to variation occurring in an unmodified display of moving images.

In the data processing apparatus according to an embodiment, the circuitry is configured to determine which way of the plurality of different ways of displaying frames is the image to be displayed for each of the respective sections on the basis of a comparison result obtained by comparing the variations in the frames and the plurality of predetermined thresholds, and cause the display to further display a graph representing the variations in the frames in time series together with threshold information representing the plurality of predetermined thresholds.

In the data processing apparatus according to an embodiment, the threshold information is moved according to operation by a user, and the circuitry is configured to determine an updated way of the plurality of different ways of displaying frames that the image is to be displayed on the basis of a comparison result obtained by comparing the variations in the frames and thresholds represented by threshold information after the movement.

In the data processing apparatus according to an embodiment, the circuitry is configured to cause the display to display updated type information when the updated way of the plurality of different ways of displaying frames is determined by the circuitry.

In the data processing apparatus according to an embodiment, fineness information representing a degree of spatial change in a frame and motion information representing a degree of temporal change in a frame relative to another frame are stored in a file as the variations, and the circuitry is configured to cause the display to display a graph representing the fineness information in time series, a graph representing the motion information in time series, or both the graph representing the fineness information in time series and the graph representing the motion information in time series.

In the data processing apparatus according to an embodiment, the circuitry is configured to select the graph representing the fineness information in time series, the graph representing the motion information in time series, or both the graph representing the fineness information in time series and the graph representing the motion information in time series to be displayed.

In the data processing apparatus according to an embodiment, a bar on which a dial is movable is caused to be displayed by the circuitry, frames are allocated in time series to subsections, the subsections dividing up a movable range of the bar on which the dial is movable, and the circuitry is configured to cause the display to display position information representing a position of a frame allocated to a subsection in which the dial is located.

In the data processing apparatus according to an embodiment, the circuitry is configured to cause the display to further display allocation range information representing an allocation range that is a range of frames in time series allocated from a front subsection to an end subsection in the movable range, the allocation range information is moved according to operation by a user, and a front frame and an end frame in the allocation range represented by the allocation range information are allocated to the front subsection and to the end subsection in the movable range.

In the data processing method of a data processing apparatus according to an embodiment there is included the steps of acquiring variations, the variations representing degrees of change on a frame by frame basis in the image data, dividing, by circuitry of the data processing apparatus, the image data of the moving image into sections based on comparing the variations in the frames with a predetermined number of thresholds and judging the continuity of the variations in the frames, determining, by the circuitry and on the basis of the variations and for each section, which way of a plurality of different ways of displaying pictures is the image data displayed for the respective section, and causing a display to display type information representing the plurality of different ways of graph representing the fineness information in time series, the graph representing the motion information in time series, or both the graph representing the fineness information in time series and the graph representing the motion information in time series to be displayed.

In the data processing apparatus according to an embodiment, a bar on which a dial is movable is caused to be displayed by the circuitry, frames are allocated in time series to subsections, the subsections dividing up a movable range of the bar on which the dial is movable, and the circuitry is configured to cause the display to display position information representing a position of a frame allocated to a subsection in which the dial is located.

In the data processing apparatus according to an embodiment, the circuitry is configured to cause the display to further display allocation range information representing an allocation range that is a range of frames in time series allocated from a front subsection to an end subsection in the movable range, the allocation range information is moved according to operation by a user, and a front frame and an end frame in the allocation range represented by the allocation range information are allocated to the front subsection and to the end subsection in the movable range.

In the data processing method of a data processing apparatus according to an embodiment there is included the steps of acquiring variations, the variations representing degrees of change on a frame by frame basis in the image data, dividing, by circuitry of the data processing apparatus, the image data of the moving image into sections based on comparing the variations in the frames with a predetermined number of thresholds and judging the continuity of the variations in the frames determining, by the circuitry and on the basis of the variations and for each section, which way of a plurality of different ways of displaying pictures is the image data displayed for the respective section, and causing a display to display type information representing the plurality of different ways of displaying pictures and position information representing a position of each section in the image data.

In the data processing apparatus according to an embodiment there is included circuitry configured to acquire variations, the variations representing degrees of change on a frame by frame basis in the image data, divide the image data of the moving image into sections based on comparing the variations in the frames with a predetermined number of thresholds, judge the continuity of the variations in the frames, determine, on the basis of the variations and for each section, which way of a plurality of different ways of displaying frames is the image data displayed for the respective section, cause a display to display type information representing the plurality of different ways of displaying frames and position information representing a position of each section in the image data, and determine a first way of displaying frames for a first section and a second way of displaying frames for a second section, the first way of displaying frames corresponds to less variation in respective frames than the second way of displaying frames, the different ways of displaying frames are respectively represented on a timeline representing an entire time length of the image data, and the different ways of displaying frames are mapped to the timeline in a weighted fashion such that the second way of displaying frames is represented on a greater portion of the timeline than the first way of displaying frames.

In the data processing method of a data processing apparatus according to an embodiment there is included the steps of determining a variation value for each frame of a plurality of frames in the image data of the moving image, determining whether each variation value is above a plurality of different thresholds, categorizing, by circuitry of the data processing apparatus, each frame into one of a plurality of categories based on the determination regarding whether the respective variation value is above a particular one of the plurality of different thresholds, grouping, by the circuitry, frames of the plurality of frames, when a preceding or following frame has a same category of the plurality of categories, into section groups, and displaying the section groups on a time axis together with a variation graph.

In the non-transitory computer readable medium according to an embodiment, there is included the steps of acquiring variations, the variations representing degrees of change on a frame by frame basis in the image data, dividing, by the computer, the image data of the moving image into sections based on comparing the variations in the frames with a predetermined number of thresholds and judging the continuity of the variations in the frames, determining, by the computer on the basis of the variations and for each section, which way of a plurality of different ways of displaying pictures is the image data displayed for the respective section, and causing a display to display type information representing the plurality of different ways of displaying pictures and position information representing a position of each section in the image data.

In the data processing apparatus according to an embodiment, the plurality of different ways of displaying frames include: displaying as a still picture, displaying the frames unmodified, and displaying the frames with a higher display rate than the unmodified display of the frames.

BRIEF DESCRIPTION OF THE DRAWINGS

FIG. 20 is a diagram for explaining an example of a display type;

FIG. 26 is a diagram showing an example of an Fy file;

FIG. 27 is a diagram for explaining an example of the display type;

FIG. 28 is a graph of motion information and a display type in a unit of frame;

FIG. 31 is a diagram for explaining an example of a display type;

FIG. 35 is a diagram showing an example of an Fy file;

FIG. 36 is a diagram showing an example of an Fy file;

FIG. 37 is a diagram showing an example of an Fy file;

FIG. 38 is a diagram for explaining an example of a display type;

FIG. 41 is a diagram showing an example of an Fy file;

FIG. 42 is a block diagram showing an example of a structure of a drive 5;

FIG. 43 is a block diagram showing an example of a functional structure of the PC 1 functioning as an editing system;

FIG. 66 is a diagram for explaining a method of determining a display type for each frame forming one GOP.

DESCRIPTION OF THE PREFERRED EMBODIMENTS

Embodiments of the invention will be hereinafter explained with reference to the accompanying drawings.

Figure 1:
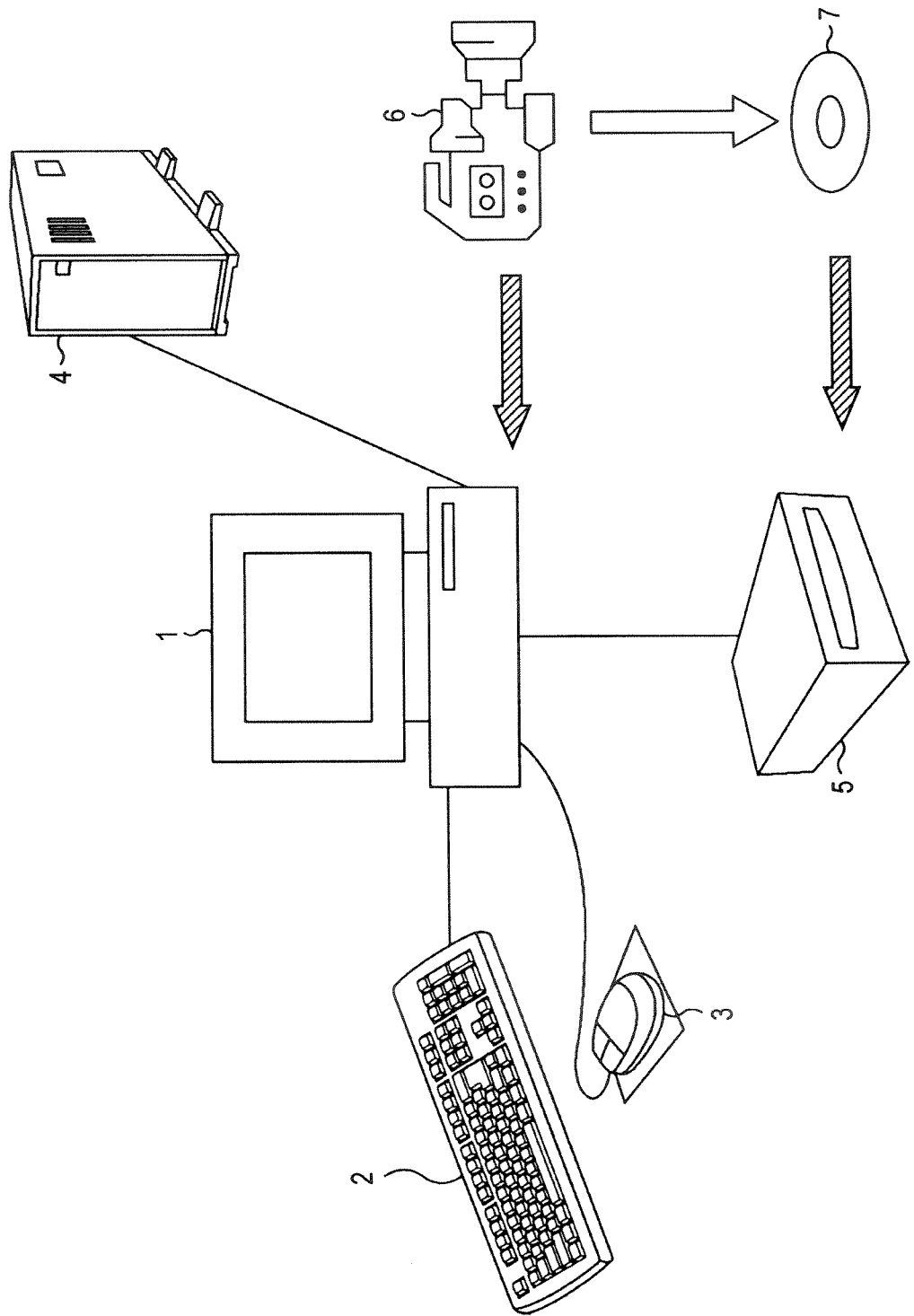
FIG. 1 is a block diagram showing an example of a structure of a data processing system according to an embodiment of the invention.

FIG. 1 is a diagram showing an example of a structure of a data processing system (a system means a logical collection of plural apparatuses regardless of whether apparatuses of respective structures are provided in an identical housing) according to an embodiment of the invention.

A PC (Personal Computer) 1 executes various programs to perform various kinds of processing. At least an OS (Operating System) and an editing program serving as software for performing edition of a moving image are installed in the PC 1 as programs. The PC 1 executes the editing program under the control by the OS to function as an editing system (an editing apparatus).

A keyboard 2 and a mouse 3 are operated in inputting a character (string), a command, and other information to the PC 1.

A hard disk (drive) 4 is a so-called external hard disk. In FIG. 1, the hard disk 4 is connected to the PC 1. The hard disk 4 records and reproduces AV (Audio Visual) data and the like under the control by the PC 1. It is possible to use the hard disk 4 for, for example, when edition of a moving image is performed in the PC 1, ripping of AV data of the moving image, i.e., saving of the AV data as a file of a format that can be processed in the PC 1.

A drive 5 is, for example, an external optical disk drive. An optical disk 7 is removably insertable into the drive 5. In FIG. 1, the drive 5 is connected to the PC 1 and records AV data and the like in and reproduces AV data and the like from the optical disk 7 under the control of the PC 1.

A camera (a video camera) 6 images a subject and records AV data (image data and sound data incidental to the image data) of a moving image obtained as a result of the imaging in a recording medium such as the optical disk 7 removably insertable into the camera 6, a not-shown magnetic tape, or a semiconductor memory or transmits the AV data via a wire or wireless transmission medium. The camera 6 may be a so-called HD camera that outputs HD image data as image data of a moving image or may be a so-called SD camera that outputs SD (standard Definition) image data as image data of a moving image.

The optical disk 7 is inserted in, for example, the camera 6. AV data and the like obtained by the camera 6 is recorded in the optical disk 7. The optical disk 7 is inserted into the drive 5. AV data and the like recorded in the optical disk 7 are reproduced. As the optical disk 7, it is possible to adopt, for example, a DVD (Digital Versatile Disc) and a professional Disc®.

The professional disc is an optical disk that is capable of performing high-density recording by a blue-violet laser. Other than HD or SD image data of a moving image that a user originally desires to record, data with an amount of data reduced by, for example, reducing the number of pixels compared with that of the HD or SD image data (hereinafter referred to as proxy data as appropriate) and metadata of the HD or SD image data are recorded in the professional disc.

As opposed to the proxy data, the HD or SD image data of the moving image that the user originally desires to record is referred to as main data as appropriate.

Besides image data of a moving image, concerning sound data incidental to the image data (sound data of the moving image), other than sound data of the moving image that the user originally desires to record, data with an amount of data of the sound data reduced is recorded in the professional disc. The main data means, other than the HD or SD image data of the moving image that the user originally desires to record, when necessary, the sound data of the moving image that the user originally desires to record or both the image data and the sound data. Similarly, the proxy data means, other than the data with an amount of data of the image data serving as the main data reduced, when necessary, data with an amount of data of the sound data serving as the main data reduced or both the data.

Figure 2:
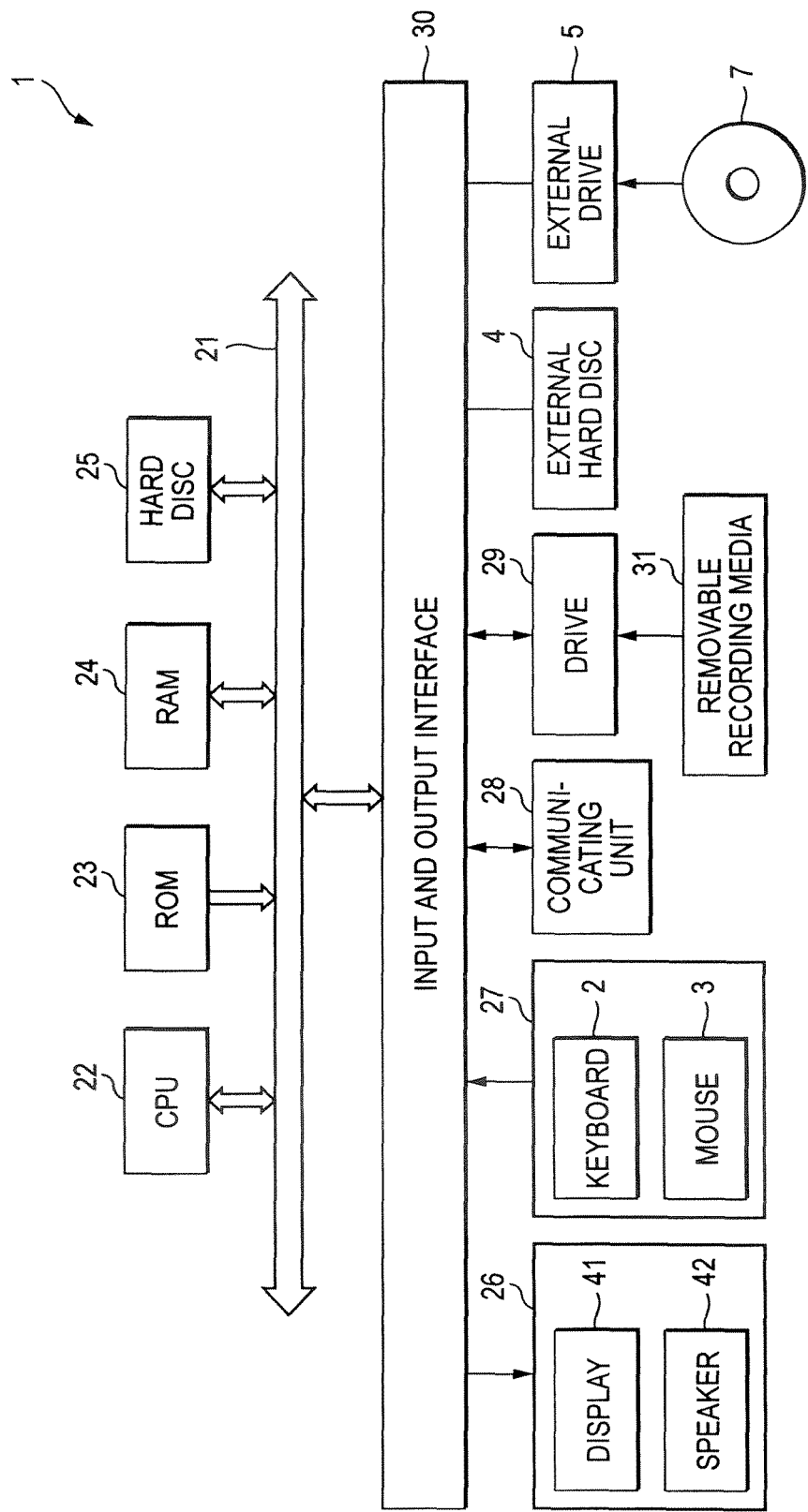
FIG. 2 is a block diagram showing an example of a configuration of hardware of a PC 1.

FIG. 2 is a diagram showing an example of a structure of hardware of the PC 1 in FIG. 1.

A CPU (Central Processing Unit) 22, a ROM (Read Only Memory) 23, a RAM (Random Access Memory) 24, a hard disk 25, and an input/output interface 30 are connected to a bus 21.

The CPU 22 executes programs to perform various kinds of processing. The ROM 23 has stored therein the programs executed by the CPU 22 and necessary data. The RAM 24 temporarily stores the programs executed by the CPU 22 and necessary data. The hard disk (drive) 25 is a built-in hard disk. The programs executed by the CPU 22 are installed and necessary data is recorded in the hard disk 25.

An output unit 26 includes a display 41 such as an LCD (Liquid Crystal Display) and a speaker 42. The output unit 26 is connected to the input/output interface 30. The output unit 26 displays an image corresponding to data supplied from the input/output interface 30 and outputs sound corresponding to the data.

An input unit 27 includes a keyboard 2, a mouse 3, and a not-shown microphone. The input unit 27 is connected to the input/output interface 30. When the user operates the keyboard 2 or the mouse 3, the input unit 27 outputs an operation signal supplied from the keyboard 2 or the mouse 3 to the input/output interface 30.

A communication unit 28 is a network interface such as a network card (a LAN (Local Area Network) card) or an ADSL (Asymmetric Digital Subscriber Line) modem. The communication unit 28 performs communication control between the PC 1 and a not-shown network.

A drive 29 is a built-in drive. It is possible to insert a removable recording medium 31 into and remove the removable recording medium 31 from the drive 29. The drive 29 reads data from and writes data in the removable recording medium 31 inserted therein.

The input/output interface 30 functions as an interface between the bus 21 and the output unit 26, the input unit 27, the communication unit 28, the drive 29, and other peripheral devices. In FIG. 2 (FIG. 1), the hard disk 4 and the drive 5 are connected to the input/output interface 30 as the other peripheral devices.

The removable recording medium 31 is a recording medium removably insertable into the drive 29 such as a flexible disc, a CD-ROM (Compact Disc Read Only Memory), an MO (Magneto Optical) disc, a DVD (Digital Versatile Disc), a magnetic disc, or a semiconductor memory.

In the PC 1 constituted as described above, for example, when the user operates the input unit 27 via the input/output interface 30 and inputs a command, the CPU 22 executes the programs stored in the ROM (Read Only Memory) 23 in accordance with the command. Alternatively, the CPU 22 loads programs stored (installed) in the external hard disk 4 or the built-in hard disk 25, programs transferred from a satellite or a network, received by the communication unit 28, and installed in the hard disk 4 or 25, or programs read out from the removable recording medium 31 inserted in the built-in drive 29 or the optical disk 7 inserted in the external drive 5 and installed in the hard disk 4 or 25 to the RAM (Random Access Memory) 24 and executes the programs. Consequently, the CPU 22 performs processing conforming to flowcharts described later or processing performed by components of a block diagram describe later. For example, the CPU 22 outputs a result of the processing from the output unit 26 including the display 41 such as an LCD (Liquid Crystal Display) and the speaker 42, transmits the result from the communication unit 28, or records the result in the hard disk 4 or 25 via the input/output interface 30 when necessary.

It is possible to record (install) the programs executed by the CPU 22 in the hard disk 25 or the ROM 23 serving as the recording medium built in the PC 1 or the external hard disk 4 in advance.

Alternatively, it is possible to temporarily or permanently store (record) the programs in the optical disk 7 removably insertable into the external drive 5 or the removable recording medium 31 removably insertable into the built-in drive 29. It is possible to provide the optical disk 7 and the removable recording medium 31 as so-called package software.

Other than installing the programs in the PC 1 from the removable recording medium 31 and the like described above, it is possible to transfer the programs from a download site to the PC 1 by radio via an artificial satellite for digital satellite broadcast or by wire via networks such as a LAN (Local Area Network) and the Internet. In the PC 1, it is possible to receive the programs transferred in this way in the communication unit 28 and install the programs in the built-in hard disk 25 and the like.

Processing steps that the PC 1 performs by executing the programs do not always have to be processed in time series according to an order described as the flowcharts described later. The processing steps also include processing executed in parallel or individually (e.g., parallel processing or processing according to an object).

The programs may be processed only by the PC 1 or may be processed by plural PCs 1 in a distributed manner. Moreover, the programs may be transferred to a remote PC and executed therein.

As described above, at least the OS and the editing program for performing edition of a moving image are installed in the PC 1. When a power supply is turned on, the PC 1 (the CPU 22) executes the OS and further executes the editing program under the control by the OS according to operation by the user. Consequently, the PC 1 functions as an editing system.

The PC 1 serving as the editing system causes, in order to show a moving image (an image) or the like serving as a so-called material, which is an object of edition, to the user, the display 41 to display a window for displaying the moving image or the like serving as the material.

Figure 3:
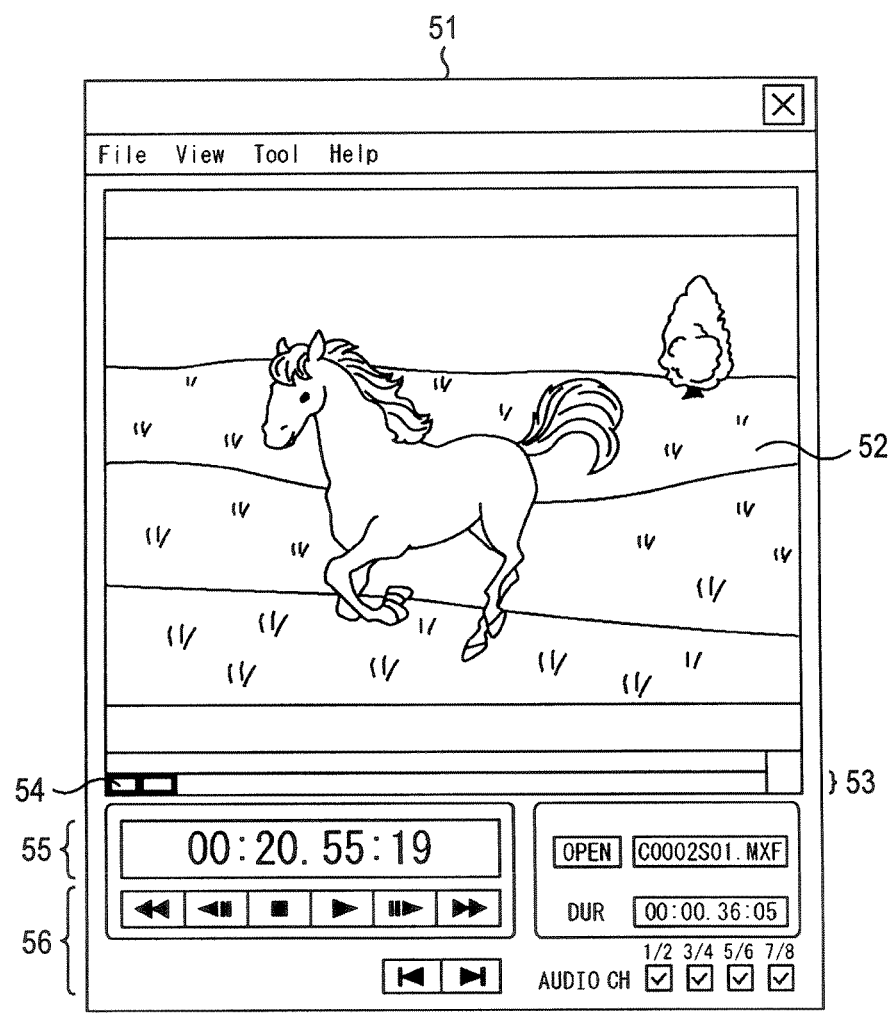
FIG. 3 is a diagram showing an example of display of a viewer 51.

FIG. 3 is a diagram showing an example of a structure of a viewer 51 serving as the window for displaying the moving image or the like serving as the material.

The viewer 51 includes a display section 52, a scrub bar 53, a time-code display section 55, and an operation section 56 and has a function of scrub.

The display section 52 is arranged from the upper part to the center to lower part of the viewer 51 and displays a moving image (an image).

The scrub bar 53 is operated in designating a picture displayed in the display section 52 among pictures forming the moving image. The scrub bar 53 is a GUI (Graphical User Interface) of a bar extending in the horizontal direction in which a scrub dial 54 thereof is movable. The user can move the scrub dial 54 along the scrub bar 53 by, for example, operating the scrub dial 54. The user can designate a picture displayed in the display section 52 according to a position of the scrub dial 54.

The picture means a frame or a field. In the following explanation, a frame is adopted as the picture. However, it is also possible to adopt a field as the picture.

The time-code display section 55 is provided below the scrub bar 53. A time code of a frame displayed in the display section 52 is displayed in the time code display section 55.

The operation section 56 is provided below the time-code display section 55. The operation section 56 includes a play button operated in starting reproduction of a moving image (display of an image in the display section 52), a stop button operated in stopping reproduction and the like, and a fast forward button operated in fast-forwarding the moving image.

Figure 4:
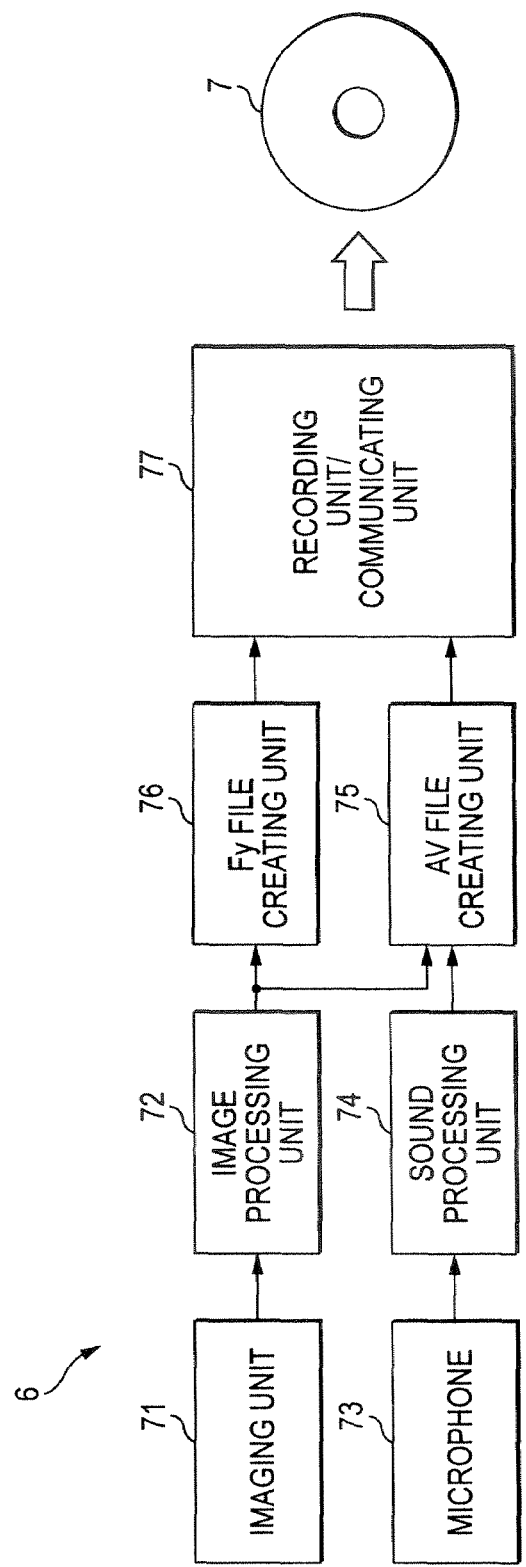
FIG. 4 is a block diagram showing an example of a structure of a camera 6.

FIG. 4 is a diagram showing an example of a structure of the camera 6 in FIG. 1.

The camera 6 includes an imaging unit 71, an image processing unit 72, a microphone 73, a sound processing unit 74, an AV-file creating unit 75, an Fy-file creating unit 76, and a recording unit/communicating unit 77.

The imaging unit 71 images a subject to acquire SD or HD image data and supplies the image data to the image processing unit 72. The imaging unit 71 includes a photoelectric conversion element such as a CCD (Charge Coupled Device) or a CMOS (Complementary Metal Oxide Semiconductor) imager and an optical system such as a lens that condenses light on the photoelectric conversion element. The imaging unit 71 photoelectrically converts light made incident thereon and supplies (digital) image data corresponding to the light to the image processing unit 72.

The image processing unit 72 applies necessary processing such as noise removal processing for removing noise to the image data from the imaging unit 71. The image processing unit 72 supplies the image data after the processing to the AV-file creating unit 75 and the Fy-file creating unit 76 in a unit of frame in time series.

The microphone 73 collects sounds, which is vibration of the air, inputted while imaging is performed by the imaging unit 71, converts the sound into (digital) sound data serving as an electric signal, and supplies the sound data to the sound processing unit 74.

The sound processing unit 74 applies necessary processing such as noise removal processing to the sound data from the microphone 73. The sound processing unit 74 supplies the sound data after the processing to the AV-file creating unit 75 in time series.

The AV-file creating unit 75 creates an AV file in which the time-series image data from the image processing unit 72 and the time-series sound data from the sound processing unit 74 are stored and supplies the AV file to the recording unit/communicating unit 77.

The Fy-file creating unit 76 calculates a variation representing a degree of change in the image data from the image processing unit 72 in a unit of frame. The Fy-file creating unit 76 determines, on the basis of a variation in a frame, a display type, which represents a display method in displaying the frame in the viewer 51 (FIG. 3), in a unit of picture when necessary. The Fy-file creating unit 76 creates a file in which one or both of the variation and the display type in a unit of frame are stored (hereinafter referred to as Fy file as appropriate) as (one of) metafiles in which metadata of the time-series image data from the image processing unit 72 is stored (metadata files) and supplies the file to the recording unit/communicating unit 77.

The recording unit/communicating unit 77 records, in the optical disk 7, the AV file supplied from the AV-file creating unit 75 and the Fy-file corresponding to the AV file supplied from the Fy-file creating unit 76, i.e., the Fy-file created from the image data, which is stored in the AV file supplied from the AV-file creating unit 75, and supplied from the Fy-file creating unit 76 or transmits the AV file and the Fy file via a not-shown transmission medium.

For example, file names indicating that an AV file $f_{av}$ and an Fy file $f_{Fy}$ corresponding to the AV file $f_{av}$ correspond to each other are given to the AV file $f_{av}$ and the Fy file $f_{Fy}$. In other words, the file names of the AV file $f_{av}$ and the Fy file $f_{Fy}$ corresponding to the AV file $f_{av}$ are, for example, file names in which only extensions are different (file names that are identical except the extensions).

Figure 5:
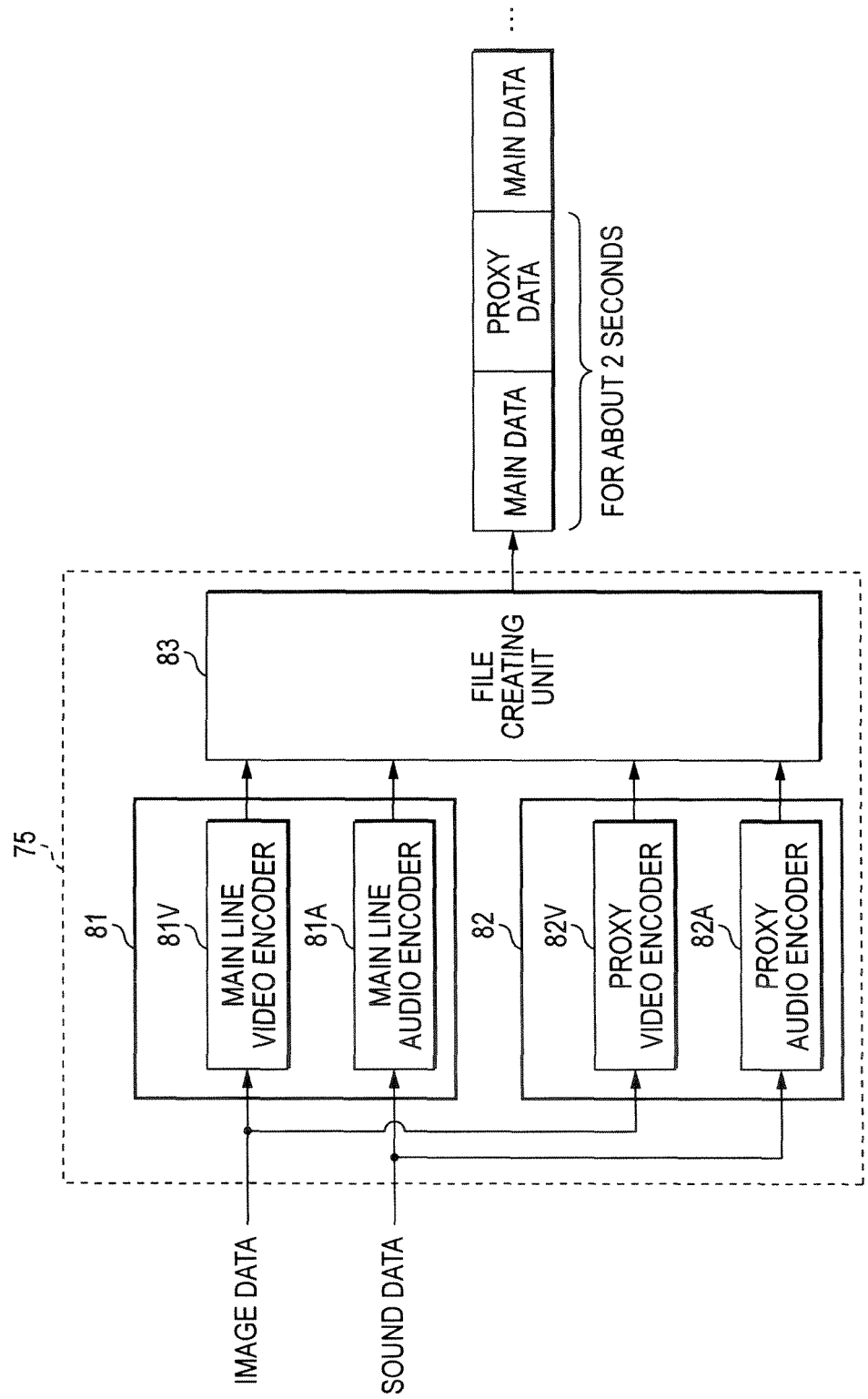
FIG. 5 is a block diagram showing an example of a structure of an AV-file creating unit 75.

FIG. 5 is a diagram showing an example of a structure of the AV-file creating unit 75 in FIG. 4.

In the example of the structure of the AV-file creating unit 75 shown in FIG. 5, the optical disk 7 is a professional disc in which both main data and proxy data are recorded.

In FIG. 5, the AV-file creating unit 75 includes a main line encoder 81, a proxy encoder 82, and a file creating unit 83.

The main line encoder 81 includes a main line video encoder 81V and a main line audio encoder 81A.

Image data serving as main data is supplied to the main line video encoder 81V from the image processing unit 72 (FIG. 4). The main line video encoder 81V encodes the image data serving as main data from the image processing unit 72 in, for example, the MPEG2 (e.g., MPEG IMX system) and supplies the image data to the file creating unit 83.

Sound data is supplied to the main line audio encoder 81A from the sound processing unit 74 (FIG. 4). The main line audio encoder 81A converts the sound data from the sound processing unit 74 into sound data of, for example, the AES (Audio Engineering Society) 3 system serving as main data and supplies the sound data to the file creating unit 83.

The proxy encoder 82 includes a proxy video encoder 82V and a proxy audio encoder 82A.

Image data serving as main data is supplied to the proxy video encoder 82V from the image processing unit 72 (FIG. 4). The proxy video encoder 82V curtails the number of pixels of the image data serving as main data from the image processing unit 72 to calculate, for example, image data serving as proxy data having a resolution (a spatial resolution) lower than that of the main data. Moreover, the proxy video encoder 82V encodes the image data serving as proxy data in, for example, the MPEG4 and supplies the image data to the file creating unit 83.

Sound data is supplied to the proxy audio encoder 82A from the sound processing unit 74 (FIG. 4). The proxy audio encoder 82A converts the sound data from the sound processing unit 74 into, for example, sound data of the ITU-T (International Telecommunication Union, Telecommunication Standardization Sector) G.711 A-Law system serving as proxy data and supplies the sound data to the file creating unit 83.

The file creating unit 83 multiplexes (the encoded data) of the image data serving as main data from the main line video encoder 81V, the sound data serving as main data from the main line audio encoder 81A, the image data serving as proxy data from the proxy video encoder 82V, and the sound data serving as proxy data from the proxy audio encoder 82A in, for example, a reproduction time of about two seconds, respectively. The file creating unit 83 creates an AV file of a predetermined format in which a bit stream obtained by the multiplexing is stored, i.e., an AV file of a predetermined format in which a bit stream obtained by multiplexing (the image data and the sound data serving as) main data and (the image data and the sound data serving as) proxy data in a reproduction time of about two seconds, respectively, is stored. The file creating unit 83 supplies the AV file to the recording unit/communicating unit 77 (FIG. 4).

Figure 6:
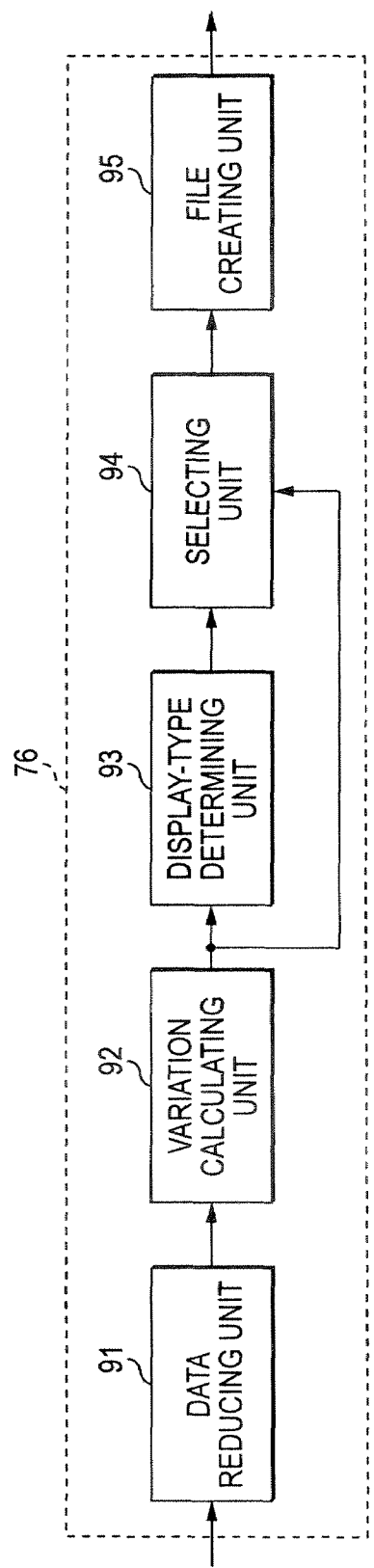
FIG. 6 is a block diagram showing an example of a structure of an Fy-file creating unit 76.

FIG. 6 is a diagram showing an example of a structure of the Fy-file creating unit 76 in FIG. 4.

The Fy-file creating unit 76 includes a data reducing unit 91, a variation calculating unit 92, a display-type determining unit 93, a selecting unit 94, and a file creating unit 95.

An image data in a unit of frame is supplied to the data reducing unit 91 from the image processing unit 72 (FIG. 4).

The data reducing unit 91 curtails the number of pixels of the image data in a unit of frame from the image processing unit 72 and supplies image data with the reduced number of pixels obtained as a result of the curtailment to the variation calculating unit 92.

The data reducing unit 91 performs curtailment to reduce the horizontal and the vertical numbers of pixels of a frame of the image data from the image processing unit 72 to, for example, ⅛, respectively.

Figure 7:
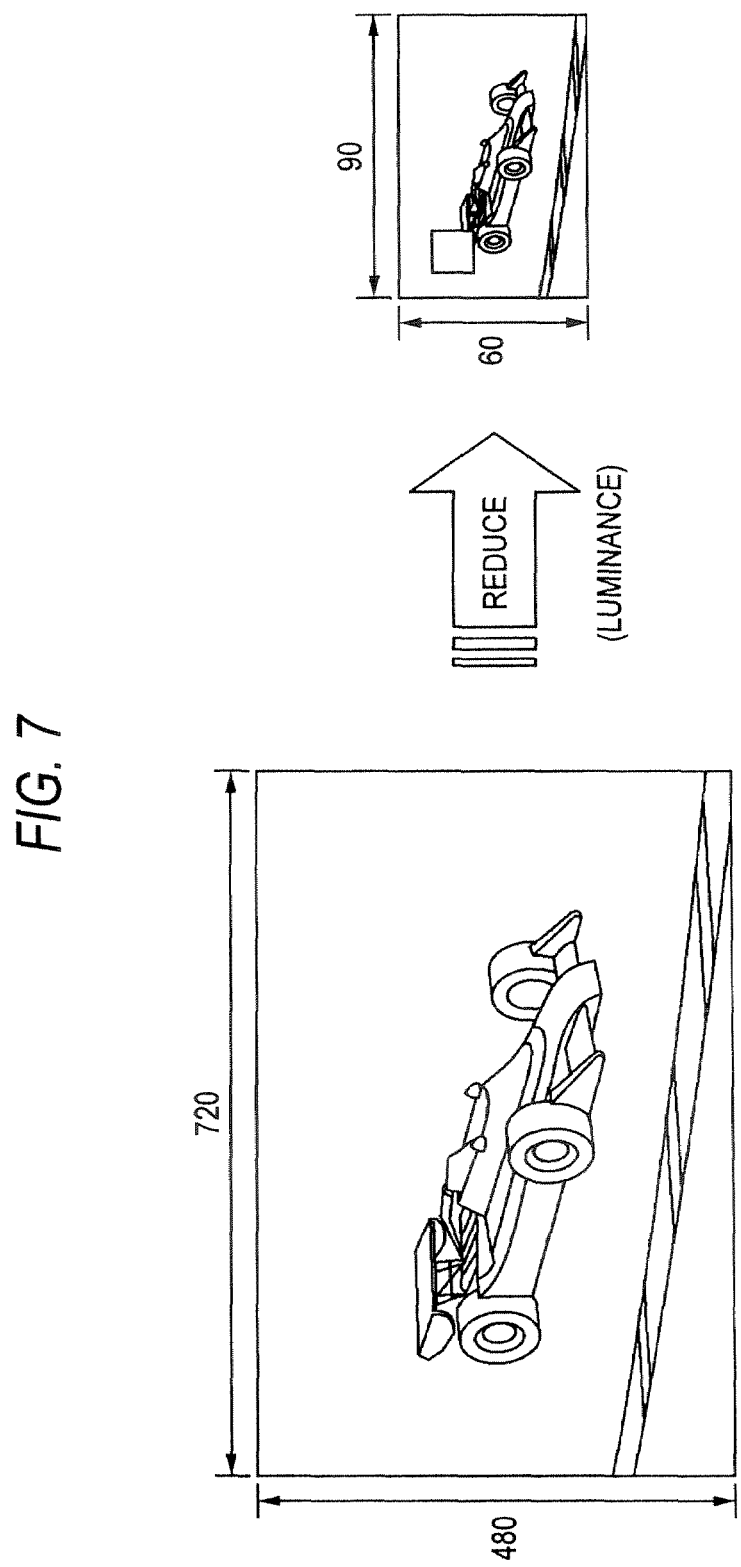
FIG. 7 is a diagram for explaining processing of a data reducing unit 91.

Therefore, when the frame of the image data supplied from the image processing unit 72 (FIG. 4) to the data reducing unit 91 is formed by, for example, 720×480 pixels arranged vertically and horizontally, the data reducing unit 91 curtails the pixels of the image data having 720×480 pixels from the image processing unit 72, for example, as shown in FIG. 7 to form image data having the horizontal and vertical numbers of pixels reduced to 90×60 pixels, which are ⅛ of 720×480 pixels.

In other words, the data reducing unit 91 divides the image data having 720×480 pixels from the image processing unit 72 into, for example, blocks of 8×8 pixels arranged horizontally and vertically and allocates an average or the like of pixel values of the pixels forming the blocks to the blocks to generate image data having 90×60 pixels.

The number of pixels of the image data from the image processing unit 72 is reduced by the data reducing unit 91 for the purpose of reducing burdens of processing after that. When the Fy-file creating unit 76 has sufficient performance and it is unnecessary to reduce burdens of the processing, the data reducing unit 91 may supply the image data from the image processing unit 72 directly to the variation calculating unit 92 at the later stage. Alternatively, the data reducing unit 91 does not have to be provided in the Fy-file creating unit 76.

The variation calculating unit 92 calculates a variation representing a degree of change in the image data supplied from the data reducing unit 91 in a unit of frame and supplies the variation to the display-type determining unit 93 and the selecting unit 94 in time series. The variation calculating unit 92 can calculate one or both of a variation representing a degree of temporal change (hereinafter referred to as temporal variation as appropriate) and a variation representing a degree of spatial change (hereinafter referred to as spatial variation as appropriate) as the variation in a unit of frame.

The temporal variation represents a degree of change in an image in a time direction. For example, a temporal variation in a frame represents a degree of change in the image between the frame and a frame immediately preceding the frame, i.e., a degree of motion of the image. Thus, the temporal variation is hereinafter also referred to as motion information as appropriate.

The spatial variation represents a degree of change in an image in a space direction. For example, a spatial variation in a frame represents a degree of change in a pixel value of pixels forming the frame, i.e., fineness (complexity) of the image. Thus, the spatial variation is hereinafter also referred to as fineness information.

The display-type determining unit 93 determines, on the basis of the variation in a unit of frame supplied from the variation calculating unit 92 in time series, a display type, which represents a display method in displaying the frame, in a unit of frame and supplies the display type to the selecting unit 94. Details of the display type will be described later.

The selecting unit 94 selects one or both of the variation in a unit of frame supplied from the variation calculating unit 92 and the display type in a unit of frame supplied from the display-type determining unit 93 and supplies one or both of the variation and the display type to the file creating unit 95.

It is possible to, for example, set in advance or determine according to operation by the user what kind of selection is performed in the selecting unit 94. When only the variation in a unit of frame supplied from the variation calculating unit 92 is selected, so to speak, fixedly in the selecting unit 94, the display-type determining unit 93 and the selecting unit 94 do not have to be provided in the Fy-file creating unit 76.

The file creating unit 95 creates a predetermined format Fy file in which one or both of the variation and the display type in a unit of frame supplied from the selecting unit 94 are stored and supplies the Fy file to the recording unit/communicating unit 77 (FIG. 4).

Figure 8:
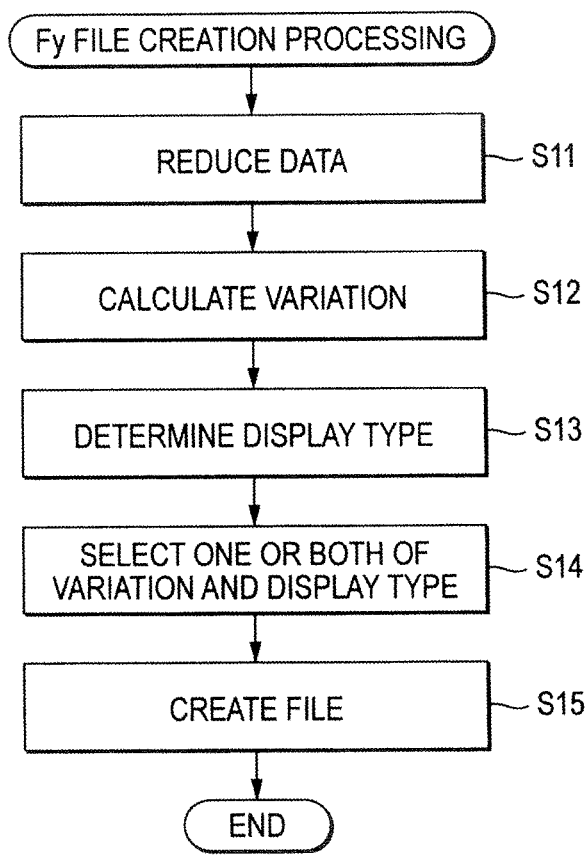
FIG. 8 is a flowchart for explaining Fy file creation processing.

Processing performed by the Fy-file creating unit 76 in FIG. 6 (Fy-file creation processing) will be explained with reference to a flowchart in FIG. 8.

First, in step S11, the data reducing unit 91 performs data reduction for curtailing the number of pixels of image data from the image processing unit 72 (FIG. 4) when necessary. The data reducing unit 91 supplies image data as a result of the data reduction to the variation calculating unit 92. The processing proceeds to step S12.

In step S12, the variation calculating unit 92 calculates, using the image data from the data reducing unit 91, a variation representing a degree of change in the image data from the image processing unit 72 (FIG. 4) in a unit of frame. The variation calculating unit 92 supplies the variation to the display-type determining unit 93 and the selecting unit 94 in time series. The processing proceeds to step S13.

In step S13, the display-type determining unit 93 determines, on the basis of the variation in a unit of frame from the variation calculating unit 92, a display type, which represents a display method in displaying the frame, in a unit of frame. The display-type determining unit 93 supplies the display type to the selecting unit 94. The processing proceeds to step S14.

In step S14, the selecting unit 94 selects one or both of the variation in a unit of frame supplied from the variation calculating unit 92 and the display type in a unit of frame supplied from the display-type determining unit 93. The selecting unit 94 supplies one or both of the variation and the display type to the file creating unit 95. The processing proceeds to step S15.

In step S15, the file creating unit 95 creates a predetermined format Fy file in which one or both of the variation and the display type in a unit of frame supplied from the selecting unit 94 are stored. The file creating unit 95 supplies the Fy file to the recording unit/communicating unit 77 (FIG. 4) and ends the processing.

Figure 9:
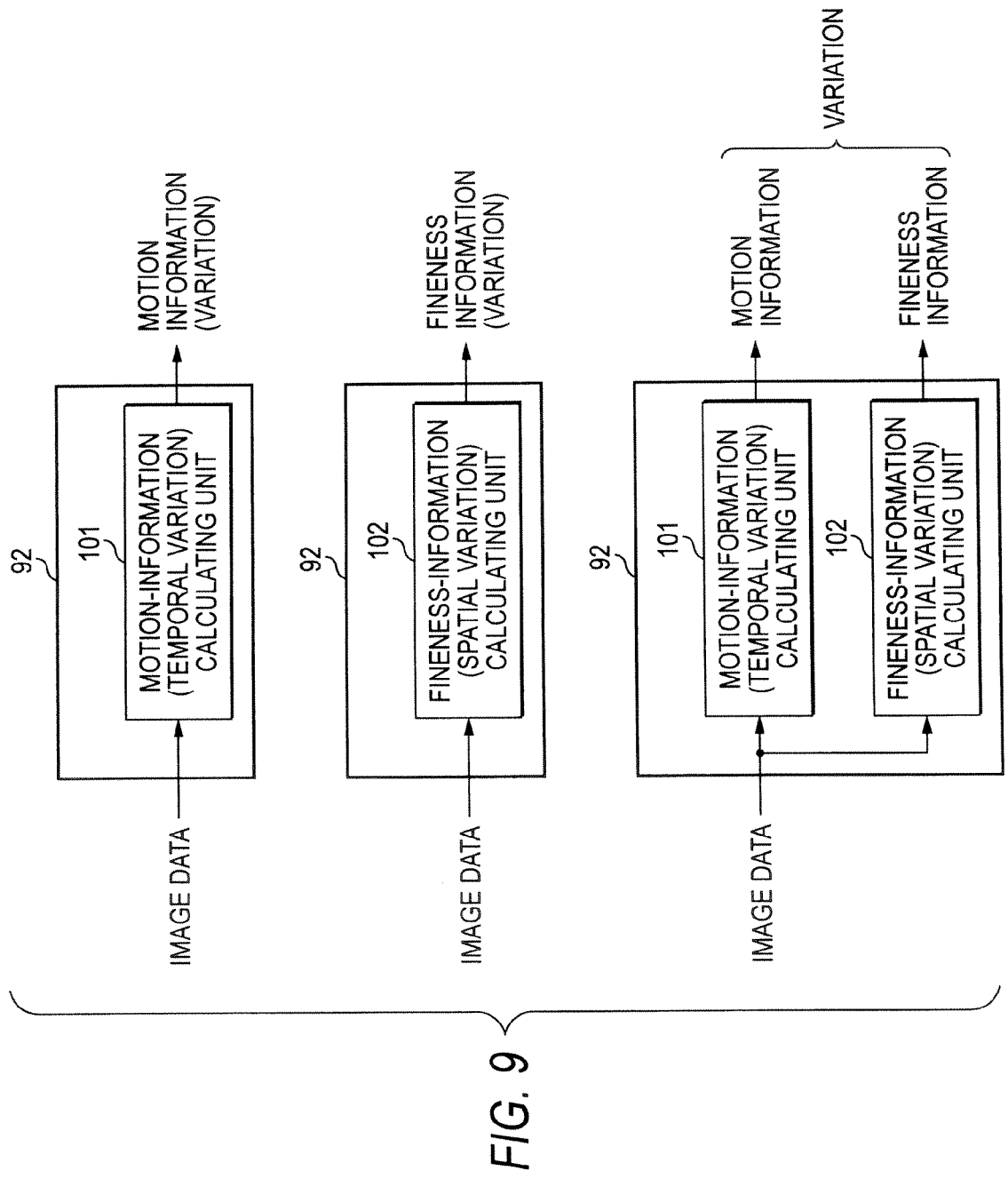
FIG. 9 is a block diagram showing an example of a structure of a variation calculating unit 92.

FIG. 9 is a diagram showing an example of a structure of the variation calculating unit 92 in FIG. 6.

As described above, the variation calculating unit 92 can calculate one or both of motion information (a temporal variation) representing a degree of temporal change and fineness information (a spatial variation) representing a degree of spatial change as a variation in a unit of frame.

A diagram at the top in FIG. 9 shows an example of a structure of the variation calculating unit 92 at the time when only motion information is calculated as a variation in a unit of frame. A second diagram from the top in FIG. 9 shows an example of a structure of the variation calculating unit 92 at the time when only fineness information is calculated as a variation in a unit of frame. A third diagram from the top (at the bottom) in FIG. 9 shows an example of a structure of the variation calculating unit 92 at the time when both the motion information and the fineness information are calculated as a variation in a unit of frame.

The variation calculating unit 92 at the top in FIG. 9 has a motion-information calculating unit 101. The second variation calculating unit 92 from the top in FIG. 9 has a fineness-information calculating unit 102. The third variation calculating unit 92 from the top in FIG. 9 has the motion-information calculating unit 101 and the fineness-information calculating unit 102.

Image data from the data reducing unit 91 (FIG. 6) is supplied to the motion-information calculating unit 101 and the fineness-information calculating unit 102.

The motion-information calculating unit 101 calculates motion information in a unit of frame using the image data from the data reducing unit 91 and outputs the motion information. The fineness-information calculating unit 102 calculates fineness information in a unit of frame using the image data from the data reducing unit 91 and outputs the fineness information.

The motion information in a unit of frame calculated by the motion-information calculating unit 101 in FIG. 9 will be explained with reference to FIG. 10.

Figure 10:
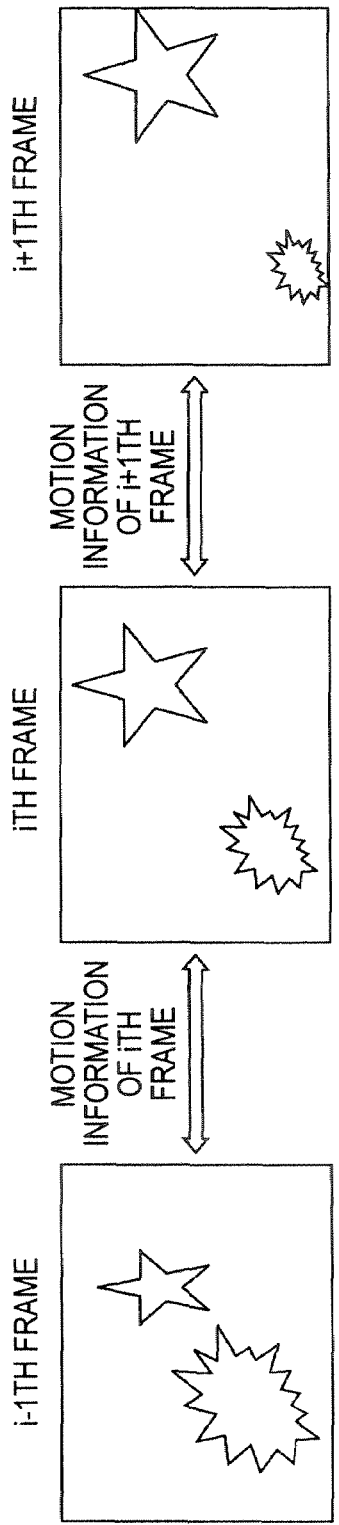
FIG. 10 is a diagram for explaining motion information in a unit of frame calculated in a motion-information calculating unit 101.

The motion-information calculating unit 101 calculates, for example, as shown in FIG. 10, as motion information of an ith frame from the top among frames in time series forming a moving image, a variation in the image from an immediately preceding i−1th frame to the ith frame. In this case, motion information of a first frame is not present. However, as the motion information of the first frame, it is possible to adopt, for example, motion information identical with motion information of a second frame. Alternatively, it is possible to calculate the motion information of the first frame assuming that an image of a 0th frame is an image in which all pixel values are 0 or an image identical with the image of the first frame.

Figure 11:
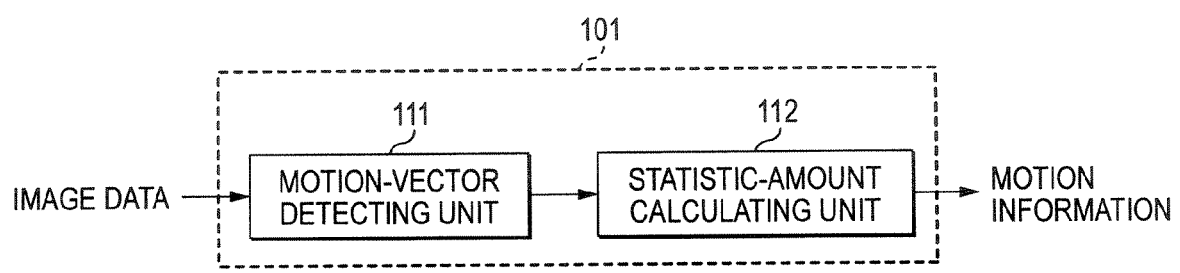
FIG. 11 is a block diagram showing an example of a structure of the motion-information calculating unit 101.

FIG. 11 is a diagram showing an example of a structure of the motion-information calculating unit 101 in FIG. 9.

In FIG. 11, the motion-information calculating unit 101 includes a motion-vector detecting unit 111 and a statistic-amount calculating unit 112.

Image data is supplied to the motion-vector detecting unit 111 from the data reducing unit 91 (FIG. 6). The motion-vector detecting unit 111 sequentially sets frames of the image data from the data reducing unit 91 as a frame of interest and divides a frame immediately preceding the frame of interest (hereinafter referred to as preceding frame as appropriate) into, for example, blocks of 16×16 pixels (macro-blocks in the MPEG). Moreover, the motion-vector detecting unit 111 calculates, for each of the macro-blocks of the preceding frame, a motion vector representing motion from the preceding frame to the frame of interest and supplies the motion vector to the statistic-amount calculating unit 112.

The statistic-amount calculating unit 112 calculates a statistic amount of the motion vector calculated for the macro-blocks of the preceding frame from the motion-vector detecting unit 111 and outputs the statistic amount as motion information of the frame of interest.

Figure 12:
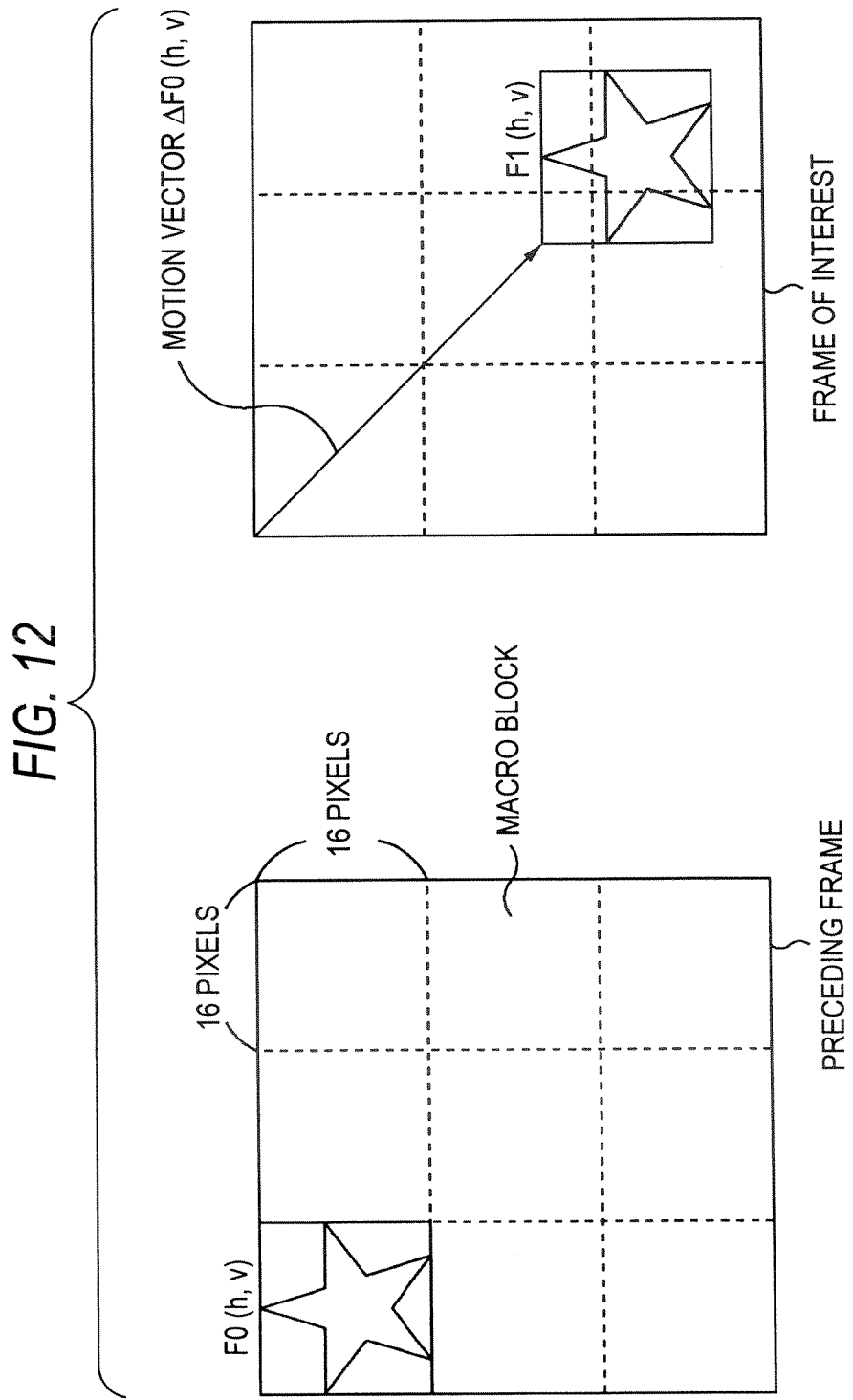
FIG. 12 is a diagram for explaining processing of the motion-information calculating unit 101.

Processing of the motion-information calculating unit 101 in FIG. 11 will be further explained with reference to FIG. 12.

In the motion-information calculating unit 101, the motion-vector detecting unit 111 divides the preceding frame into macro-blocks of 16×16 pixels and detects, for each of the macro-blocks of the preceding frame, a block of 16×16 pixels of a frame of interest most similar to the macro-block (hereinafter referred to as similar block). The motion-vector detecting unit 111 calculates a vector having, for example, the upper left part of the macro-block as a start point and the upper left part of the similar block as an end point as a motion vector $\Delta F0$ (h, v) of the macro-block.

A position of a macro-block hth from the left and vth from the top of the preceding frame is represented as F0 (h, v) and a position of a block of 16×16 pixels of a frame of interest in a position moved by the motion vector $\Delta F0$ (h, v) of the macro block F0 (h, v) from the macro-block F0 (h, v), i.e., a similar block is represented as F1 (h, v). The motion vector $\Delta F0$ (h, v) of the macro-block F0 (h, v) is represented by an equation $\Delta F0$ (h, v)=F1 (h, v)−F0 (h, v).

The statistic-amount calculating unit 112 calculates, as a statistic amount of the motion vector calculated for the macro-block of the preceding frame, for example, a sum $D0=\Sigma|\Delta F0$ (h, v)| of sizes |$\Delta F0$ (h, v)| of the motion vectors $\Delta F0$ (h, v) of all the macro-blocks of the preceding frame and outputs the sum D0 as motion information of the frame of interest.

The summation $\Sigma$ in the sum $D0=\Sigma|\Delta F0$ (h, v)| represents a summation performed by changing h from 1 to the number of macro-blocks in the horizontal direction of the preceding frame and changing v from 1 to the number of macro-blocks in the vertical direction of the preceding frame.

When the motion vector $\Delta F0$ (h, v) of each of the macro-blocks F0 (h, v) of the preceding frame is large, the motion information D0, which is a sum of motion vectors, is also large. Therefore, when the motion information D0 of the frame of interest is large, motion of an image of the frame of interest is also large (intense).

In the case described above, the sum $D0=\Sigma|\Delta F0$ (h, v)| of the sizes |$\Delta f0$ (h, v)| of the motion vectors $\Delta f0$ (h, v) of all the macro-blocks of the preceding frame is calculated as the statistic amount of the motion vector calculated for the macro-block of the preceding frame. However, as the statistic amount of the motion vector calculated for the macro-block of the preceding frame, besides the sum D0, it is possible to adopt, for example, distribution of the motion vectors calculated for the macro-block of the receding frame.

In this case, the statistic-amount calculating unit 112 calculates an average $\Delta_{ave}$ of the motion vectors $\Delta F0$ (h, v) of all the macro-blocks of the preceding frame and calculates distribution $\sigma 0$ of the motion vectors $\Delta F0$ (h, v) of all the macro-blocks F0 (h, v) of the preceding frame by calculating, for example, an equation $\sigma 0=\Sigma(\Delta f0$ (h, v)$-\Delta_{ave})^2$.

The summation $\Sigma$ in the distribution $\sigma 0=\Sigma(\Delta f0$ (h, v)$-\Delta_{ave})^2$ represents a summation performed by changing h from 1 to the number of macro-blocks in the lateral direction of the preceding frame and changing v from 1 to the number of macro-blocks in the vertical direction of the preceding frame.

Like the sum D0, the distribution $\sigma 0$ is also large when motion of the image of the frame of interest is large (intense).

In the case in which encoding of image data is performed in the main line video encoder 81V in FIG. 5, when the motion vector $\Delta F0$ (h, v) is calculated, the statistic-amount calculating unit 112 (FIG. 11) can calculate the statistic amount described above using the motion vector $\Delta F0$ (h, v) calculated in the main line video encoder 81V. In this case, the motion-vector detecting unit 111 does not have to be provided in the motion-information calculating unit 101 in FIG. 11.

Figure 13:
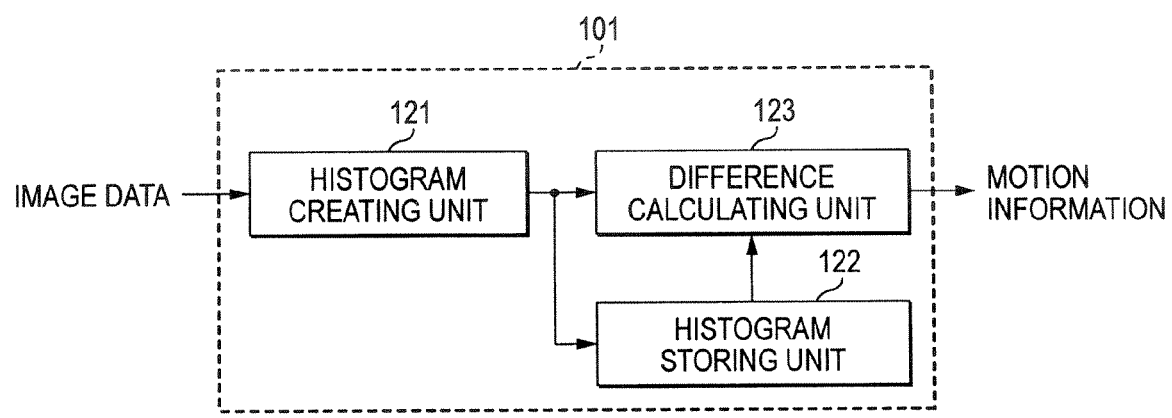
FIG. 13 is a block diagram showing another example of the structure of the motion-information calculating unit 101.

FIG. 13 is a diagram showing another example of the structure of the motion-information calculating unit 101 in FIG. 9.

In FIG. 13, the motion-information calculating unit 101 includes a histogram creating unit 121, a histogram storing unit 122, and a difference calculating unit 123.

Image data from the data reducing unit 91 (FIG. 6) is supplied to the histogram creating unit 121. The histogram creating unit 121 sequentially sets frames of the image data from the data reducing unit 91 as a frame of interest and creates, so to speak, a simple histogram of a pixel value of the frame of interest. The histogram creating unit 121 supplies the histogram to the histogram storing unit 122 and the difference calculating unit 123 as a histogram of the frame of interest.

The histogram storing unit 122 stores the histogram of the frame of interest supplied from the histogram creating unit 121. The histogram storing unit 122 has a storage capacity enough for storing histograms for at least two frames. The histogram storing unit 122 stores the histogram of the frame of interest of this time supplied from the histogram creating unit 121 and a histogram of a frame of interest of the last time, i.e., a preceding frame.

The difference calculating unit 123 calculates a difference absolute value sum described later of the histogram of the frame of interest supplied from the histogram creating unit 121 and the histogram of the preceding frame stored in the histogram storing unit 122 and outputs the difference absolute value sum as motion information of the frame of interest.

Processing of the motion-information calculating unit 101 in FIG. 13 will be further explained with reference to FIG. 14.

When a pixel value of the image data supplied from the data reducing unit 91 (FIG. 6) to the histogram creating unit 121 is represented by, for example, 8 bits that are capable of representing integer values of 0 to 255, the histogram creating unit 121 equally divides a range of 0 to 255 into, for example, eight small ranges of 0 to 31, 32 to 63, 64 to 95, 96 to 127, 128 to 159, 160 to 191, 192 to 223, and 224 to 255. The histogram creating unit 121 calculates frequencies of pixels values included in the respective small ranges to create a simple histogram of the frame of interest.

Figure 14:
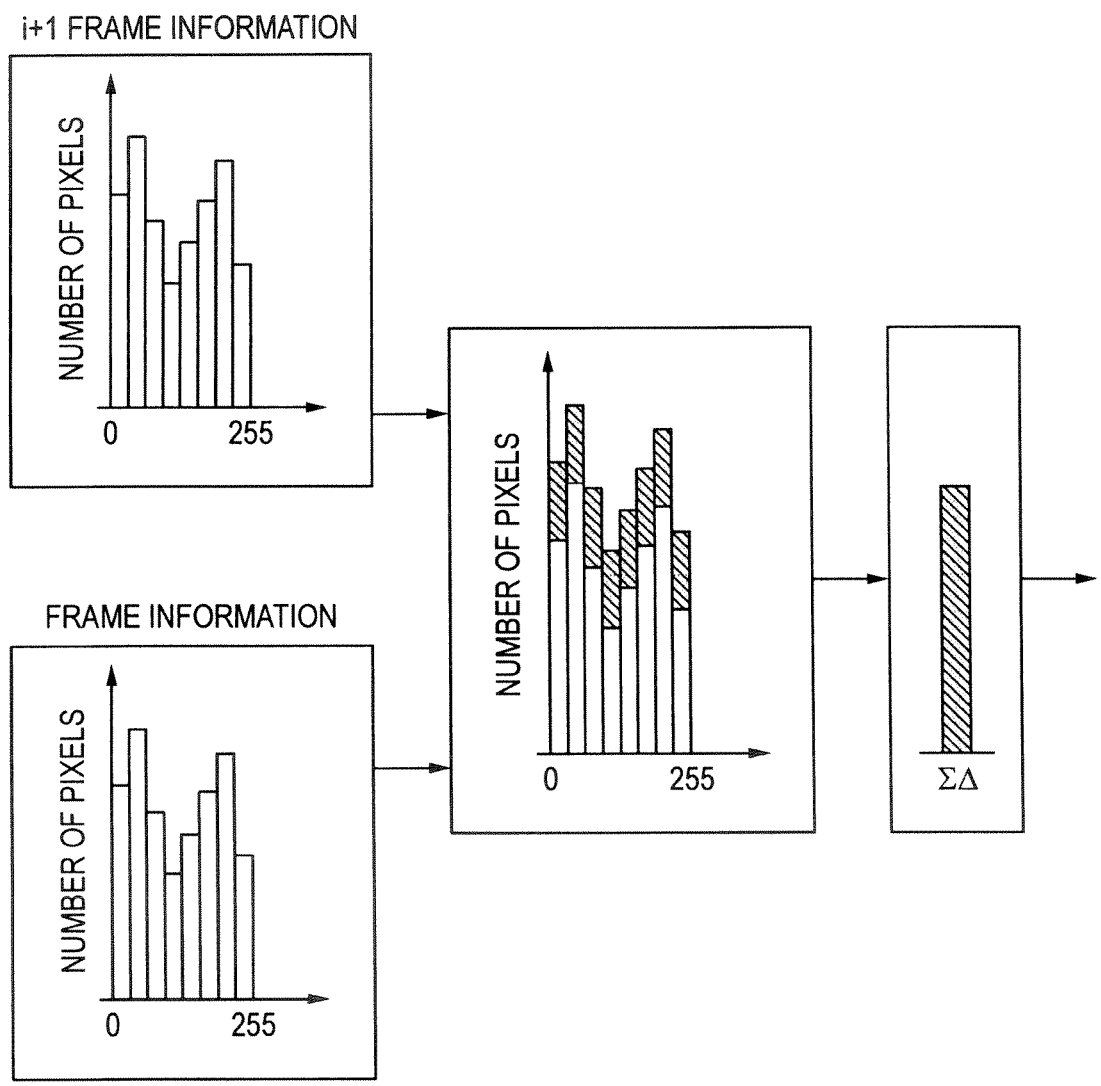
FIG. 14 is a diagram for explaining processing of the motion-information calculating unit 101.

For example, when an i+1th frame is a frame of interest, the difference calculating unit 123 calculates an absolute value Δ (a shaded portion in FIG. 14) of a difference value between frequencies of an identical small range of the i+1th frame, which is the frame of interest, and an ith frame, which is a preceding frame, as shown in FIG. 14. The difference calculating unit 123 further calculates a sum of absolute values of difference values (a difference absolute value sum) ΣΔ of frequencies calculated for the eight small ranges of the histogram and outputs the sum as motion information of the frame of interest.

When motion of the frame of interest is large (intense) a frequency distribution of a pixel value of the frame of interest is different from a frequency distribution of a pixel value of the preceding frame. Therefore, when the difference absolute value sum ΣΔ of the frame of interest is large, motion of the image of the frame of interest is also large (intense).

Figure 15:
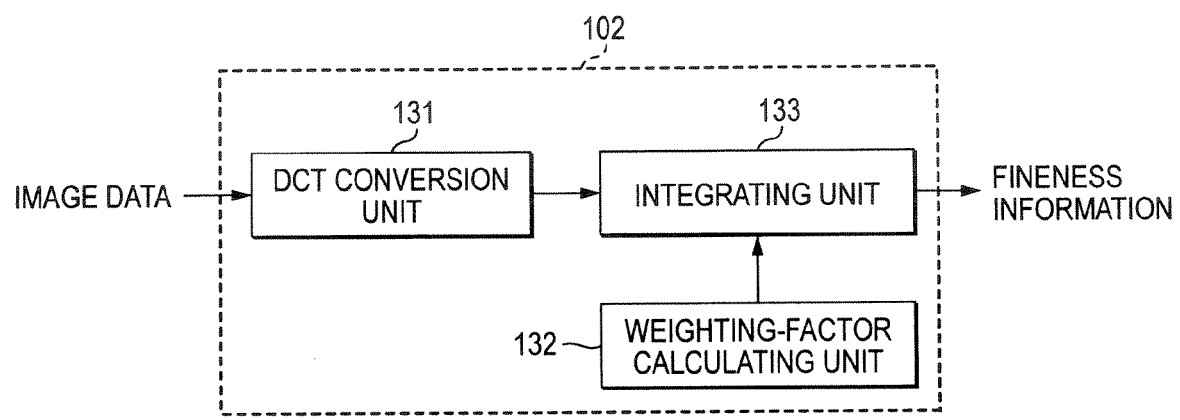
FIG. 15 is a block diagram showing an example of a structure of a fineness-information calculating unit 102.

FIG. 15 is a diagram showing an example of a structure of the fineness-information calculating unit 102 in FIG. 9.

In FIG. 15, the fineness-information calculating unit 102 includes a DCT (Discrete Cosine Transform) conversion unit 131, a weighting-factor calculating unit 132, and an integrating unit 133.

Image data from the data reducing unit 91 (FIG. 6) is supplied to the DCT conversion unit 131. The DCT conversion unit 131 sequentially sets frames of the image data from the data reducing unit 91 as a frame of interest and divides the frame of interest into, for example, blocks of 8×8 pixels. The DCT conversion unit 131 subjects each of the blocks of the frame of interest to DCT conversion and supplies 8×8 DCT factors obtained for each of the blocks to the integrating unit 133.

The weighting-factor calculating unit 132 calculates weights to be applied to the 8×8 DCT factors of the block and supplies the weights to the integrating unit 133.

The integrating unit 133 applies the weights supplied from the weighting-factor calculating unit 132 to the 8×8 DCT factors of the block supplied from the DCT conversion unit 131 and integrates the DCT factors to calculate integrated values. Moreover, the integrating unit 133 calculates a sum of the integrated values calculated for the respective blocks of the frame of interest and outputs the sum as fineness information of the frame of interest.

Processing of the fineness-information calculating unit 102 in FIG. 15 will be further explained with reference to FIG. 16.

Figure 16:
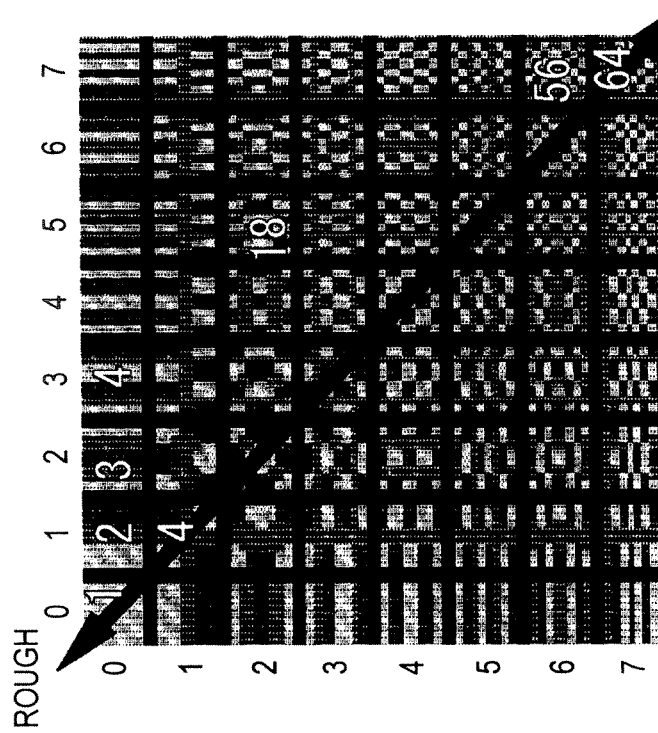
FIG. 16 is a diagram for explaining processing of the fineness-information calculating unit 102.

The left part in FIG. 16 indicates a base image of the DCT conversion. The base image includes 8×8 patterns (frequency components). A pattern further on the right side and a pattern further on the lower side are patterns having higher frequency components.

Among the 8×8 DCT factors of the block, a DCT factor $F_{i-1,j-1}$ ith ($i=1, 2, \ldots, 8$) from the left and jth ($j=1, 2, \ldots, 8$) from the top represents a degree of inclusion of a frequency component of a pattern ith from the left and jth from the top of the base image in the block.

The right part in FIG. 16 indicates a weight $G_{i-1,j-1}$ calculated by the weighting-factor calculating unit 132 in FIG. 15.

The weight $G_{i-1,j-1}$ is a weight applied to the DCT factor $F_{i-1,j-1}$. The weighting-factor calculating unit 132 calculates the weight $G_{i-1,j-1}$ in accordance with, for example, an equation $G_{i-1,j-1}=i \times j$. Therefore, in the weighting-factor calculating unit 132, the weight $G_{i-1,j-1}$ calculated is larger when the $G_{i-1,j-1}$ is applied to the DCT factor $F_{i-1,j-1}$ of a higher frequency component.

The integrating unit 133 in FIG. 15 multiplies the DCT factor $F_{i-1,j-1}$ of the block supplied from the DCT conversion unit 131 by the weight $G_{i-1,j-1}$ supplied from the weighting-factor calculating unit 132 to calculate a multiplied value $G_{i-1,j-1} \times F_{i-1,j-1}$. The integrating unit 133 integrates multiplied values $G_{i-1,j-1} \times F_{i-1,j-1}$ obtained for the 8×8 DCT factors $F_{i-1,j-1}$ of the block to calculate an integrated value $V=\Sigma G_{i-1,j-1} \times F_{i-1,j-1}$. The summation Σ in the integrated value $V=\Sigma G_{i-1,j-1} \times F_{i-1,j-1}$ represents a summation performed by changing i and j from 1 to 8, respectively.

The integrating unit 133 further calculates a sum K of integrated values V obtained for all the blocks of the frame of interest and outputs the sum K as fineness information of the frame of interest.

As a higher frequency component is included in the frame of interest, since the fineness information, which is the sum K of the integrate values V, is larger, an image of the frame of interest is a finer (more complicated) image.

Figure 17:
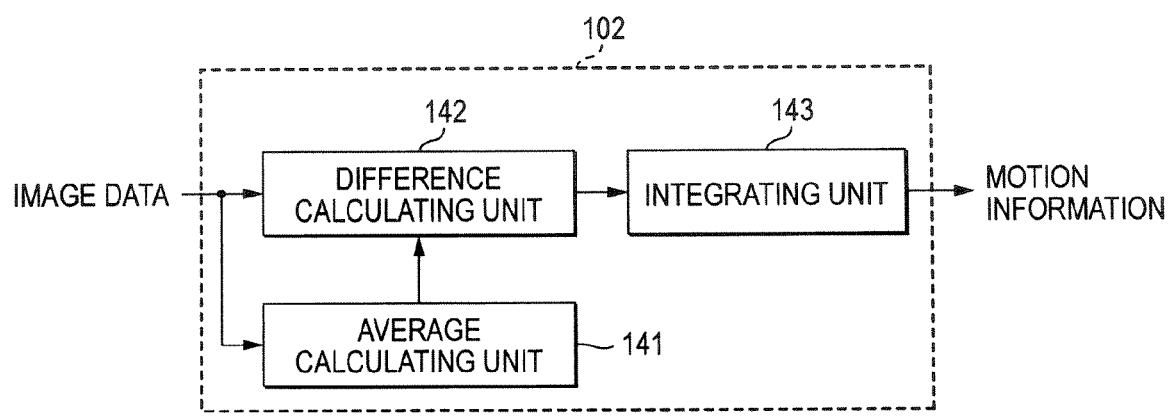
FIG. 17 is a block diagram showing another example of the structure of the fineness-information calculating unit 102.

FIG. 17 is a diagram showing another example of the structure of the fineness information calculating unit 102 in FIG. 9.

In FIG. 17, the fineness-information calculating unit 102 includes an average calculating unit 141, a difference-value calculating unit 142, and an integrating unit 143.

Figure 18:
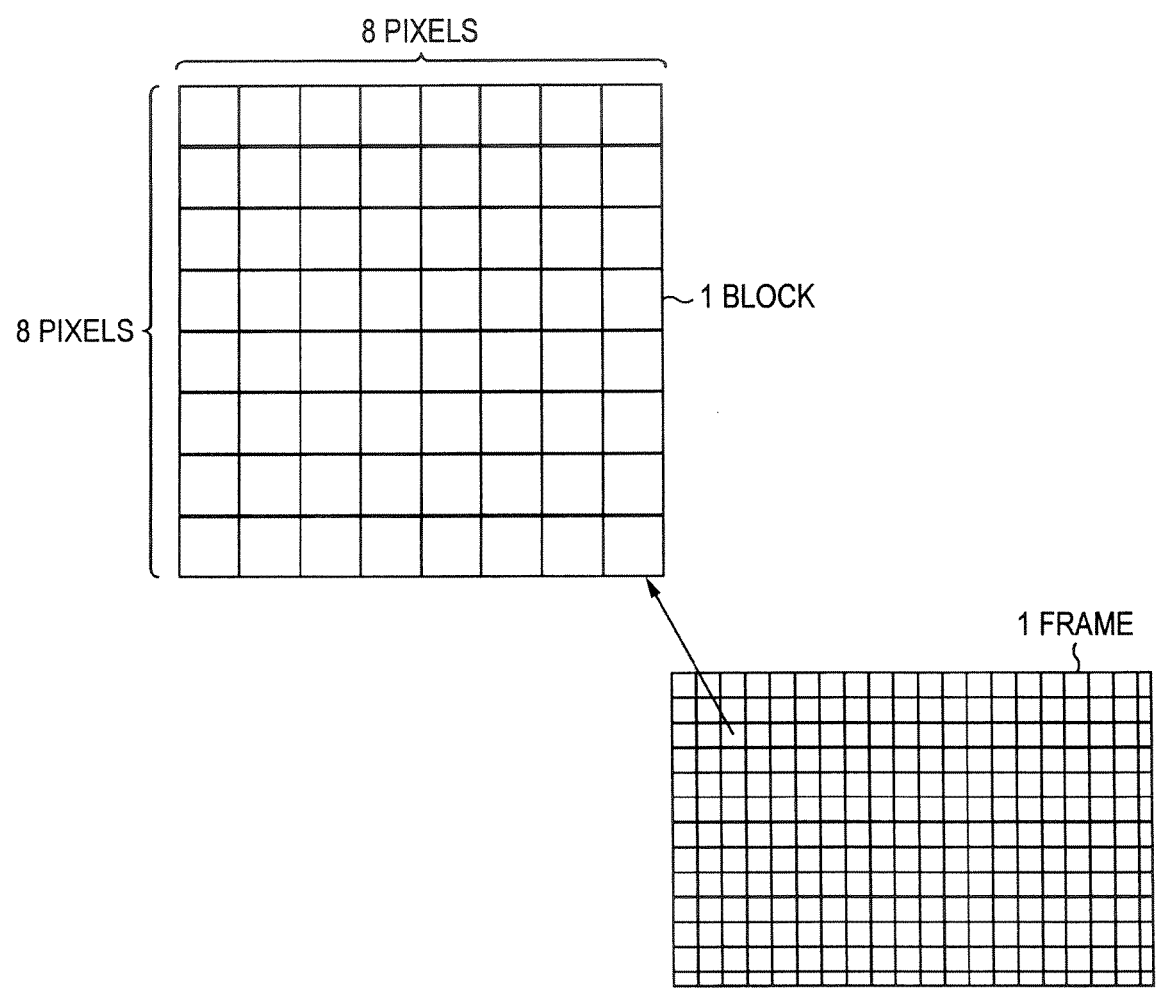
FIG. 18 is a diagram for explaining processing of an average calculating unit 141.

Image data from the data reducing unit 91 (FIG. 6) is supplied to the average calculating unit 141 and the difference-value calculating unit 142. The average calculating unit 141 sequentially sets frames of the image data from the data reducing unit 91 as a frame of interest and divides the frame of interest into blocks of 8×8 pixels, for example, as shown in FIG. 18. Moreover, the average calculating unit 141 calculates an average of pixel values of the blocks of the frame of interest and supplies the average to the difference-value calculating unit 142.

When a pixel value of a kth pixel in a raster scan order of the blocks of 8×8 pixels is represented as $P_k$, the average calculating unit 141 calculates an average $P_{ave}$ in accordance with an equation $P_{ave}=1/(8\times8)\times\Sigma P_k$. The summation $\Sigma$ in the average $P_{ave}=1/(8\times8)\times\Sigma P_k$ represents a summation performed by changing k from 1 to 8×8 (=64).

Like the average calculating unit 141, the difference-value calculating unit 142 divides the frame of interest into blocks of 8×8 pixels, calculates an absolute value $|P_k-P_{ave}|$ of a difference value between each of pixel values $P_k$ of the block and the average value $P_{ave}$ of pixel values of the block supplied from the average calculating unit 141, and supplies the absolute value $|P_k-P_{ave}|$ to the integrating unit 143.

The integrating unit 143 integrates absolute values $|P_k-P_{ave}|$ of difference values calculated for the respective pixels of the block supplied from the difference-value calculating unit 142 to calculate an integrated value $Q=\Sigma|P_k-P_{ave}|$. The summation $\Sigma$ in the integrated value $Q=\Sigma|P_k-P_{ave}|$ represents a summation performed by changing k from 1 to 8×8 (=64).

Moreover, the integrating unit 143 calculates a sum of integrated values Q obtained for all the blocks of the frame of interest and outputs the sum as fineness information of the frame of interest.

The sum of integrated values Q calculated for the frame of interest is called intra-AC. As a value of the intra-AC is larger, fluctuation in pixel values in the frame of interest is larger. Therefore, as the fineness information, which is the sum of integrated values Q, is larger, an image of the frame of interest is a finer (more complicated) image.

In this embodiment, the variations such as the motion information and the fineness information are used for (variable speed reproduction including) scrub as described later. Besides, it is possible to use the variations in, for example, detecting a scene change and realizing efficiency of MPEG encoding.

The display-type determining unit 93 in FIG. 6 will be explained with reference to FIGS. 19 to 25.

Figure 19:
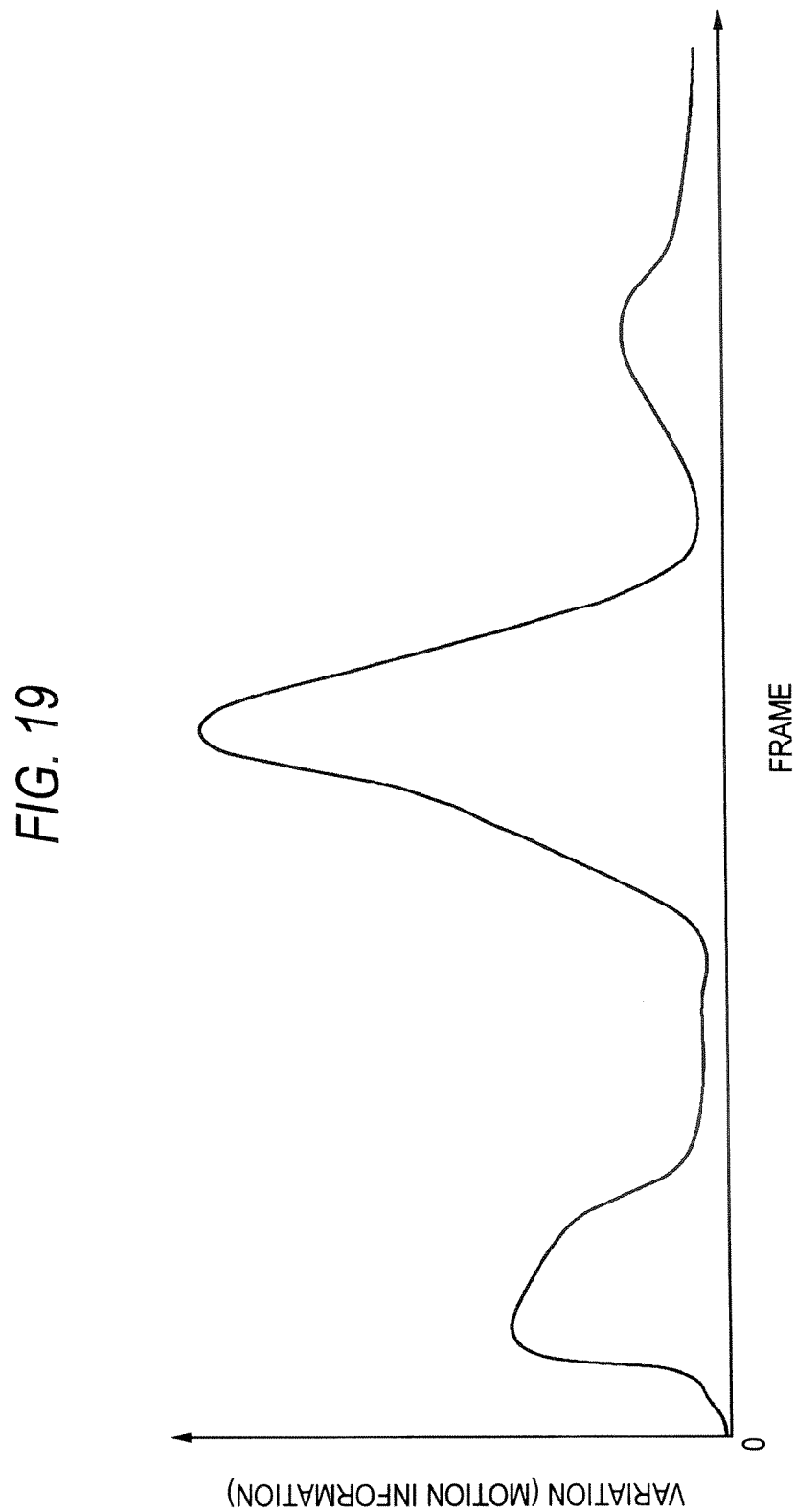
FIG. 19 is a graph of variations for frames calculated by the variation calculating unit 92.

FIG. 19 is a graph of a variation for each of frames calculated by the variation calculating unit 92 (FIG. 6). In FIG. 19, the abscissa indicates a frame (a place of a frame from the top) and the ordinate indicates a variation.

When the variation is, for example, motion information, in a frame in which motion is intense (large), the variation is also large. In a frame in which there is no (little) motion, the variation is small.

The display-type determining unit 93 (FIG. 6) determines, on the basis of a variation in a unit of frame shown in FIG. 19 calculated by the variation calculating unit 92, a display type, which represents a display method in displaying each of frames, out of plural display types.

FIG. 20 is a diagram showing an example of display types determined by the display-type determining unit 93.

In FIG. 20, as the display types, there are three types, namely, a still image type V1 representing display in a still image and a normal type V2 and a high display rate/low resolution type V3 in which resolutions in displaying a frame and display rates in displaying a frame are different.

The resolution in displaying a frame means a spatial resolution of an image displayed on a display device such as the display 41 (FIG. 2). For example, concerning image data serving as main data and proxy data, the main data has a higher resolution and the proxy data has a lower resolution.

The display rate in displaying a frame means a frequency (a period) for updating display in the display device such as the display 41. For example, when display is updated at a display rate identical with a frame rate (e.g., 30 Hz) of a moving image and a frame to be displayed is updated from a frame to the next frame (a frame temporally following a frame) at a rate identical with the frame rate, the moving image is displayed at a single speed.

Moreover, for example, when display is updated at a display rate twice as high as the frame rate of the moving image and the frame to be displayed is updated from a frame to the next frame at a rate twice as high as the frame rate, the moving image is displayed at a double speed.

For example, when display is updated at a display rate identical with the frame rate of the moving image and the frame to be displayed is updated from a frame to the next frame at a rate twice as high as the frame rate, the moving image is displayed at a double speed as well.

When display is updated at a display rate twice as high as the frame rate of the moving image and the frame to be displayed is updated at a rate twice as high as the frame rate, all frames forming the moving image are displayed without missing. However, when display is updated at a display rate identical with the frame rate of the moving image and the frame to be displayed is updated at a rate twice as high as the frame rate, the frames forming the moving image are displayed every other frames, which is a missing frame state.

Therefore, when the frame to be displayed is updated at a rate higher than the frame rate, it is possible to prevent (reduce) missing frame by increasing a display rate.

Concerning a frame of the still image type V1, for example, even if a frame to be displayed is changed, as long as an image of the frame to be displayed can be regarded as an image identical with (an image of) a frame displayed immediately before the image, (the image) of the frame displayed immediately before the image is displayed (continued to be displayed).

Concerning a frame of the normal type V2, for example, an image is displayed at a display rate identical with a frame rate of a moving image (hereinafter referred to as normal rate as appropriate) and with a resolution identical with that of image data serving as main data (a resolution higher than that of image data serving as proxy data) (hereinafter referred to as normal resolution as appropriate).

Concerning a frame of the high display rate/low resolution type V3, for example, an image is displayed at a display rate higher than the normal rate, for example, a display rate twice as high as the normal rate and with a resolution identical with that of image data serving as proxy data (a resolution lower than that of image data serving as main data).

When there are the three types, namely, the still image type V1, the normal type V2, and the high display rate/low resolution type V3 as the display types as shown in FIG. 20, the variation calculating unit 92 calculates motion information representing a degree of temporal change of a frame as a variation. The display-type determining unit 93 compares, for example, a variation (motion information) of each of frames and two predetermined thresholds and determines, on the basis of a result of the comparison, that a display type for the frame is the still image type V1, the normal type V2, or the high display rate/low resolution type V3.

Figure 21:
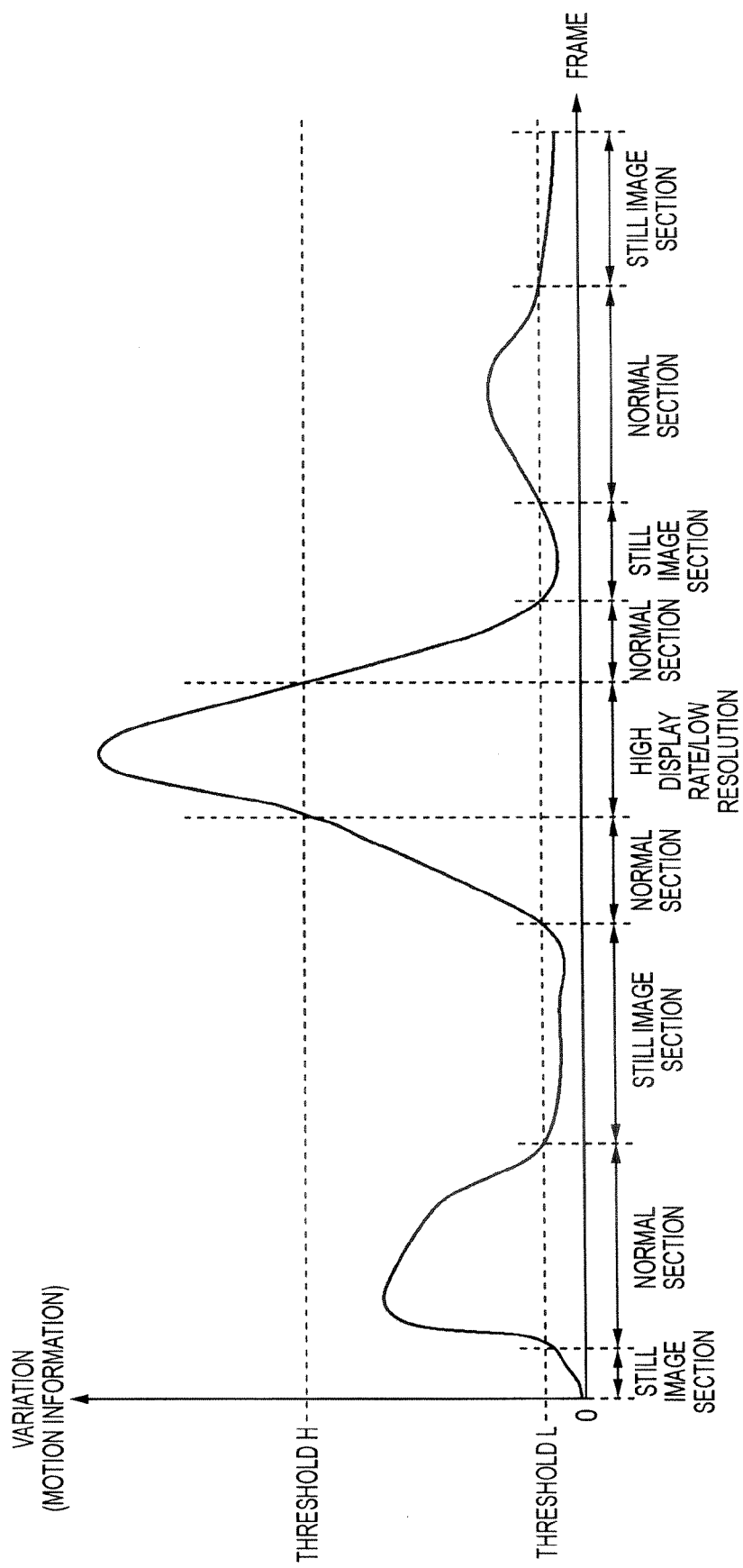
FIG. 21 is a graph for explaining a display type determined in a unit of frame by a display-type determining unit 93.

FIG. 21 is a diagram showing a display type determined by the display-type determining unit 93 in a unit of frame on the basis of the variation in a unit of frame shown in FIG. 19.

The display-type determining unit 93 compares the variation (motion information) in a unit of frame with one of a threshold L and a threshold H that are in a relation of L<H. The display-type determining unit 93 determines the high display rate/low resolution type V3, which is a kind of a low resolution/high display rate type, as a display type for frames having motion information equal to or larger than the threshold H, i.e., a display type for frames in which motion information indicates that a degree of temporal change is large.

When, for example, missing frame occurs in display of the frame having a large degree of temporal change, i.e., a frame having large motion in scrub performed in edition, a temporal change in an image tends to be overlooked. Thus, it is desirable that the frame having large motion is displayed at a high display rate.

However, when the display rate is set high, burdens on an apparatus for scrub increases. Moreover, since an amount of data of the frame with large motion is large, burdens of processing for the frame is larger than burdens of processing for a frame not having large motion.

Thus, in this embodiment, the frame having large motion is displayed at a high display rate. However, the high display rate/low resolution type V3, which is a kind of a low resolution/high display rate type for displaying an image having a low resolution is adopted for the frame. The image having a low resolution has a small amount of data compared with an image having a high resolution. Thus, it is possible to reduce burdens on the apparatus for scrub while preventing overlooking of a temporal change in an image in edition by displaying the image having a low resolution at a high display rate for the frame having large motion.

On the other hand, the display-type determining unit 93 determines the still image type V1 representing display in a still image as a display type for frames in which motion information is smaller than the threshold L, i.e., frames in which motion information indicates that a degree of temporal change is small.

For example, frames having a small degree of temporal change, i.e., frames having no (little) motion continue in scrub performed in edition. In this case, when a frame to be displayed is updated among the frames, even if display on the display device such as the display 41 (FIG. 2) is changed from (an image of) a frame immediately before the update to (an image of) a frame to be displayed after the update, an image displayed on the display device does not change (rarely changes).

When the frame to be displayed is updated regardless of no change in an image displayed on the display device, if display on the display device is changed from a frame displayed immediately before the update to a frame to be displayed after the update in this way, so to speak, excess burdens are imposed on the apparatus for scrub.

In the case in which frames having no (little) motion continue, when a frame to be displayed is updated among the frames, if display on the display device such as the display 41 (FIG. 2) is changed from a frame displayed immediately before the update to a frame to be displayed after the update, an image displayed on the display device may slightly change. In this case, in a section of the continuous frames having no motion that are rarely set as an edition point, attention of a user who operates the apparatus for scrub is drawn, so to speak, uselessly. This imposes burdens on the user.

Thus, in this embodiment, the still image type V1 for displaying, even if a frame to be displayed is changed, (an image of) a frame displayed immediately before the update as long as an image of the frame to be displayed can be regarded as an image identical with that of the frame displayed immediately before the update is adopted for a frame having no motion. This makes it possible to prevent excess burdens from being imposed on the apparatus for scrub and the user who operates the apparatus.

The display-type determining unit 93 determines the normal type V2 as a display type for frames other than frames having motion information equal to or higher than threshold H and frames having motion information smaller than the threshold L, i.e., frames having motion information equal to or larger than the threshold L and smaller than the threshold H.

The normal type V2 for displaying an image at a normal rate (a display rate identical with a frame rate of the image) and with a normal resolution is adopted for a frame having some degree of motion but not having very large motion.

In (a sequence of) frames in time series forming a moving image, a section in which frames of the still image type V1 continue is referred to as a still image section and a section in which frames of the normal type V2 continue is referred to as a normal section. A section in which frames of the high display rate/low resolution type V3 continue is referred to as a high display rate/low resolution section.

Figure 22:
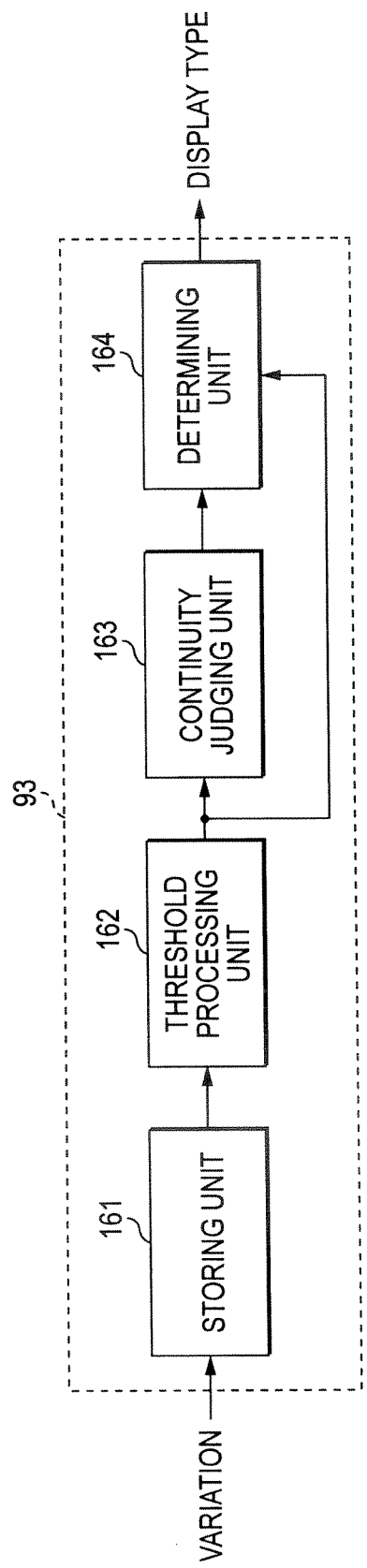
FIG. 22 is a block diagram showing an example of a structure of the display-type determining unit 93.

FIG. 22 is a diagram showing an example of a structure of the display-type determining unit 93 in FIG. 6.

In FIG. 22, the display-type determining unit 93 includes a storing unit 161, a threshold processing unit 162, a continuity judging unit 163, and a determining unit 164.

A variation in a unit of frame is supplied to the storing unit 161 from the variation calculating unit 92 (FIG. 6). The storing unit 161 temporarily stores the variation in a unit of frame from the variation calculating unit 92.

The threshold processing unit 162 compares the variation in a unit of frame stored in the storing unit 161 and (one or both of) the threshold H and the threshold L and supplies comparison information representing a result of the comparison to the continuity judging unit 163 and the determining unit 164 in a unit of frame.

The continuity judging unit 163 judges, on the basis of the comparison information in a unit of frame from the threshold processing unit 162, for example, whether frames having a variation equal to or larger than the threshold H are continuously present by the number of frames N (plural) or more and whether frames having a variation smaller than the threshold H are continuously present by the number of frames N or more. The continuity judging unit 163 supplies judgment information representing a result of the judgment to the determining unit 164.

The determining unit 164 determines, on the basis of the comparison information from the threshold processing unit 162 and the judgment information from the continuity judging unit 163, a display type for each of frames forming a moving image and outputs the display type.

Processing of the display-type determining unit 93 in FIG. 22 will be explained with reference to flowcharts in FIGS. 23 and 24.

When a variation in a unit of frame is supplied from the variation calculating unit 92 (FIG. 6), in step S41, the display-type determining unit 93 causes the storing unit 161 to cache (temporarily store) the variation in a unit of frame. The processing proceeds to step S42.

For example, motion information is supplied from the variation calculating unit 92 to the display-type determining unit 93 as a variation. The display-type determining unit 93 determines a display type for each of frames out of, for example, the three types, namely, the still image type V1, the normal type V2, and the high display rate/low resolution type V3 shown in FIG. 20.

In step S42, the threshold processing unit 162 performs threshold processing for comparing the variation (motion information) in a unit of frame stored in the storing unit 161 and (one or both of) the threshold H and the threshold L. The threshold processing unit 162 supplies comparison information representing a result of the comparison of the variation in a unit of frame and the threshold H or the threshold L to the continuity judging unit 163 in a unit of frame. The processing proceeds to step S43.

In step S43, the continuity judging unit 163 selects, for example, a top frame in a time series order not set as a frame of interest among frames forming a moving image, for which an Fy file is about to be created by the Fy-file creating unit 76 (FIG. 6), as a frame of interest. The processing proceeds to step S44.

In step S44, the continuity judging unit 163 judges, on the basis of the comparison information from the threshold processing unit 162, whether a variation in the frame of interest is equal to or larger than the threshold H and frames having a variation equal to or larger than the threshold H are continuously present by the number of frames N (plural) or more immediately before, immediately after, or before and after the frame of interest.

When it is judged in step S44 that the variation in the frame of interest is equal to or larger than the threshold H and frames having a variation equal to or larger than the threshold H are continuously present by the number of frames N (plural) or more immediately before, immediately after, or before and after the frame of interest, the continuity judging unit 163 supplies judgment information representing a result of the judgment to the determining unit 164. The processing proceeds to step S45.

In step S45, the determining unit 164 determines, on the basis of the judgment information from the continuity judging unit 163, the high display rate/low resolution type V3. The processing proceeds to step S50 as a display type for the frame of interest.

According to steps S44 and S45, when the variation in the frame of interest is equal to or larger than the threshold H and, moreover, frames having a variation equal to or larger than the threshold H are continuously present by the number of frames N (plural) or more immediately before, immediately after, or before and after the frame of interest, the high display rate/ low resolution type V3 is determined as a display type for the frame of interest. This determination is based on the following reason.

As described later, when a display type is determined out of three types, namely, the still image type V1, the normal type V2, and the high display rate/low resolution type V3, in scrub, an image having a high resolution (an image having a normal resolution) is displayed for frames of the still image type V1 and frames of the normal type V2. In other words, an image is displayed by processing image data of main data having a larger amount of data (than that of proxy data). On the other hand, concerning frames of the high display rate/low resolution type V3, an image having a low resolution is displayed. In other words, an image is displayed by processing image data of proxy data having a smaller amount of data (than that of main data).

For example, when the optical disk 7 (FIG. 1) is a professional disc in which main data and proxy data are recorded, scrub is performed using the main data or the proxy data recorded in the optical disk 7. Then, concerning frames of the still image type V1 or the normal type V2, it is necessary to read out the main data from the optical disk 7. Concerning frames of the high display rate/low resolution type V3, it is necessary to read out the proxy data from the optical disk 7.

In the optical disk 7, the main data and the proxy data are recorded in positions physically apart from each other. Thus, for example, when frames of the still image type V1 or the normal type V2 and frames of the high display rate/low resolution type V3 alternately appear, seek is frequently performed at the time of scrub for (data recorded in) the optical disk 7. Depending on performance of the apparatus for scrub, it may be difficult to smoothly perform display of a frame designated by operation of the scrub bar 53 (FIG. 3).

Thus, in this embodiment, in order to prevent seek from being frequently performed, display types are determined such that frames of the high display rate/low resolution type V3 are continuously present by the number of frames N or more and frames of the still image type V1 or the normal type V2 are also present by the number of frames N or more.

For example, as described above, in steps S44 and S45, when the variation in the frame of interest is equal to or larger than the threshold H and frames having a variation equal to or larger than the threshold H are continuously present by the number of frames N or more immediately before, immediately after, or before and after the frame of interest, the high display rate/low resolution type V3 is determined as a display type for the frame of interest.

It is possible to determine the number of frames N taking into account, for example, a longest seek time of the drive 5 and the like for playing the optical disk 7 and a total number of frames forming a moving image for which an Fy file is about to be created by the Fy-file creating unit 76 (FIG. 6). The number of frames N may be determined in response to operation by the user.

When a display type is determined, the number of frames N is a minimum number of frames having a variation equal to or larger than the threshold H that should continue (moreover, as described later, a minimum number of frames having a variation smaller than the threshold H that should continue), the number of frames N is hereinafter referred to as a minimum limit number of frames N as appropriate.

Seek is a problem when, in frames in time series forming a moving image, frames of the still image type V1 or the normal type V2 for displaying an image using the main data and frames of the high display rate/low resolution type V3 for displaying an image using the proxy data are frequently switched. When frames of the still image type V1 and frames of the normal type V2, in both of which images are displayed using the main data, are switched, seek is not a problem.

On the other hand, when it is judged in step S44 that the variation in the frame of interest is not equal to or larger than the threshold H or, even if the variation in the frame of interest is equal to or larger than the threshold H, frames having a variation equal to or larger than the threshold H are not continuously present by the minimum limit number of frames N or more immediately before, immediately after, and before and after the frame of interest, the processing proceeds to step S46. The continuity judging unit 163 judges, on the basis of the comparison information from the threshold processing unit 162, whether a variation in the frame of interest is smaller than the threshold H and frames having a variation smaller than the threshold H are continuously present by the minimum limit number of frames N or more immediately before, immediately after, or before and after the frame of interest.

When it is judged in step S46 that the variation in the frame of interest is smaller than the threshold H and frames having a variation smaller than the threshold H are continuously present by the minimum limit number of frames N or more immediately before, immediately after, or before and after the frame of interest, the continuity judging unit 163 supplies judgment information representing a result of the judgment to the determining unit 164. The processing proceeds to step S47.

The determining unit 164 receives from the continuity judging unit 163 the supply of the judgment information representing the result of the judgment that the variation in the frame of interest is smaller than the threshold H and frames having a variation smaller than the threshold H are continuously present by the minimum limit number of frames N or more immediately before, immediately after, or before and after the frame of interest. Then, in step S47, the determining unit 164 judges, on the basis of the comparison information from the threshold processing unit 162, whether a variation in the frame of interest is equal to or larger than the threshold L.

When it is judged in step S47 that the variation in the frame of interest is equal to or larger than the threshold L, i.e., when the variation in the frame of interest is equal to or larger than the threshold L and smaller than the threshold H, the processing proceeds to step S48. The determining unit 164 determines the normal type V2 as a display type for the frame of interest. The processing proceeds to step S50.

When it is judged in step S47 that the variation in the frame of interest is not equal to or larger than the threshold L, i.e., when the variation in the frame of interest is smaller than the threshold L, the processing proceeds to step S49. The determining unit 164 determines the still image type V1 as a display type for the frame of interest. The processing proceeds to step S50.

According to steps S46 to S49, when the variation in the frame of interest is smaller than the threshold H and frames having a variation smaller than the threshold H are continuously present by the number of frames N or more immediately before, immediately after, or before and after the frame of interest, if the variation in the frame of interest is equal to or larger than the threshold L, the normal type V2 is determined as a display type for the frame of interest. If the variation in the frame of interest is smaller than the threshold L, the still image type V1 is determined as a display type for the frame of interest. This is for the purpose of preventing seek from being frequently performed at the time of scrub as described above.

In step S50, the continuity judging unit 163 judges whether there is a frame not selected as a frame of interest yet among frames forming a moving image, for which an Fy file is about to be created by the Fy-file creating unit 76 (FIG. 6).

When it is judged in step S50 that there is a frame not selected as a frame of interest yet, the processing returns to step S43. The frame not selected as a frame of interest yet is selected as a frame of interest anew. The same processing is repeated.

When it is judged in step S50 that there isn't a frame not selected as a frame of interest yet, the display-type determining unit 93 ends the processing.

Figure 24:
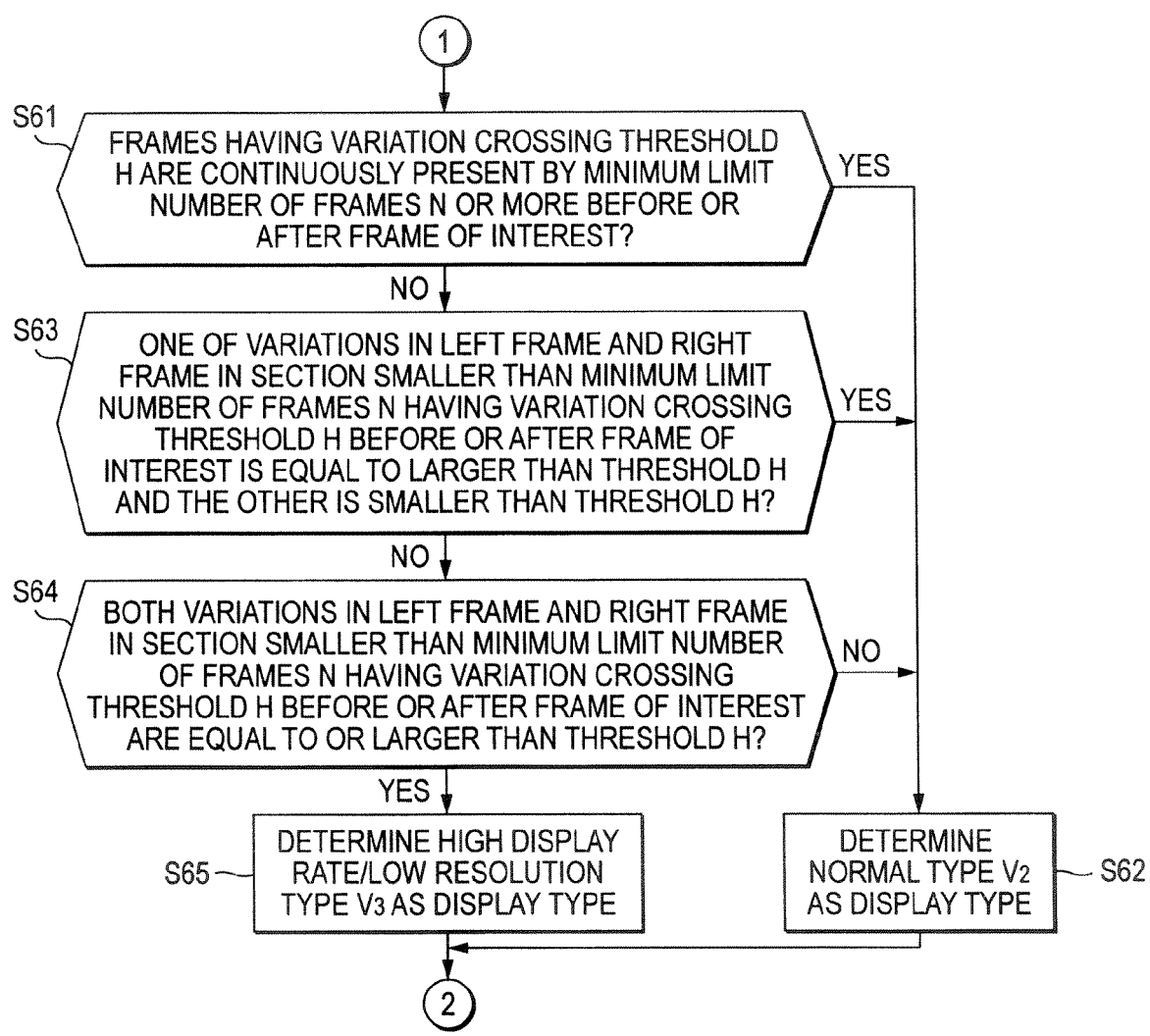
FIG. 24 is a flowchart for explaining the display type determination processing.

On the other hand, when it is judged in step S46 that the variation in the frame of interest is not smaller than the threshold H or, even if the variation in the frame of interest is smaller than the threshold H, frames having a variation smaller than the threshold H are not continuously present by the minimum limit number of frames N or more immediately before, immediately after, and before and after the frame of interest, the processing proceeds to step S61 in FIG. 24. The continuity judging unit 163 judges whether frames having a variation crossing the threshold H are continuously present by the minimum limit number of frames N or more immediately before, immediately after, or before and after the frame of interest.

Figure 25:
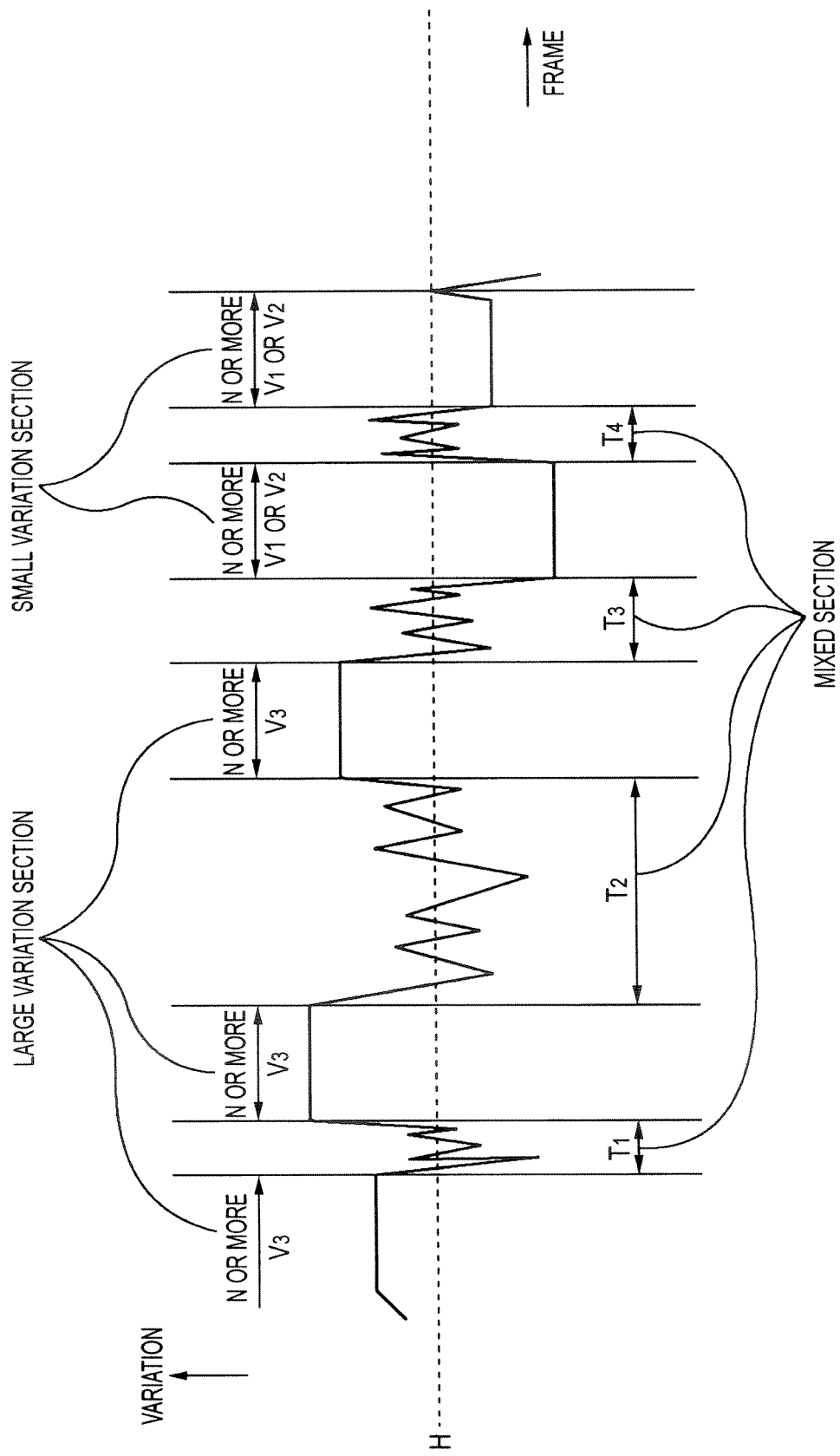
FIG. 25 is a graph of a variation in a unit of frame.

FIG. 25 is a graph of a variation in a unit of frame. In FIG. 25, the abscissa indicates a frame and the ordinate indicates a variation. Only the threshold H of the thresholds H and L is shown in the FIG. 25.

Figure 23:
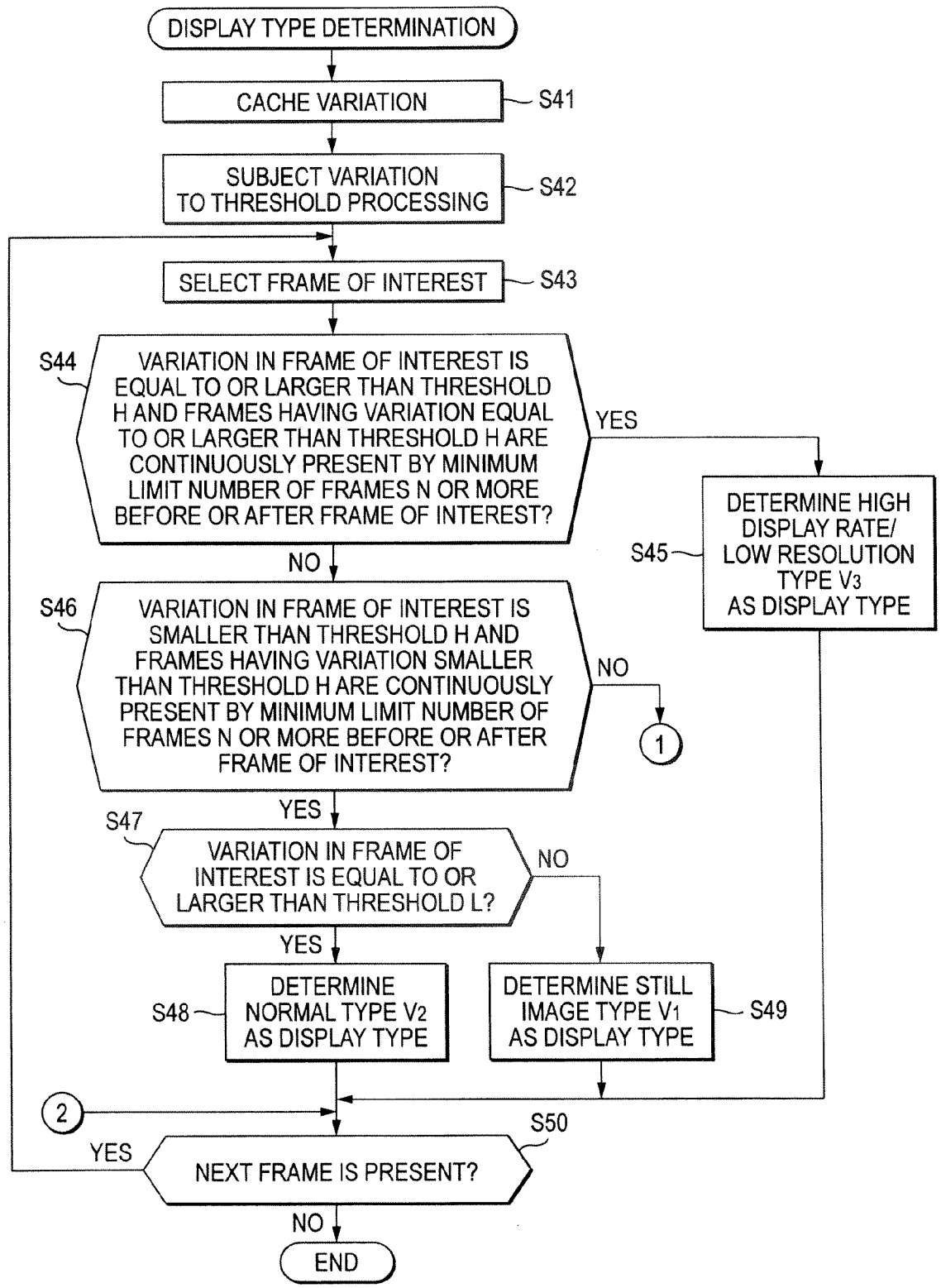
FIG. 23 is a flowchart for explaining display type determination processing.

When the variation in the frame of interest is equal to or larger than the threshold H and frames having a variation equal to or larger than the threshold H are continuously present by the number of frames N or more immediately before, immediately after, or before and after the frame of interest, in step S45 in FIG. 23, the high display rate/low resolution type V3 is determined as a display type for the frame of interest.

When the variation in the frame of interest is smaller than the threshold H and frames having a variation smaller than the threshold H are continuously present by the minimum limit number of frames N or more immediately before, immediately after, or before and after the frame of interest, in step S48 or S49 in FIG. 23, the normal type V2 or the still image type V1 is determined as a display type for the frame of interest.

Therefore, the processing in step S61 in FIG. 24 is performed when frames having a variation equal to or larger than the threshold H are not continuously present by the number of frames N or more and frames having a variation less than the threshold H are not continuously present by the minimum limit number of frames N or more immediately before, immediately after, and before and after the frame of interest. This is a case in which the frame of interest is, for example, a frame in a section in which a frame having a variation crossing the threshold H is present (a section in which frames having a variation equal to or larger than the threshold H and frames having a variation smaller than the threshold H are mixed) as indicated as sections $T_1$, $T_2$, $T_3$, and $T_4$ in FIG. 25 and a section in which the number of continuing frames having a variation equal to or larger than the threshold H and the number of continuing frames having a variation smaller than the threshold H are smaller than the minimum limit number of frames N at most (hereinafter referred to as mixed section as appropriate).

As shown in FIG. 25, the mixed section is typically present between a section in which frames having a variation equal to or larger than the threshold H are continuously present by the number of frames N or more (hereinafter referred to as large variation section as appropriate) and a section in which frames having a variation smaller than the threshold H are continuously present by the minimum limit number of frames N or more (hereinafter referred to small variation section as appropriate), between two large variation sections, or between two small variation sections.

The mixed section can be divided into a section having a section length (the number of frames) equal to or larger than the minimum limit number of frames N and a section having a section length smaller than the minimum limit number of frames N. Among the mixed sections $T_1$ to $T_4$ in FIG. 25, the mixed section $T_2$ is a section having a section length equal to or larger than the minimum limit number of frames N and the other mixed sections $T_1$, $T_3$, and $T_4$ are sections having a section length smaller than the minimum limit number of frames N.

The mixed section can also be divided into a section between a large variation section and a small variation section, a section between large variation sections, and a section between small variation sections. Among the mixed sections $T_1$ to $T_4$ in FIG. 25, the mixed sections $T_1$ and $T_2$ are sections between large variation sections and the mixed section $T_3$ is a section between a large variation section and a small variation section. The mixed section $T_4$ is a section between small variation sections.

Referring back to FIG. 24, as described above, in step S61, the continuity judging unit 163 judges whether frames having a variation crossing the threshold H are continuously present by the minimum limit number frames N or more immediately before, immediately after, and before and after the frame of interest, i.e., whether a mixed section in which the frame of interest is present is a section having a section length equal to or larger than the minimum limit number of frames N.

When it is judged in step S61 that frames having a variation crossing the threshold H are continuously present by the minimum number of frames N or more immediately before, immediately after, or before and after the frame of interest, i.e., a mixed section in which the frame of interest is present is a section having a section length equal to or larger than the minimum limit number of frames N like the mixed section $T_2$ in FIG. 25, the processing proceeds to step S62. The determining unit 164 determines, for example, the normal type V2 as a display type for the frame of interest. The processing proceeds to step S50 in FIG. 23. Thereafter, the processing described above is performed.

Concerning frames in a mixed section in which frames having a variation crossing the threshold H are continuously present by the minimum limit number of frames N or more, the normal type V2 for displaying an image using (image data serving as) the main data or the high display rate/low resolution type V3 for displaying an image using (image data serving as) the proxy data is determined as all display types for the frames. This makes it possible to prevent seek from being frequently performed.

Thus, in this embodiment, the normal type V2 is determined as all display types for the frames in the mixed section in which frames having a variation crossing the threshold H are continuously present by the minimum limit number of frames N or more. Other than the normal type V2, it is also possible to determine the high display rate/low resolution type V3 as a display type for frames in the mixed section in which frames having a variation crossing the threshold H are continuously present by the minimum limit number of frames N or more.

When attention is paid only to the prevention of seek from being frequently performed, it is also possible to determine the still image type V1 for displaying an image using the main data as a display type for frames in the mixed section. However, since the mixed section is a section in which frames having a variation crossing the threshold H are present, it is not preferable to determine the still image type V1, which is a display type for frames having a variation smaller than the threshold L, as a display type for frames in the mixed section. Therefore, the normal type V2 or the high display rate/low resolution type V3 is determined as a display type for frames in the mixed section.

On the other hand, when it is judged in step S61 that frames having a variation crossing the threshold H are not continuously present by the minimum number of frames N or more immediately before, immediately after, and before and after the frame of interest, i.e., a mixed section in which a frame of interest is present (hereinafter referred to as mixed section of interest) is a section having a section length smaller than the minimum limit number of frames N like the mixed sections $T_1$, $T_3$, and $T_4$ in FIG. 25, the processing proceeds to step S63. The continuity judging unit 163 judges whether one of a variation in a frame adjacent to the mixed section of interest among temporally preceding frames on the left side of the mixed section of interest having a section length smaller than the minimum limit number of frames N (hereinafter referred to as left frame as appropriate) and a variation in a frame adjacent to the mixed section of interest among temporally following frames on the right side of the mixed section of interest (hereinafter referred to as right frame as appropriate) is equal to or larger than the threshold H and the other is smaller than the threshold H. In other words, the continuity judging unit 163 judges whether the mixed section of interest having a section length smaller than the minimum limit number of frames N is a section between a large variation section and a small variation section.

When it is judged in step S63 that the mixed section of interest having a section length smaller than the minimum limit number of frames N is a section between a large variation section and a small variation section, i.e., the mixed section of interest having a section length smaller than the minimum limit number of frames N is a mixed section between a large variation section and a small variation section like the mixed section $T_3$ in FIG. 25, the processing proceeds to step S62. As described above, the determining unit 164 determines the normal type V2 as a display type for the frame of interest. The processing proceeds to step S50 in FIG. 23. Thereafter, the processing described above is performed.

Both the large variation section and the small variation section on both sides of the mixed section of interest having a section length smaller than the minimum limit number of frames N are sections having a section length equal to or larger than the minimum limit number of frames N. Moreover, the high display rate/low resolution type V3 for displaying an image using the proxy data is determined as a display type for frames in the large variation section. The normal type V2 or the still image type V1 for displaying an image using the main data is determined as a display type for frames in the small variation section.

Concerning the frames in the mixed section of interest having a section length smaller than the minimum limit number of frames N between the large variation section and the small variation section, a display type is identical with the high display rate/low resolution type V3 determined as a display type for frames in the large variation section or the normal type V2 determined as a display type for frames in the small variation section. As a result, frames of the high display rate/low resolution type V3 or the normal type V2 continue by the minimum limit number of frames N or more. This makes it possible to prevent seek from being frequently performed.

Thus, in this embodiment, the normal type V2 is determined as all display types for the frames in the mixed section of interest in which frames having a variation crossing the threshold is less than the minimum limit number of frames N and that is between the large variation section and the small variation section. Other than the normal type V2, it is also possible to determine the high display rate/low resolution type V3 as all display types for the frames in the mixed section of interest in which frames having a variation crossing the threshold H are less than the minimum limit number of frames N and that is between the large variation section and the small variation section.

On the other hand, when it is judged in step S63 that the mixed section of interest having a section length smaller than the minimum limit number of frames N is not a section between a large variation section and a small variation section, the processing proceeds to step S64. The continuity judging unit 163 judges whether both a variation in a frame adjacent to the mixed section of interest among temporally preceding frames on the left side of the mixed section of interest having a section length smaller than the minimum limit number of frames N (a left frame) and a variation in a frame adjacent to the mixed section of interest among temporally following frames on the right side of the mixed section of interest (a right frame) are equal to or larger than the threshold H. In other words, the continuity judging unit 163 judges whether the mixed section of interest having a section length smaller than the minimum limit number of frames N is a section between large variation sections.

When it is judged in step S64 that the mixed section of interest having a section length smaller than the minimum limit number of frames N is not a section between large variation sections, i.e., when the mixed section of interest having a section length smaller than the minimum limit number of frames N is a mixed section between small variation sections like the mixed section $T_4$ in FIG. 25, the processing proceeds to step S62. As described above, the determining unit 164 determines the normal type V2 as a display type for the frame of interest. The processing proceeds to step S50 in FIG. 23. Thereafter, the processing described above is performed.

In other words, concerning the frames in the mixed section of interest having a section length smaller than the minimum limit number of frames N between two small variation sections, a display type is identical with the normal type V2 that is determined (could be determined) as a display type for frames in the two small variation sections. As a result, frames of the normal type V2 continue by the minimum limit number of frames N or more. This makes it possible to prevent seek from being frequently performed.

On the other hand, when it is judged in step S64 that the mixed section of interest having a section length smaller than the minimum limit number of frames N is a section between large variation sections, i.e., when the mixed section of interest having a section length smaller than the minimum limit number of frames N is a mixed section between large variation sections like the mixed section $T_1$ in FIG. 25, the processing proceeds to step S65. The determining unit 164 determines the high display rate/low resolution type V3 as a display type for the frame of interest. The processing proceeds to step S50 in FIG. 23. Thereafter, the processing described above is performed.

In other words, concerning the frames in the mixed section of interest having a section length smaller than the minimum limit number of frames N between two large variation sections, a display type is identical with the high display rate/low resolution type V3 determined as a display type for frames in the two large variation sections. As a result, frames of the high display rate/low resolution type V3 continue by the minimum limit number of frames N or more. This makes it possible to prevent seek from being frequently performed.

FIG. 26 is a diagram showing an example of an Fy file created by the file creating unit 95 in FIG. 6 when motion information is calculated as a variation by the variation calculating unit 92 in FIG. 6, a display type is determined by the display-type determining unit 93 on the basis of the motion information, and both a variation and a display type are selected by the selecting unit 94.

In the Fy file in FIG. 26, from the left to the right, a frame number indicating a place of a frame from the top, a time code of a frame corresponding to the frame number, motion information serving as a variation in the frame corresponding to the frame number, and a display type for the frame corresponding to the frame number are sequentially arranged.

In the Fy file in FIG. 26, any one of the three types, namely, the still image type V1, the normal type V2, and the high display rate/low resolution type V3 shown in FIG. 20 is determined as the display type.

In the Fy file in FIG. 26, for determination of the display type, 1 and 5 are adopted as the threshold L and the threshold H, respectively. As the minimum limit number of frames N, a value calculated by an equation N=F×P from a total number F of frames of a moving image, for which the Fy file is created, and a predetermined factor P is adopted. When the total number F of frames of a moving image, for which the Fy file is created, is, for example, 3000 and the predetermined factor P is, for example, 0.01, the minimum limit number of frames N is 30 (=3000×0.01).

In FIG. 26, motion information is adopted as a variation and, on the basis of motion information of a frame, any one of the three types, namely, the still image type V1, the normal type V2, and the high display rate/low resolution type V3 is determined as a display type for the frame. However, a method of determining a display type for a frame is not limited to this.

FIG. 27 is a diagram showing another example of display types determined by the display-type determining unit 93 in FIG. 6.

In FIG. 27, as the display types, there are five types, namely, a still image type V11 representing display in a still image and a normal type V12, a high display rate/normal resolution type V13, an ultrahigh display rate/low resolution type V14, and an ultra-ultrahigh display rate/low resolution type V15 in which resolutions in displaying a frame and display rates in displaying a frame are different.

Concerning frames of the still image type V11, like the still image type V1 in FIG. 20, even if a frame to be displayed is changed, as long as an image of the frame to be displayed can be regarded as an image identical with (an image of) a frame displayed immediately before the image, (the image) of the frame displayed immediately before the image is displayed (continued to be displayed).

Concerning frames of the normal type V12, like the normal type V2 in FIG. 20, an image is displayed at a display rate identical with a frame rate of a moving image (a normal rate) and with a resolution identical with that of image data serving as main data (a normal resolution).

Concerning frames of the high display rate/normal resolution type V13, an image is displayed at a display rate higher than the normal rate, for example, a display rate twice as high as the normal rate and with a resolution identical with that of image data serving as proxy data (the normal resolution).

Concerning frames of the ultrahigh display rate/low resolution type V14, an image is displayed at a display rate higher than the display rate of the high display rate/normal resolution type V13, for example, a display rate three times as high as the normal rate and with a resolution identical with that of image data serving as proxy data (a resolution lower than that of image data serving as main data).

Concerning frames of the ultra-ultrahigh display rate/low resolution type V15, an image is displayed at a display rate higher than the display rate of the ultrahigh display rate/low resolution type V14, for example, a display rate four times as high as the normal rate and with a resolution identical with image data serving as proxy data (a resolution lower than that of image data serving as main data).

When the normal rate is (about) 30 frames/second identical with that of the NTSC (National Television System Committee) system, display rates of the normal type V12, the high display rate/normal resolution type V13, the ultrahigh display rate/low resolution type V14, and the ultra-ultrahigh display rate/low resolution type V15 are 30 frames/second, 60 frames/second, 90 frames/second, and 120 frames/second, respectively.

When there are five types, namely, the still image type V11, the normal type V12, the high display rate/normal resolution type V13, the ultrahigh display rate/low resolution type V14, and the ultra-ultrahigh display rate/low resolution type V15 as the display types as shown in FIG. 27, the variation calculating unit 92 (FIG. 6) calculates motion information representing a degree of temporal change in a frame as a variation. The display-type determining unit 93 (FIG. 6) compares, for example, motion information of each of frames and four predetermined thresholds. The display-type determining unit 93 determines, on the basis of a result of the comparison, the still image type V11, the normal type V12, the high display rate/normal resolution type V13, the ultrahigh display rate/ low resolution type V14, or the ultra-ultrahigh display rate/low resolution type V15 as a display type for the frame.

FIG. 28 a graph of motion information serving as a variation and a display type in a unit of frame determined by the display-type determining unit 93 (FIG. 6) in a unit of frame on the basis of the variation.

In FIG. 28, the abscissa indicates a frame and the ordinate indicates a variation.

The display-type determining unit 93 (FIG. 6) compares a variation (motion information) in a unit of frame with thresholds TH1, TH2, TH3, and TH4, which are in a relation of TH1<TH2<TH3<TH4. The display-type determining unit 93 determines the ultra-ultra high display rate/low resolution type V15, which is a kind of a low resolution/high display rate type, as a display type for frames having motion information equal to or larger than the threshold TH4, i.e., frames in which motion information indicates that a degree of temporal change is extremely large. In FIG. 28, the ultra-ultrahigh display rate/low resolution type V15 is determined as a display type for frames in a section D5 in which frames having motion information equal to or larger than the threshold TH4 continue.

The display-type determining unit 93 determines the ultrahigh display rate/low resolution type V14 that is a kind of a low resolution/high display rate type and in which a display rate is lower than that of the ultra-ultrahigh display rate/low resolution type V15 as a display type for frames having motion information equal to or larger than the threshold TH3 and smaller than the threshold TH4, i.e., frames in which motion information indicates that a degree of temporal change is large close to extremely large. In FIG. 28, the ultrahigh display rate/low resolution type V14 is determined as a display type for frames in sections D4 and D6 in which frames having motion information equal to or larger than the threshold TH3 and smaller than the threshold TH4 continue.

The display-type determining unit 93 determines the high display rate/normal resolution type V13 in which a display rate is lower than that of the ultrahigh display rate/low resolution type V14 and a resolution is higher than that of the ultrahigh display rate/low resolution type V14 as a display type for frames having motion information equal to or larger than the threshold TH2 and smaller than the threshold TH3, i.e., frames in which motion information indicates that a degree of temporal change is not extremely large but is still large. In FIG. 28, the high display rate/normal resolution type V13 is determined as a display type for frames in sections D3 and D7 in which frames having motion information equal to or larger than the threshold TH2 and smaller than the threshold TH3 continue.

The display-type determining unit 93 determines the normal type V12 in which a display rate is lower than that of the high display rate/normal resolution type V13 as a display type for frames having motion information equal to or higher than the threshold TH1 and smaller than the threshold TH2, i.e., frames in which motion information indicates that a degree of temporal change is not very large. In FIG. 28, the normal type V12 is determined as a display type for frames in sections D2 and D8 in which frames having motion information equal to or larger than the threshold TH1 and smaller than the threshold TH2 continue.

Moreover, the display-type determining unit 93 determines the still image type V11 representing display in a still image as a display type for frames having motion information smaller than the threshold TH1, i.e., frames in which motion information indicates a degree of temporal change is small. In FIG. 28, the still image type V11 is determined as a display type for frames in sections D1 and D9 in which frames having motion information smaller than the threshold TH1 continue.

Processing of the display-type determining unit 93 in FIG. 22 in the case in which the still image type V11, the normal type V12, the high display rate/normal resolution type V13, the ultrahigh display rate/low resolution type V14, or the ultra-ultrahigh display rate/low resolution type V15 shown in FIG. 27 is determined as a display type will be explained with reference to flowcharts in FIGS. 29 and 30.

When a variation in a unit of frame is supplied from the variation calculating unit 92 (FIG. 6), in step S81, the display-type determining unit 93 causes the storing unit 161 (FIG. 22) to cache (temporarily store) the variation in a unit of frame. The processing proceeds to step S82.

For example, motion information is supplied from the variation calculating unit 92 to the display-type determining unit 93 as a variation.

In step S82, the threshold processing unit 162 (FIG. 22) performs threshold processing for comparing the variation (the motion information) in a unit of frame stored in the storing unit 161 and the threshold TH1, TH2, TH3, or TH4. The threshold processing unit 162 supplies comparison information representing a result of the comparison of the variation in a unit of frame and the threshold TH1, TH2, TH3, or TH4 to the continuity judging unit 163 in a unit of frame. The processing proceeds to step S83.

In step S83, the continuity judging unit 163 (FIG. 22) selects, for example, a front frame in a time series order not set as a frame of interest among frames forming a moving image, for which an Fy file is about to be created by the Fy-file creating unit 76 (FIG. 6), as a frame of interest. The processing proceeds to step S84.

In step S84, the continuity judging unit 163 judges, on the basis of the comparison information from the threshold processing unit 162, whether a variation in the frame of interest is equal to or larger than the threshold TH3 and frames having a variation equal to or larger than the threshold TH3 are continuously present by the minimum limit number of frames N or more immediately before, immediately after, or before and after the frame of interest.

When it is judged in step S84 that the variation in the frame of interest is equal to or larger than the threshold TH3 and frames having a variation equal to or larger than the threshold TH3 are continuously present by the minimum limit number of frames N or more immediately before, immediately after, or before and after the frame of interest, the continuity judging unit 163 supplies judgment information representing a result of the judgment to the determining unit 164 (FIG. 22) The processing proceeds to step S85.

The determining unit 164 receives, from the continuity judging unit 163, the supply of the judgment information representing the result of the judgment that the variation in the frame of interest is equal to or larger than the threshold TH3 and frames having a variation equal to or larger than the threshold TH3 are continuously present by the minimum limit number of frames N or more immediately before, immediately after, or before and after the frame of interest. Then, in step S85, the determining unit 164 judges, on the basis of the comparison information from the threshold processing unit 162, whether a variation in the frame of interest is equal to or larger than the threshold TH4.

When it is judged in step S85 that the variation in the frame of interest is equal to or larger than the threshold TH4, the processing proceeds to step S86. The determining unit 164 determines the ultra-ultrahigh display rate/low resolution type V15 as a display type for the frame of interest. The processing proceeds to step S93.

When it is judged in step S85 that the variation in the frame of interest is not equal to or larger than the threshold TH4, i.e., when the variation in the frame of interest is equal to or larger than the threshold TH3 and smaller than the threshold TH4, the processing proceeds to step S87. The determining unit 164 determines the ultra-high display rate/low resolution type V14 as a display type for the frame of interest. The processing proceeds to step S93.

According to steps S84 and S87, when the variation in the frame of interest is equal to or larger than the threshold TH3 and, moreover, frames having a variation equal to or larger than the threshold TH3 are continuously present by the number of frames N or more immediately before, immediately after, or before and after the frame of interest, the ultra-ultrahigh display rate/low resolution type V15 or the ultra-high display rate/low resolution type V14 is determined as a display type for the frame of interest. This determination is based on the following reason.

When a display type is determined out of the still image type V11, the normal type V12, the high display rate/normal resolution type V13, the ultrahigh display rate/low resolution type V14, and the ultra-ultrahigh display rate/low resolution type V15 shown in FIG. 27, in scrub, an image having a high resolution (an image having a normal resolution) is displayed for frames of the still image type V11, frames of the normal type V12, and frames of the high display rate/normal resolution type V13. In other words, an image is displayed by processing image data of main data having a larger amount of data (than that of proxy data).

On the other hand, concerning frames of the ultrahigh display rate/low resolution type V14 and frames of the ultra-ultrahigh display rate/low resolution type V15, an image having a low resolution is displayed. In other words, an image is displayed by processing image data of proxy data having a smaller amount of data (than that of main data).

For example, when the optical disk 7 (FIG. 1) is a professional disc in which main data and proxy data are recorded, scrub is performed using the main data or the proxy data recorded in the optical disk 7. Then, as in the case explained with reference to FIG. 23, in frames in time series forming a moving image, when frames of the ultrahigh display rate/low resolution type V14 or the ultra-ultrahigh display rate/low resolution type V15 for displaying an image using the proxy data and frames of the still image type V11, the normal type V12, or the high display rate/normal resolution type V13 for displaying an image using the main data are frequently switched, seek is frequently performed. Thus, it may be difficult to smoothly perform display of a frame designated by operation of the scrub bar 53 (FIG. 3).

In order to prevent seek from being frequently performed, it is necessary to prevent frames of the ultrahigh display rate/low resolution type V14 or the ultra-ultrahigh display rate/low resolution type V15 for displaying an image using the proxy data and frames of the still image type V11, the normal type V12, or the high display rate/normal resolution type V13 for displaying an image using the main data from being frequently switched On the other hand, in both frames of the ultrahigh display rate/low resolution type V14 and frames of the ultra-ultrahigh display rate/low resolution type V15, an image is displayed using the proxy data. Thus, seek is not a problem concerning switching of the frames of the ultrahigh display rate/low resolution type V14 and the frames of the ultra-ultrahigh display rate/low resolution type V15.

Moreover, in all frames of the still image type V1, frames of the normal type V12, and frames of the high display rate/normal resolution type V13, an image is displayed using the main data. Thus, seek is not a problem either concerning switching of frames of arbitrary one display type and frames of another display type among the frames of the still image type V11, the frames of the normal type V12, and the frames of the high display rate/normal resolution type V13.

Figure 29:
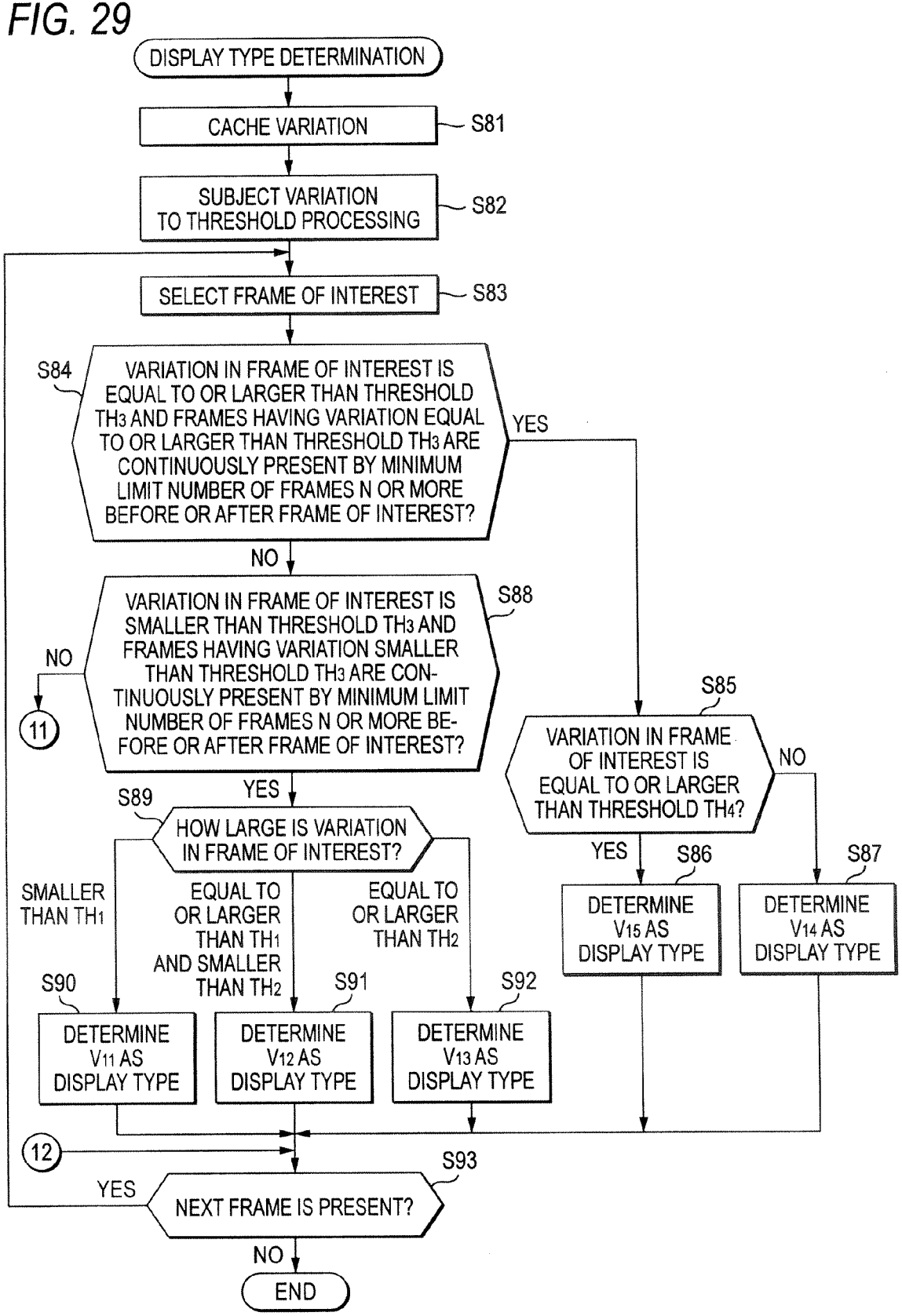
FIG. 29 is a flowchart for explaining display type determination processing.
Figure 30:
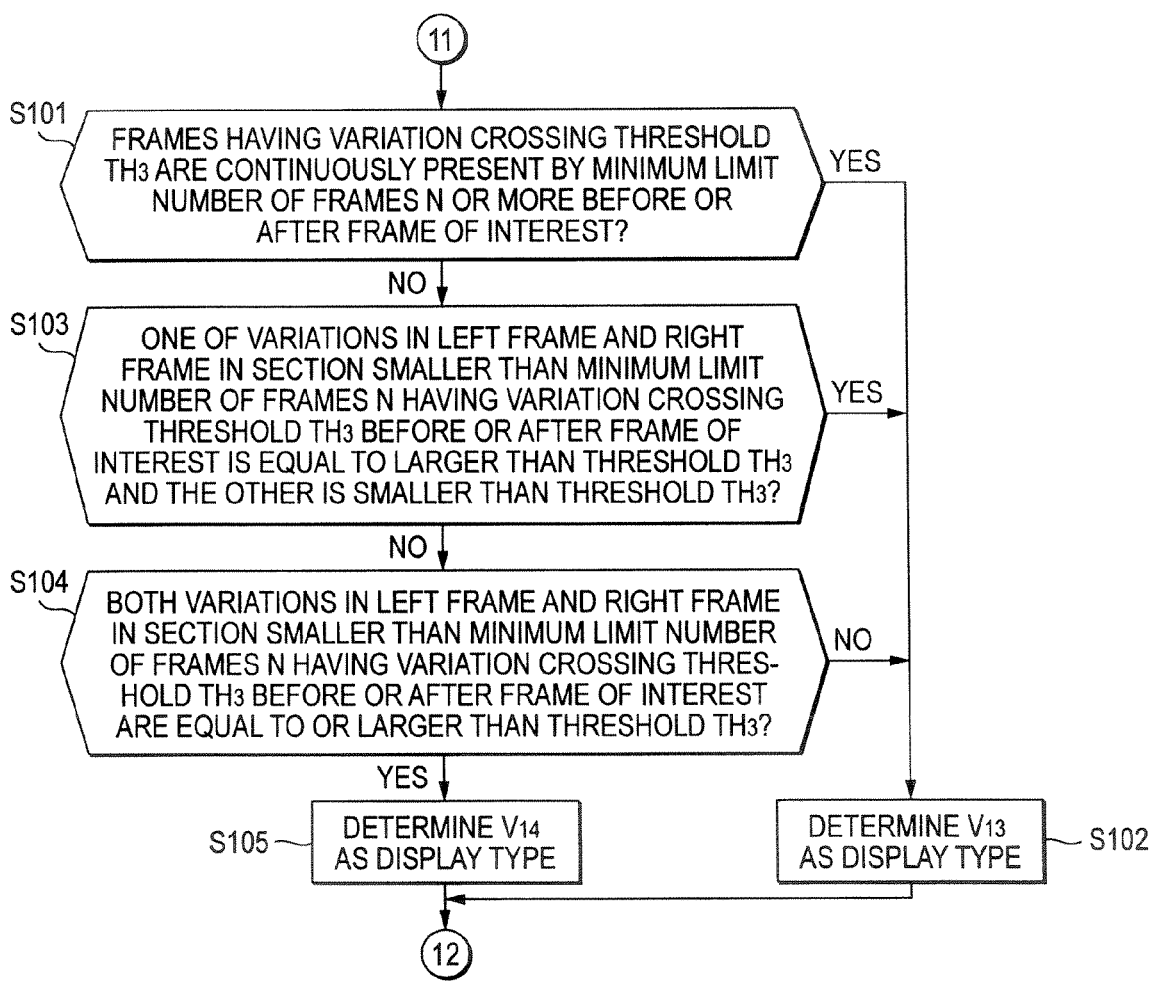
FIG. 30 is a flowchart for explaining the display type determination processing.

Thus, in FIGS. 29 and 30, switching of frames of a display type for displaying an image using the proxy data (the ultra-high display rate/low resolution type V14 or the ultra-ultra-high display rate/low resolution type V15) and frames of a display type for displaying an image using the main data (the still image type V11, the normal type V12, or the high display rate/normal resolution type V13) is prevented from being caused in a section of frames continuing by at least the minimum limit number of frames N. For this purpose, in steps S84 to S87, when a variation in the frame of interest is equal to or larger than the threshold TH3 and frames having a variation equal to or larger than the threshold TH3 continue by the minimum limit number of frames N or more immediately before, immediately after, or before and after the frame of interest, the ultrahigh display rate/low resolution type V14 or the ultra-ultrahigh display rate/low resolution type V15 is determined as a display type for the frame of interest.

Further, switching of frames of a display type for displaying an image using the proxy data and frames of a display type for displaying an image using the main data is prevented from being caused in a section of frames continuing by at least the minimum limit number of frames N. For this purpose, in steps S88 to S92 described later, when a variation in the frame of interest is smaller than the threshold TH3 and frames having a variation smaller than the threshold TH3 continues by the minimum limit number of frames N or more immediately before, immediately after, or before and after the frame of interest, the still image type V11, the normal type V12, or the high display rate/normal resolution type V13 is determined as a display type for the frame of interest.

When it is judged in step S84 that the variation in the frame of interest is not equal to or larger than the threshold TH3 or, even if the variation in the frame of interest is equal to or larger than the threshold TH3, frames having a variation equal to or larger than the threshold TH3 are not continuously present by the minimum limit number of frames N or more immediately before, immediately after, and before and after the frame of interest, the processing proceeds to step S88. The continuity judging unit 163 judges, on the basis of the comparison information from the threshold processing unit 162, whether a variation in the frame of interest is smaller than the threshold TH3 and frames having a variation smaller than the threshold TH3 are continuously present by the minimum limit number of frames N or more immediately before, immediately after, or before and after the frame of interest.

When it is judged in step S88 that the variation in the frame of interest is smaller than the threshold TH3 and frames having a variation smaller than the threshold TH3 are continuously present by the minimum limit number of frames N or more immediately before, immediately after, or before and after the frame of interest, the continuity judging unit 163 supplies judgment information representing a result of the judgment to the determining unit 164. The processing proceeds to step S89.

The determining unit 164 receives, from the continuity judging unit 163, supply of the judgment information representing the result of the judgment that the variation in the frame of interest is smaller than the threshold TH3 and frames having a variation smaller than the threshold TH3 are continuously present by the minimum limit number of frames N or more immediately before, immediately after, or before and after the frame of interest. Then, in step S89, the determining unit 164 judges, on the basis of the comparison information from the threshold processing unit 162, whether a variation in the frame of interest is smaller than the threshold TH1, equal to or larger than the threshold TH1 and smaller than the threshold TH2, or equal to or larger than the threshold TH2 and smaller than the threshold TH3.

When it is judged in step S89 that the variation in the frame of interest is smaller than the threshold TH1, the processing proceeds to step S90. The determining unit 164 determines the still image type V11 as a display type for the frame of interest. The processing proceeds to step S93.

When it is judged in step S89 that the variation in the frame of interest is equal to or larger than the threshold TH1 and smaller than the threshold TH2, the processing proceeds to step S91. The determining unit 164 determines the normal type V12 as a display type for the frame of interest. The processing proceeds to step S93.

When it is judged in step S89 that the variation in the frame of interest is equal to or larger than the threshold TH2 and smaller than the threshold TH3, the processing proceeds to step S92. The determining unit 164 determines the high display rate/normal resolution type V13 as a display type for the frame of interest. The processing proceeds to step S93.

According to steps S88 to S92, as described above, when a variation in the frame of interest is smaller than the threshold TH3 and frames having a variation smaller than the threshold TH3 are continuously present by the number of frames N or ore immediately before, immediately after, or before and after the frame of interest, the still image type V11, the normal type V12, or the high display rate/normal resolution type V13, for displaying an image using the main data, is determined as a display type for the frame of interest. As described above, this is for the purpose of preventing seek from being frequently performed.

In step S93, the continuity judging unit 163 judges whether there is a frame not selected as a frame of interest yet among frames forming a moving image for which an Fy file is about to be created by the Fy-file creating unit 76 (FIG. 6).

When it is judged in step S93 that there is a frame not selected as a frame of interest yet, the processing returns to step S83. As described above, a frame not selected as a frame of interest yet is selected as a frame of interest anew. Thereafter, the same processing is repeated.

When it is judged in step S93 that there isn't a frame not selected as a frame of interest yet, the display-type determining unit 93 ends the processing.

On the other hand, when it is judged in step S88 that the variation in the frame of interest is not smaller than the threshold TH3 or, even if the variation in the frame of interest is smaller than the threshold TH3, frames having a variation smaller than the threshold TH3 are not continuously present by the minimum limit number of frames N or more immediately before, immediately after, and before and after the frame of interest, the processing proceeds to step S101 in FIG. 30. The continuity judging unit 163 judges whether frames having a variation crossing the threshold TH3 are continuously present by the minimum limit number of frames N or more immediately before, immediately after, or before and after the frame of interest.

When a variation in the frame of interest is equal to or larger than the threshold TH3 and frames having a variation equal to or larger than the threshold TH3 are continuously present by the number of frames N or more immediately before, immediately after, or before and after the frame of interest, in step S86 or S87 in FIG. 29, the ultrahigh display rate/low resolution type V14 or the ultra-ultrahigh display rate/low resolution type V15 is determined as a display type for the frame of interest.

When a variation in the frame of interest is smaller than the threshold TH3 and frames having a variation smaller than the threshold TH3 are continuously present by the minimum limit number of frames N or more immediately before, immediately after, or before and after the frame of interest, in steps S90 to S92 in FIG. 29, the still image type V11, the normal type V12, or the high display rate/normal resolution type V13 is determined as a display type for the frame of interest.

Therefore, the processing in step S101 in FIG. 30 is performed when frames having a variation equal to or larger than the threshold TH3 are not continuously present by the number of frames N or more and frames having a variation smaller than the threshold TH3 are not continuously present by the minimum limit number of frames N or more immediately before, immediately after, and before and after the frame of interest. This is a case in which the frame of interest is a frame in a section in which frames having a variation crossing the threshold TH3 are present (a section in which frames having a variation equal to or larger than the threshold TH3 and frames having a variation smaller than the threshold TH3 are mixed) and a section in which the number of continuing frames having a variation equal to or larger than the threshold TH3 and the number of continuing frames having a variation smaller than the threshold TH3 are smaller than the minimum limit number of frames N at most (hereinafter also referred to as mixed section as appropriate).

As in the case explained with reference to FIG. 25, the mixed section is typically present between a section in which frames having a variation equal to or larger than the threshold TH3 are continuously present by the number of frames N or more (hereinafter also referred to as large variation section as appropriate) and a section in which frames having a variation smaller than the threshold TH3 are continuously present by the minimum limit number of frames N or more (hereinafter also referred to small variation section as appropriate), between two large variation sections, or between two small variation sections.

Consequently, the mixed section can be divided into a section having a section length (the number of frames) equal to or larger than the minimum limit number of frames N and a section having a section length smaller than the minimum limit number of frames N.

The mixed section can also be divided into a section between a large variation section and a small variation section, a section between large variation sections, and a section between small variation sections.

In step S101, the continuity judging unit 163 judges whether frames having a variation crossing the threshold TH3 are continuously present by the minimum limit number of frames N or more immediately before, immediately after, or before and after the frame of interest, i.e., a mixed section in which the frame of interest is present is a section having a section length equal to or larger than the minimum limit number of frames N.

When it is judged in step S101 that frames having a variation crossing the threshold TH3 are continuously present by the minimum limit number of frames N or more immediately before, immediately after, or before and after the frame of interest, the processing proceeds to step S102. The determining unit 164 determines, for example, the high display rate/normal resolution type V13 among the display types for displaying an image using the main data as a display type for the frame of interest. The processing proceeds to step S93 in FIG. 29. Thereafter, the processing described above is performed.

Concerning the frames in the mixed section in which frames having a variation crossing the threshold TH3 are continuously present by the minimum limit number of frames N or more, a display type for displaying an image using (image data serving as) the main data or a display type for displaying an image using (image data serving as) the proxy data is determined as a display type for all the frames. This makes it possible to prevent seek from being frequently performed.

Thus, in FIG. 30, for example, the high display rate/normal resolution type V13 among the display types for displaying an image using the main data is determined as all display types for the frames in the mixed section in which frames having a variation crossing the threshold TH3 are continuously present by the minimum limit number of frames N or more.

Besides, it is possible to determine, for example, the normal type V12 among the display types for displaying an image using the main data as display types of the frames in the mixed section in which frames having a variation crossing the threshold TH3 are continuously present by the minimum limit number of frames N or more. It is also possible to determine, for example, the ultrahigh display rate/low resolution type V14 or the ultra-ultrahigh display rate/low resolution type V15 for displaying an image using the proxy data as display types for frames in the mixed section in which frames having a variation crossing the threshold TH3 are continuously present by the minimum limit number of frames N or more.

On the other hand, when it is judged in step S101 that frames having a variation crossing the threshold TH3 are not continuously present by the minimum limit number of frames N or more immediately before, immediately after, and before and after the frame of interest, i.e., when a mixed section in which the frame of interest is present (a mixed section of interest) is a section having a section length smaller than the minimum limit number of frames N, the processing proceeds to step S103. The continuity judging unit 163 judges whether one of a variation in a frame adjacent to the mixed section of interest among temporally preceding frames on the left side of the mixed section of interest having a section length smaller than the minimum limit number of frames N (a left frame) and a variation in a frame adjacent to the mixed section of interest among temporally following frames on the right side of the mixed section of interest (a right frame) is equal to or larger than the threshold TH3 and the other is smaller than the threshold TH3. In other words, the continuity judging unit 163 judges whether the mixed section of interest having a section length smaller than the minimum limit number of frames N is a section between a large variation section and a small variation section.

When it is judged in step S103 that the mixed section of interest having a section length smaller than the minimum limit number of frames N is a section between a large variation section and a small variation section, the processing proceeds to step S102. As described above, the determining unit 164 determines the high display rate/normal resolution type V13 as a display type for the frame of interest. The processing proceeds to step S93 in FIG. 29. Thereafter, the processing described above is performed.

Both the large variation section and the small variation section on both sides of the mixed section of interest having a section length smaller than the minimum limit number of frames N are sections having a section length equal to or larger than the minimum limit number of frames N. Moreover, the display type (the ultrahigh display rate/low resolution type V14 or the ultra-ultrahigh display/low resolution type V15) for displaying an image using the proxy data is determined as a display type for frames in the large variation section. The display type (the still image type V11, the normal type V12, or the high display rate/normal resolution type V13) for displaying an image using the main data is determined as a display type for frames in the small variation section.

Concerning the frames in the mixed section of interest having a section length smaller than the minimum limit number of frames N between a large variation section and a small variation section, a display type is identical with a display type for frames in the large variation section or a display type for frames in the small variation section. This makes it possible to prevent seek from being frequently performed.

Thus, in FIG. 30, for example, the high display rate/normal resolution type V13 among the display types for displaying an image using the main data is determined as all display types for frames in the mixed section of interest in which frames having a variation crossing the threshold TH3 are less than the minimum limit number of frames N and that is between a large variation section and a small variation section.

Besides, it is possible to determine, for example, the normal type V12 among the display types for displaying an image using the main data or the ultrahigh display rate/low resolution type V14 among the display types for displaying an image using the proxy data as the display types for frames in the mixed section of interest in which frames having a variation crossing the threshold TH3 are less than the minimum limit number of frames N and that is between a large variation section and a small variation section.

On the other hand, when it is judged in step S103 that the mixed section of interest having a section length smaller than the minimum limit number of frames N is not a section between a large variation section and a small variation section, the processing proceeds to step S104. The continuity judging unit 163 judges whether both a variation in a frame adjacent to the mixed section of interest among temporally preceding frames on the left side of the mixed section of interest having a section length smaller than the minimum limit number of frames N (a left frame) and a variation in a frame adjacent to the mixed section of interest among temporally following frames on the right side of the mixed section of interest (a right frame) are equal to or larger than the threshold TH3. In other words, the continuity judging unit 163 judges whether the mixed section of interest having a section length smaller than the minimum limit number of frames N is a section between large variation sections.

When it is judged in step S104 that the mixed section of interest having a section length smaller than the minimum limit number of frames N is not a section between large variation sections, the processing proceeds to step S102. As described above, the determining unit 164 determines, for example, the high display rate/normal resolution type V13 among the display types for displaying an image using the main data as a display type for the frame of interest. The processing proceeds to step S93 in FIG. 29. Thereafter, the processing described above is performed.

In other words, concerning the frames in the mixed section of interest having a section length smaller than the minimum limit number of frames N between two small variation sections, a display type is identical with the display type for displaying an image using the main data determined as a display type for frames in the two small variation sections. This makes it possible to prevent seek from being frequently performed.

On the other hand, when it is judged in step S104 that the mixed section of interest having a section length smaller than the minimum limit number of frames N is a section between large variation sections, the processing proceeds to step S105. The determining unit 164 determines, for example, the ultra-high display rate/low resolution type V14 among the display types for displaying an image using the proxy data as a display type for the frame of interest. The processing proceeds to step S93 in FIG. 29. Thereafter, the processing described above is performed.

In other words, concerning the frames in the mixed section of interest having a section length smaller than the minimum limit number of frames N between two large variation sections, a display type is identical with the display type for displaying an image using the proxy data determined as a display type for frames in the two large variation sections. This makes it possible to prevent seek from being frequently performed.

FIG. 31 is a diagram showing another example of display types determined by the display-type determining unit 93 in FIG. 6.

In FIG. 31, as the display types, there are three types, namely, a low resolution/normal display rate type C1, a normal type C2, and a normal resolution/low display rate type C3 in which resolutions and display rates in displaying a frame are different.

Concerning frames of the low resolution/normal display rate type C1, an image is displayed at a display rate (a normal rate) identical with a frame rate of a moving image and with a resolution identical with that of the image data serving as the proxy data (a resolution lower than that of the image data serving as the main data).

Concerning frames of the normal type C2, an image is displayed at a display rate of a normal rate and with a resolution identical with that of the image data serving as the main data (a normal resolution).

Concerning frames of the normal resolution/low display rate type C3, an image is displayed at a display rate lower than the normal rate, for example, a display rate one half of the normal rate and with a resolution identical with that of the image data serving as the main data (a resolution higher than that of the image data serving as the proxy data).

When there are three types, namely, the low resolution/normal display rate type C1, the normal type C2, and the normal resolution/low display rate type C3 as the display types as shown in FIG. 31, the variation calculating unit 92 (FIG. 6) calculates fineness information representing a degree of spatial change in a frame as a variation. The display-type determining unit 93 compares, for example, a variation (fineness information) of each of frames and two predetermined thresholds. The display-type determining unit 93 determines, on the basis of a result of the comparison, the low resolution/normal display rate type C1, the normal type C2, or the normal resolution/low display rate type C3 as a display type for the frame.

Figure 32:
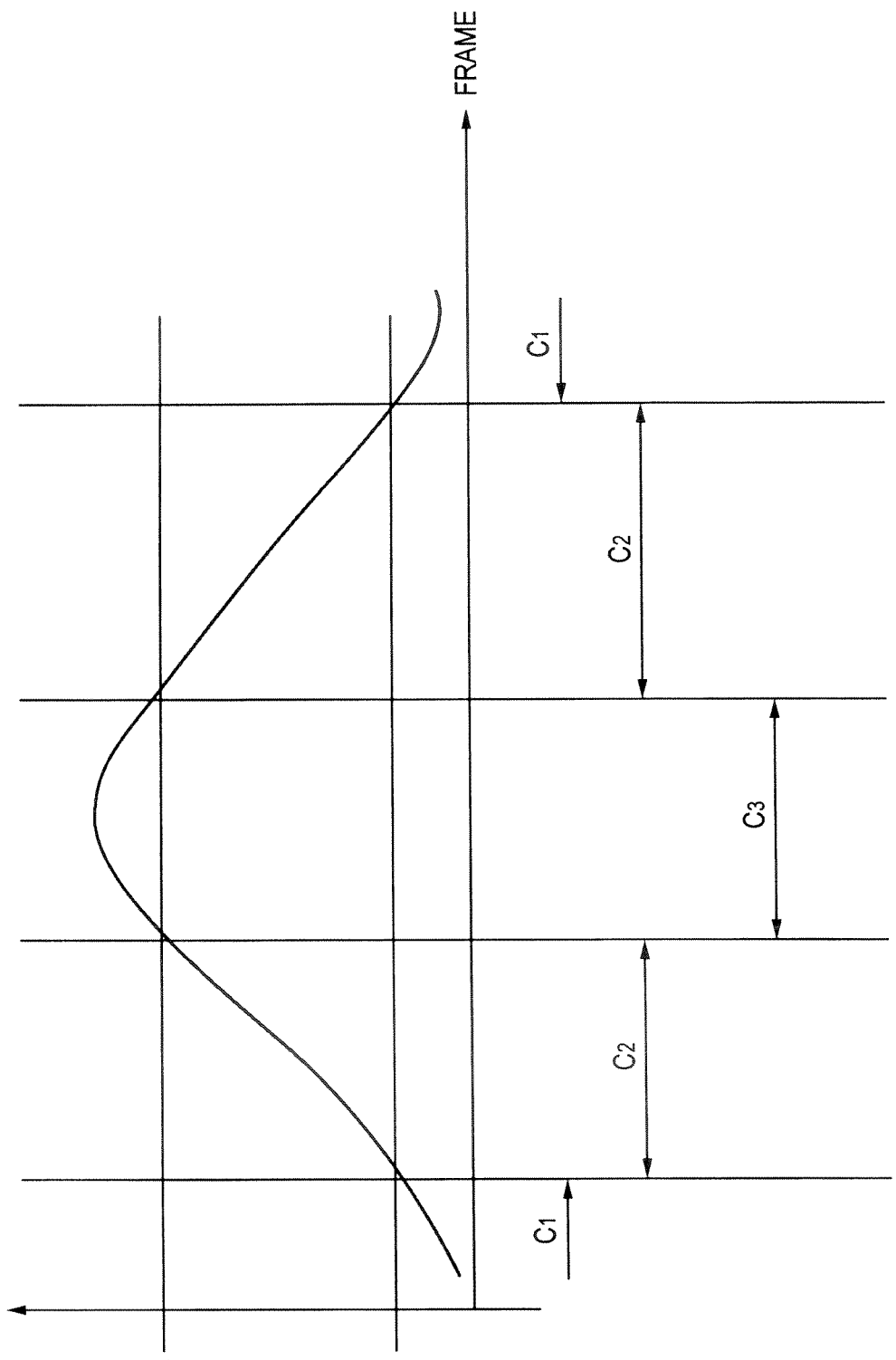
FIG. 32 is a graph of fineness information and a display type in a unit of frame.

FIG. 32 is a graph of fineness information serving as a variation and a display type in a unit of frame determined by the display-type determining unit 93 (FIG. 6) in a unit of frame on the basis of the variation.

In FIG. 32, the abscissa indicates a frame and the ordinate indicates a variation.

The display-type determining unit 93 compares the variation (the fineness information) in a unit of frame with one of the threshold L and the threshold H that are in a relation of L<H. The display-type determining unit 93 determines the normal resolution/low display rate type C3, which is a kind of a high resolution/low display rate type, as a display type for frames having fineness information equal to or larger than the threshold H, i.e., frames in which fineness information indicates that a degree of spatial change is large.

When, for example, display of frames having a large degree of spatial change, i.e., frames of an image having a large change in a pixel value (a complicated image) is performed with a low resolution in scrub performed in edition, a spatial change in an image tends to be overlooked. Thus, it is desirable that the frames of the complicated image are displayed with a high resolution.

However, burdens of processing for displaying a complicated image with a high resolution are larger than burdens of processing for displaying an image that is not complicated, for example, a flat image.

Thus, although the frames of the complicated image are displayed with a high resolution, instead, the normal resolution/low display rate type C3, which is a kind of the high resolution/low display rate type for displaying an image at a low display rate, is adopted. When an image is displayed at a low display rate, compared with the case in which an image is displayed at a high display rate, burdens of processing are small. Thus, it is possible to reduce burdens on the apparatus for scrub while preventing a spatial change in an image from being overlooked in edition by displaying, for the frames of the complicated image, an image having a high resolution at a low display rate.

On the other hand, the display-type determining unit 93 determines the low resolution/normal display rate type C1 for displaying an image with a resolution lower than that of the normal resolution/low display rate type C3 and at a display rate of the normal rate higher than that of the normal resolution/low display rate type C3 as a display type for frames having fineness information smaller than the threshold L, i.e., frames in which fineness information indicates that a degree of spatial change is small.

Concerning frames in which a degree of a spatial change is small, i.e., frames of a flat image, even if an image is displayed with a high resolution, details of the image do not look so different from details of an image displayed with a low resolution.

When the details of the image do not look so different when the image is displayed with a high resolution and displayed with a low resolution in this way, if the image is displayed with a high resolution, so to speak, excess burdens are imposed on the apparatus for scrub.

Thus, the low resolution/normal display rate type C1 for displaying an image with a resolution lower than that of the normal resolution/low display rate type C3 and at a display rate of the normal rate higher than that of the normal resolution/low display rate type C3 is determined as a display type for frames of a flat image. This makes it possible to prevent excess burdens from being imposed on the apparatus for scrub.

The display-type determining unit 93 determines the normal type C2 as a display type for frames other than frames having fineness information equal to or larger than the threshold H and frames having fineness information smaller than the threshold L, i.e., frames having fineness information equal to or larger than the threshold L and smaller than the threshold H.

In other words, the normal type C2 for displaying an image at the normal rate (a display rate identical with the frame rate of the moving image) and with the normal resolution as a display type for frames of an image that is not so complicated and not flat.

Processing of the display-type determining unit 93 in FIG. 22 in the case in which the low resolution/normal display rate type C1, the normal type C2, or the normal resolution/low display rate type C3 shown in FIG. 31 is determined as a display type on the basis of fineness information serving as a variation will be explained with reference to flowcharts in FIGS. 33 and 34.

When a variation in a unit of frame is supplied from the variation calculating unit 92 (FIG. 6), in step S121, the display-type determining unit 93 causes the storing unit 161 (FIG. 22) to cache (temporarily store) the variation in a unit of frame. The processing proceeds to step S122.

Figure 33:
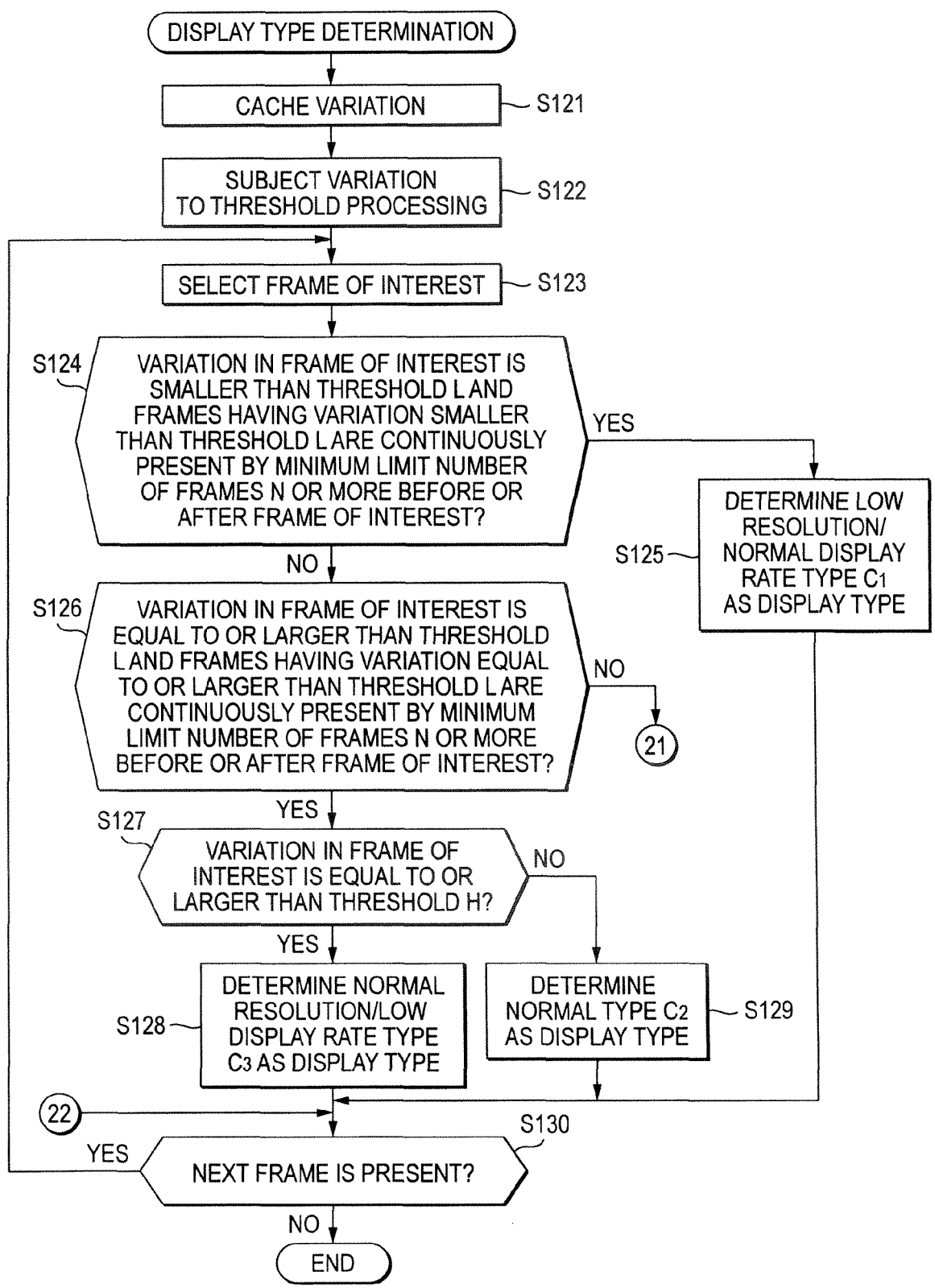
FIG. 33 is a flowchart for explaining display type determination processing.
Figure 34:
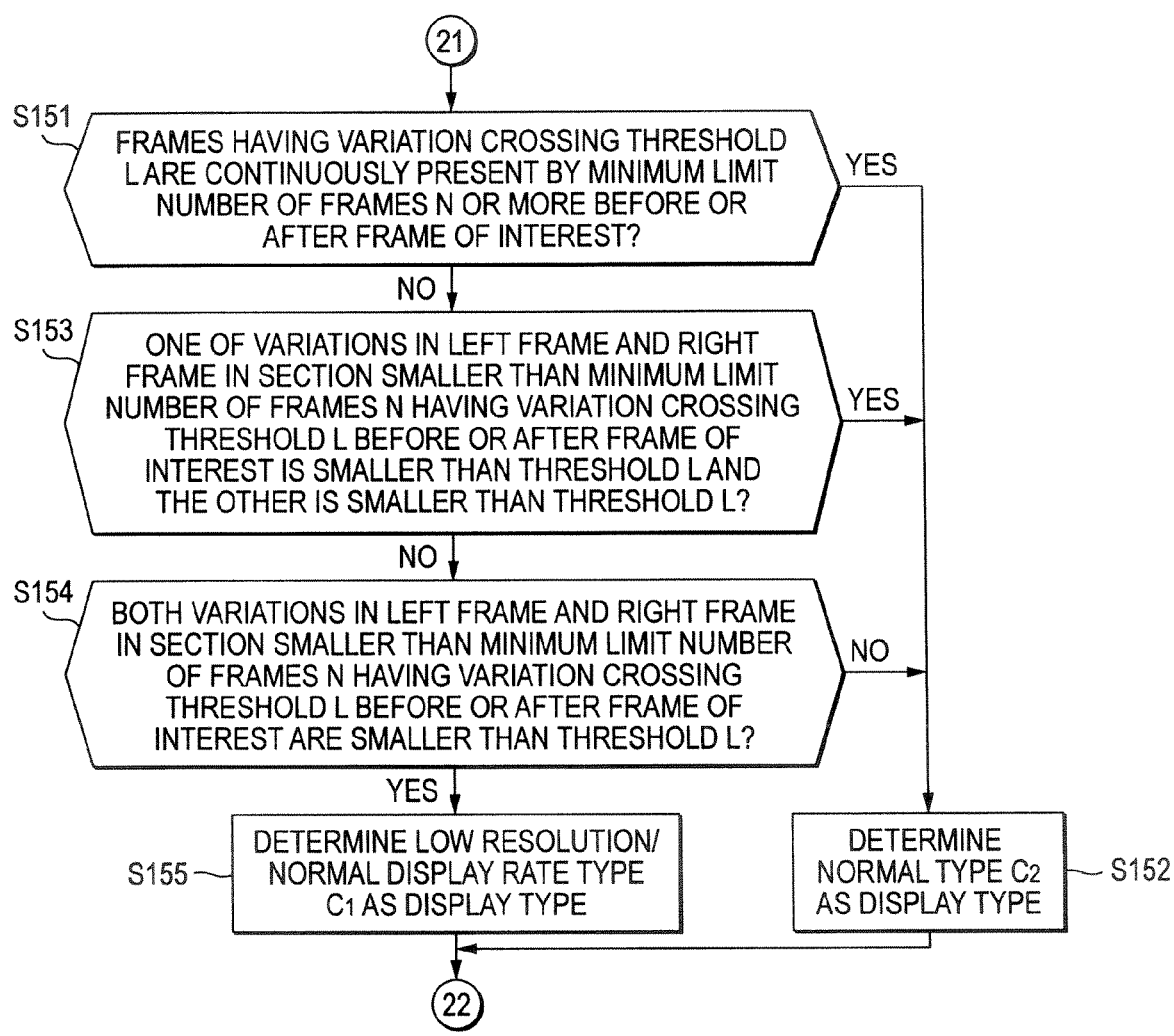
FIG. 34 is a flowchart for explaining the display type determination processing.

In FIGS. 33 and 34, fineness information is supplied from the variation calculating unit 92 to the display-type determining unit 93 as a variation.

In step S122, the threshold processing unit 162 performs threshold processing for comparing the variation (the fineness information) in a unit of frame stored in the storing unit 161 and the threshold H or the threshold L. The threshold processing unit 162 supplies comparison information representing a result of the comparison of the variation in a unit of frame and the threshold H or the threshold L to the continuity judging unit 163 in a unit of frame. The processing proceeds to step S123.

In step S123, the continuity judging unit 163 selects a front frame in a time series order not set as a frame of interest yet among frames forming a moving image, for which an Fy file is about to be created by the Fy-file creating unit 76 (FIG. 6), as a frame of interest. The processing proceeds to step S124.

In step S124, the continuity judging unit 163 judges, on the basis of the comparison information from the threshold processing unit 162, whether a variation in the frame of interest is smaller than the threshold L and frames having a variation smaller than the threshold L are continuously present by the minimum limit number of frames N or more immediately before, immediately after, or before and after the frame of interest.

When it is judged in step S124 that the variation in the frame of interest is smaller than the threshold L and frames having a variation smaller than the threshold L are continuously present by a minimum limit number of frames N or more immediately before, immediately after, before and after the frame of interest, the continuity judging unit 163 supplies judgment information representing a result of the judgment to the determining unit 164. The processing proceeds to step S125.

In step S125, the determining unit 164 determines, on the basis of the judgment information from the continuity judging unit 163, the low resolution/normal display rate type C1 as a display type for the frame of interest. The processing proceeds to step S130.

According to steps S124 and S125, when the variation in the frame of interest is smaller than the threshold L and, moreover, frames having a variation smaller than the threshold L are continuously present by the number of frames N or more immediately before, immediately after, or before and after the frame of interest, the low resolution/normal display rate type C1 is determined as a display type for the frame of interest. This determination is based on the following reason.

When a display type is determined out of the low resolution/normal display rate type C1, the normal type C2, and the normal resolution/low display rate type C3 shown in FIG. 31, in scrub, an image having a low resolution is displayed for frames of the low resolution/normal display rate type C1. In other words, an image is displayed by processing proxy data having a smaller amount of data (than that of main data).

On the other hand, concerning frames of the normal type C2 and the normal resolution/low display rate type C3, an image having a high resolution is displayed. In other words, an image is displayed by processing image data of main data having a larger amount of data (than that of proxy data).

For example, when the optical disk 7 (FIG. 1) is a professional disc in which main data and proxy data are recorded, scrub is performed using the main data or the proxy data recorded in the optical disk 7. Then, as in the case explained with reference to FIG. 23, in frames in time series forming a moving image, when frames of the low resolution/normal display rate type C1 for displaying an image using the proxy data and frames of the normal type C2 or the normal resolution/low display rate type C3 for displaying an image using the main data are frequently switched, seek is frequently performed. Thus, it may be difficult to smoothly perform display of a frame designated by operation of the scrub bar 53 (FIG. 3).

In order to prevent seek from being frequently performed, it is necessary to prevent frames of the low resolution/normal display rate type C1 for displaying an image using the proxy data and frames of the normal type C2 or the normal resolution/low display rate type C3 for displaying an image using the main data from being frequently switched.

On the other hand, in both frames of the normal type C2 and frames of the normal resolution/low display rate type C3, an image is displayed using the main data. Thus, seek is not a problem concerning switching of the frames of the normal type C2 and the frames of the normal resolution/low display rate type C3.

Thus, in FIGS. 33 and 34, switching of frames of a display type for displaying an image using the proxy data (the low resolution/normal display rate type C1) and frames of a display type for displaying an image using the main data (the normal type C2 or the normal resolution/low display rate type C3) is prevented from being caused in a section of frames continuing by at least the minimum limit number of frames N. For this purpose, in steps S124 and S125, when a variation in the frame of interest is smaller than the threshold L and frames having a variation smaller than the threshold L continue by the minimum limit number of frames N or more immediately before, immediately after, or before and after the frame of interest, the low resolution/normal display rate type C1 for displaying an image using the proxy data is determined as a display type for the frame of interest.

Further, switching of frames of a display type for displaying an image using the proxy data and frames of a display type for displaying an image using the main data is prevented from being caused in a section of frames continuing by at least the minimum limit number of frames N. For this purpose, in steps S126 to S129 described later, when a variation in the frame of interest is equal to or larger than the threshold L and frames having a variation equal to or larger than the threshold L continues by the minimum limit number of frames N or more immediately before, immediately after, or before and after the frame of interest, the normal type C2 or the normal resolution/low display rate type C3 for displaying an image using the main data is determined as a display type for the frame of interest.

When it is judged in step S124 that the variation in the frame of interest is not smaller than the threshold L or, even if the variation in the frame of interest is smaller than the threshold L, frames having a variation smaller than the threshold L are not continuously present by the minimum limit number of frames N or more immediately before, immediately after, and before and after the frame of interest, the processing proceeds to step S126. The continuity judging unit 163 judges, on the basis of the comparison information from the threshold processing unit 162, whether a variation in the frame of interest is equal to or larger than the threshold L and frames having a variation equal to or larger than the threshold L are continuously present by the minimum limit number of frames N or more immediately before, immediately after, or before and after the frame of interest.

When it is judged in step S126 that the variation in the frame of interest is equal to or larger than the threshold L and frames having a variation equal to or larger than the threshold L are continuously present by the minimum limit number of frames N or more immediately before, immediately after, or before and after the frame of interest, the continuity judging unit 163 supplies judgment information representing a result of the judgment to the determining unit 164. The processing proceeds to step S127.

The determining unit 164 receives, from the continuity judging unit 163, supply of the judgment information representing the result of the judgment that the variation in the frame of interest is equal to or larger than the threshold L and frames having a variation equal to or larger than the threshold L are continuously present by the minimum limit number of frames N or more immediately before, immediately after, or before and after the frame of interest. Then, in step S127, the determining unit 164 judges, on the basis of the comparison information from the threshold processing unit 162, whether a variation in the frame of interest is equal to or larger than the threshold H.

When it is judged in step S127 that the variation in the frame of interest is equal to or larger than the threshold H, the processing proceeds to step S128. The determining unit 164 determines the normal resolution/low display rate type C3 as a display type for the frame of interest. The processing proceeds to step S130.

When it is judged in step S127 that the variation in the frame of interest is not equal to or larger than the threshold H, i.e., when the variation in the frame of interest is equal to or larger than the threshold L and smaller than the threshold H, the processing proceeds to step S129. The determining unit 164 determines the normal type C2 as a display type for the frame of interest. The processing proceeds to step S130.

According to steps S126 to S129, when the variation in the frame of interest is equal to or larger than the threshold L and frames having a variation equal to or larger than the threshold L are continuously present by the number of frames N or more immediately before, immediately after, or before and after the frame of interest, the normal resolution/low display rate type C3 or the normal type C2 for displaying an image using the main data is determined as a display type for the frame of interest. This is for the purpose of preventing seek from being frequently performed at the time of scrub as described above.

In step S130, the continuity judging unit 163 judges whether there is a frame not selected as a frame of interest yet among frames forming a moving image, for which an Fy file is about to be created by the Fy-file creating unit 76 (FIG. 6).

When it is judged in step S130 that there is a frame not selected as a frame of interest yet, the processing returns to step S123. The frame not selected as a frame of interest yet is selected as a frame of interest anew. The same processing is repeated.

When it is judged in step S130 that there isn't a frame not selected as a frame of interest yet, the display-type determining unit 93 ends the processing.

On the other hand, when it is judged in step S126 that the variation in the frame of interest is not equal to or larger than the threshold L or, even if the variation in the frame of interest is equal to or larger than the threshold L, frames having a variation equal to or larger than the threshold L are not continuously present by the minimum limit number of frames N or more immediately before, immediately after, and before and after the frame of interest, the processing proceeds to step S151 in FIG. 34. The continuity judging unit 163 judges whether frames having a variation crossing the threshold L are continuously present by the minimum limit number of frames N or more immediately before, immediately after, or before and after the frame of interest.

When a variation in the frame of interest is smaller than the threshold L and frames having a variation smaller than the threshold L are continuously present by the number of frames N or more immediately before, immediately after, or before and after the frame of interest, in step S125 in FIG. 33, the low resolution/normal display rate type C1 is determined as a display type for the frame of interest.

When a variation in the frame of interest is equal to or larger than the threshold L and frames having a variation equal to or larger than the threshold L are continuously present by the minimum limit number of frames N or more immediately before, immediately after, or before and after the frame of interest, in steps S128 or S129 in FIG. 33, the normal resolution/low display rate type C3 or the normal type C2 is determined as a display type for the frame of interest.

Therefore, the processing in step S151 in FIG. 34 is performed when frames having a variation smaller than the threshold L are not continuously present by the number of frames N or more and frames having a variation equal to or larger than the threshold L are not continuously present by the minimum limit number of frames N or more immediately before, immediately after, and before and after the frame of interest. This is a case in which the frame of interest is a frame in a section in which frames having a variation crossing the threshold L are present (a section in which frames having a variation smaller than the threshold L and frames having a variation equal to or larger than the threshold L are mixed) and a section in which the number of continuing frames having a variation smaller than the threshold L and the number of continuing frames having a variation equal to or larger than the threshold L are smaller than the minimum limit number of frames N at most (hereinafter also referred to as mixed section as appropriate).

As in the case explained with reference to FIG. 25, the mixed section is typically present between a section in which frames having a variation smaller than the threshold L are continuously present by the number of frames N or more (hereinafter also referred to as small variation section as appropriate) and a section in which frames having a variation equal to or larger than the threshold L are continuously present by the minimum limit number of frames N or more (hereinafter also referred to large variation section as appropriate), between two large variation sections, or between two small variation sections.

Consequently, the mixed section can be divided into a section having a section length (the number of frames) equal to or larger than the minimum limit number of frames N and a section having a section length smaller than the minimum limit number of frames N.

The mixed section can also be divided into a section between a large variation section and a small variation section, a section between large variation sections, and a section between small variation sections.

In step S151, the continuity judging unit 163 judges whether frames having a variation crossing the threshold L are continuously present by the minimum limit number of frames N or more immediately before, immediately after, or before and after the frame of interest, i.e., a mixed section in which the frame of interest is present is a section having a section length equal to or larger than the minimum limit number of frames N.

When it is judged in step S151 that frames having a variation crossing the threshold L are continuously present by the minimum limit number of frames N or more immediately before, immediately after, or before and after the frame of interest, the processing proceeds to step S152. The determining unit 164 determines, for example, the normal type C2 among the display types for displaying an image using the main data as a display type for the frame of interest. The processing proceeds to step S130 in FIG. 33. Thereafter, the processing described above is performed.

Concerning the frames in the mixed section in which frames having a variation crossing the threshold L are continuously present by the minimum limit number of frames N or more, a display type for displaying an image using (image data serving as) the main data or a display type for displaying an image using (image data serving as) the proxy data is determined as a display type for all the frames. This makes it possible to prevent seek from being frequently performed.

Thus, in FIG. 34, for example, the normal type C2 among the display types for displaying an image using the main data is determined as all display types for the frames in the mixed section in which frames having a variation crossing the threshold L are continuously present by the minimum limit number of frames N or more.

Besides, it is possible to determine, for example, the low resolution/normal display rate type C1 for displaying an image using the proxy data as display types of the frames in the mixed section in which frames having a variation crossing the threshold L are continuously present by the minimum limit number of frames N or more.

On the other hand, when it is judged in step S151 that frames having a variation crossing the threshold L are not continuously present by the minimum limit number of frames N or more immediately before, immediately after, and before and after the frame of interest, i.e., when a mixed section in which the frame of interest is present (a mixed section of interest) is a section having a section length smaller than the minimum limit number of frames N, the processing proceeds to step S153. The continuity judging unit 163 judges whether one of a variation in a frame adjacent to the mixed section of interest among temporally preceding frames on the left side of the mixed section of interest having a section length smaller than the minimum limit number of frames N (a left frame) and a variation in a frame adjacent to the mixed section of interest among temporally following frames on the right side of the mixed section of interest (a right frame) is smaller than the threshold L and the other is equal to or larger than the threshold L. In other words, the continuity judging unit 163 judges whether the mixed section of interest having a section length smaller than the minimum limit number of frames N is a section between a large variation section and a small variation section.

When it is judged in step S153 that the mixed section of interest having a section length smaller than the minimum limit number of frames N is a section between a large variation section and a small variation section, the processing proceeds to step S152. As described above, the determining unit 164 determines the normal type C2 as a display type for the frame of interest. The processing proceeds to step S130 in FIG. 33. Thereafter, the processing described above is performed.

Both the large variation section and the small variation section on both sides of the mixed section of interest having a section length smaller than the minimum limit number of frames N are sections having a section length equal to or larger than the minimum limit number of frames N. Moreover, the display type (the normal type C2 or the normal resolution/low display rate type C3) for displaying an image using the main data is determined as a display type for frames in the large variation section. The display type (the low resolution/normal display rate type C1) for displaying an image using the proxy data is determined as a display type for frames in the small variation section.

Concerning the frames in the mixed section of interest having a section length smaller than the minimum limit number of frames N between a large variation section and a small variation section, a display type is identical with a display type for frames in the large variation section or a display type for frames in the small variation section. This makes it possible to prevent seek from being frequently performed.

Thus, in FIG. 34, for example, the normal type C2 among the display types for displaying an image using the main data is determined as all display types for frames in the mixed section of interest in which frames having a variation crossing the threshold L are less than the minimum limit number of frames N and that is between a large variation section and a small variation section.

Besides, it is possible to determine, for example, a display type for frames in a small variation section, i.e., the low resolution/normal display rate type C1 for displaying an image using the proxy data as the display types for frames in the mixed section of interest in which frames having a variation crossing the threshold L are less than the minimum limit number of frames N and that is between a large variation section and a small variation section.

On the other hand, when it is judged in step S153 that the mixed section of interest having a section length smaller than the minimum limit number of frames N is not a section between a large variation section and a small variation section, the processing proceeds to step S154. The continuity judging unit 163 judges whether both a variation in a frame adjacent to the mixed section of interest among temporally preceding frames on the left side of the mixed section of interest having a section length smaller than the minimum limit number of frames N (a left frame) and a variation in a frame adjacent to the mixed section of interest among temporally following frames on the right side of the mixed section of interest (a right frame) are smaller than the threshold L. In other words, the continuity judging unit 163 judges whether the mixed section of interest having a section length smaller than the minimum limit number of frames N is a section between small variation sections.

When it is judged in step S154 that the mixed section of interest having a section length smaller than the minimum limit number of frames N is not a section between large variation sections, i.e., when the mixed section of interest having a section length smaller than the minimum limit number of frames N is a section between large variation sections, the processing proceeds to step S152. As described above, the determining unit 164 determines a display type for frames in the large variation section, i.e., for example, the normal type C2 among the display types for displaying an image using the main data as a display type for the frame of interest. The processing proceeds to step S130 in FIG. 33. Thereafter, the processing described above is performed.

In other words, concerning the frames in the mixed section of interest having a section length smaller than the minimum limit number of frames N between two small variation sections, a display type is identical with the display type for displaying an image using the main data determined as a display type for frames in the two small variation sections. This makes it possible to prevent seek from being frequently performed.

On the other hand, when it is judged in step S154 that the mixed section of interest having a section length smaller than the minimum limit number of frames N is a section between small variation sections, the processing proceeds to step S155. The determining unit 164 determines, for example, the low resolution/normal display rate type C1 for displaying an image using the proxy data as a display type for the frame of interest. The processing proceeds to step S130 in FIG. 33. Thereafter, the processing described above is performed.

In other words, concerning the frames in the mixed section of interest having a section length smaller than the minimum limit number of frames N between two large variation sections, a display type is identical with the low resolution/normal display rate type C1 for displaying an image using the proxy data determined as a display type for frames in the two large variation sections. This makes it possible to prevent seek from being frequently performed.

FIG. 35 is a diagram showing an example of an Fy file created by the file creating unit 95 in FIG. 6 when motion information and fineness information are calculated as variations by the variation calculating unit 92 in FIG. 6, a display type based on the motion information and a display type based on the fineness information are determined by the display-type determining unit 93, and both the variations and the display types are selected by the selecting unit 94.

In the Fy file in FIG. 35, from the left to the right, a frame number indicating a place of a frame from the top, a time code of a frame corresponding to the frame number, motion information and fineness information serving as variation in the frames corresponding to the frame number, and a display type based on the motion information and a display type based on the fineness information of the frame corresponding to the frame number are sequentially arranged.

FIG. 36 is a diagram showing an example of an Fy file created by the file creating unit 95 in FIG. 6 when motion information and fineness information are calculated as variations by the variation calculating unit 92 in FIG. 6 and only the variations are selected by the selecting unit 94.

In the Fy file in FIG. 36, from the left to the right, a frame number indicating a place of a frame from the top, a time code of a frame corresponding to the frame number, and motion information and fineness information serving as variation in the frame corresponding to the frame number are sequentially arranged.

FIG. 37 is a diagram showing an example of an Fy file created by the file creating unit 95 in FIG. 6 when motion information and fineness information are calculated as variations by the variation calculating unit 92 in FIG. 6, a display type based on the motion information and a display type based on the fineness information are determined by the display-type determining unit 93, and only the display types are selected by the selecting unit 94.

In the Fy file in FIG. 37, from the left to the right, a frame number indicating a place of a frame from the top, a time code of a frame corresponding to the frame number, and a display type based on motion information and a display type based on fineness information of the frame corresponding to the frame number are sequentially arranged.

In the cases described above, the display types are determined on the basis of the motion information or the fineness information. However, it is also possible to determine the display types on the basis of both the motion information and the fineness information.

FIG. 38 is a diagram showing another example of display types determined by the display-type determining unit 93 in FIG. 6.

In FIG. 38, as the display types, there are four types, namely, a still image type VC1 representing display in a still image and a normal type VC2, a high display rate/low resolution type VC3, and a normal display rate/low resolution type VC4 in which resolutions in displaying a frame and display rates in displaying a frame are different.

Concerning frames of the still image type VC1, like the still image type V1 in FIG. 20, even if a frame to be displayed is changed, as long as an image of the frame to be displayed can be regarded as an image identical with (an image of) a frame displayed immediately before the image, (the image) of the frame displayed immediately before the image is displayed (continued to be displayed).

Concerning frames of the normal type VC2, like the normal type V2 in FIG. 20, an image is displayed at a display rate identical with a frame rate of a moving image (a normal rate) and with a resolution identical with that of image data serving as main data (a normal resolution).

Concerning frames of the high display rate/low resolution type VC3, like the high display rate/low resolution type V3 in FIG. 20, an image is displayed at a display rate higher than the normal rate, for example, a display rate twice as high as the normal rate and with a resolution identical with that of image data serving as proxy data (a resolution lower than that of image data serving as main data).

Concerning frames of the normal display rate/low resolution type VC4, an image is displayed at a display rate of the normal rate and with a resolution identical with that of the image data serving as the proxy data (a resolution lower than the image data serving as the main data).

The high display rate/low resolution type VC3 and the normal display rate/low resolution type VC4 are only different in that, whereas an image is displayed at a display rate higher than the normal rate in the high display rate/low resolution type VC3, an image is displayed at (a display rate of) the normal rate in the normal display rate/low resolution type VC4.

When there are the four types, namely, the still image type VC1, the normal type VC2, the high display rate/low resolution type VC3, and the normal display rate/low resolution type VC4 as the display types, as shown in FIG. 38, the variation calculating unit 92 (FIG. 6) calculates motion information and fineness information as variations. On the basis of both the motion information and the fineness information, for example, the display-type determining unit 93 (FIG. 6) compares the motion information and two thresholds and compares the fineness information and one threshold. The display-type determining unit 93 determines, on the basis of a result of the comparisons, the still image type VC1, the normal type VC2, the high display rate/low resolution type VC3, or the normal display rate/low resolution type VC4 as a display type for a frame.

Figure 39:
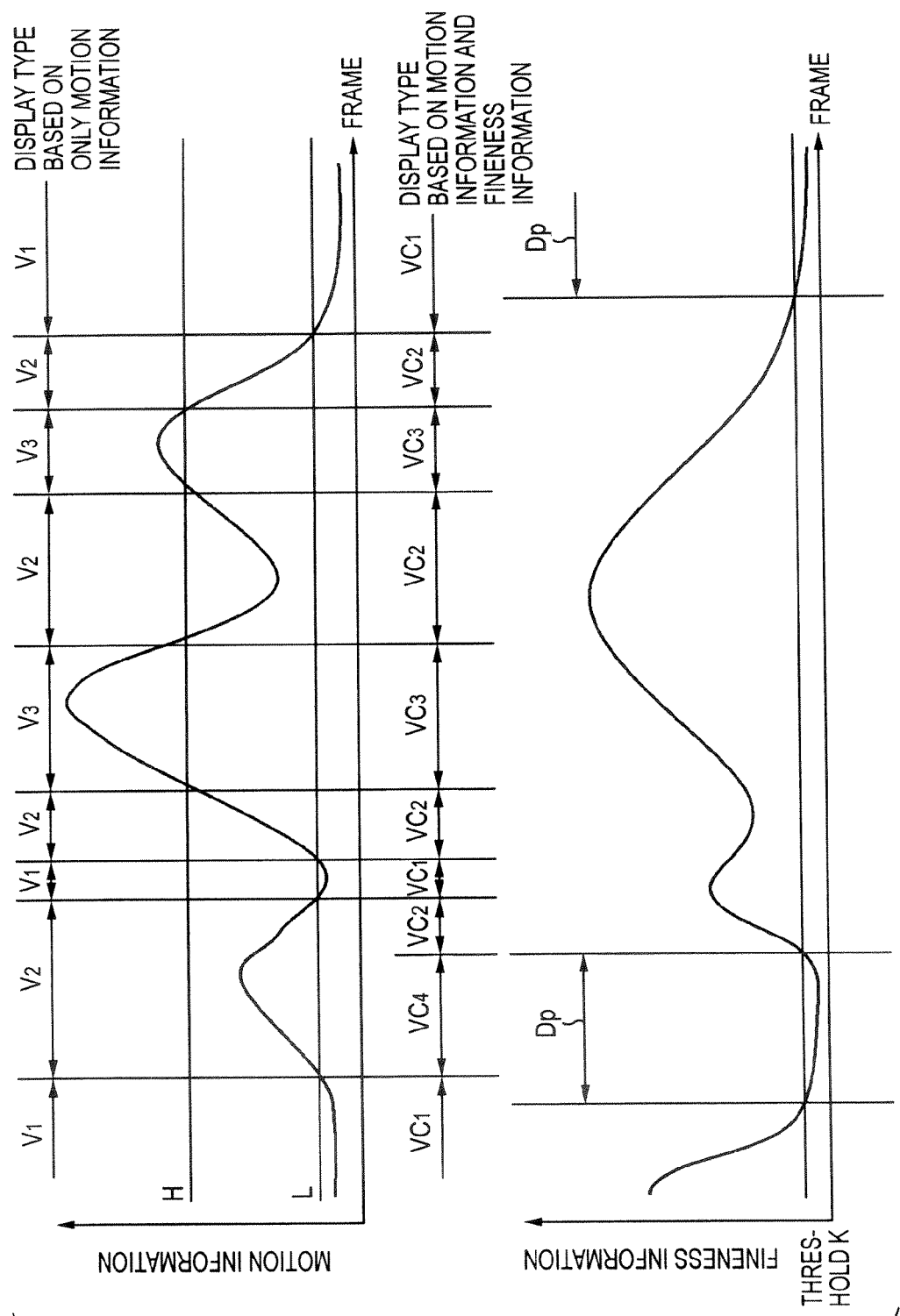
FIG. 39 is a graph of motion information and fineness information and a display type.

FIG. 39 is a graph of motion information and fineness information serving as variations in a unit of frame and a display type determined by the display-type determining unit 93 (FIG. 6) in a unit of frame on the basis of the motion information and the fineness information.

A graph in the upper part in FIG. 39 represents motion information in a unit of frame and a graph in the lower part in FIG. 39 represents fineness information in a unit of frame.

In FIG. 39, the abscissa indicates a frame and the ordinate indicates variations (motion information and fineness information).

The display-type determining unit 93 (FIG. 6) compares motion information in a unit of frame with one of the threshold L and the threshold H that are in a relation of L<H. The display-type determining unit 93 determines, so to speak, a provisional display type (provisionally determines a display type) on the basis of a result of the comparison.

For example, in the same manner as the case explained with reference to FIGS. 20 to 25, the display-type determining unit 93 determines, on the basis of motion information of a frame, the still image type V1, the normal type V2, or the high display rate/low resolution type V3 shown in FIG. 20 as a provisional display type for the frame (provisionally determines a display type).

Consequently, as explained with reference to FIGS. 20 to 25, roughly speaking, the still image type V1, the normal type V2, and the high display rate/low resolution type V3 are provisionally determined as a display type for frames having motion information smaller than the threshold L, a display type for frames having motion information equal to or larger than the threshold L and smaller than the threshold H, and a display type for frames having motion information equal to or larger than the threshold H, respectively.

The display-type determining unit 93 (FIG. 6) compares the fineness information in a unit of frame with a predetermined threshold K. The display-type determining unit 93 finally determines the still image type VC1, the normal type VC2, the high display rate/low resolution type VC3, or the normal display rate/low resolution type VC4 shown in FIG. 38 as a display type for the frames on the basis of a result of the comparison and the provisional display type provisionally determined on the basis of the motion information.

The display-type determining unit 93 finally determines the still image type VC1 and the high display rate/low resolution type VC3 as a display type for the frames, a provisional display type for which is the still image type V1, and a display type for the frames, a provisional display type for which is the high display rate/low resolution type V3, respectively.

The display-type determining unit 93 finally determines the normal type VC2 as a display type for frames having fineness information equal to or larger than the threshold K, i.e., frames of an image not regarded as a flat image among frames, a provisional display type for which is the normal type V2. Moreover, the display-type determining unit 93 finally determines the normal display rate/low resolution type VC4 as a display type for frames having fineness information smaller than the threshold K, i.e., frames of a flat image among the frames, a provisional display type for which is the normal type V2.

The frames, a provisional display type for which is the normal type V2, are frames that have a certain degree of motion, although not very large motion. The frames having fineness information smaller than the threshold K are frames of a flat image. Therefore, among the frames, a provisional display type for which is the normal type V2, frames having fineness information smaller than the threshold K are frames of a flat image, although having a certain degree of motion.

Even if an image has a certain degree of motion, as long as the image is flat, when the image is displayed with a low resolution, a spatial change in the image does not tend to be overlooked. When the image is displayed with a low resolution in scrub, it is possible to reduce burdens imposed on the apparatus for scrub.

Thus, concerning the frames, a provisional display type for which is the normal type V2, having a certain degree of motion, in principle, the normal type VC2 for displaying an image with the normal resolution is determined as a display type. However, as long as fineness information is smaller than the threshold K, the normal display rate/low resolution type VC4 for displaying an image with a resolution lower than the normal resolution is finally determined as the display type.

In FIG. 39, the normal display rate/low resolution type VC4 is finally determined as a display type for a frame in a section $D_p$ that has fineness information smaller than the threshold K, a provisional display type based on motion information of which is the normal type V2.

The still image type VC1, the normal type VC2, the high display rate/low resolution type VC3, or the normal display rate/low resolution type VC4 shown in FIG. 38 is finally determined as a display type on the basis of motion information and fineness information in a unit of frame. This display type is hereinafter referred to as a final display type as appropriate.

Figure 40:
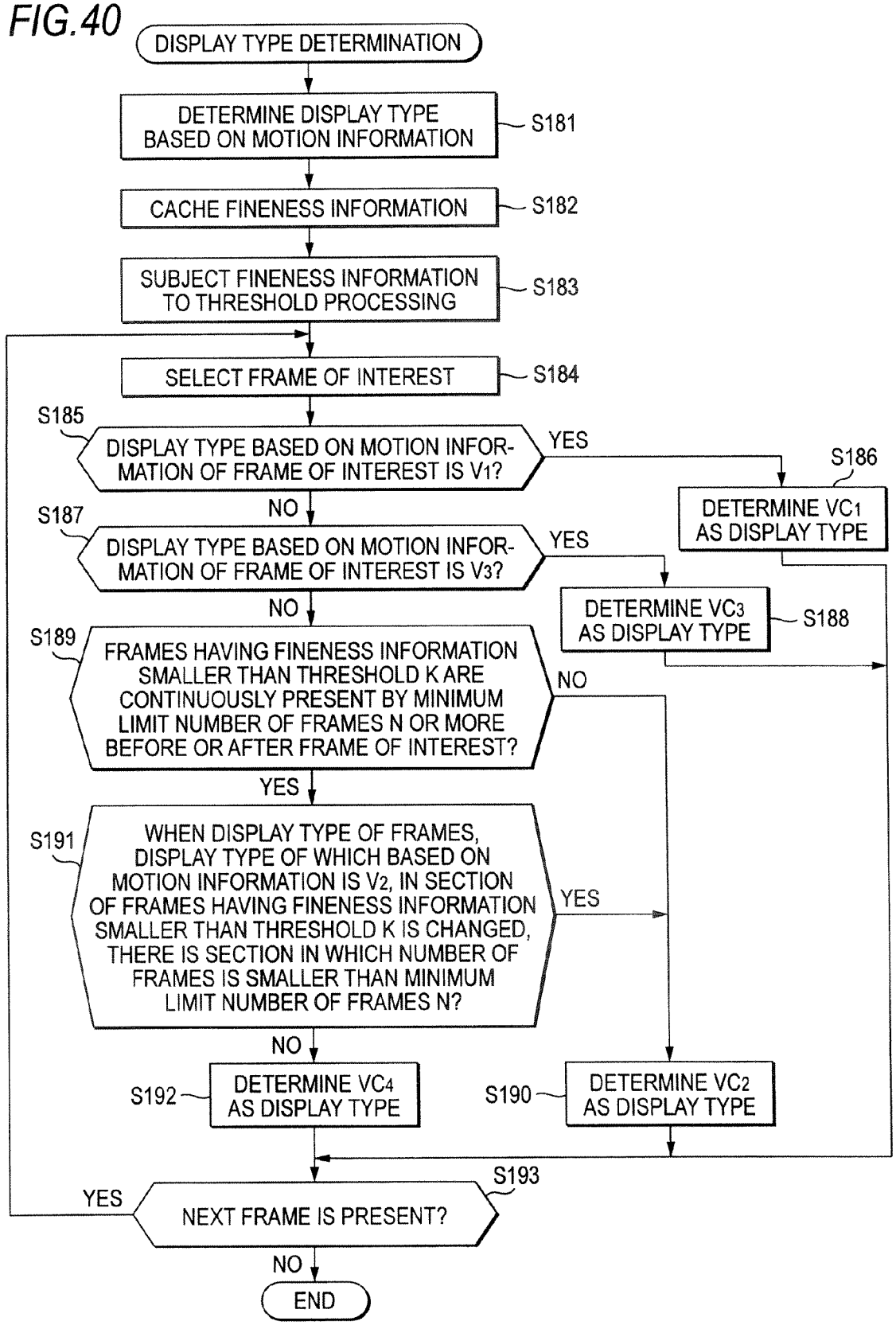
FIG. 40 is a flowchart for explaining display type determination processing.

Processing of the display-type determining unit 93 in FIG. 22 in the case in which the still image type VC1, the normal type VC2, the high display rate/low resolution type VC3, or the normal display rate/low resolution type VC4 shown in FIG. 38 is determined as a display type (a final display type) on the basis of both motion information and fineness information will be explained with reference to a flowchart in FIG. 40.

The variation calculating unit 92 (FIG. 6) calculates motion information and fineness information as variations and supplies the motion information and the fineness information to the display-type determining unit 93.

In step S181, the display-type determining unit 93 determines, on the basis of the motion information in a unit of frame from the variation calculating unit 92 (FIG. 6), a display type (a provisional display type) based on the motion information as explained with reference to FIGS. 23 and 24. The processing proceeds to step S182.

In step S182, the display-type determining unit 93 causes the storing unit 161 (FIG. 22) to cache the fineness information in a unit of frame supplied from the variation calculating unit 92. The processing proceeds to step S183.

In step S183, the threshold processing unit 162 (FIG. 22) performs threshold processing for comparing the fineness information in a unit of frame stored in the storing unit 161 and the threshold K. The threshold processing unit 162 supplies comparison information representing a result of the comparison of the fineness information in a unit of frame and the threshold K to the continuity judging unit 163 in a unit of frame. The processing proceeds to step S184.

In step S184, the continuity judging unit 163 (FIG. 22) selects a front frame in a time series order not set as a frame of interest yet among frames forming a moving image, for which an Fy file is about to be created by the Fy-file creating unit 76 (FIG. 6), as a frame of interest. The continuity judging unit 163 supplies information on the frame of interest to the determining unit 164 (FIG. 22). The processing proceeds to step S185.

In step S185, the determining unit 164 judges whether a display type based on motion information of the frame of interest (the provisional display type determined in step S181) is the still image type V1.

When it is judged in step S185 that the display type based on the motion information of the frame of interest is the still image type V1, the processing proceeds to step S186. The determining unit 164 finally determines the still image type VC1 as a final display type for the frame of interest (a display type based on motion information and fineness information of the frame of interest). The processing proceeds to step S193.

When it is judged in step S185 that the display type based on the motion information of the frame of interest is not the still image type V1, the processing proceeds to step S187. The determining unit 164 judges whether the display type based on the motion information of the frame of interest is the high display rate/low resolution type V3.

When it is judged in step S187 that the display type based on the motion information of the frame of interest is the high display rate/low resolution type V3, the processing proceeds to step S188. The determining unit 164 finally determines the high display rate/low resolution type VC3 as a final display type for the frame of interest. The processing proceeds to step S193.

When it is judged in step S187 that the display type based on the motion information of the frame of interest is not the high display rate/low resolution type V3, i.e., when the display type based on the motion information of the frame of interest is the normal type V2, the processing proceeds to step S189. The continuity judging unit 163 (FIG. 22) judges, on the basis of the comparison information from the threshold processing unit 162, whether fineness information of the frame of interest, a display type based on the motion information of which is the normal type V2, is smaller than the threshold K and frames having fineness information smaller than the threshold K are continuously present by the minimum limit number of frames N or more immediately before, immediately after, or before and after the frame of interest.

When it is judged in step S189 that the fineness information of the frame of interest is not smaller than the threshold K or, even if the fineness information of the frame of interest is smaller than the threshold K, frames having fineness information are not continuously present by the minimum limit number of frames N or more immediately before, immediately after, and before and after the frame of interest, the continuity judging unit 163 supplies judgment information representing a result of the judgment to the determining unit 164 (FIG. 22). The processing proceeds to step S190.

The determining unit 164 (FIG. 22) receives, from the continuity judging unit 163, the supply of the judgment information representing the result of the judgment that the fineness information of the frame of interest is not smaller than the threshold K and frames having fineness information smaller than the threshold K are not continuously present by the minimum limit number of frames N or more immediately before, immediately after, and before and after the frame of interest. Then, in step S190, the determining unit 164 finally determines the normal type VC2 as a final display type for the frame of interest, a display type based on the motion information of which is the normal type V2. The processing proceeds to step S193.

When it is judged in step S189 that the fineness information of the frame of interest is smaller than the threshold K and frames having fineness information smaller than the threshold K are continuously present by the minimum limit number of frames N or more immediately before, immediately after, or before and after the frame of interest, the processing proceeds to step S191. The continuity judging unit 163 (FIG. 22) judges whether there is a section in which the number of continuing frames having an identical type is less than the minimum limit number of frames N when a display type for frames, a display type based on the motion information of which is the normal type V2, among frames of a section of the frames continuing by the minimum limit number of frames N or more immediately before, immediately after, or before and after the frame of interest having the fineness information smaller than the threshold K is changed to the normal display rate/low resolution type VC4.

For example, in FIG. 39, the section $D_p$ is a section in which frames having fineness information smaller than the threshold K continue by the minimum limit number of frames N or more. In this case, in step S191, it is judged whether there is a section in which the number of continuing frames having an identical type is less than the minimum limit number of frames N among sections in which the frames of the identical display type continue in a time series of display types when a display type for frames, a display type based on the motion information of which is the normal type V2, among frames of the section $D_p$ is changed to the normal display rate/low resolution type VC4. The display types are based on the motion information and fineness information finally obtained for a moving image, for which an Fy file is about to be created.

When it is judged in step S191 that, when the display type for frames, a display type based on the motion information of which is the normal type V2, among the frames in the section of frames continuing by the minimum limit number of frames N or more immediately before, immediately after, or before and after the frame of interest having fineness information smaller than the threshold K is changed to the normal display rate/low resolution type VC4, there is such a section in which the number of continuing frames having an identical type is less than the minimum limit number of frames N, i.e., when it is likely that seek is frequently performed if the final display type of the frame of interest, a display type based on the motion information of which is the normal type V2, is changed to the normal display rate/low resolution type VC4, the processing proceeds to step S190. As described above, the determining unit 164 (FIG. 22) finally determines the normal type VC2 as the final display type for the frame of interest, a display type based on the motion information of which is the normal type V2. The processing proceeds to step S193.

When it is judged in step S191 that, when the display type for frames, a display type based on the motion information of which is the normal type V2, among the frames in the section of frames continuing by the minimum limit number of frames N or more immediately before, immediately after, or before and after the frame of interest having fineness information smaller than the threshold K is changed to the normal display rate/low resolution type VC4, there is no such section in which the number of continuing frames having an identical type is less than the minimum limit number of frames N, the processing proceeds to step S192. The determining unit 164 (FIG. 22) finally determines the normal display rate/low resolution type VC4 as the final display type for the frame of interest, a display type based on the motion information of which is the normal type V2. The processing proceeds to step S193.

When the display type (the final display type) is determined out of the still image type VC1, the normal type VC2, the high display rate/low resolution type VC3, and the normal display rate/low resolution type VC4 shown in FIG. 38, in scrub, concerning frames of the still image type VC1 and frames of the normal type VC2, an image having a high resolution (an image having a normal resolution) is displayed. In other words, an image is displayed by processing image data of the main data having a large amount of data (than that of the proxy data).

Concerning frames of the high display rate/low resolution type VC3 and frames of the normal display rate/low resolution type VC4, an image having a low resolution is displayed. In other words, an image is displayed by processing image data of the proxy data having a smaller amount of data (than that of the main data).

For example, when the optical disk 7 (FIG. 1) is a professional disc in which main data and proxy data are recorded, scrub is performed using the main data or the proxy data recorded in the optical disk 7. Then, as in the case explained with reference to FIG. 23, in frames in time series forming a moving image, when frames of the high display rate/low resolution type VC3 or the normal display rate/low resolution type VC4 for displaying an image using the proxy data and frames of the still image type VC1 or the normal type VC2 for displaying an image using the main data are frequently switched, seek is frequently performed. Thus, it may be difficult to smoothly perform display of a frame designated by operation of the scrub bar 53 (FIG. 3).

In order to prevent seek from being frequently performed, it is necessary to prevent frames of the high display rate/low resolution type VC3 or the normal display rate/low resolution type VC4 for displaying an image using the proxy data and frames of the still image type VC1 or the normal type VC2 for displaying an image using the main data from being frequently switched.

Therefore, in FIG. 40, in steps S190 to S192, the normal display rate/low resolution type VC4 is determined as the final display type for the frame of interest, a display type based on the motion information of which is the normal type V2 only in the following case. That is, there is no section in which the number of continuing frames having an identical type is less than the minimum limit number of frames N even if the display type for frames, a display type based on the motion information of which is the normal type V2, among the frames in the section of frames continuing by the minimum limit number of frames N or more immediately before, immediately after, or before and after the frame of interest having fineness information smaller than the threshold K is changed to the normal display rate/low resolution type VC4. In other case (when there is a section in which the number of continuing frames having the identical type (the final display type) is less than the minimum limit number of frames N), the normal type V2 is determined as the final display type for the frame of interest, a display type based on the motion information of which is the normal type VC2.

In step S193, the continuity judging unit 163 judges whether there is a frame not selected as a frame of interest yet among frames forming a moving image, for which an Fy file is about to be created by the Fy-file creating unit 76 (FIG. 6).

When it is judged in step S193 that there is a frame not selected as a frame of interest yet, the processing returns to step S184. The frame not selected as a frame of interest yet is selected as a frame of interest anew. The same processing is repeated.

When it is judged in step S193 that there isn't a frame not selected as a frame of interest yet, the display-type determining unit 93 ends the processing.

FIG. 41 is a diagram showing an example of an Fy file created by the file creating unit 95 in FIG. 6 when motion information and fineness information are calculated as variations by the variation calculating unit 92 in FIG. 6, a display type (a final display type) based on the motion information and the fineness information is determined by the display-type determining unit 93, and both the variations and the display type are selected by the selecting unit 94.

In the Fy file in FIG. 41, from the left to the right, a frame number indicating a place of a frame from the top, a time code of a frame corresponding to the frame number, motion information and fineness information serving as variation in the frame corresponding to the frame number, and a display type (a final display type) based on the motion information and the fineness information of the frame corresponding to the frame number are sequentially arranged.

FIG. 42 is a diagram showing an example of a structure of the drive 5 in FIG. 1.

The drive 5 includes a recording unit/reproducing unit 181, a decoder 182, an Fy-file creating unit 183, and an external I/F 184.

The recording unit/reproducing unit 181 writes (records) to the optical disk 7 (a file of) data supplied from the external I/F 184 and an Fy file supplied from the Fy-file creating unit 183. The recording unit/reproducing unit 181 reads out data from the optical disk 7 and supplies the data to the decoder 182 or the external I/F 184.

The decoder 182 decodes the data supplied from the recording unit/reproducing unit 181 and supplies the data to the Fy-file creating unit 183.

The Fy-file creating unit 183 has the same structure as the Fy-file creating unit 76 in FIG. 4. The Fy-file creating unit 183 creates an Fy file serving as a metafile from the data supplied from the decoder 182 and supplies the Fy file to the recording unit/reproducing unit 181.

The external I/F 184 receives the data supplied from the recording unit/reproducing unit 181 and outputs the data to the outside. The external I/F 184 receives data supplied from the outside and supplies the data to the recording unit/reproducing unit 181.

In the drive 5 constituted as described above, the recording unit/reproducing unit 181 records data supplied via the external I/F 184, for example, according to operation by the user in the optical disk 7. The recording unit/reproducing unit 181 reads out data recorded in the optical disk 7 and outputs the data to the outside via the external I/F 184.

For example, when the optical disk 7 is a professional disc in which AV files having main data and proxy data stored therein and metafiles having metadata stored therein are recorded, in the drive 5, the recording unit/reproducing unit 181 checks whether an Fy file is present in the metafile recorded in the optical disk 7, for example, when the optical disk 7 is inserted into the drive 5 or according to operation by the user.

When an Fy file is not recorded in the optical disk 7, the recording unit/reproducing unit 181 reads out image data serving as the main data from the optical disk 7 to acquire the image data and supplies the image data to the decoder 182.

The image data serving as the main data recorded in the optical disk 7 is encoded, for example, in the MPEG2 system as explained with reference to FIG. 5. Thus, the decoder 182 decodes the main data from the recording unit/reproducing unit 181 in the MPEG2 system and supplies image data obtained as a result of the decoding to the Fy-file creating unit 183.

The Fy-file creating unit 183 creates an Fy file serving as the metafile having the metadata of the image data (the image data recorded in the optical disk 7) from the decoder 182 in the same manner as the Fy-file creating unit 76 in FIG. 4.

The Fy-file creating unit 183 calculates a variation in each of frames of the image data from the decoder 182. Moreover, the Fy-file creating unit 183 determines a display type on the basis of the variation in the frame if necessary. The Fy-file creating unit 183 creates an Fy file having stored therein one or both of the variation and the display type in a unit of frame and supplies the Fy file to the recording unit/reproducing unit 181.

The recording unit/reproducing unit 181 records the Fy file supplied from the Fy-file creating unit 183 in the optical disk 7.

In the drive 5 in FIG. 42, for example, an encoded bit stream obtained by encoding image data in the MPEG2 system is supplied to the external I/F 184 from the outside and the recording unit/reproducing unit 181 records (a file of) the encoded bit stream supplied from the external I/F 184 in the optical disk 7. In this case, the Fy-file creating unit 183 can create an Fy file as described above after the recording of the encoded bit stream ends. Alternatively, the recording unit/reproducing unit 181 supplies the encoded bit stream supplied from the external I/F 184 to the decoder 182 and causes the decoder 182 to decode the encoded bit stream and supply the bit stream decoded to the Fy-file creating unit 183. Consequently, the Fy-file creating unit 183 can create an Fy file in parallel to the recording of the encoded bit stream in the optical disk 7.

A kind of a pixel value used for calculating a variation in the frame is not specifically limited. When the pixel value includes a luminance signal (Y) and a color difference signal (Cb, Cr), it is possible to calculate a variation using the luminance signal or using the color difference signal. However, since a change in the luminance signal has a large influence on the human visual sense is larger than a change in the color difference signal, it is desirable to calculate a variation using the luminance signal.

When the pixel value includes color components of R, G, and B, for example, it is possible to calculate a variation using a square sum or the like of the color components of R, G, and B.

As the motion information serving as the variation, it is possible to adopt values that quantitatively represent intensity of motion other than the values explained with reference to FIGS. 11 to 14. Similarly, as the fineness information serving as the variation, it is possible to adopt values (e.g., values called difficulty and flatness) that quantitatively represent fineness of an image other than the values explained with reference to FIGS. 15 to 18.

For example, when a variation is calculated using image data encoded in the MPEG2 system as explained with reference to FIG. 42, it is possible to analyze (parse) an encoded bit stream obtained by encoding the image data in the MPEG2 system and calculate a variation using a result of the analysis.

A motion vector is included in the encoded bit stream. Thus, when the motion information serving as the variation is calculated using the motion vector as explained with reference to FIGS. 11 and 12, it is possible to analyze the encoded bit stream to obtain the motion vector included in the encoded bit stream as a result of the analysis and calculate motion information using the motion vector.

DCT factors obtained by subjecting a block of 8×8 pixels to DCT conversion are included in the encoded bit stream. Thus, when fineness information serving as the variation is calculated using the DCT factors as explained with reference to FIGS. 15 and 16, it is possible to analyze the encoded bit stream to obtain the DCT factors included in the encoded bit stream as a result of the analysis and calculate fineness information using the DCT factors.

Moreover, a so-called DC component, which is a DCT factor on the upper left, among the DCT factors obtained by subjecting the block of 8×8 pixels to DCT conversion is an average of pixels values of the 8×8 pixels of the block. Thus, when the fineness information serving as the variation is calculated using the average of the pixel values of the block as explained with reference to FIGS. 17 and 18, it is possible to analyze the encoded bit stream to obtain the DC component among the DCT factors included in the encoded bit stream as a result of the analysis and calculate fineness information using the DC component, i.e., the average of the pixel values of the block.

FIG. 43 is a diagram showing an example of a functional structure of the PC1 functioning as an editing system when the CPU 22 (FIG. 2) of the PC 1 in FIG. 1 executes the editing program.

The editing system includes the keyboard 2, the mouse 3, the display 41, an edition control unit 201, a stream-memory control unit 221, and a stream memory 222.

The edition control unit 201 includes a GUI control unit 211, a stream-decoding-position detecting unit 212, a decoder-supply control unit 213, an Fy-file managing unit 214, a display-type acquiring unit 215, a decoder 216, an Fy-file creating unit 217, and a display control unit 218.

The GUI control unit 211 controls the display control unit 218 to cause the display 41 (FIG. 2) to display a GUI such as the viewer 51 shown in FIG. 3. The GUI control unit 211 receives an operation signal supplied from the keyboard 2 or the mouse 3 according to operation of the keyboard 2 or the mouse 3 by the user on the GUI displayed on the display 41. The GUI control unit 211 supplies necessary information and the like to the stream-decoding-position detecting unit 212, the data-supply control unit 213, the display control unit 218, and the like according to the operation signal.

Specifically, the GUI control unit 211 supplies, for example, according to the operation signal supplied from the keyboard 2 or the mouse 3, a command for requesting reproduction of a frame to the stream-decoding-position detecting unit 212 together with information designating a stream (an AV file) of main data or proxy data to be subjected to scrub and information designating a frame that should be reproduced in scrub.

Moreover, the GUI control unit 211 supplies thresholds used in determining a display type on the basis of a variation to the data-supply control unit 213 according to the operation signal supplied from the keyboard 2 or the mouse 3.

The stream-decoding-position detecting unit 212 generates, according to the command from the GUI control unit 211, a frame number serving as information specifying a frame to be displayed on the display 41 and a stream number serving as information specifying a stream including data (main data or proxy data) of the frame and supplies the frame number and the stream number to the data-supply control unit 213.

The data-supply control unit 213 performs relay and the like for data exchanged among blocks constituting the editing system.

Specifically, the data-supply control unit 213 receives for example, the thresholds from the GUI control unit 211 and supplies the thresholds to the Fy-file managing unit 214. The data-supply control unit 213 receives, for example, the frame number and the stream number from the stream-decoding-position detecting unit 212 and supplies the frame number and the stream number to the display-type acquiring unit 215 and the stream-memory control unit 221. Moreover, the data-supply control unit 213 receives, for example, the stream (the main data or the proxy data) from the stream-memory control unit 221 and supplies the stream to the decoder 216. The data-supply control unit 213 acquires, for example, the Fy file read out from the optical disk 7 by receiving the Fy file and supplies the Fy file to the Fy-file managing unit 214. Moreover, the data-supply control unit 213 receives the Fy file supplied from the Fy-file creating unit 217, supplies the Fy file to the optical disk 7, and causes the optical disk 7 to record the Fy file.

The Fy-file managing unit 214 manages (stores) the Fy file supplied from the data-supply control unit 213. The Fy-file managing unit 214 determines (again) a display type by comparing the variation stored in the Fy file and the thresholds supplied from the data-supply control unit 213.

The display-type acquiring unit 215 acquires a display type for a frame specified by the frame number (and a necessary stream number) supplied from the data-supply control unit 213, i.e., a frame displayed on the display 41 by referring to the Fy file managed by the Fy-file managing unit 214. The display-type acquiring unit 215 supplies the display type to the decoder 216, the display control unit 218, and the other necessary blocks constituting the editing system such as the GUI control unit 211.

The decoder 216 includes a memory control unit 216A. The decoder 216 decodes the stream (the main data or the proxy data) supplied from the data-supply control unit 213 and supplies image data of a frame (image data of a base band) obtained as a result of the decoding to the Fy-file creating unit 217 and the display control unit 218.

The decoder 216 decodes the stream while causing the RAM 24 (FIG. 2) to store data necessary in decoding the stream. The memory control unit 216A included in the decoder 216 controls reading of the data from and writing of the data in the RAM 24. The decoder 216 does not perform decoding in some cases when a display type for a frame displayed on the display 41 is a still image type. The decoder 216 recognizes that the display type for the frame displayed on the display 41 is the still image type by referring to the display type supplied from the display-type acquiring unit 215.

The Fy-file creating unit 217 has the same structure as the Fy-file creating unit 76 shown in FIG. 6. The Fy-file creating unit 217 creates an Fy file from the image data supplied from the decoder 216 and supplies the image data to the data-supply control unit 213.

The display control unit 218 causes the display 41 to display a GUI according to the information supplied from the GUI control unit 211 and the Fy file and the like managed by the Fy-file managing unit 214. The display control unit 218 causes the display 41 to display an image corresponding to the image data of the frame supplied from the decoder 216 with a display method represented by the display type for the frame supplied from the display-type acquiring unit 215. An image corresponding to data stored in a frame buffer 218A serving as a storage area in a part of the RAM 24 (FIG. 2) is displayed on the display 41. The display control unit 218 writes image data in the frame buffer 218A to cause the display 41 to display an image corresponding to the image data.

The stream-memory control unit 221 controls reading of the stream (the main data or the proxy data) from and writing of the stream in the optical disk 7 and the stream memory 222. The stream control unit 221 reads out data (main data or proxy data) of a stream necessary for decoding a frame specified by the frame number and the stream number from the data-supply control unit 213 and supplies the data to the data-supply control unit 213 and, if necessary, to the stream memory 222.

The stream memory 222 is a storage area in a part of the RAM 24 (FIG. 2) and stores the data of the stream supplied from the stream-memory control unit 221. The stream-memory control unit 221 supplies the data of the stream read out from the optical disk 7 to the stream memory 222 and causes the stream memory 222 to store the data. The stream-memory control unit 221 reads out the data of the stream already stored in the stream memory 222. In reading out the data of the stream from the stream memory 222, it is possible to read out the data at high speed compared with speed of readout from the optical disk 7.

In the editing system constituted as described above, the Fy file is read out from the optical disk 7, supplied to the Fy-file managing unit 214 via the data-supply control unit 213, and stored therein.

On the other hand, when a frame designated as a frame displayed on the display 41 in scrub is referred to as a frame of interest, the display-type acquiring unit 215 acquires a display type for the frame of interest by referring to the Fy file managed (stored) by the Fy-file managing unit 214 and supplies the display type to the display control unit 218.

The decoder 216 decodes the data read out from the optical disk 7 and supplied to the decoder 216 via the data-supply control unit 213 into image data of the frame of interest and supplies the image data to the display control unit 218. The display control unit 218 causes the display 41 to display an image corresponding to the image data of the frame of interest with a display method represented by the display type for the frame of interest.

As described above, one or both of a variation and a display type in a unit of frame are selected and stored in the Fy file. Thus, in the Fy file, both the variation and the display type are stored, the variation is stored but the display type is not stored, or the display type is stored but the variation is not stored.

When the display type is stored in the Fy file, i.e., when both the variation and the display type are stored or when the display type is stored but the variation is not stored, it is possible to cause the display 41 to display the image corresponding to the image data of the frame of interest using the display type stored in the Fy file as it is.

When the variation is stored in the Fy file, i.e., when both the variation and the display type are stored or when the variation is stored but the display type is not stored, the Fy-file managing unit 214 can determine a display type in a unit of frame on the basis of the variation in a unit of frame stored in the Fy file and cause the display 41 to display the image corresponding to the image data of the frame of interest using the display type.

When an Fy file is not recorded in the optical disk 7, the Fy-file creating unit 217 can create an Fy file and record the Fy file in the optical disk 7.

In this explanation, in the editing system in FIG. 43, scrub is performed with the data recorded in the optical disk 7 as an object. Besides, for example, it is possible to perform scrub with the data recorded in, for example, the hard disk 4 in FIG. 1 and the hard disk 25 in FIG. 2 as objects.

Figure 44:
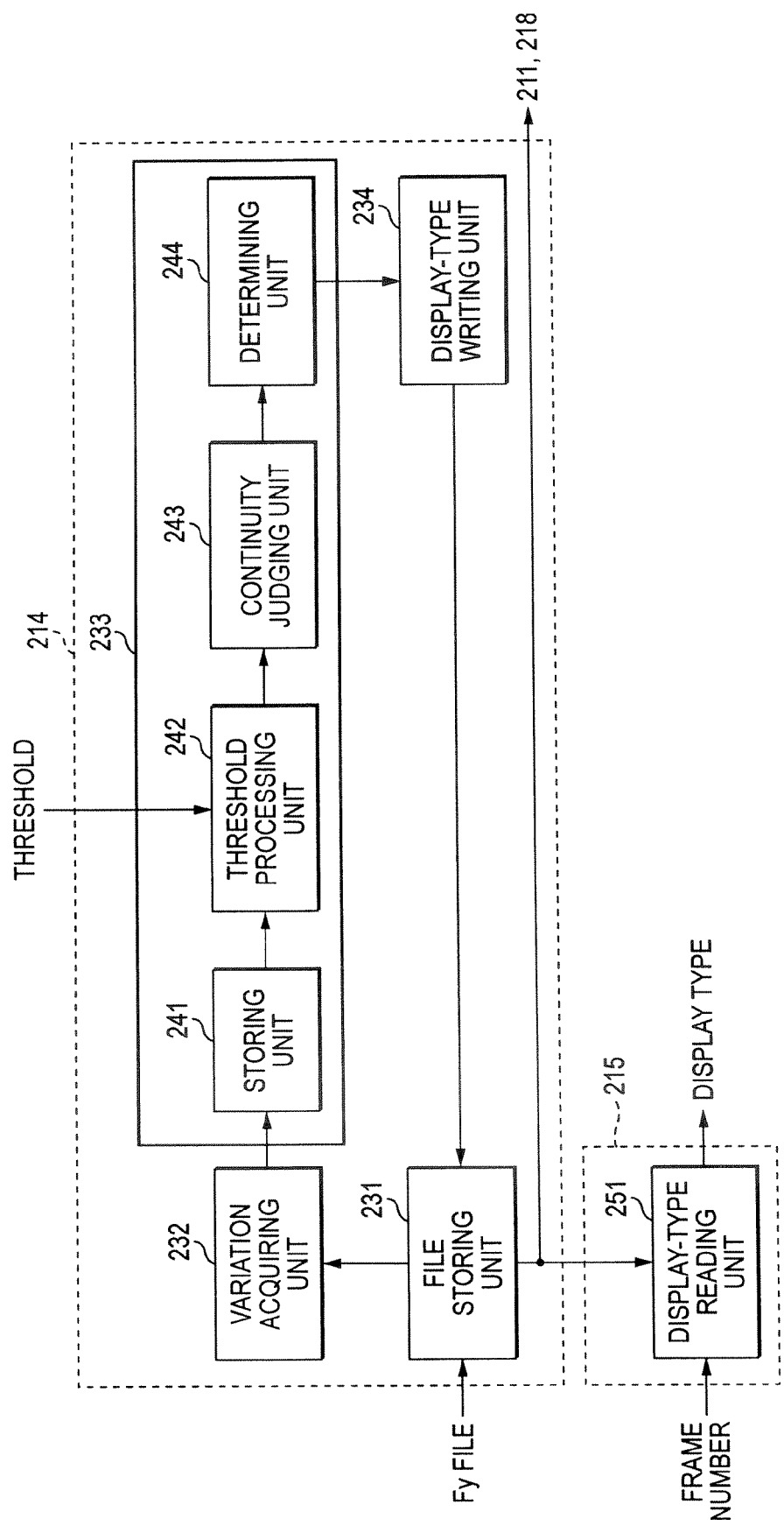
FIG. 44 is a block diagram showing an example of structures of an Fy-file managing unit 214 and a display-type acquiring unit 215.

FIG. 44 is a diagram showing an example of structures of the Fy-file managing unit 214 and the display-type acquiring unit 215 in FIG. 43.

The Fy-file managing unit 214 includes a file storing unit 231, a variation acquiring unit 232, a display-type determining unit 233, and a display-type writing unit 234.

The file storing unit 231 stores (data stored in) the Fy file supplied from the data-supply control unit 213 (FIG. 43).

The variation acquiring unit 232 acquires the variation in a unit of frame by reading out the variation from the Fy file stored in the file storing unit 231 and supplies the variation to the display-type determining unit 233.

The display-type determining unit 233 includes a storing unit 241, a threshold processing unit 242, a continuity judging unit 243, and a determining unit 244. The display-type determining unit 233 determines (again) a display type in a unit of frame on the basis of the variation in a unit of frame supplied from the variation acquiring unit 232 in the same manner as the display-type determining unit 93 in FIG. 22 and supplies the display type to the display-type writing unit 234.

In the display-type determining unit 233, the storing unit 241, the threshold processing unit 242, the continuity judging unit 243, and the determining unit 244 have the same structures as the storing unit 161, the threshold processing unit 162, the continuity judging unit 163, and the determining unit 164 of the display-type determining unit 93 in FIG. 22, respectively.

Like the threshold processing unit 162, the threshold processing unit 242 compares a variation and a threshold in a unit of frame. However, the threshold compared with the variation by the threshold processing unit 242 is supplied from the GUI control unit 211 in FIG. 43 to the threshold processing unit 242 via the data-supply control unit 213.

The display-type writing unit 234 stores (writes) the display type in a unit of frame supplied from the Fy-file managing unit 214 in association with the frame number and the time code stored in the Fy file (FIG. 26) stored in the file storing unit 231.

The display-type acquiring unit 215 includes a display-type readout unit 251. The display-type readout unit 251 acquires the display type associated with the frame number of the frame of interest supplied from the data-supply control unit 213 by reading out the display type from the Fy file managed by the Fy-file managing unit 214, i.e., the Fy file stored in the file storing unit 231 of the Fy-file managing unit 214. The display-type readout unit 251 supplies the display type to the decoder 216, the display control unit 218, and the like in FIG. 43.

In scrub performed in the editing system in FIG. 43, a frame (a frame of interest) to be displayed on (the display section 52 of the viewer 51 displayed on) the display 41 is designated according to, for example, a position of the scrub dial 54 of the scrub bar 53 shown in FIG. 3.

The GUI control unit 211 in FIG. 43 causes the display control unit 218 to display the scrub bar 53 and recognizes a frame designated by a position of the scrub dial 54 of the scrub bar 53 as a frame of interest.

A relation between a position of the scrub dial 54 and a frame designated by the position will be explained with reference to FIG. 45.

Figure 45:
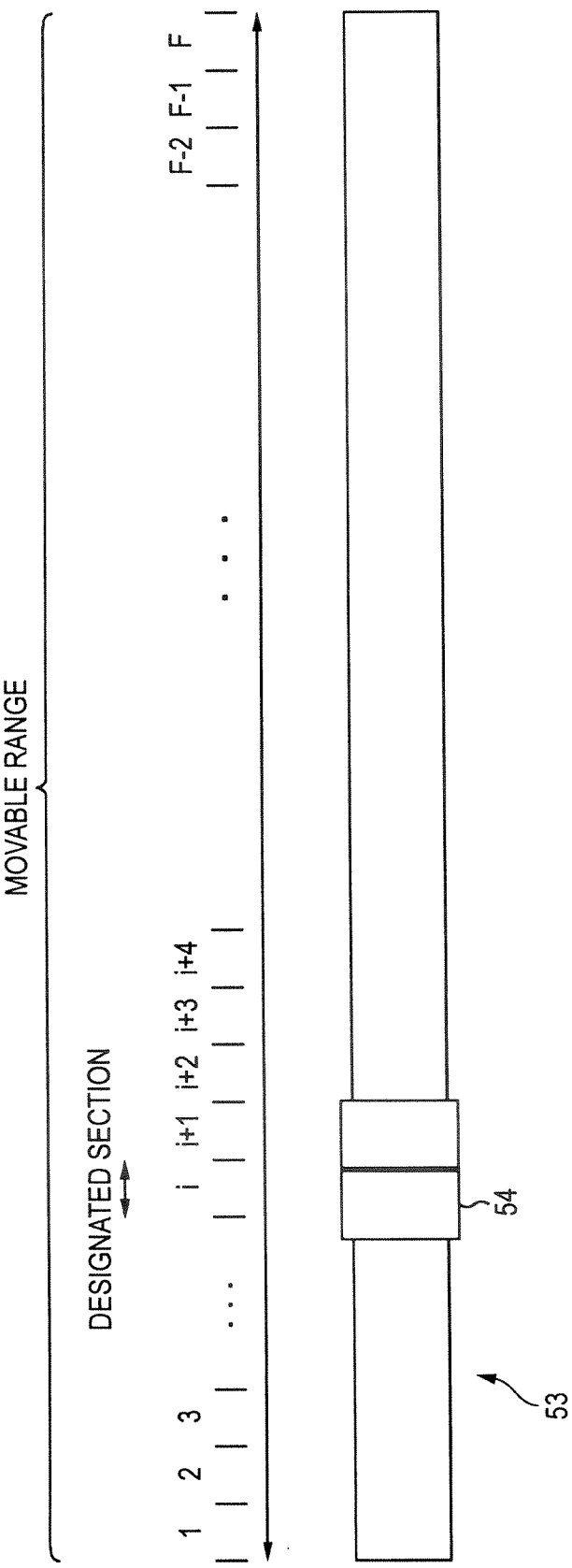
FIG. 45 is a diagram for explaining a relation between a position of a scrub dial 54 and a frame designated by the position.

FIG. 45 is a diagram showing the scrub bar 53.

In the scrub bar 53, a movable range in the horizontal direction in which the scrub dial 54 is movable (a range in length of, for example, about 10 to 20 cm in the horizontal direction) is divided into subsections in a number identical with the number of frames forming (a stream of) a moving image set to be subjected to scrub (hereinafter referred to as designated sections as appropriate).

In FIG. 45, the movable range is divided into F designated sections.

When length in the horizontal direction of the designated sections (width in dividing the movable range into designated sections) is referred to as a section length, in FIG. 45, the movable range is divided (equally divided) into designated sections having an identical section length.

In the respective designated sections dividing the movable range, frames forming the moving image set to be subjected to scrub are allocated in time series, for example, in a direction from the designated section on the left side to the designated section on the right side. Therefore, when a designated section ith from the left in the movable range is referred to as an ith designated section and a frame ith from the top of the frames forming the moving image set to be subjected to scrub is referred to as an ith frame, the ith frame is allocated to the ith designated section.

The GUI control unit 211 detects a designated section in which the scrub dial 54 is located at timing corresponding to a display rate indicated by a display type for a frame displayed on the display 41 immediately before scrub dial 54 is moved. The GUI control unit 211 recognizes a frame allocated to the designated section as a frame of interest.

As display types, the three types, namely, the still image type V1, the normal type V2, and the high display rate/low resolution type V3 shown in FIG. 20 are adopted. A display rate of the still image type V1 and the normal type V2 is, for example, 30 frames/second. A display rate of the high display rate/low resolution type V3 is, for example, 60 frames/second.

Figure 46:
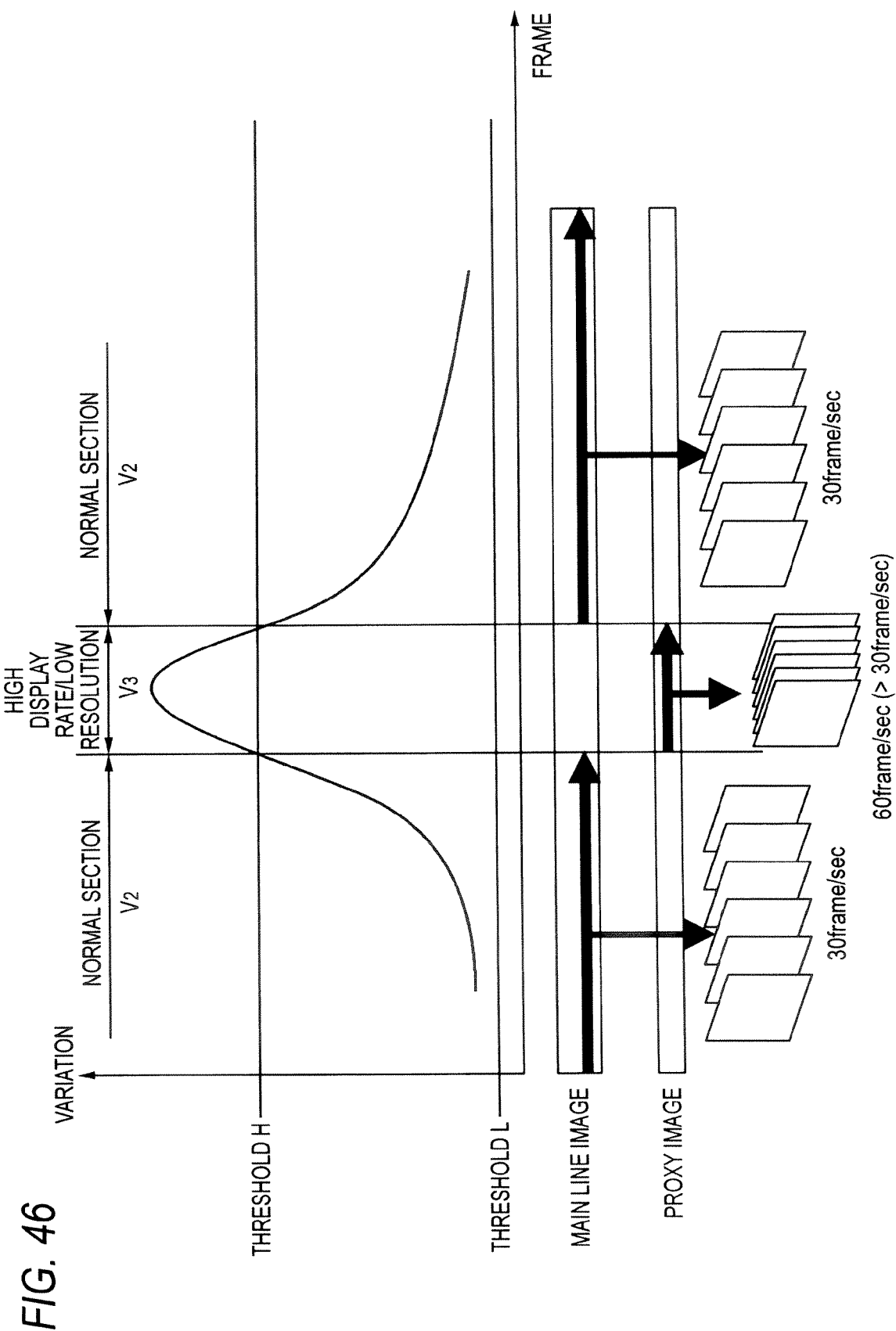
FIG. 46 is a diagram showing display methods in scrub of frames of a normal type V2 and a high display rate/low resolution type V3.

FIG. 46 is a diagram showing display methods in scrub of frames of the normal type V2 and the high display rate/low resolution type V3.

When a display type for a frame displayed on the display 41 immediately before the scrub dial 54 is moved is the still image type V1 or the normal type V2 having the display rate of 30 frames/second, the GUI control unit 211 detects a designated section in which the scrub dial 54 is located at an interval of 1/30 second. The GUI control unit 211 recognizes a frame allocated to the designated section as a frame of interest. Therefore, when the display type is the normal type V2, the frame (the designated frame) displayed on the display 41 is updated at the interval of 1/30 second, i.e., a display rate of 30 frames/second.

When a display type for a frame displayed on the display 41 immediately before the scrub dial 54 is moved is, for example, the high display rate/low resolution type V3 having the display rate of 60 frames/second, the GUI control unit 211 detects a designated section in which the scrub dial 54 is located at an interval of 1/60 second. The GUI control unit 211 recognizes a frame allocated to the designated section as a frame of interest. Therefore, when the display type is the high display rate/low resolution type V3, the frame (the frame of interest) displayed on the display 41 is updated at an interval of 1/60 second, i.e., a display rate of 60 frames/second.

Consequently, when the scrub dial 54 is moved, for example, at speed for moving from the left to the right by length of two designated sections in 1/30 second, for example, in a normal section in which frames, a display type for which is the normal type V2, continue, every other frames, i.e., an ith frame, an i+2th frame, an i+4th frame, and the like are set as a frame of interest at an interval of 1/30 second. As a result, an image is displayed in a missing frame state at double speed on the display 41.

For example, the scrub dial 54 is moved at the speed for moving from the left to the right by the length of two designated sections in 1/30 second as in the case described above, i.e., when the scrub dial 54 is moved at speed for moving from the left to the right by length of one designated section in 1/60 second. In this case, in a high display rate/low resolution section in which frames of the high display rate/low resolution type V3 continue, each of the frames, i.e., an ith frame, an i+1th frame, an i+2th frame, and the like are set as a frame of interest at an interval of 1/60 second. As a result, an image is displayed without missing frame at double speed on the display 41.

When the scrub dial 54 is moved at high moving speed for performing display (reproduction) at double speed, missing frame occurs in frames of some display types and does not occur in frames of other display types. Concerning frames of the high display rate/low resolution type V3 having a high display rate compared with the normal type V2, i.e., frames having large motions, missing frame occurs less easily even if the scrub dial 54 is moved fast. This makes it possible to prevent a temporal change in an image from being overlooked for the frames having large motion.

As described above, whereas the frame of interest is updated at an interval of 1/30 second in the normal section, the frame of interest is updated at an interval of 1/60 second, which is a half of that in the normal section, in the high display rate/low resolution section.

Therefore, the decoder 216 (FIG. 43) needs to decode frames in the high display rate/low resolution section (frames, a display type for which is the high display rate/low resolution type V3) at speed twice as high as that of frames in the normal section (frames, a display type for which is the normal type V2). Moreover, the frames in the high display rate/low resolution section are frames having large motion than that of the frames in the normal section. Thus, when a resolution is fixed, the frames in the high display rate/low resolution have a larger amount of data necessary for decoding by the decoder 216 than that of the frames in the normal section. Consequently, large loads are imposed on display of the frames in the high display rate/low resolution section compared with display of the frames in the normal section.

Thus, in the editing system in FIG. 43, when the frames in the normal section are displayed, image data serving as main data is decoded. When the frames in the high display rate/low resolution section are displayed, image data serving as proxy data having a smaller amount of data than the main data is decoded. In this way, the burdens imposed on display of the frames in the high display rate/low resolution section are reduced.

In the case described above, the scrub dial 54 is moved, for example, at the speed for moving from the left to the right by the length of two designated sections in 1/30 second. Besides, for example, when the scrub dial 54 is moved at speed for moving from the left to the right by length of one designated section in 1/30 second, in the normal section in which the frames, a display type for which is the normal type V2, continue, each of the frames is set as a frame of interest at an interval of 1/30 second. As a result, an image is displayed at single speed without missing frame on the display 41.

When the scrub dial 54 is moved at speed for moving from the left to the right by length of one designated section in 1/30 second, the scrub dial 54 is moved from the left to the right by 1/2 of the length of one designated section in 1/60 second. Thus, in the high display rate/low resolution section in which frames, a display type for which is the high display rate/low resolution type V3, continue, an identical frame is set as a frame of interest in 1/30 second. As a result, an image is also displayed at single speed without missing frame on the display 41.

Display of frames, a display type for which is the still image type V1, will be explained with reference to FIG. 47.

In the editing system in FIG. 43, concerning frames in the still image section in which frames, a display type for which is the still image type V1, continue, even if a frame of interest (a frame to be displayed) is changed among the frames in the still image section, an image of a frame displayed on the display 41 immediately before the frame of interest is changed.

Concerning the frames in the still image section, as long as a frame in the still image section is a frame of interest, an image of a frame set as a frame of interest first in the still image section continues to be displayed.

Figure 47:
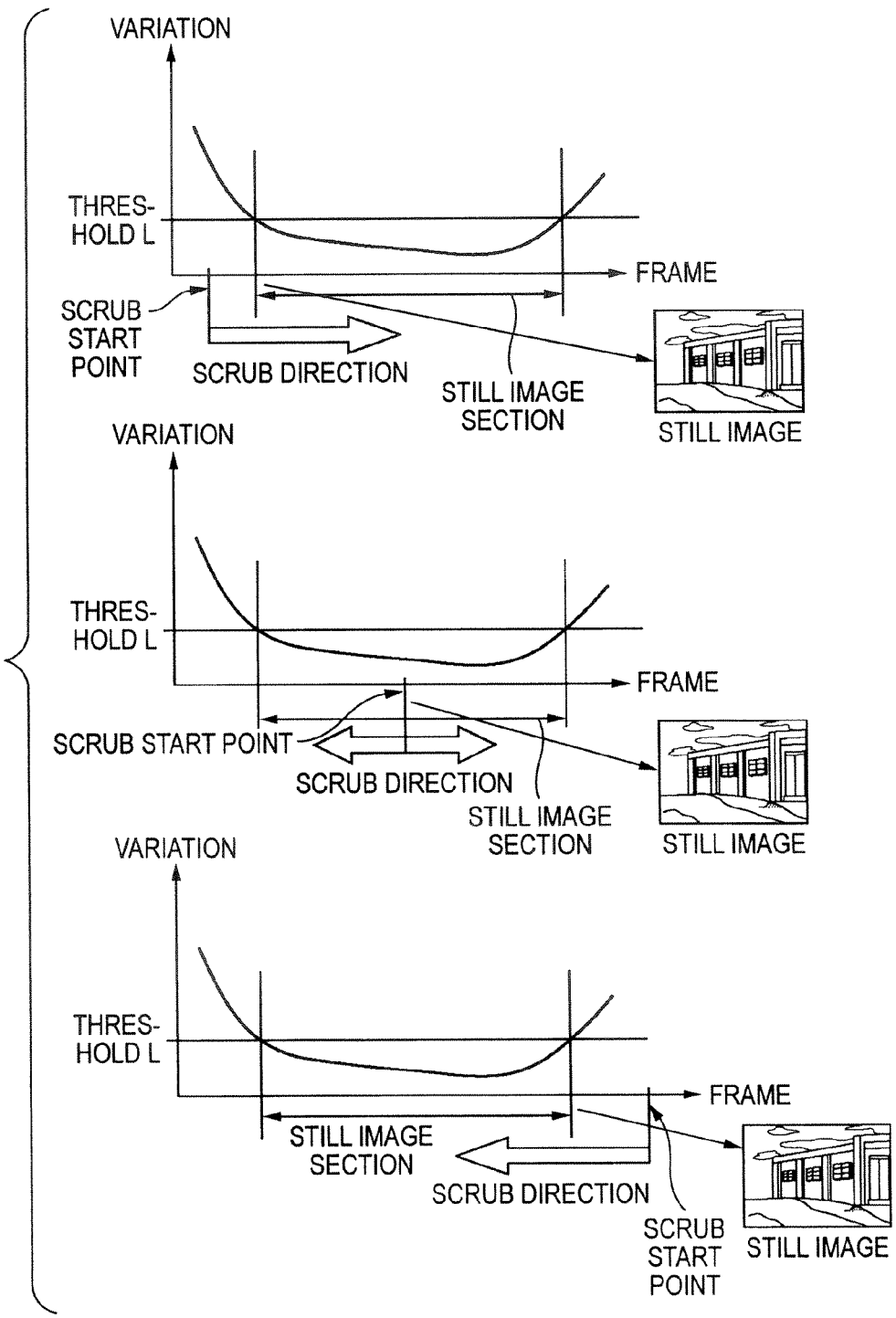
FIG. 47 is a diagram for explaining display of a frame, a display type for which is a still image type V1.

For example, as shown in the top part in FIG. 47, at the start of scrub, the scrub dial 54 designates a frame in a section other than the still image section (here, the normal section or the high display rate/low resolution section) as a frame of interest. In this case, when the user moves the scrub dial 54 from the left to the right, according to the movement, a frame located at the left end in the still image section among the frames in the still image section (a frame earliest in the still image section) is designated as a frame of interest first. Then, the decoder 216 (FIG. 43) decodes image data of the frame designated as the frame of interest first. An image corresponding to the image data is displayed on the display 41.

Thereafter, as long as a frame in the still image section is designated as a frame of interest, the image of the frame designated as the frame of interest first is displayed as an image of a present frame of interest. Therefore, as long as a frame in the still image section is designated as a frame of interest, the decoder 216 does not decode image data of the present frame of interest except the image data of the frame designated as the frame of interest first.

For example, as shown in the second diagram from the top of FIG. 47, at the start of scrub, the scrub dial 54 designates a frame in the still image section as a frame of interest. In this case, the decoder 216 (FIG. 43) decodes image data of the frame designated as the frame of interest at the start of scrub. An image corresponding to the image data is displayed on the display 41.

Thereafter, as long as a frame in the still image section is designated as a frame of interest, the image of the frame designated as the frame of interest at the start of scrub is displayed as an image of a present frame of interest. Therefore, as long as a frame in the still image section is designated as a frame of interest, the decoder 216 does not decode image data of the present frame of interest except the image data of the frame designated as the frame of interest at the start of scrub.

Moreover, for example, as shown in the third diagram from the top (the diagram at the bottom) in FIG. 47, at the start of scrub, the scrub dial 54 designates a frame in a section other than the still image section (here, the normal section or the high display rate/low resolution section) as a frame of interest. In this case, when the user moves the scrub dial 54 from the right to the left, according to the movement, a frame located at the right end in the still image section among the frames in the still image section (a frame latest in the still image section) is designated as a frame of interest first. Then, the decoder 216 (FIG. 43) decodes image data of the frame designated as the frame of interest first. An image corresponding to the image data is displayed on the display 41.

Thereafter, as long as a frame in the still image section is designated as a frame of interest, the image of the frame designated as the frame of interest first is displayed as an image of a present frame of interest. Therefore, as long as a frame in the still image section is designated as a frame of interest, the decoder 216 does not decode image data of the present frame of interest except the image data of the frame designated as the frame of interest first.

Processing of scrub performed in the editing system in FIG. 43 will be explained with reference to FIG. 48.

For example, the user inserts the optical disk 7 (FIG. 1) having recorded therein AV files and Fy files into the drive 5 and operates the keyboard 2 or the mouse 3 to start an editing program. Then, the CPU 22 (FIG. 2) executes the editing program. Consequently, the PC 1 functions as the editing system in FIG. 43.

Thereafter, when the user operates the keyboard 2 or the mouse 3 to designate an AV file to be subjected to scrub, an operation signal corresponding to the operation is supplied from the keyboard 2 or the mouse 3 to the GUI control unit 211.

In step S211, the GUI control unit 211 recognizes the AV file to be subjected to scrub according to the operation signal from the keyboard 2 or the mouse 3. The processing proceeds to step S212.

In step S212, the Fy-file managing unit 214 caches (temporarily stores) an Fy file corresponding to the AV file recognized as the object of scrub by the GUI control unit 211. The processing proceeds to step S213.

The GUI control unit 211 controls the data-supply control unit 213 via the stream-decoding-position detecting unit 212 to supply the Fy file corresponding to the AV file recognized to be subjected to scrub. The data-supply control unit 213 reads out the Fy file from the optical disk 7 in accordance with the control by the GUI control unit 211 and supplies the Fy file to the Fy-file managing unit 214. In step S212, the Fy-file managing unit 214 causes the file storing unit 231 (FIG. 44) to store the Fy file supplied from the data-supply control unit 213 as described above.

In step S213, the variation acquiring unit 232 (FIG. 44) of the Fy-file managing unit 214 judges whether a display type is present in the Fy file stored in the file storing unit 231 in the immediately preceding step S212.

When it is judged in step S213 that a display type is present in the Fy file stored in the file storing unit 231, step S214 described later is skipped. The processing proceeds to step S215.

When it is judged in step S213 that a display type is not present in the Fy file stored in the file storing unit 231, the variation acquiring unit 232 reads out a variation in a unit of frame from the Fy file stored in the file storing unit 231 and supplies the variation to the display-type determining unit 233 (FIG. 44). The processing proceeds to step S214.

At least motion information serving as a variation in a unit of frame is stored in the Fy file stored in the file storing unit 231.

In step S214, the display-type determining unit 233 determines a display type in a unit of frame on the basis of the variation in a unit of frame supplied from the variation acquiring unit 232 in the same manner as the display-type determining unit 93 in FIG. 22 and supplies the display type to the display-type writing unit 234 (FIG. 44). The display-type writing unit 234 writes the display type from the display-type determining unit 233 in the Fy file in the file storing unit 231. The processing proceeds from step S214 to step S215.

In determining a display type in step S214, the threshold processing unit 242 (FIG. 44) of the display-type determining unit 233 compares the variation and a threshold. As the threshold, a threshold identical with the threshold used by the threshold processing unit 162 of the display-type determining unit 93 in FIG. 22 is used.

When the processing proceeds from step S213 to step S215 or from step S214 to step S215 as described above, in the editing system in FIG. 43, GUI display processing for displaying a GUI such as the viewer 51 in FIG. 3 on the display 41 is started. Details of the GUI display processing are described later.

In step S215, the GUI control unit 211 judges whether the keyboard 2 or the mouse 3 is operated to finish the editing program.

When it is judged in step S215 that the keyboard 2 or the mouse 3 is not operated to finish the editing program, the processing proceeds to step S216. The GUI control unit 211 judges whether the scrub dial 54 provided in the scrub bar 53 of the viewer 51 (FIG. 3), which is displayed by the GUI display processing started when the processing proceeds from step S213 to S215 or from step S214 to step S215, is moved. In other words, the GUI control unit 211 judges whether the user has moved the scrub dial 54 by operating the keyboard 2 or the mouse 3.

When it is judged in step S216 that the scrub dial 54 is moved, this means that the user has operated the keyboard 2 or the mouse 3 to move the scrub dial 54 and an operation signal corresponding to the operation is supplied from the keyboard 2 or the mouse 3 to the GUI control unit 211. In this case, the GUI control unit 211 sets a frame allocated to a designated section (FIG. 45) in which the scrub dial 54 is located as a frame of interest. The GUI control unit 211 supplies information on the frame of interest to the display-type acquiring unit 215 via the stream-decoding-position detecting unit 212 and the data-supply control unit 213. The processing proceeds to step S217.

In step S217, the display-type acquiring unit 215 acquires a display type for the frame of interest by reading out the display type from the file storing unit 231 (FIG. 44) of the Fy-file managing unit 214 on the basis of the information on the frame of interest supplied from the GUI control unit 211 via the stream-decoding-position detecting unit 212 and the data-supply control unit 213. The display-type acquiring unit 215 supplies the display type to the GUI control unit 211, the decoder 216, and the display control unit 218. Moreover, in step S217, the decoder 216 and the display control unit 218 judge the display type for the frame of interest from the display-type acquiring unit 215. The decoder 216 and the display control unit 218 perform display control processing for displaying an image of the frame of interest (steps S218 to S223 described later). The processing returns to step S215.

When it is judged in step S217 that the display type for the frame of interest is the still image type V1, the processing proceeds to step S218. The display control unit 218 judges, with reference to the Fy file stored in the file storing unit 231 of the Fy-file managing unit 214, whether a display type for a frame set as a frame of interest immediately before the frame of interest (hereinafter referred to as previous frame as appropriate) is the still image type V1 and the previous frame and the frame of interest are frames in an identical still image section.

When it is judged in step S218 that the previous frame and the frame of interest are not frames in an identical still image section, the processing proceeds to step S219. When the data-supply control unit 213 reads out main data of the frame of interest (and data necessary for decoding of the frame of interest) from the optical disk 7 and supplies the main data to the decoder 216, the decoder 216 acquires (receives) the main data of the frame of interest. The processing proceeds to step S220.

In step S220, the decoder 216 decodes the main data of the frame of interest acquired from the data-supply control unit 213. The decoder 216 supplies image data obtained as a result of the decoding to the display control unit 218. The processing proceeds to step S221. In step S221, the display control unit 218 causes the frame buffer 218A to store the image data of the frame of interest from the decoder 216. The processing proceeds to step S222. The display control unit 218 causes the display 41 to display an image corresponding to the image data stored in the frame buffer 218A.

Therefore, as an image of the frame, a display type for which is the still image type V1, the image corresponding to the image data serving as the main data, i.e., an image having a higher resolution (than an image corresponding to the image data serving as the proxy data) is displayed.

On the other hand, when it is judged in step S218 that the previous frame and the frame of interest are frames in an identical still image section, the processing proceeds to step S222. The display control unit 218 causes the display 41 to display the image corresponding to the image data, which is stored in the frame buffer 218A in step S221, as an image of the frame of interest.

When the previous frame and the frame of interest are frames in an identical still image section, as an image of a frame in the still image section, an image of a frame set as a frame of interest first among frames in the still image section is displayed. Therefore, in this case, since decoder 216 does not have to perform decoding, it is possible to reduce burdens imposed on the PC 1.

On the other hand, when it is judged in step S217 that a display type for the frame of interest is the normal type V2, the processing sequentially proceeds to steps S219 to S222. As described above, an image of the frame of interest is displayed.

In step S219, when the data-supply control unit 213 reads out main data of the frame of interest from the optical disk 7 and supplies the main data to the decoder 216, the decoder 216 acquires the main data of the frame of interest. The processing proceeds to step S220.

In step S220, the decoder 216 decodes the main data of the frame of interest acquired from the data-supply control unit 213. The decoder 216 supplies image data obtained as a result of the decoding to the display control unit 218. The processing proceeds to step S221. In step S221, the display control unit 218 causes the frame buffer 218A to store the image data of the frame of interest from the decoder 216. The processing proceeds to step S222. The display control unit 218 causes the display 41 to display an image corresponding to the image data stored in the frame buffer 218A.

Therefore, as an image of a frame, a display type for which is the normal type V2, the image corresponding to the image data serving as the main data, i.e., an image having a higher resolution (than an image corresponding to the image data serving as the proxy data) is displayed.

On the other hand, when it is judged in step S217 that a display type for the frame of interest is the high display rate/low resolution type V3, the processing proceeds to step S233. When the data-supply control unit 213 reads out proxy data of the frame of interest (and data necessary for decoding of the frame of interest) from the optical disk 7 and supplies the proxy data to the decoder 216, the decoder 216 acquires the proxy data of the frame of interest. The processing proceeds to step S220.

In step S220, the decoder 216 decodes the proxy data of the frame of interest acquired from the data-supply control unit 213. The decoder 216 supplies image data obtained from a result of the decoding to the display control unit 218. The processing proceeds to step S221. In step S221, the display control unit 218 causes the frame buffer 218A to store the image data of the frame of interest from the decoder 216. The processing proceeds to step S222. The display control unit 218 causes the display 41 to display an image corresponding to the image data stored in the frame buffer 218A.

Therefore, as an image of a frame, a display type for which is the high display rate/low resolution type V3, an image corresponding to the image data serving as the proxy data, i.e., an image having a lower resolution (than an image corresponding to the image data serving as the main data) is displayed.

On the other hand, when it is judged in step S216 that the scrub dial 54 is not moved, the processing proceeds to step S222. The display control unit 218 causes the display 41 to display the image corresponding to the image data, which is stored in the frame buffer 218A in step S221, as an image of the frame of interest.

When the scrub dial 54 is not moved from the time when the judgment in step S216 was performed, the display control unit 218 causes the display 41 to display the image corresponding to the image data stored in the frame buffer 218A, i.e., the image displayed immediately before the judgment (the image displayed in the last step S222) again.

After the image of the frame of interest is displayed in step S222 as described above, the processing proceeds to step S224. The GUI control unit 211 judges the display type for the frame of interest supplied from the display-type acquiring unit 215 in step S217.

When it is judged in step S224 that the display type for the frame of interest is the high display rate/low resolution type V3, the processing proceeds to step S225. The GUI control unit 211 judges whether time corresponding to the display rate of the high display rate/low resolution type V3, for example, 1/60 second has elapsed after it is judged in the last step S216 whether the scrub dial 54 is moved.

When it is judged in step S225 that 1/60 second has not elapsed, the processing returns to step S225.

When it is judged in step S225 that 1/60 second has elapsed, the processing returns to step S215. Thereafter, the processing described above is repeated.

Therefore, when a frame, a display type for which is the high display rate/low resolution type V3, is a frame of interest, in step S216, the GUI control unit 211 judges whether the scrub dial 54 is moved at a period of 1/60 second corresponding to the high display rate/low resolution type V3.

When it is judged that the scrub dial 54 is moved, the display control unit 218 causes the display 41 to display an image corresponding to image data obtained by decoding proxy data of a frame allocated to a designated section (FIG. 45) in which the scrub dial 54 is located after the movement.

When it is judged that the scrub dial 54 is not moved, the display control unit 218 causes the display 41 to display the image displayed on the display 41 immediately before the judgment.

As described above, concerning the frame, a display type for which is the high display rate/low resolution type V3, an image is displayed on the display 41 at 60 frames/second, which is a display rate of the display type.

On the other hand, when it is judged in step S224 that the display type for the frame of interest is the still image type V1 or the normal type V2, the processing proceeds to step S226. The GUI control unit 211 judges whether time corresponding to the display rate of the still image type V1 and the normal type V2, for example, 1/30 second has elapsed after it is judged in the last step S216 whether the scrub dial 54 is moved.

When it is judged in step S226 that 1/30 second has not elapsed, the processing returns to step S226.

When it is judged in step S226 that 1/30 second has elapsed, the processing returns to step S215. Thereafter, the processing described above is repeated.

Therefore, when a frame, a display type for which is the still image type V1 or the normal type V2, is a frame of interest, the GUI control unit 211 judges in step S216 whether the scrub dial 54 is moved at a period of 1/30 second corresponding to the still image type V1 and the normal type V2.

When it is judged that the scrub dial 54 is moved, the display control unit 218 causes the display 41 to display an image corresponding to image data obtained by decoding main data of a frame allocated to a designated section (FIG. 45) in which the scrub dial 54 after the movement is located (an image having a high resolution).

When it is judged that the scrub dial 54 is not moved, the display control unit 218 causes the display 41 to display the image displayed on the display 41 immediately before the judgment again.

As described above, concerning the frames, display types of which are the still image type V1 and the normal type V2, an image is displayed on the display 41 at 30 frames/second, which is a display rate of the display types.

On the other hand, when the keyboard 2 or the mouse 3 is operated to finish the editing program in step S215, i.e., for example, when the user has operated the keyboard 2 or the mouse 3 to finish the editing program and an operation signal corresponding to the operation is supplied from the keyboard 2 or the mouse 3 to the GUI control unit 211, the processing of scrub (the execution of the editing program) ends.

As described above, a display type for a frame of interest, which is a frame designated by the scrub dial 54, is acquired and an image of the frame of interest is displayed with a display method represented by the display type for the frame of interest. Thus, it is possible to appropriately perform scrub.

When the frame, a display type for which is the still image type V1, i.e., a frame having no motion is a frame of interest, image data of a frame set as a frame of interest first in a still image section in which frames of the still image type V1 including the frame of interest continue is obtained by decoding the main data and an image corresponding to the image data is displayed. Thus, high-quality images of an identical frame are displayed. As a result, the user can easily check contents of the image. Moreover, as long as frames in an identical still image section are continuously set as a frame of interest, it is unnecessary to decode the main data. Thus, it is possible to reduce burdens imposed on the PC 1 serving as the editing system.

When the frame, a display type for which is the high display rate/low resolution type V3, i.e., a frame having large (intense) motion is a frame of interest, an image is displayed at a high display rate. Thus, the user can accurately check contents of an image having intense motion.

Moreover, when the frame, a display type for which is the high display rate/low resolution type V3, is a frame of interest, the proxy data having a smaller amount of data than the main data is decoded and an image corresponding to image data as a result of the decoding is displayed. Thus, it is possible to reduce burdens imposed on the PC 1 serving as the editing system and prevent the editing program from failing to respond (the PC1 from hanging up) because of large loads imposed on the PC 1.

When the frame, a display type for which is the normal type V2, i.e., a frame having a certain degree of motion, although not intense, is a frame of interest, an image having a display rate lower than that of the frame, a display type for which is the high display rate/low resolution type V3, but having a resolution higher than that of the frame, a display type for which is the high display rate/low resolution type V3, is displayed. The frame, a display type for which is the normal type V2, has smaller motion of an image (a change in a pixel value among frames) is smaller than that of the frame, a display type for which is the high display rate/low resolution type V3. Thus, even if the frame, a display type for which is the normal type V2, is displayed at a display rate lower than that of the frame, a display type for which is the high display rate/low resolution type V3, the user can accurately check contents of the image.

Moreover, the frame, a display type for which is the normal type V2, has smaller motion of an image than that of the frame, a display type for which is the high display rate/low resolution type V3. An amount of data of the main data of the frame, a display type for which is the normal type V2, is smaller than an amount of data of the main data of the frame, a display type for which is the high display rate/low resolution type V3. Therefore, when the frame, a display type for which is the normal type V2, is a frame of interest, even if the main data is decoded and an image having a high resolution corresponding to image data obtained as a result of the decoding is displayed, loads imposed on the PC 1 serving as the editing system are smaller than loads imposed when the main data of the frame, a display type for which is the high display rate/low resolution type V3, is decoded.

As described above, in the editing system in FIG. 43, in scrub, a resolution and a display rate of an image are changed according to a display type rather than displaying all frames with an identical display method. Moreover, only a necessary frame is decoded according to a display type rather than decoding all frames set as a frame of interest. This makes it possible to perform appropriate scrub.

Figure 48:
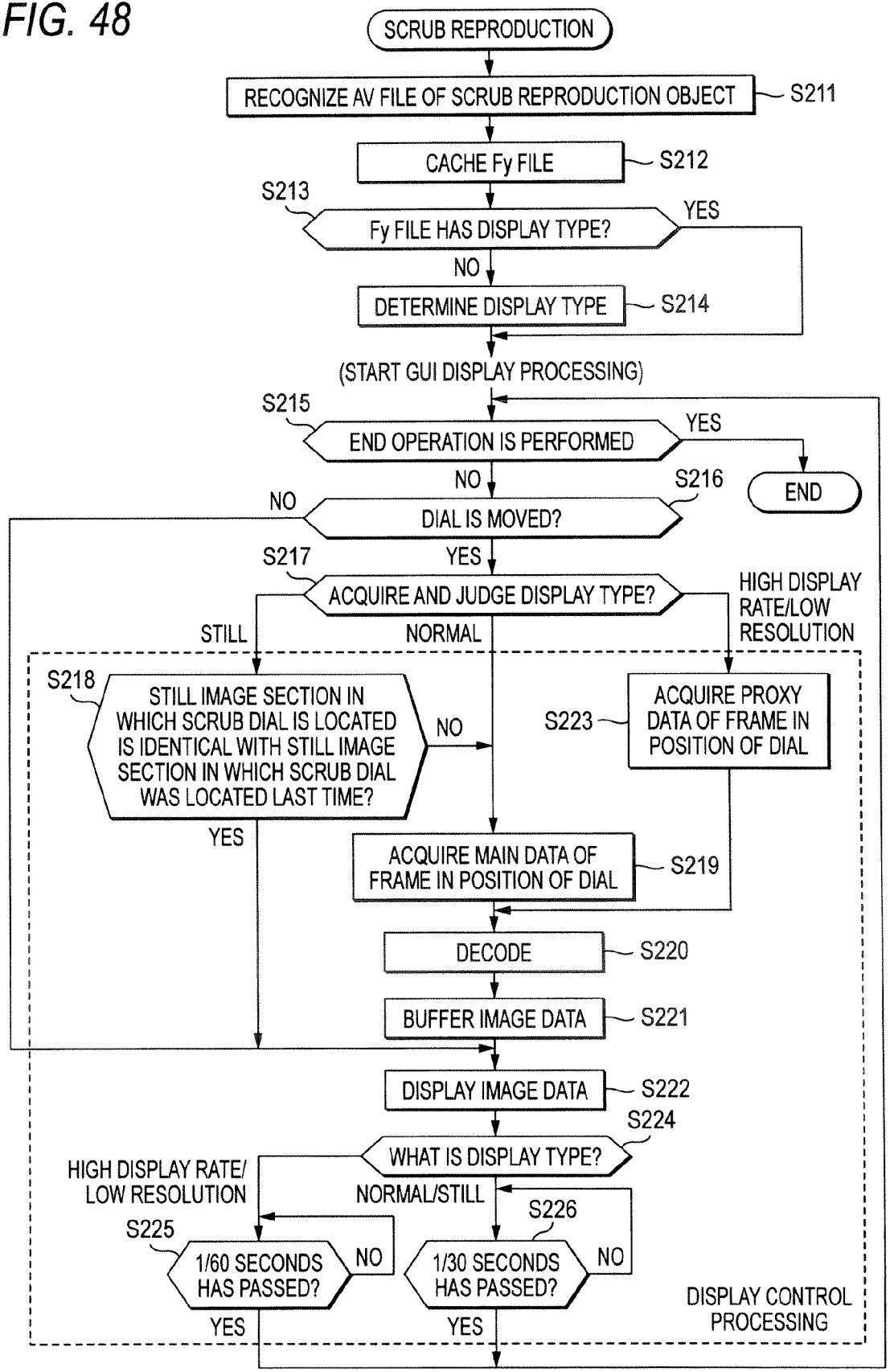
FIG. 48 is a flowchart for explaining processing of scrub.

In the processing of scrub in FIG. 48, the display types are the three types, namely, the still image type V1, the normal type V2, and the high display rate/low resolution type V3 shown in FIG. 20 determined on the basis of motion information. However, it is also possible to perform the processing of scrub even if the display types are, for example, the five types, namely, the still image type V11, the normal type V12, the high display rate/normal resolution type V13, the ultra-high display rate/low resolution type V14, and ultra-ultrahigh display rate/low resolution type V15 shown in FIG. 27. It is also possible to perform the processing of scrub even if the display types are, for example, the three types, namely, the low resolution/normal display rate type C1, the normal type C2, and the normal resolution/low display rate type C3 shown in FIG. 31 determined on the basis of fineness information.

In the case described above, the main data of the image having a high resolution and the proxy data of the image having a low resolution are recorded in the optical disk 7, i.e., the images having two kinds of resolutions including identical contents are recorded in the optical disk 7, and the image having a high resolution and the image having a low resolution are displayed according to a display type for a frame. Besides, for example, it is possible to record images of three kinds of resolutions, i.e., high, medium, and low resolutions in the optical disk 7 and display the image having a high resolution, the image having a medium resolution, and an image having a low resolution according to a display type for a frame.

As described above, in the editing system in FIG. 43, when the processing of scrub in FIG. 48 proceeds from step S213 to step S215 or proceeds from step S214 to S215, the GUI display processing for displaying a GUI such as the viewer 51 in FIG. 3 on the display 41 is started.

As described above, one or both of a variation and a display type in a unit of frame are selected and stored in an Fy file. In the following explanation, at least a variation of a variation and a display type is stored in a Fy file.

When a variation is stored but a display type is not stored in a Fy file, it is possible to determine a display type in the Fy managing unit 214 (FIG. 43) on the basis of the variation. Thus, for the editing system in FIG. 43 including the Fy managing unit 214, the Fy file in which a display type is not stored but a variation is stored is substantially equivalent to an Fy file in which both a display type and a variation are stored.

On the other hand, when a display type is stored but a variation is not stored in an Fy file, since it is difficult to calculate a variation from the display type, concerning the Fy file in which a display type is stored but a variation is not stored, processing for calculating a variation in processing explained below is not performed. However, even in the file in which a variation is not stored, if the Fy-file creating unit 217 re-creates an Fy file in which a variation is stored from data stored in an AV file corresponding to the Fy file, it is possible to perform the processing for calculating a variation in the processing explained below using the Fy file re-created.

Figure 49:
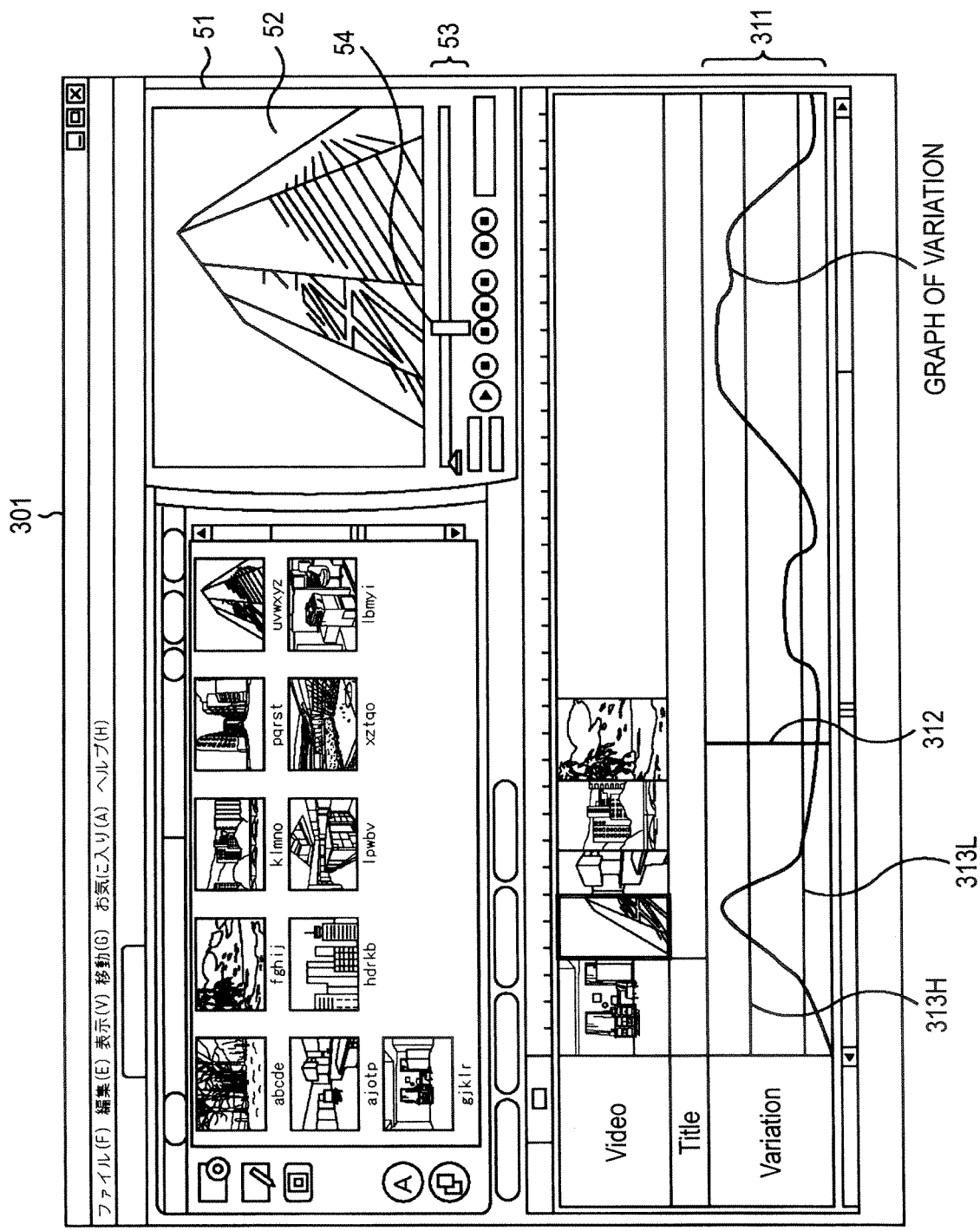
FIG. 49 is a diagram showing an example of display of an edition window 301.

FIG. 49 is a diagram showing an example of an edition window 301 serving as a GUI displayed on the display 41 by the GUI display processing.

In the edition window 301 in FIG. 49, the viewer 51 explained with reference to FIG. 3 is arranged on the upper right thereof. An Fy-file display section 311, which is an area of a horizontally rectangular shape, is provided in a lower part of the edition window 301.

A GUI representing information and the like stored in an Fy file corresponding to an AV file to be subjected to scrub is displayed in the Fy-file display section 311.

Motion information is stored as a variation in the Fy file corresponding to the AV file to be subjected to scrub. The motion information is compared with the threshold L or the threshold H, for example, as explained with reference to FIGS. 20 and 21. Consequently, the still image type V1, the normal type V2, or the high display rate/low resolution type V3 is determined as a display type.

In the Fy-file display section 311 in FIG. 49, a graph quantitatively representing a variation stored in the AV file to be subjected to scrub, i.e., the Fy file managed by the Fy-file managing unit 214 (hereinafter referred to as variation graph as appropriate) is displayed. In FIG. 49 (in figures described later as well), the horizontal direction (left to right direction) of the Fy-file display section 311 indicates elapse of time, i.e., a frame (a place of a frame from the top) and the vertical direction thereof indicates a variation.

Moreover, in the Fy-file display section 311, a position indicator 312 serving as position information representing a position of a frame allocated to a designated section, in which the scrub dial 54 of the viewer 51 is located, is displayed.

In scrub, a frame allocated to the designated section, in which the scrub dial 54 of the scrub bar 53 is located, is set as a frame of interest displayed on the display section 52 of the viewer 51. The position indicator 312 is a GUI of a segment extending in the vertical direction that is displayed in a position corresponding to the frame of interest among frames in time series forming a moving image corresponding to the AV file to be subjected to scrub (a moving image to be subjected to scrub). When the scrub dial 54 is moved in the horizontal direction and a frame of interest is changed from the frame that is a frame of interest before the movement to another frame, the position indicator 312 is also moved in the horizontal direction to indicate a position corresponding to the another frame.

A scale in the horizontal direction of an area of the Fy-file display section 311 in which the variation graph is displayed and a scale of the movable range of the scrub bar 53 correspond to each other.

If length in the horizontal direction of the area in which the variation graph of the Fy-file display section 311 and length of the movable range of the scrub bar 53 are set to the same length by multiplying the length of the horizontal direction of the area of the Fy-file display section 311, in which the variation graph is displayed, by a predetermined number, a position of the position indicator 312 displayed in the Fy-file display section 311 and a position of the scrub dial 54 coincide with each other.

When the length in the horizontal direction of the area of the Fy-file display section 311 in which the variation graph is displayed and the length of the movable range of the scrub bar 53 are set to the same length as described above, a value of the variation graph in the position of the scrub dial 54 is a variation in a frame allocated to a designated section in which the scrub dial 54 is located.

In FIG. 49, in the Fy-file display section 311, threshold indicators 313H and 313L serving as threshold information representing thresholds used in determining a display type are also displayed on the basis of the variation stored in the Fy file managed by the Fy-file managing unit 214.

The threshold indicators 313H and 313L are GUIs of segments extending in the horizontal direction that are displayed in positions in the vertical direction corresponding to thresholds used in determining a display type. Therefore, when the variation stored in the Fy file managed by the Fy-file managing unit 214 is, for example, motion information as described above and the motion information is compared with the threshold L or the threshold H to determine the still image type V1, the normal type V2, or the high display rate/low resolution type V3 as a display type, the threshold indicator 313H is displayed in, for example, a position (in the vertical direction) corresponding to the threshold H and the threshold indicator 313L is displayed in a position corresponding to the threshold L.

The user can move the threshold indicators 313H and 313L serving as threshold information in the vertical direction by operating the keyboard 2 or the mouse 3 of the editing system (FIG. 43) (e.g., by dragging a cursor). This makes it possible to change a threshold used for determining a display type to a threshold represented by the threshold information after the movement. When the threshold used for determining a display type is changed, the display-type determining unit 233 of the file managing unit 214 (FIG. 44) compares the variation stored in the Fy file and the threshold after change and determines a display type again on the basis of a result of the comparison. Processing for determining a display type again using the threshold after change in this way is performed in GUI display processing described later.

According to the Fy-file display section 311 described above, the user can visually grasp the transition of the variation over the entire moving image to be subjected to scrub according to the variation graph. When the variation is, for example, motion information, the user can grasp the transition of a degree of motion over the entire moving image to be subjected to scrub according to the variation graph. As a result, the user can grasp in advance, for example, that the moving image to be subjected to scrub is a moving image having motion as a whole or having little motion or a moving image having intense motion in a part of frames.

The user can grasp a degree of motion of a frame of interest displayed in (the display section 52 of) the viewer 51 and frames near the frame of interest according to the variation graph and the position indicator 312 indicating a position of the frame of interest.

The user can grasp with what kind of display type (display method) an image is displayed in the viewer 51 according to the variation graph, the position indicator 312 indicating a position of the frame of interest, and the threshold indicators 313H and 313L. Moreover, the user can recognize how the Fy file is used (e.g., used for displaying an image in scrub) in the editing system (FIG. 43).

The GUI display processing will be explained with reference to a flowchart in FIG. 50.

In the GUI display processing, the GUI control unit 211 controls the display control unit 218 to display the edition window 301 (FIG. 49). The display control unit 218 causes the display 41 to display the edition window 301. In step S251, the display control unit 218 reads out the Fy file managed by the Fy-file managing unit 214 (FIG. 43), i.e., the Fy file stored in the file storing unit 231 (FIG. 44) of the Fy-file managing unit 214 and causes the Fy-file display section 311 of the edition window 301 to display a variation graph on the basis of a variation stored in the Fy file. The processing proceeds to step S252.

In step S252, the display control unit 218 causes the Fy-file display section 311 of the edition window 301 to display, for example, the threshold indicators 313H and 313L (FIG. 49) according to thresholds used for determining the display type stored in the Fy file stored in the file storing unit 231 (FIG. 44) of the Fy-file managing unit 214.

The thresholds used for determining the display type stored in the Fy file stored in the file storing unit 231 (FIG. 44) of the Fy-file managing unit 214 immediately after the GUI processing is started are referred to as default thresholds.

Assuming that there are the two thresholds H and L as the default thresholds, the threshold indicators 313H and 313L corresponding to the two thresholds H and L, respectively, are displayed.

When there is only one threshold as the default threshold, a threshold indicator serving as one piece of threshold information corresponding to the one threshold is displayed. When there are three or more thresholds as the default thresholds, threshold indicators serving as pieces of threshold information in a number identical with the number of the default thresholds are displayed.

Thereafter, the processing proceeds from step S252 to step S253. The display control unit 218 acquires information on a position of the scrub dial 54 in the edition window 301 (FIG. 49) displayed on the display 41 and a frame allocated to a designated section in which the scrub dial 54 is located, i.e., a frame of interest as well from the GUI control unit 211 (receives the information on the frame of interest supplied from the GUI control unit 211). The processing proceeds to step S254.

In step S254, the display control unit 218 causes the Fy-file display section 311 of the edition window 301 to display the position indicator 312 (FIG. 49) according to the information on the frame of interest acquired from the GUI control unit 211 in the immediately preceding step S253. The display control unit 218 causes the Fy-file display section 311 to display the position indicator 312 (FIG. 49) of a segment shape extending in the vertical direction in a position in the horizontal direction of the Fy-file display section 311 corresponding to the frame (the frame of interest) allocated to the designated section in which the scrub dial 54 is located.

The processing proceeds from step S254 to step S255. The GUI control unit 211 judges whether the keyboard 2 or the mouse 3 is operated to finish the editing program.

When it is judged in step S255 that the keyboard 2 or the mouse 3 is not operated to finish the editing program, the processing proceeds to step S256. The GUI control unit 211 judges whether the scrub dial 54 is moved, i.e., the user has moved the scrub dial 54 by operating the keyboard 2 or the mouse 3.

When it is judged in step S256 that the scrub dial 54 is moved, this means that the user has operated the keyboard 2 or the mouse 3 to move the scrub dial 54 and an operation signal corresponding to the operation is supplied from the keyboard 2 or the mouse 3 to the GUI control unit 211. In this case, the GUI control unit 211 sets a frame allocated to a designated position (FIG. 45) in which the scrub dial 54 is located as a frame of interest and supplies information on the frame of interest to the display control unit 218. The processing returns to step S253. Thereafter, the same processing is repeated.

When the scrub dial 54 is moved in the horizontal direction and the frame of interest is changed from the frame set as the frame of interest immediately before the movement to another frame according to the processing in steps S253 to S256, the position indicator 312 is also moved in the horizontal direction to indicate a position corresponding to the another frame.

Steps S255 and S256 are identical with steps S215 and S216 in FIG. 48, respectively. Therefore, it is possible to perform the processing in step S215 and the processing in S216 in FIG. 48 as the processing in step S255 and the processing in S256, respectively. In this case, as explained with reference to FIG. 48, when a display type for the frame of interest is the still image type V1 or the normal type V2, steps S255 and S256 are performed at a period of $\frac{1}{30}$ second. When a display type for the frame of interest is the high display rate/low resolution type V3, steps S255 and S256 are performed at a period of $\frac{1}{60}$ second.

On the other hand, when it is judged in step S256 that the scrub dial 54 is not moved, the processing proceeds to step S257. The GUI control unit 211 judges whether movement of the threshold indicator 313H or 313L (FIG. 49) is started, i.e., the user has operated the keyboard 2 or the mouse 3 to move the threshold indicator 313H or 313L.

When it is judged in step S257 that the movement of the threshold indicator 313H or 313L is not started, the processing returns to step S255. Thereafter, the same processing is repeated.

When it is judged in step S257 that the movement of the threshold indicator 313H or 313L is started, this means that the user has operated the keyboard 2 or the mouse 3 to move the threshold indicator 313H or 313L and an operation signal corresponding to the operation is supplied from the keyboard 2 or the mouse 3 to the GUI control unit 211. In this case, the GUI control unit 211 calculates, according to the operation signal from the keyboard 2 or the mouse 3, a position to which the threshold indicator 313H or 313L is moved. The GUI control unit 211 supplies information indicating the position to the display control unit 218. The processing proceeds to step S258.

In step S258, the display control unit 218 causes the Fy-file display section 311 to display the threshold indicator 313H or 313L in a position corresponding to the information from the GUI control unit 211 instead of the position displayed immediately before the threshold indicator 313H or 313L is moved. The processing proceeds to step S259.

In step S259, the GUI control unit 211 judges whether the movement of the threshold indicator 313H or 313L is finished, i.e., the user has finished the operation of the keyboard 2 or the mouse 3 for moving the threshold indicator 313H or 313L.

When it is judged in step S259 that the operation for moving the threshold indicator 313H or 313L is finished, this means that the user continues to operate the keyboard 2 or the mouse 3 to move the threshold indicator 313H or 313L and an operation signal corresponding to the operation is supplied from the keyboard 2 or the mouse 3 to the GUI control unit 211. In this case, the GUI control unit 211 calculates, according to the operation signal from the keyboard 2 or the mouse 3, a position to which the threshold indicator 313H or 313L is moved. The GUI control unit 211 supplies information indicating the position to the display control unit 218. The processing returns to step S258. Thereafter, the same processing is repeated.

According to the processing in steps S257 to S259, the threshold indicator 313H or 313L is moved in the vertical direction in accordance with operation by the user for moving the threshold indicator 313H or 313L.

On the other hand, when it is judged in step S259 that the operation for moving the threshold indicator 313H or 313L is finished, this means that the user has finished the operation of the keyboard 2 or the mouse 3 for moving the threshold indicator 313H or 313L and an operation signal corresponding to the operation for moving the threshold indicator 313H or 313L is not supplied from the keyboard 2 or the mouse 3 to the GUI control unit 211. In this case, the GUI control unit 211 supplies a threshold corresponding to a position (in the vertical direction) of the threshold indicator 313H or 313L where the movement is finished to the Fy-file managing unit 214 via the data-supply control unit 213 (FIG. 43). The processing proceeds to step S260.

The threshold supplied to the Fy-file managing unit 214 via the data-supply control unit 213 by the GUI control unit 211 is supplied to the threshold processing unit 242 constituting the display-type determining unit 233 of the Fy-file managing unit 214 (FIG. 44). Thereafter, the threshold processing unit 242 performs processing using the threshold supplied from the GUI control unit 211 via the data-supply control unit 213 until a new threshold is supplied to the threshold processing unit 242 or a new Fy file is stored in the file storing unit 231.

In step S260, the display-type determining unit 233 of the Fy-file managing unit 214 (FIG. 44) determines a display type anew (again) using the threshold supplied from the GUI control unit 211 to the threshold processing unit 242 via the data-supply control unit 213 immediately before the determination, i.e., the threshold indicated by the threshold indicator 313H or 313L serving as the threshold information after the movement, and the variation stored in the Fy file stored in the Fy-file storing unit 231.

The display-type determining unit 233 compares the variation stored in the Fy file stored in the Fy-file storing unit 231 and the threshold H or L indicated by the threshold indicator 313H or 313L serving as the threshold information after the movement. The display-type determining unit 233 determines a display type again on the basis of a result of the comparison. The display type determined by the display-type determining unit 233 again is written in the file storing unit 231 by the display-type writing unit 234 to overwrite the display type in the Fy file stored in the file storing unit 231.

Therefore, thereafter, in steps S217 and S224 in FIG. 48 described above, a display type for the frame of interest is judged with reference to the display type determined by the display-type determining unit 233 again. The frame of interest is displayed according to the display type.

As described above, the user changes the threshold H or L in determining a display type by operating the threshold indicator 313H or 313L serving as the GUI. A display type is determined again, so to speak, on a real time basis using the threshold H or L after the change. Thus, the user can change the threshold H or L taking into account performance and the like of the PC 1 and easily adjust a display type (a display method) in displaying a frame (an image) in scrub to make it possible to perform smooth (optimum) scrub.

After the processing in step S260, the processing returns to step S255. Thereafter, the same processing is repeated.

When it is judged in step S255 that the keyboard 2 or the mouse 3 is operated to finish the editing program, this means that the user has operated the keyboard 2 or the mouse 3 to finish the editing program and an operation signal corresponding to the operation is supplied from the keyboard 2 or the mouse 3 to the GUI control unit 211. In this case, the GUI display processing ends.

In FIG. 49, the variation graph, the position indicator 312, and the threshold indicators 313H and 313L are displayed in the Fy-file display section 311. However, it is possible to display type information, which is a GUI of belt-like areas representing, in time series, a display type in the Fy file managed by the Fy-file managing unit 214 (FIG. 43), in the Fy-file display section 311 instead of or together with the variation graph, the position indicator 312, and the threshold indicators 313H and 313L.

Figure 51:
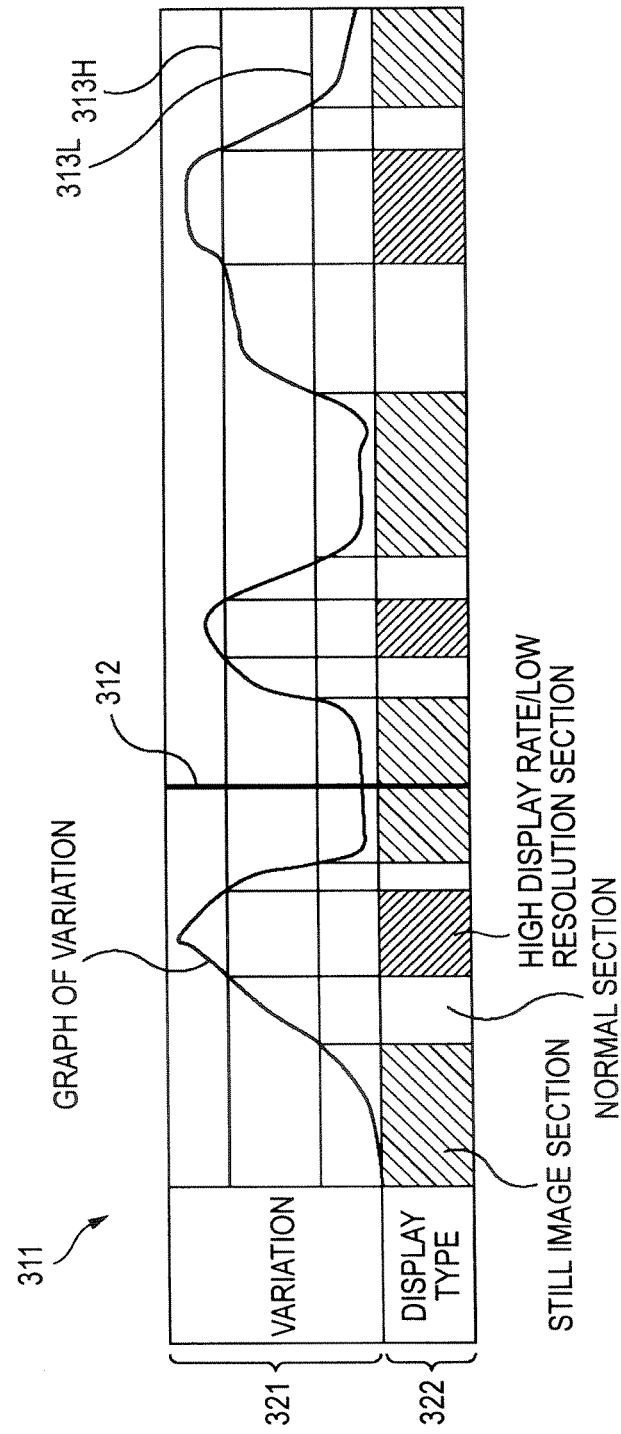
FIG. 51 is a diagram showing an example of display in an Fy-file display section 311.

FIG. 51 is a diagram showing an example of display of the Fy-file display section 311 in which the type information is displayed together with the variation graph, the position indicator 312, and the threshold indicators 313H and 313L.

In FIG. 51, the Fy-file display section 311 includes a graph display section 321 and a type-information display section 322.

The graph display section 321 is a rectangular area on the upper side of the Fy-file display section 311. In the graph display section 321, the variation graph, the position indicator 312, and the threshold indicators 313H and 313L explained in FIG. 49 are displayed.

The type-information display section 322 is a rectangular area on the lower side of the Fy-file display section 311. The type information is displayed in the type-information display section 322.

The type information is a GUI having a horizontally rectangular area. The horizontal direction (the left to right direction) thereof indicates elapse of time, i.e., a frame (a place of a frame from the top) as explained about the Fy-file display section 311 in FIG. 49.

The type information represents display types of frames corresponding to respective positions in the horizontal direction. In FIG. 51, assuming that there are the three types, namely, the still image type V1, the normal type V2, and the high display rate/low resolution type V3 explained in FIG. 20, a still image section in which frames of the still image type V1 continue is shown with slanted lines down to the left (up to the right), a normal section in which frames of the normal type V2 continue is shown without a pattern, and a high display rate/low resolution section in which frames of the high display rate/low resolution type V3 continue is shown with lines in the horizontal direction (horizontal lines).

Therefore, the user can grasp a display type for a frame of a moving image to be subjected to scrub according to the type information.

Scales in the horizontal direction of the variation graph displayed in the graph display section 321 and the type information displayed in the type-information display section 322 are identical. Therefore, when attention is paid to a position in the horizontal direction of the Fy-file display section 311 as a position of interest, a value of a variation graph in the position of interest represents a variation (motion information) of a frame corresponding to the position of interest. A pattern put on the type information in the position of interest represents a display type for the frame corresponding to the position of interest.

It is assumed that, in the moving image to be subjected to scrub, all of a minimum value of the number of continuing frames having a variation smaller than the threshold L indicated by the threshold indicator 313L, a minimum value of the number of continuing frames having a variation equal to or larger than the threshold H indicated by the threshold indicator 313H, and a minimum value of the number of continuing frames having a variation equal to or larger than the threshold L and smaller than the threshold H are equal to or larger than the minimum limit number of frames N. Then, the still image type V1, the normal type V2, and the high display rate/low resolution type V3 are determined as a display type for the frames having a variation smaller than the threshold L, a display type for the frames having a variation equal to or larger than the threshold L and smaller than the threshold H, and a display type for the frames having a variation equal to or larger than the threshold H, respectively.

In this case, as shown in FIG. 51, a section in which a value of the variation graph (a variation) is smaller than the threshold L indicated by the threshold indicator 313L in the graph display section 321 and a section of type information with the slanted lines, which is the still image section, in the type-information display section 322 coincide with each other. A section in which a value of the variation graph is equal to or larger than the threshold H indicated by the threshold indicator 313H in the graph display section 321 and a section of type information with the horizontal lines, which is the high display rate/low resolution section, in the type-information display section 322 coincide with each other as well. A section in which a value of the variation graph is equal to or larger than the threshold L and smaller than the threshold H and a section of type information without a pattern, which is the normal section, in the type-information display section 322 in the graph display section 321 coincide with each other as well.

Moreover, in the type-information display section 322, the position indicator 312 displayed in the graph display section 321 is displayed as an extension of a segment as the position indicator 312 together with the type information.

Therefore, the user can easily grasp (at a glance) a frame of interest displayed in (the display section 52 of) the viewer 51 (FIG. 49), i.e., and variation and (a display method presented by) a display type for a frame corresponding to a position of the position indicator 312.

In the rectangular area as the type information, other than applying a different pattern to each of the display types, for example, it is possible to apply a different color to each of the display type or apply a different shade to each of the display types.

As shown in FIG. 51, when the Fy-file display section 311 includes the graph display section 321 in which the variation graph and the like are displayed and the type-information display section 322 in which the type information is displayed, as in the Fy-file display section 311 in FIG. 49, it is possible to move the threshold indicators 313H and 313L according to operation by the user.

When the threshold indicator 313H or 313L is moved and, consequently, the threshold H or L used for determining a display type is changed, the display-type determining unit 233 of the file managing unit 214 (FIG. 44) compares the variation stored in the Fy file and the threshold H or L after the change and determines a display type again on the basis of a result of the comparison. However, the type information of the type-information display section 322 in FIG. 51 is displayed again in accordance with the display type determined again.

Figure 52:
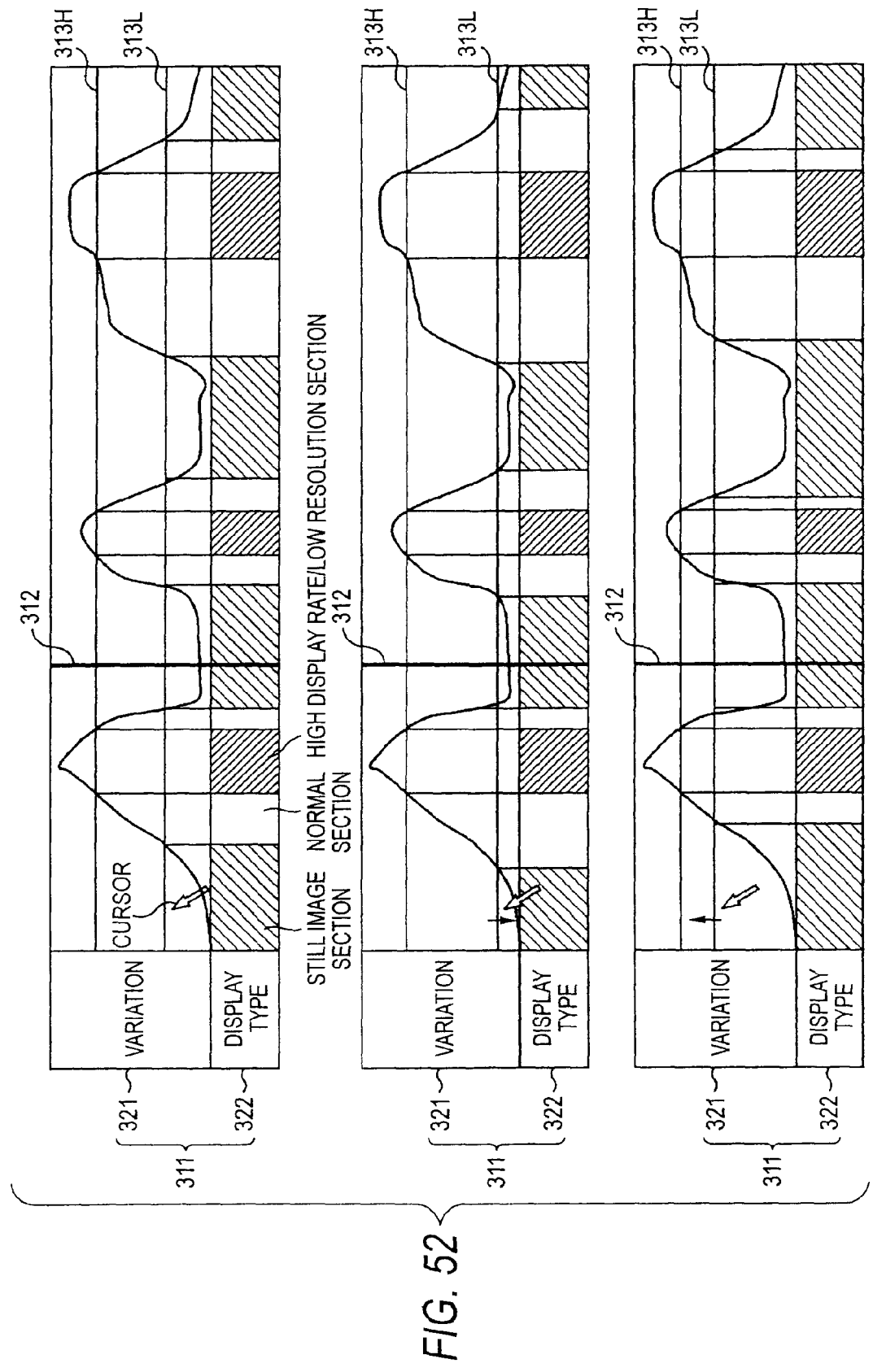
FIG. 52 is a diagram showing type information displayed again according to change of a threshold H or L.

FIG. 52 is a diagram showing type information displayed again as the threshold H or L used for determining a display type is changed.

A diagram at the top in FIG. 52 shows the Fy-file display section 311 displayed at certain timing. In FIG. 52, other than the Fy-file display section 311, a cursor operated by the keyboard 2 or the mouse 3 is also shown.

When the Fy-file display section 311 at the top in FIG. 52 is shown, for example, the user drags to move the threshold indicator 313L in the downward direction using the cursor. In this case, the display-type determining unit 233 of the file managing unit 214 (FIG. 44) compares the variation stored in the Fy file and the threshold L after the change indicated by the threshold indicator 313L after the movement or the threshold H not changed and determines a display type again on the basis of a result of the comparison. The type information is displayed again in accordance with the display type determined again by the display-type determining unit 233.

A second diagram from the top in FIG. 52 shows the Fy-file display section 311 having the type information displayed again as described above.

When the threshold indicator 313L is moved in the downward direction as described above, the threshold (the threshold after the change) L indicated by the threshold indicator 313L after the movement becomes smaller than the threshold (the threshold before the change) L indicated by the threshold indicator 313L before the movement. Therefore, after the movement of the threshold indicator 313L, frames having a variation smaller than the threshold L decrease and frames having a variation equal to or larger than the threshold L and smaller than the threshold H increases compared with those before the movement. In other words, after the movement of the threshold indicator 313L, frames, a display type for which is the still image type V1, decreases and frames, a display type for which is the normal type V2, increases compared with those before the movement.

As a result, after the movement of the threshold indicator 313L, as shown in the second diagram from the top in FIG. 52, type information in which still image sections (portions with slanted lines) decrease and normal sections (portions without slanted lines) increase compared with those before the movement is displayed.

On the other hand, when the first Fy-file display section 311 from the top in FIG. 52 is displayed, for example, the user drags to move the threshold indicator 313L in the upward direction using the cursor. In this case, the display-type determining unit 233 of the file managing unit 214 (FIG. 44) compares the variation stored in the Fy file and the threshold L after the change indicated by the threshold indicator 313L after the movement or the threshold H not changed and determines a display type again on the basis of a result of the comparison. The type information is displayed again in accordance with the display type determined again by the display-type determining unit 233.

A third diagram from the top (at the bottom) in FIG. 52 shows the Fy-file display section 311 having the type information displayed again as described above.

When the threshold indicator 313L is moved in the upward direction as described above, the threshold (the threshold after the change) L indicated by the threshold indicator 313L after the movement becomes larger than the threshold (the threshold before the change) L indicated by the threshold indicator 313L before the movement. Therefore, after the movement of the threshold indicator 313L, frames having a variation smaller than the threshold L increase and frames having a variation equal to or larger than the threshold L and smaller than the threshold H decreases compared with those before the movement. In other words, after the movement of the threshold indicator 313L, frames, a display type for which is the still image type V1, increases and frames, a display type for which is the normal type V2, decreases compared with those before the movement.

As a result, after the movement of the threshold indicator 313L, as shown in the third diagram from the top in FIG. 52, type information in which still image sections (portions with slanted lines) increase and normal sections (portions without slanted lines) decrease compared with those before the movement is displayed.

Figure 53:
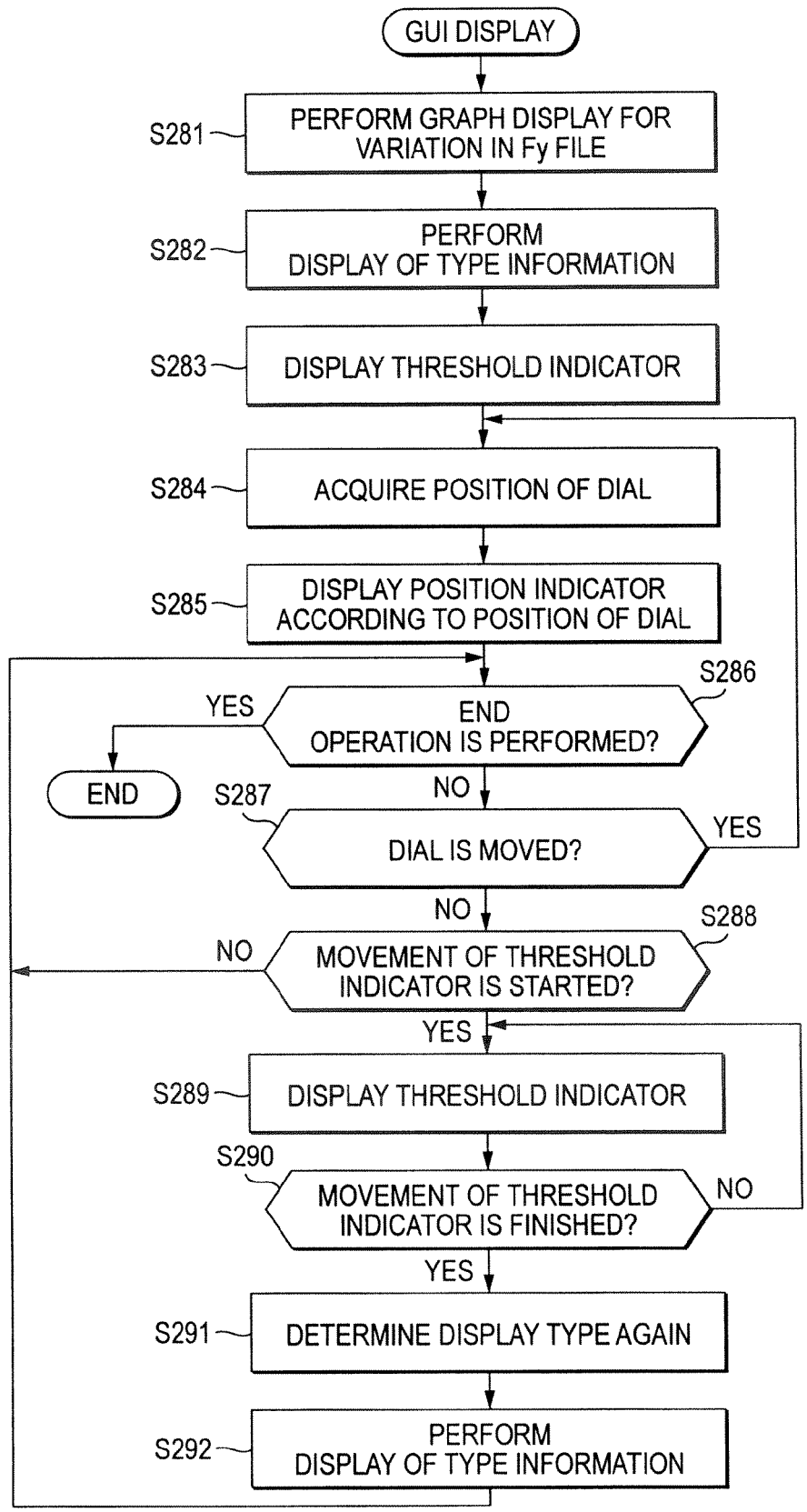
FIG. 53 is a flowchart for explaining GUI display processing.

The GUI display processing at the time when type information is displayed as explained with reference to FIGS. 51 and 52 will be explained with reference to a flowchart in FIG. 53.

In the GUI display processing, the GUI control unit 211 controls the display control unit 218 to display the edition window 301 (FIG. 49). Consequently, the display control unit 218 causes the display 41 to display the edition window 301.

Figure 50:
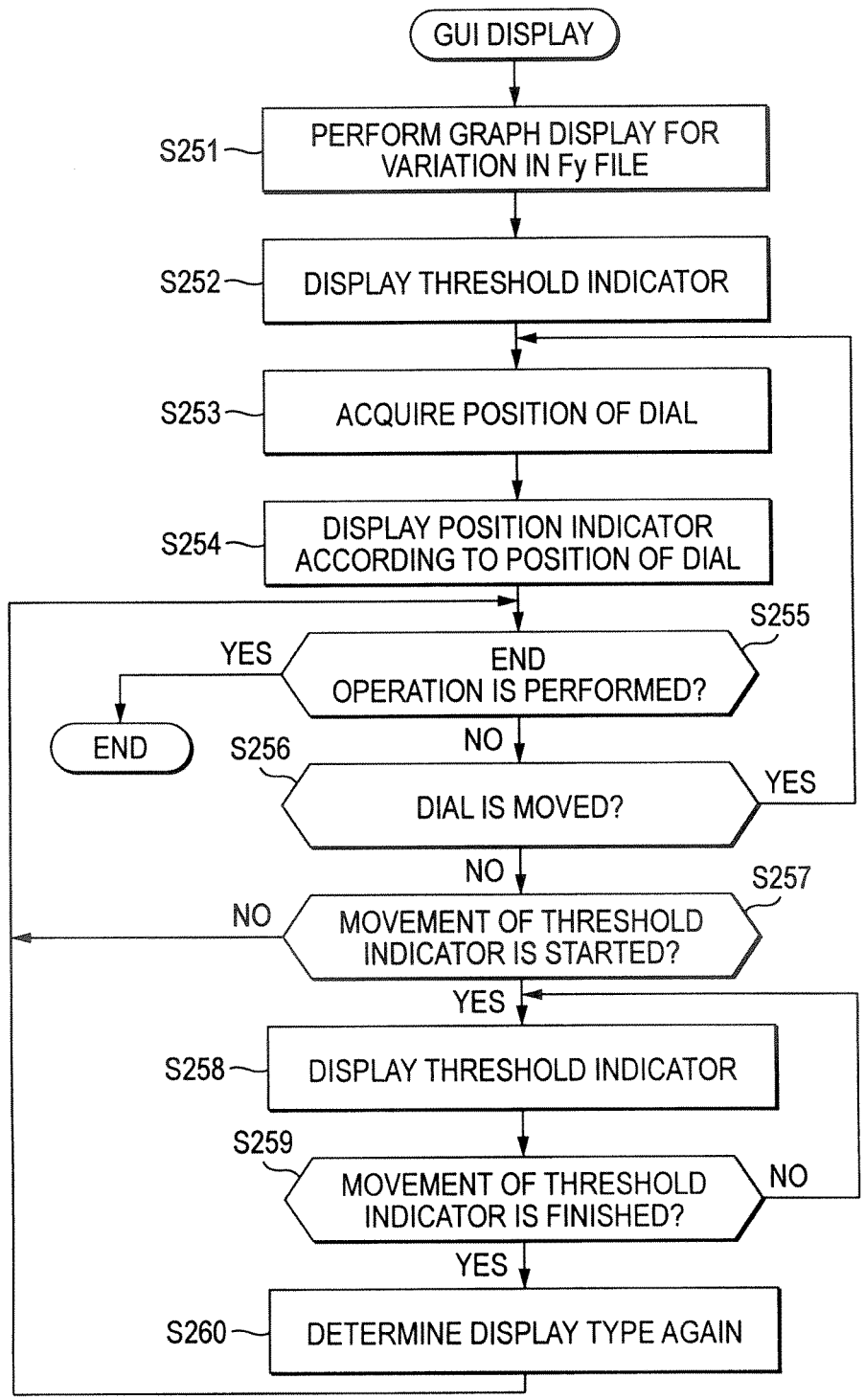
FIG. 50 is a flowchart for explaining GUI display processing.

In step S281, as in step S251 in FIG. 50, the display control unit 218 reads out the Fy file managed by the Fy-file managing unit 214 (FIG. 43). The display control unit 218 causes the graph display section 321 of the Fy-file display section 311 (FIG. 51) of the edition window 301 to display a variation graph on the basis of a variation in the Fy file. The processing proceeds to step S282.

In step S282, the display control unit 218 causes the type-information display section 322 of the Fy-file display section 311 (FIG. 51) of the edition window 301 to display, on the basis of display types in the Fy file managed by the Fy-file managing unit 214 (FIG. 43), type information representing the display types in time series (type information representing an arrangement of the display types in time series). The processing proceeds to step S283.

In step S283, as in step S252 in FIG. 50, the display control unit 218 causes the graph display section 321 of the Fy-file display section 311 (FIG. 51) of the edition window 301 to display the threshold indicators 313H and 313L (FIG. 49) according to the thresholds (the default thresholds) used for determining the display type stored in the Fy file stored in the file storing unit 231 (FIG. 44) of the Fy-file managing unit 214.

Thereafter, the processing proceeds from step S283 to step S284. In steps S284 to S291, the processing same as the processing in steps S253 to S260 in FIG. 50 is performed.

In step S291, as in step S260 in FIG. 50, the display-type determining unit 233 (FIG. 44) of the Fy-file managing unit 241 determines display types again using the threshold indicated by the threshold indicator 313H or 313L after the movement and the variation stored in the Fy file stored in the Fy-file storing unit 231 (FIG. 44). When the display types determined again are written in the file storing unit 231 anew, the processing proceeds to step S292. The display control unit 218 (FIG. 43) performs update of display in the type-information display section 322 for causing the type-information display section 322 of the Fy-file display section 311 (FIG. 51) to display, on the basis of the display types written in the file storing unit 231 of the Fy-file managing unit 214 (FIG. 44) anew, type information representing the display types in time series (type information representing an arrangement of the display types in time series) anew. The processing returns to step S286.

When the user operates the threshold indicator 313H or 313L serving as the GUI as described above, the threshold H or L in determining display types is changed. When display types are determined again using the threshold H or L after the change, display of the type information representing the display types in time series is updated on the basis of the display types determined again.

As the variation, there are motion information and fineness information. It is possible to store only one of the motion information and the fineness information in the Fy file. It is also possible to store both the motion information and the fineness information in the Fy file as shown in, for example, FIG. 35.

When both the motion information and the fineness information are stored in the Fy file, in the Fy-file display section 311, for example, it is possible to select one of the motion information and the fineness information serving as the variations in the Fy file and display a variation graph representing the variation selected in time series.

Figure 54:
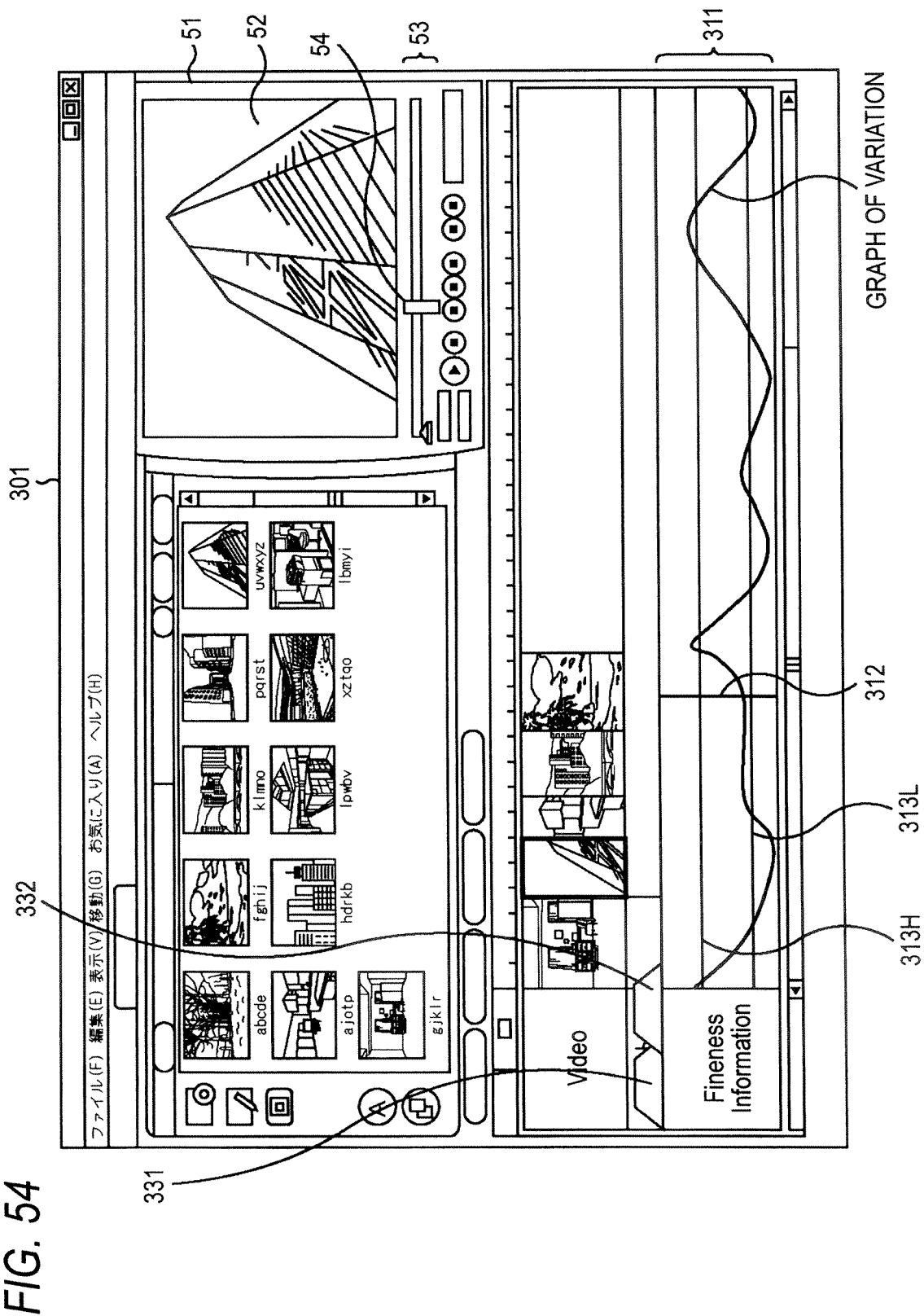
FIG. 54 is a diagram showing an example of display of the Fy-file display section 311.

FIG. 54 is a diagram showing (the edition window 301 including) the Fy-file display section 311 for selecting one of the variations, i.e., the motion information and the fineness information, and displaying a variation graph representing the variation selected in time series.

In FIG. 54, a motion information tab 331 and a fineness information tab 332 serving as GUIs operated in selecting which of a variation graph representing the motion information in time series and a variation graph representing the fineness information in time series is selected is provided in the upper left of the Fy-file display section 311.

When the user performs operation for selecting, for example, the motion information tab 331 of the motion information tab 331 and the fineness information tab 332 (e.g., clicks the motion information tab 331 with the mouse 3), a graph representing the motion information in time series is displayed in the Fy-file display section 311 as a variation graph. When the user performs operation for selecting, for example, the fineness information tab 332 of the motion information tab 331 and the fineness information tab 332, a graph representing the fineness information in time series is displayed in the Fy-file display section 311 as a variation graph.

In FIG. 54, operation for selecting the fineness information tab 332 is performed, whereby the graph representing the fineness information in time series is displayed in the Fy-file display section 311 as a variation graph.

When both the motion information and the fineness information are stored in the Fy file, it is possible to display a variation graph of the motion information or the fineness information in the Fy-file display section 311. Moreover, it is possible to display variation graphs of both the motion information and the fineness information. It is also possible to display type information representing the display types in times series together with the variation graph.

Figure 55:
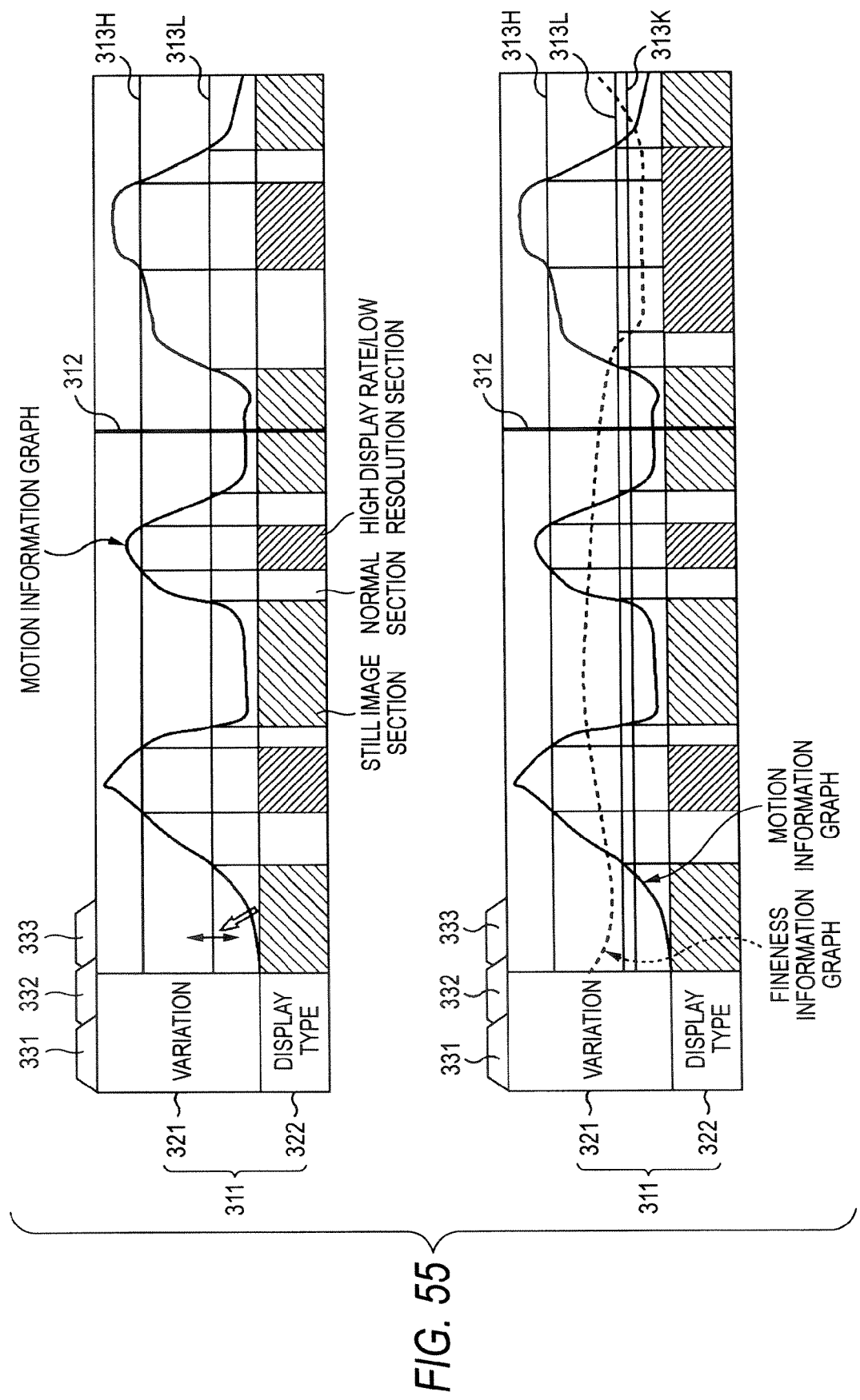
FIG. 55 is a diagram showing an example of display of the Fy-file display section 311.

FIG. 55 is a diagram showing the Fy-file display section 311.

The Fy-file display section 311 in FIG. 55 includes the graph display section 321 in which a variation graph and the like are displayed and the type-information display section 322 in which type information and the like are displayed.

On the upper left of the Fy-file display section 311 in FIG. 55, the motion information tab 331, the fineness information tab 332, and an all information tab 333 serving as GUIs are provided. These tabs are operated in selecting which of a variation graph representing motion information in time series (hereinafter also referred to as motion information graph as appropriate), a variation graph representing fineness information in time series (hereinafter also referred to as fineness information graph as appropriate), or both the motion information graph and the fineness information graph is displayed.

When the user performs, for example, operation for selecting the motion information tab 331 among the motion information tab 331, the fineness information tab 332, and the all information tab 333, as shown in the upper part in FIG. 55, the motion information graph is displayed in the graph display section 321 of the Fy-file display section 311. In the type-information display section 322 of the Fy-file display section 311, type information representing display types (display types based on the motion information), which is determined by comparing the motion information and the thresholds H and L, in time series is displayed. Besides, in the Fy-file display section 311, the position indicator 312 indicating a position of a frame (a frame of interest) displayed in the viewer 51 (FIG. 49) and the threshold indicators 313H and 313L indicating the thresholds H and L used in determining display types based on the motion information, respectively, are also displayed.

When the motion information and the fineness information are stored in the Fy file, for example, as explained with reference to FIGS. 38 to 40, the motion information is compared with the two thresholds H and L and the fineness information is compared with the one threshold K. Consequently, the still image type VC1, the normal type VC2, the high display rate/low resolution type VC3, or the normal display rate/low resolution type VC4 shown in FIG. 38 is determined as a display type (a final display type) based on the motion information and the fineness information.

In this case, when the user performs, for example, operation for selecting the all information tab 333 among the motion information tab 331, the fineness information tab 332, and the all information tab 333, as shown in the lower part in FIG. 55, the motion information graph and the fineness information graph are displayed in the graph display section 321 of the Fy-file display section 311. In the type-information display section 322 of the Fy-file display section 311, type information representing display types based on the motion information and the fineness information, which are determined by comparing the motion information and the thresholds H and L and comparing the fineness information and the threshold K, in time series is displayed. Besides, in the Fy-file display section 311, the position indicator 312 indicating a position of a frame (a frame of interest) displayed in the viewer 51 (FIG. 49) and the threshold indicators 313H, 313L, and 313K indicating the thresholds H, L, and K used in determining display types, respectively, are also displayed.

When the user performs, for example, operation for selecting the fineness information tab 332 among the motion information tab 331, the fineness information tab 332, and the all information tab 333, as in the case in which the operation for selecting the motion information tab 331 is performed, the fineness information graph is displayed in the graph display section 321 of the Fy-file display section 311. In the type-information display section 322 of the Fy-file display section 311, type information representing display types (display types based on the fineness information), which are determined by comparing the fineness information and the threshold K, in time series is displayed. Besides, in the Fy-file display section 311, the position indicator 312 indicating a position of a frame (a frame of interest) displayed in the viewer 51 (FIG. 49) and the threshold indicator 313K indicating the threshold K used in determining display types are also displayed.

Figure 56:
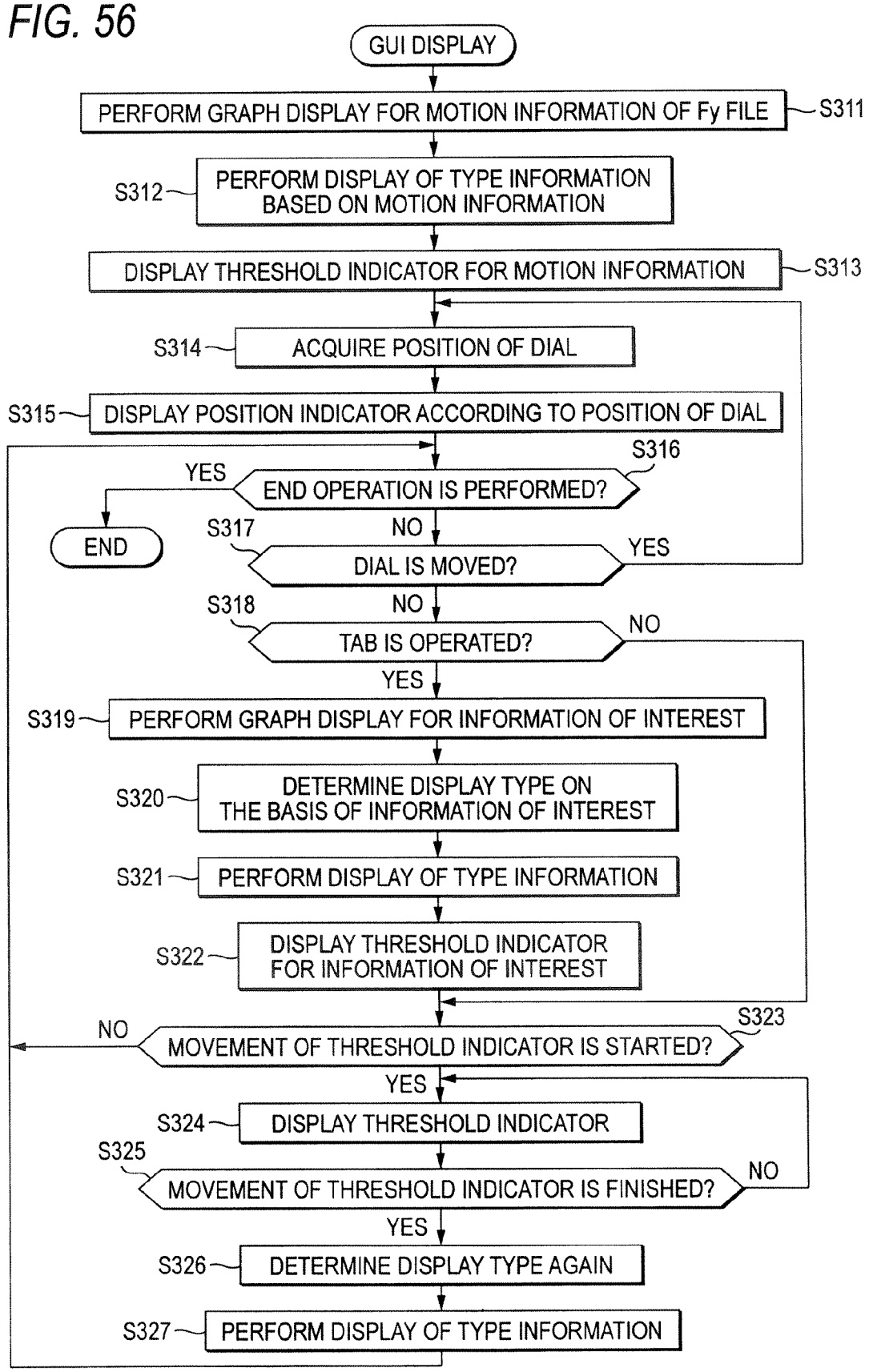
FIG. 56 is a flowchart for explaining GUI display processing.

The GUI display processing performed when plural kinds of information (values) such as the motion information and the fineness information are stored in the Fy file as variations as explained with reference to FIGS. 54 and 55 will be explained with reference to a flowchart in FIG. 56.

The motion information and the fineness information are stored in the Fy file as the variations. For example, motion information of the motion information and the fineness information is set as default of information of interest that is a variation of interest. Moreover, when display types based on the motion information, which is the default information of interest, is not stored in the Fy file, in step S214 of the processing of scrub in FIG. 48, the Fy managing unit 214 (FIG. 43) determines display types based on the motion information and writes the display types in the file storing unit 231 (FIG. 44).

In the GUI display processing, the GUI control unit 211 (FIG. 43) controls the display control unit 218 (FIG. 43) to display the edition window 301 (FIG. 49). Consequently, the display control unit 218 causes the display 41 to display the edition window 301. In step S311, the display control unit 218 reads out the Fy file managed by the Fy-file managing unit 214 (FIG. 43), i.e., the Fy file stored in the file storing unit 231 (FIG. 44) of the Fy-file managing unit 214. The display control unit 218 causes the Fy-file display section 311 of the edition window 301 to display a variation graph (a motion information graph) on the basis of the motion information, which is the default information of interest, of the motion information and the fineness information stored in the Fy file.

Moreover, the display control unit 218 causes the Fy-file display section 311 to display the motion information tab 331, the fineness information tab 332, and the all information tab 333, for example, as shown in FIG. 55, on the basis of the motion information and the fineness information stored in the Fy file read out from the file storing unit 231 of the Fy-file managing unit 214. The processing proceeds from step S311 to step S312.

In step S312, the display control unit 218 causes the type-information display section 322 of the Fy-file display section 311 (FIG. 51) of the edition window 301 to display, on the basis of the display types based on the motion information, which is the default information of interest, stored in the file storing unit 231 of the Fy-file managing unit 214 (FIG. 43), type information representing the display types in time series (type information representing an arrangement of the display types in time series). The processing proceeds to step S313.

In step S313, the display control unit 218 causes the Fy-file display section 311 to display the threshold indicators 313H and 313L (FIG. 55) according to the thresholds H and L used for determining the display types based on the motion information, which is the default information of interest, stored in the Fy file stored in the file storing unit 231 (FIG. 44) of the Fy-file managing unit 214.

Thereafter, the processing proceeds from step S313 to S314. In steps S314 to S317, processing same as steps S253 to S256 in FIG. 50 is performed.

In step S314, the display control unit 218 acquires information on a position of the scrub dial 54 and a frame allocated to a designated section (FIG. 45) in which the scrub dial 54 is located, i.e., a frame of interest as well from the GUI control unit 211 (receives the information on the frame of interest supplied from the GUI control unit 211). The processing proceeds to step S315.

In step S315, the display control unit 218 causes the Fy-file display section 311 to display the position indicator 312 (FIG. 55) according to the information on the frame of interest acquired from the GUI control unit 211 in the immediately preceding step S314. The display control unit 218 causes the Fy-file display section 311 to display the position indicator 312 in a position corresponding to the frame (the frame of interest) allocated to the designated section in which the scrub dial 54 is located.

The processing proceeds from step S315 to step S316. The GUI control unit 211 judges whether the keyboard 2 or the mouse 3 is operated to finish the editing program.

When it is judged in step S316 that the keyboard 2 or the mouse 3 is not operated to finish the editing program, the processing proceeds to step S317. The GUI control unit 211 judges whether the scrub dial 54 is moved, i.e., the user has moved the scrub dial 54 by operating the keyboard 2 or the mouse 3.

When it is judged in step S317 that the scrub dial 54 is moved, this means that the user has operated the keyboard 2 or the mouse 3 to move the scrub dial 54 and an operation signal corresponding to the operation is supplied from the keyboard 2 or the mouse 3 to the GUI control unit 211. In this case, the GUI control unit 211 sets a frame allocated to a designated position (FIG. 45) in which the scrub dial 54 is located as a frame of interest and supplies information on the frame of interest to the display control unit 218. The processing returns to step S314. Thereafter, the same processing is repeated.

On the other hand, when it is judged in step S317 that the scrub dial 54 is not moved, the processing proceeds to step S318. The GUI control unit 211 (FIG. 43) judges whether operation for selecting the motion information tab 331, the fineness information tab 332, or the all information tab 333 displayed in step S311 is performed.

When it is judged in step S318 that the operation for selecting the motion information tab 331, the fineness information tab 332, or the all information tab 333 is not performed, steps S319 to S322 described later in which processing for changing the information of interest is performed are skipped. The processing proceeds to step S323.

When it is judged in step S318 that the operation for selecting the motion information tab 331, the fineness information tab 332, or the all information tab 333 is performed, this means that the user has operated the keyboard 2 or the mouse 3 to select the motion information tab 331, the fineness information tab 332, or the all information tab 333 and an operation signal corresponding to the selection is supplied from the keyboard 2 or the mouse 3 to the GUI control unit 211 (FIG. 43). In this case, the GUI control unit 211 sets information corresponding to the selected one of the motion information tab 331, the fineness information tab 332, and the all information tab 333 (hereinafter also referred to as selected tab as appropriate) as information of interest on the basis of the operation signal from the keyboard 2 or the mouse 3. The processing proceeds to step S319.

When the selected tab is the motion information tab 331, the motion information that is information corresponding to the motion information tab 331 is set as information of interest. When the selected tab is the fineness information tab 332, the fineness information corresponding to the fineness information tab 332 is set as information of interest. When the selected tab is the all information tab 333, all the variations stored in the Fy file, i.e., both the motion information and the fineness information corresponding to the all information tab 333 are set as information of interest.

In step S319, the display control unit 218 (FIG. 43) reads out the Fy file managed by the Fy-file managing unit 214, i.e., the Fy file stored in the file storing unit 231 (FIG. 44) of the Fy-file managing unit 214. The display control unit 218 causes the Fy-file display section 311 of the edition window 301 to display the variation graph on the basis of the information of interest of the motion information and the fineness information stored in the Fy file.

For example, when the motion information of the motion information and the fineness information is the information of interest, in step S319, the display control unit 218 causes the Fy-file display section 311 to display the motion information graph as shown in the upper part in FIG. 55. For example, when the fineness information is the information of interest, in step S319, the display control unit 218 causes the Fy-file display section 311 to display the fineness information graph. Moreover, for example, when both the motion information and the fineness information are the information of interest, in step S319, the display control unit 218 causes the Fy-file display section 311 to display the motion information graph and the fineness information graph as shown in the lower part in FIG. 55.

Thereafter, the processing proceeds from step S319 to step S320. The Fy-file managing unit 214 (FIG. 43) compares, in the display-type determining unit 233, the information of interest and a present threshold for determining display types based on the information of interest (the default threshold or the threshold H, L, or K represented by a position of the threshold indicator 313H, 313L, or 313K (FIG. 55)) to determine display types based on the information of interest and causes the file storing unit 231 to store the display types. The processing proceeds to step S321.

In step S321, the display control unit 218 causes the Fy-file display section 311 to display, on the basis of the display types based on the information of interest stored in the file storing unit 231 of the Fy-file managing unit 214 (FIG. 43), type information representing the display types in time series (type information representing an arrangement of the display types in time series). The processing proceeds to step S322.

In step S322, the display control unit 218 causes the Fy-file display section 311 to display the threshold indicator 313H, 313L, or 313K (FIG. 55) according to the threshold H, L, or K used for determining the display types based on the information of interest stored in the file storing unit 231 (FIG. 44) of the Fy-file managing unit 214 (used for determining the display types in the immediately preceding step S320).

For example, when the motion information of the motion information and the fineness information is the information of interest, in step S322, the display control unit 218 causes the Fy-file display section 311 to display the threshold indicators 313H and 313L in positions thereon corresponding to the thresholds H and L used for determining the display types based on the motion information as shown in the upper part in FIG. 55.

For example, when the fineness information is the information of interest, in step S322, the display control unit 218 causes the Fy-file display section 311 to display the threshold indicator 313K in a position thereon corresponding to the threshold K used for determining the display types based on the fineness information.

Moreover, for example, when both the motion information and the fineness information are the information of interest, in step S322, the display control unit 218 causes the Fy-file display section 311 to display the threshold indicators 313H, 313L, and 313K in positions thereon corresponding to the thresholds H, L, and K used for determining the display types based on the motion information and the fineness information, respectively, as shown in the lower part in FIG. 55.

Thereafter, the processing proceeds from step S322 to step S323. In steps S323 to S327, processing same as the processing in steps S288 to S292 in FIG. 53 is performed.

In step S323, the GUI control unit 211 judges whether movement of the threshold indicator displayed in the Fy-file display section 311, i.e., the threshold indicator corresponding to the threshold used for determining the display types based on the information of interest (one of the threshold indicators 313H, 313L, and 313K) is started, i.e., whether the user has operated the keyboard 2 or the mouse 3 to move the threshold indicator.

When it is judged in step S323 that the movement of the threshold indicator displayed in the Fy-file display section 311 is not started, the processing returns to step S316. Thereafter, the same processing is repeated.

When it is judged in step S323 that the movement of the threshold indicator displayed in the Fy-file display section 311 is started, this means that the user has operated the keyboard 2 or the mouse 3 to move the threshold indicator displayed in the Fy-file display section 311 and an operation signal corresponding to the operation is supplied from the keyboard 2 or the mouse 3 to the GUI control unit 211. In this case, the GUI control unit 211 calculates, according to the operation signal from the keyboard 2 or the mouse 3, a position to which the threshold indicator displayed in the Fy-file display section 311 is moved. The GUI control unit 211 supplies information representing the position to the display control unit 218. The processing proceeds to step S324.

In step S324, the display control unit 218 causes the Fy-file display section 311 to display the threshold indicator in a position corresponding to the information from the GUI control unit 211 instead of the position where the threshold indicator was displayed immediately before the step. The processing proceeds to step S325.

In step S325, the GUI control unit 211 judges whether the movement of the threshold indicator is finished, i.e., whether the user has finished the operation of the keyboard 2 or the mouse 3 for moving the threshold indicator.

When it is judged in step S325 that the operation for moving the threshold indicator is not finished, this means that the user continues to operate the keyboard 2 or the mouse 3 to move the threshold indicator and an operation signal corresponding to the operation is supplied from the keyboard 2 or the mouse 3 to the GUI control unit 211. In this case, the GUI control unit 211 calculates, according to the operation signal from the keyboard 2 or the mouse 3, a position to which the threshold indicator is moved and supplies information representing the position to the display control unit 218. The processing returns to step S324. Thereafter, the same processing is repeated.

On the other hand, when it is judged in step S325 that the operation for moving the threshold indicator is finished, this means that the user has finished the operation of the keyboard 2 or the mouse 3 for moving the threshold indicator and an operation signal corresponding to the operation for moving the threshold indicator is not supplied from the keyboard 2 or the mouse 3 to the GUI control unit 211. In this case, the GUI control unit 211 supplies a threshold corresponding to a position (in the vertical direction) in which the movement of the threshold indicator is finished to the Fy-file managing unit 214 via the data-supply control unit 213 (FIG. 43). The processing proceeds to step S326.

As explained with reference to FIG. 50, the threshold supplied to the Fy-file managing unit 214 via the data-supply control unit 213 by the GUI control unit 211 is supplied to the threshold processing unit 242 constituting the display-type determining unit 233 of the Fy-file managing unit 214 (FIG. 44). Thereafter, the threshold processing unit 242 performs the processing using the threshold supplied from the GUI control unit 211 via the data-supply control unit 213 until a new threshold is supplied to the threshold processing unit 242 or a new Fy file is stored in the file storing unit 231.

In step S326, the display-type determining unit 233 of the Fy-file managing unit 214 (FIG. 44) determines display types anew (again) using the threshold supplied from the GUI control unit 211 to the threshold processing unit 242 via the data-supply control unit 213 immediately before the step, i.e., the threshold indicated by the threshold indicator after the movement and the variation, which is the information of interest, stored in the Fy file stored in the Fy-file storing unit 231.

The display-type determining unit 233 compares the variation, which is the information of interest, stored in the Fy file stored in the Fy-file storing unit 231 and the threshold indicated by the threshold indicator after the movement. The display-type determining unit 233 determines display types based on the information of interest again on the basis of a result of the comparison. The display types based on the information of interest determined again by the display-type determining unit 233 is written in the file storing unit 231 to overwrite the display types stored therein.

After the display types based on the information of interest are determined in step S326 as described above, the processing proceeds to step S327. The display control unit 218 (FIG. 43) performs update of display in the type-information display section 322 for causing the Fy-file display section 311 to display type information representing the display types in time series (type information representing an arrangement in time series of the display types) on the basis of the display types based on the information of interest written in the file storing unit 231 of the Fy-file managing unit 214 (FIG. 44) anew. The processing returns to step S316.

When it is judged in step S316 that the keyboard 2 or the mouse 3 is operated to finish the editing program, this means that the user has operated the keyboard 2 or the mouse 3 to finish the editing program and an operation signal corresponding to the operation is supplied from the keyboard 2 or the mouse 3 to the GUI control unit 211. In this case, the GUI display processing ends.

In scrub, a position of the scrub dial 54 is detected at a period corresponding to a display rate. A frame allocated to a designated section in which the scrub dial 54 is located is set as a frame of interest. The frame of interest is displayed in the viewer 51 (FIG. 3).

For simplification of the explanation, it is assumed that a display rate is fixed.

As explained with reference to FIG. 45, a movable range of the scrub bar 53 is divided into designated sections that are provided in the same number as the number of frames forming a moving image to be subjected to scrub and have an identical section length. In this case, when the scrub dial 54 is moved at fixed speed, the scrub dial 54 is moved a fixed distance and in a fixed number of designated sections in a unit time. Therefore, as described above, if a display rate is fixed, when the scrub dial 54 is moved at the fixed speed by the fixed distance, a fixed number of frames are displayed. This does not depend on in what kind of range in the movable range the scrub bar 53 is moved.

For example, in the moving image to be subjected to scrub, there are a section in which frames having intense motion continue (hereinafter referred to as section with motion as appropriate) and a section in which frames not having motion (hereinafter referred to as section without motion as appropriate) In this case, even if the scrub dial 54 is moved at the fixed speed by the fixed distance in a range of designated section to which the frames in the section with motion are allocated and a range of designated sections to which the frames in the section without motion are allocated among the movable range of the scrub bar 53, the number of frames displayed in the viewer 51 is the same.

However, when the scrub dial 54 is moved in the range of the designated sections to which the frames in the section with motion are allocated, an image displayed in the viewer 51 substantially changes (moves) because the frames in the section with motion have intense motion.

On the other hand, when the scrub dial 54 is moved in the range of the designated section to which the frames in the section without motion are allocated, an image displayed in the viewer 51 does not change (changes little) because the frames in the section without motion do not have motion (have little motion).

Therefore, in the case in which the movable range of the scrub bar 53 is divided into the designated sections having the identical section length, when the scrub dial 54 is moved at the fixed speed by the fixed distance, an image displayed in the viewer 51 substantially changes in some ranges and does not change in other ranges.

In the range of the designated sections to which the frames in the section without motion are allocated, even if the scrub dial 54 is moved by a certain degree, an image displayed in the viewer 51 does not change. Thus, the user operating the scrub dial 54 sometimes feels it annoying.

On the other hand, in the range of the designated sections to which the frames in the section with motion are allocated, when the scrub dial 54 is moved by a certain degree, an image displayed on the viewer 51 substantially changes. Thus, the user operating the scrub dial 54 sometimes needs to perform precise (careful) operation of the scrub dial 54 in order to find a frame of a desired image.

Thus, a section length of designated sections to which frames are allocated is not fixed but is weighted according to, for example, motion information as variation in the frames allocated to the designated sections. This makes it possible to divide the movable range of the scrub bar 53 into designated sections that have a larger section length when frames having larger motion information as variables are allocated to the designated sections.

Figure 57:
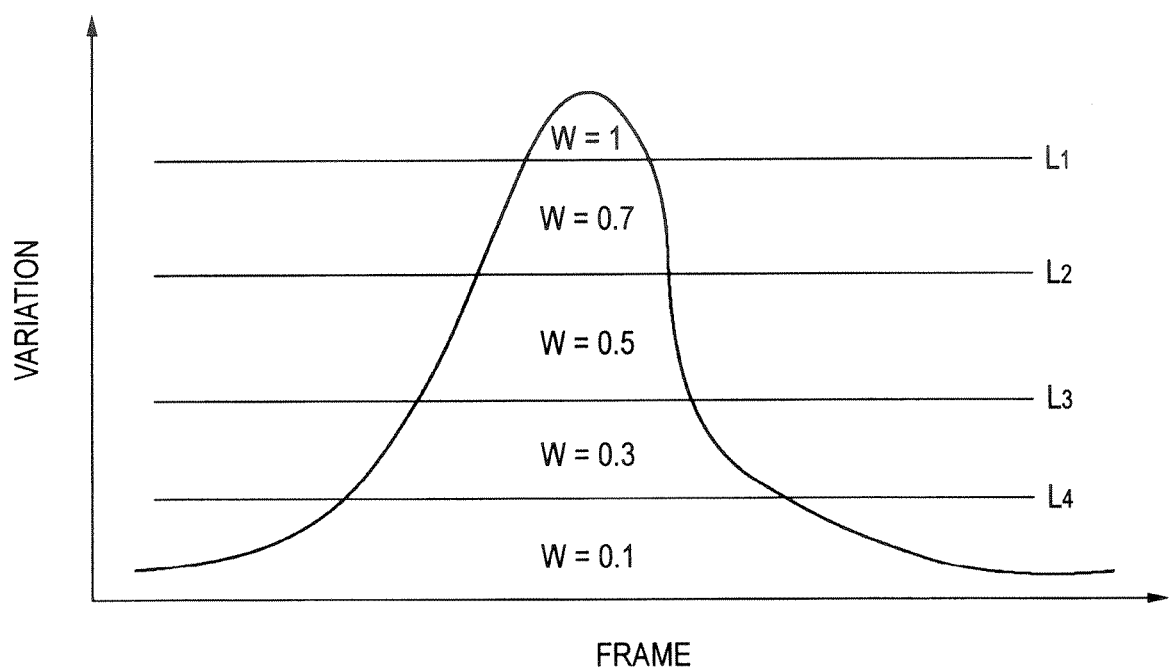
FIG. 57 is a diagram showing an example of a weight for weighting a section length in a designated section.

FIG. 57 is a diagram showing an example of weight in weighting the section length of the designated sections.

In FIG. 57, the abscissa indicates a frame (a place of a frame from the top) and the ordinate indicates motion information serving as a variation.

In FIG. 57, thresholds $L_1$, $L_2$, $L_3$, and $L_4$ satisfying a relation $L_1 > L_2 > L_3 > L_4$ are used. A weight w for a section length of designated sections to which frames having motion information equal to or larger than the threshold $L_1$ are allocated is set as, for example, 1. A weight w for a section length of designated sections to which frames having motion information equal to or larger than the threshold $L_2$ and smaller than the threshold $L_1$ are allocated is set as, for example, 0.7. A weight w for a section length of designated sections to which frames having motion information equal to or larger than the threshold $L_3$ and smaller than the threshold $L_2$ are allocated is set as, for example, 0.5. A weight w for a section length of designated section to which frames having motion information equal to or larger than the threshold $L_4$ and smaller than the threshold $L_3$ are allocated is set as, for example, 0.3. Moreover, a weight w for a section length of designated sections to which frame shaving motion information smaller than the threshold $L_4$ are allocated is set as, for example, 0.1.

It is possible to calculate the section length weighted using the weights w, for example, as explained below.

A section in which designated sections having a section length weighted by the identical weight w is referred to as an identical weight section. A sequence of designated sections allocated to frames forming a moving image to be subjected to scrub is divided into Q identical weight sections.

The number of designated sections forming a qth identical weight section from the top among the Q identical weight sections and the number of frames allocated to the designated sections forming the qth identical weight section are represented as $F_q$. A weight given to a section length of each of the designated sections forming the qth identical weight section is represented as $w_q$.

A total number F of the frames of the moving image to be subjected to scrub is represented as $F = F_1 + F_2 + \ldots + F_Q$.

Assuming that length of the movable range is 1, a section length of designated sections is represented as 1/F when the section length is not weighted.

On the other hand, a section length of designated sections forming the qth identical weight section from the top is represented as $w_q/(\Sigma w_i F_i)$ when the section length is weighted. Since length of the qth identical weight section from the top is represented as $w_q F_q/(\Sigma w_i F_i)$, by dividing $w_q F_q/(\Sigma w_i F_i)$ by the number Fq of (the frames allocated to) the designated sections forming the qth identical weight section, it is possible to calculate a section length of the designated sections forming the qth identical weight section from the top at the time when the section length is weighted. $\Sigma w_i F_i$ represents a sum of $w_i F_i$ when a suffix i is changed from 1 to Q.

It is possible to calculate a section length of designated sections at the time when the section length is not weighted by setting all the weights $w_1, w_2, \ldots, w_Q$ at the time when the section length is weighted to the identical weight w. The section length of the designated sections forming the qth identical weight section from the top at the time when the section length is weighted is $w_q/(\Sigma w_i F_i)$ as described above. When $w_1, w_2, \ldots,$ and $w_Q$ are set as the identical weight w, $w_q/(\Sigma w_i F_i) = w/(w\Sigma F_i) = 1/\Sigma F_i = 1/F$.

In FIG. 57, the weight w for the section length of the designated sections allocated to the frames is calculated using the four thresholds $L_1$, $L_2$, $L_3$, and $L_4$ that are not related to the thresholds used for determining display types. However, besides, it is also possible to calculate a weight w for section length using the thresholds used for determining display types.

Figure 58:
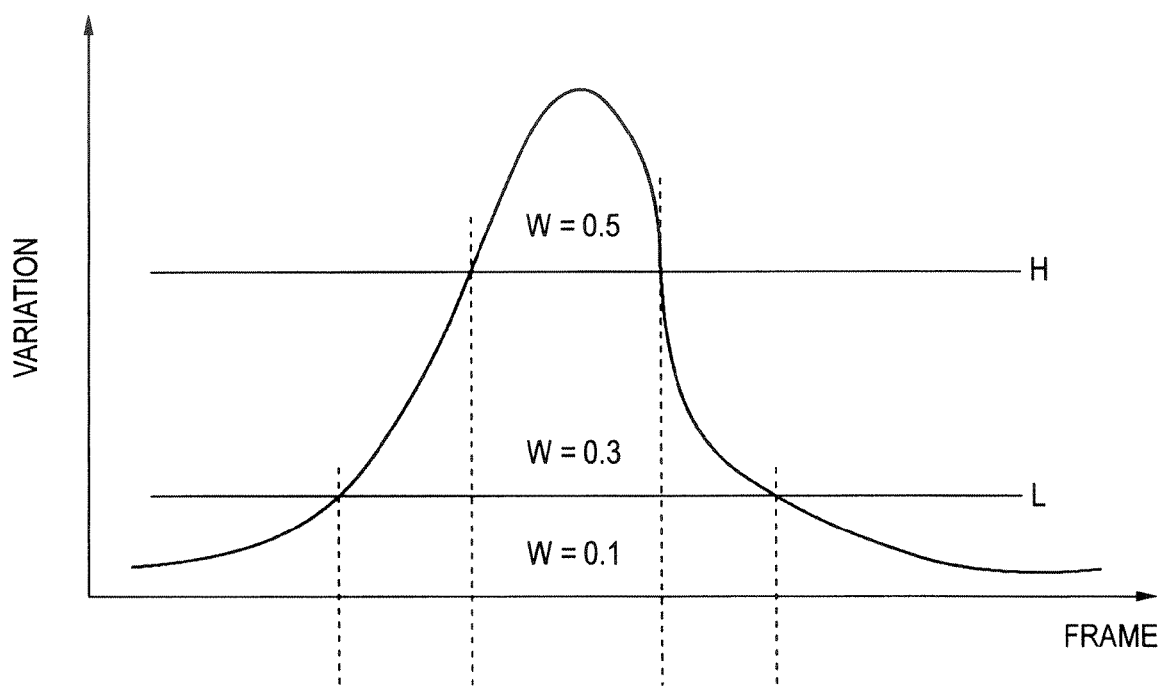
FIG. 58 is a diagram showing an example of a weight for weighting a section length in a designated section.

FIG. 58 is a diagram showing an example of weights calculated using the thresholds H and L used for determining display types based on motion information.

In FIG. 58, the abscissa indicates a frame (a place of a frame from the top) and the ordinate indicates motion information serving as a variation.

In FIG. 58, a weight w for a section length of designated sections to which frames having motion information equal to or larger than the threshold H are allocated is set as, for example, 0.5. A weight w for a section length of designated sections to which frames having motion information equal to or larger than the threshold L and smaller than the threshold H are allocated is set as, for example, 0.3. A weight w for a section length of designated sections to which frames having motion information smaller than the threshold L are allocated is set as, for example, 0.1.

Besides, for example, when display types of frames are determined on the basis of motion information of the frames, it is possible to determine a weight w for a section length of designated sections allocated to the frames according to the display types.

When display types are determined on the basis of motion information, the display types represents degrees of motion of frames. Specifically, for example, as shown in FIG. 20, when the still image type V1, the normal type V2, or the high display rate/low resolution type V3 is determined as a display on the basis of motion information, in principle, frames of the still image type V1 are frames having motion information smaller than the threshold L and frames of the normal type V2 are frames having motion information equal to or larger than the threshold L and smaller than the threshold H. Frames of the high display rate/low resolution type V3 are frames having motion information equal to or larger than the threshold H.

Therefore, as in the case in which the thresholds H and L are used explained with reference to FIG. 58, it is possible to set a weight w for a section length of designated sections to which the frames of the still image type V1 are allocated, a weight w for section length of designated sections to which the frames of the normal type V2 are allocated, and a weight w for section length of designated sections to which the frames of the high display rate/low resolution type V3 are allocated as 0.1, 0.3, and 0.5, respectively.

When a weight w for section length of designated sections allocated to frames is determined according to display types of the frames, all of a still image section in which the frames of the still image type V1 continue, a normal section in which the frames of the normal type V2 continue, and a high display rate/low resolution section in which the frames of the high display rate/low resolution type V3 continue are identical weight sections.

Figure 59:
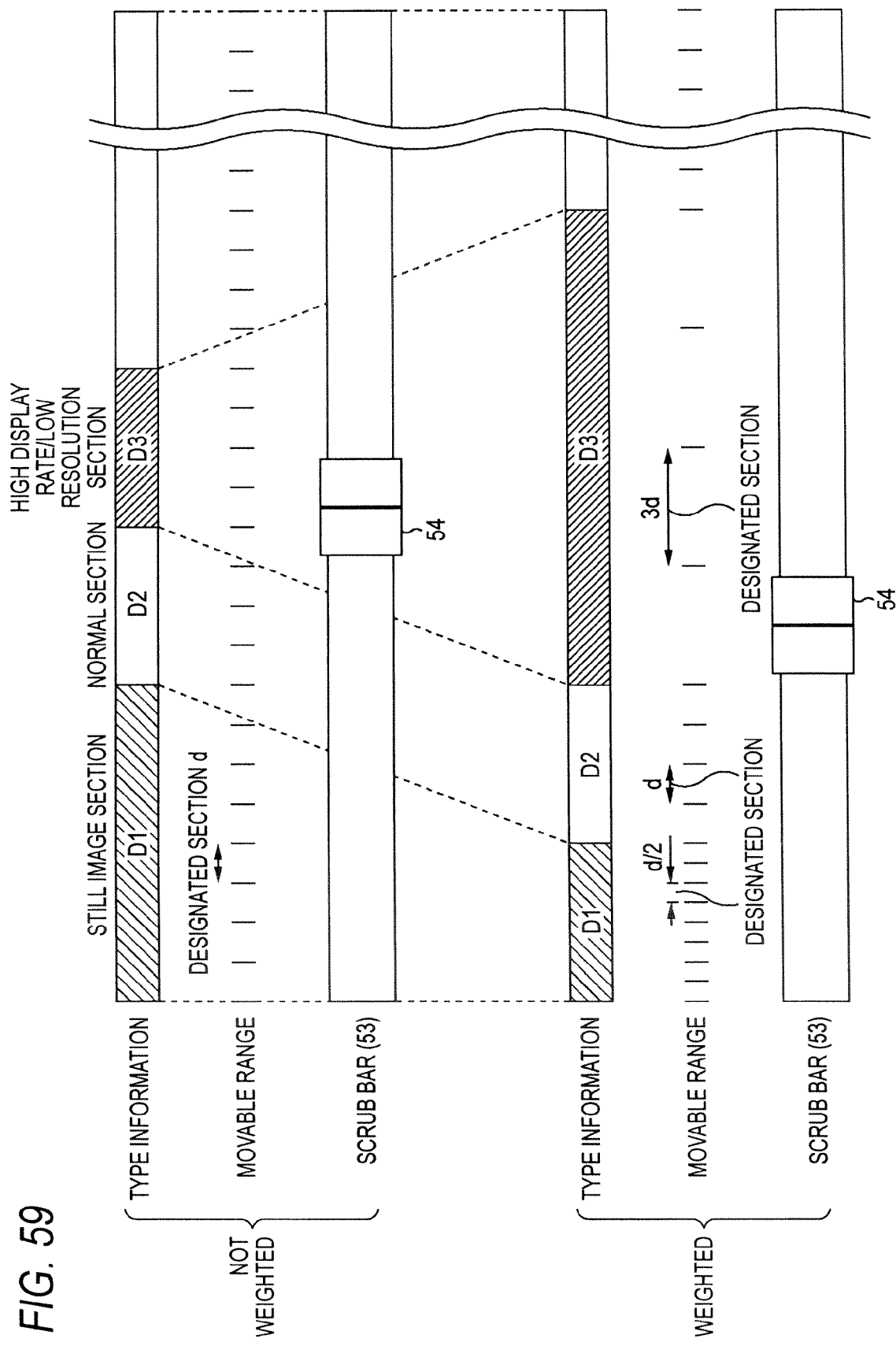
FIG. 59 is a diagram showing designated sections at the time when a section length is not weighted and at the time when a section length is weighted.

FIG. 59 is a diagram showing designated sections at the time when a section length is weighted and at the time when a section length is not weighted, respectively.

When the section length is not weighted, as shown in the upper half in FIG. 59, the movable range of the scrub bar 53 is divided into designated sections that are provided in the same number as the number of frames forming a moving image to be subjected to scrub and have an identical section length. As explained with reference to FIG. 45, the frames forming the moving image to be subjected to scrub are allocated in time series from a designated section on the left.

When the section length is not weighted, a section length of designated sections allocated to frames in all the still image sections in which the frames of the still image type V1 continue, the normal section in which the frames of the normal type V2 continue, and the high display rate/low resolution section in which the frames of the high display rate/low resolution type V3 continue are d.

On the other hand, when the section length is weighted, as shown in the lower half in FIG. 59, the movable range of the scrub bar 53 is divided into designated sections. As explained with reference to FIG. 45, the frames forming the moving image to be subjected to scrub are allocated in time series from a designated section on the left. However, a section length is larger in a designated section to which a frame having larger motion information serving as a variation is allocated.

In FIG. 59, a section length of designated sections allocated to frames in the still image section in which the frames of the still image type V1 continue, i.e., frames without motion is d/2, which is ½ time as large as the section length d at the time when the section length is not weighted. A section length of designated sections allocated to frames in the normal section in which the frames of the normal type V2 continue, i.e., frames with motion, although not intense, is d, which is identical with the section length d at the time when the section length is not weighted. Moreover, a section length of designated sections allocated to frames in the high display rate/low resolution section in which the frames of the high display rate/low resolution type V3 continue, i.e., frames with intense motion is 3d, which is three times as large as the section length d at the time when the section length is not weighted.

Therefore, in weighting the section length, when the scrub dial 54 is moved by an amount of movement ½ time as large as that at the time when the section length is not weighted, display of the frames in the still image section ends. As a result, even if the scrub dial 54 is moved by a certain degree, since an image displayed in the viewer 51 does not change, it is possible to prevent the user operating the scrub dial 54 from feeling the movement of the scrub dial 54 annoying.

In the case in which the section length is weighted, when the scrub dial 54 is moved by an amount of movement three times as large as that at the time when the section length is not weighted, a frame of interest displayed in the viewer 51 is changed from a frame in the high display rate/low resolution section to the next frame. As a result, the user can easily find a frame of a desired image without operating the scrub dial 54 so precisely (carefully).

In FIG. 59, type information in which a scale in the horizontal direction is identical with a scale in the movable range of the scrub bar 53 (a GUI of belt-like areas representing display types in time series).

In type information in which a scale in the horizontal direction is identical with a scale in the movable range of the scrub bar 53, (a pattern of) type information in a position of the scrub dial 54 represents a display type for a frame allocated to a designated section in which the scrub dial 54 is located.

In FIG. 59, among the belt-like areas serving as the type information, an area D1 with slanted lines represents a still image section in which the frames of the still image type V1 continue and an area D2 without a pattern represents a normal section in which the frames of the normal type V2 continue. An area D3 with horizontal lines represents a high display rate/low resolution section in which the frames of the high display rate/low resolution type V3 continue.

In FIG. 59, as describe above, a section length of designated sections allocated to frames in the still image section in which the frames of the still image type V1 continue at the time when the section length is weighted is d/2, which is ½ time as large as the section length d at the time when the section length is not weighted. Thus, length in the horizontal direction of the area D1 representing the still image section at the time when the section length is weighted is also ½ time as large as that at the time when the section length is not weighted.

In FIG. 59, a section length of designated sections allocated to frames in the normal section in which the frames of the normal type V2 continue at the time when the section length is weighted is d, which is identical with the section length d at the time when the section length is not weighted. Thus, length in the horizontal direction of the area D2 representing the normal section at the time when the section length is weighted is also identical with that at the time when the section length is not weighted.

Moreover, in FIG. 59, a section length of designated sections allocated to frames in the high display rate/low resolution section in which the frames of the high display rate/low resolution type V3 continue at the time when the section length is weighted is 3d, which is three times as large as the section length d at the time when the section length is not weighted. Thus, length in the horizontal direction of the area D3 representing the high display rate/low resolution section at the time when the section length is weighted is also three times as large as that at the time when the section length is not weighted.

As described above, when the section length is weighted, type information depends on the section length after the weighting and is different from that at the time when the section length is not weighted (in other words, when the section length is not weighted, type information is different from that at the time when the section length is weighted).

In the editing system in FIG. 43, a weighting-on mode for weighting a section length of designated sections and a weighing-off mode for not weighting the section length are provided as operation modes. It is possible to switch an operation mode to the weighting-on mode or the weighting-off mode according to operation by the user.

Figure 60:
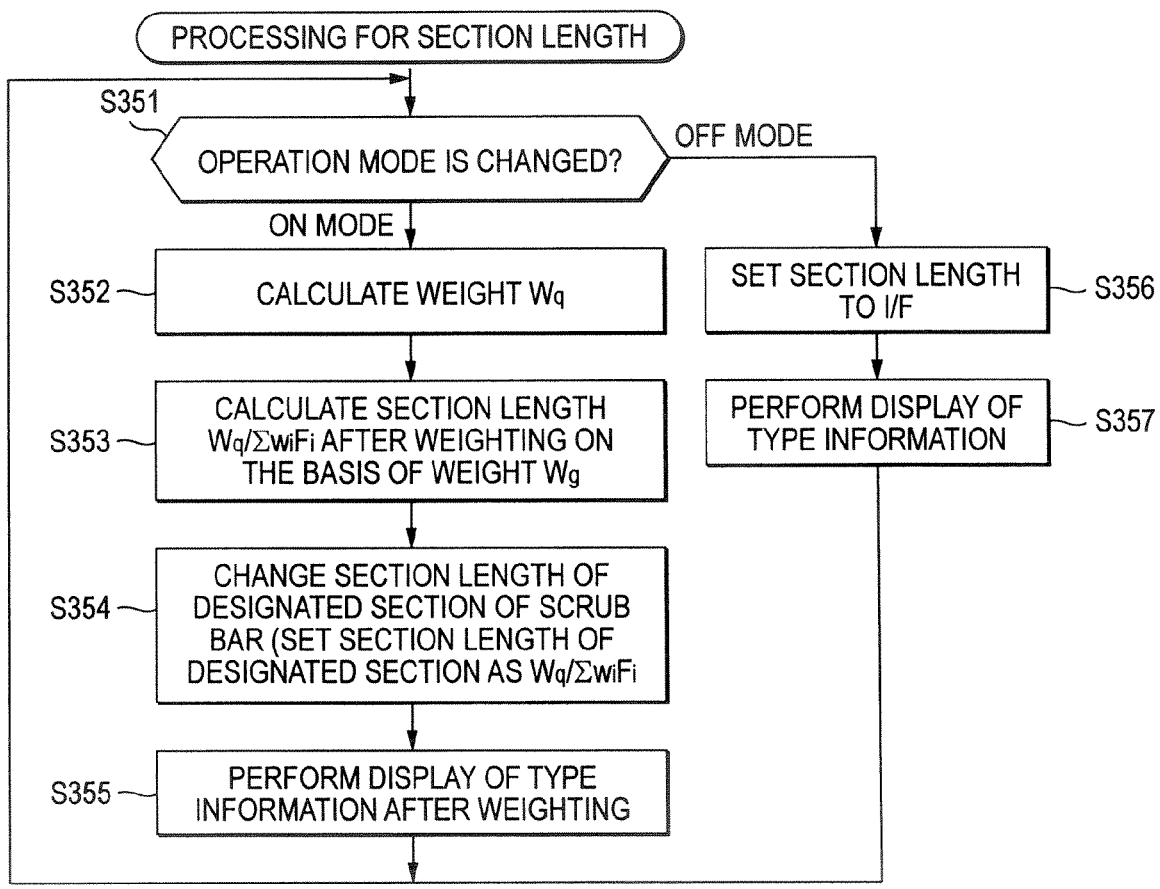
FIG. 60 is a flowchart for explaining processing for a section length.

Processing applied to section length of designated sections by the editing system in FIG. 43 (processing concerning a section length) will be explained with reference to a flowchart in FIG. 60.

A not-shown weight button that is operated in switching the operation mode to the weighting-on mode or the weighting-off mode is provided in the edition window 301 (FIG. 49). When the user operates the weight button, the operation mode is switching to the weighting-on mode or the weighting-off mode.

It is assumed that length of the movable range of the scrub bar 53 is 1.

In the processing concerning a section length, in step S351, the GUI control unit 211 judges whether the operation mode is switched. When it is judged in step S351 that the operation mode is switched to the weighting-on mode, the processing proceeds to step S352. The GUI control unit 211 calculates a weight given to the weight length of each of the designated sections allocated to a frame as described above on the basis of the variation or the display type in the Fy file stored in the file storing unit 231 of the Fy-file managing unit 214 (FIG. 44). The processing proceeds to step S353.

In step S353, the GUI control unit 211 calculates a weighted section length for each of the designated sections on the basis of the weights given to the section length of each of the sections allocated to the frame.

When the weight given to the section length of each of the designated sections allocated to the frame is calculated as described above on the basis of the variation or the display type in step S352, the GUI control unit 211 recognizes a section in which designated sections having a section length weighted by the identical weight w continue as an identical weight section.

As described above, a sequence of designated section allocated to frames forming a moving image to be subjected to scrub is divided into Q identical weight sections. Then, the GUI control unit 211 calculates a section length $w_q/(\Sigma w_i F_i)$ of designated sections forming a qth identical weight section from the top using the number $F_q$ of designated sections forming the qth identical weight section from the top among the Q identical weight sections and the weight $w_q$ given to the section length of the designated sections forming the qth identical weight section calculated in step S353.

After calculating the section length $w_q/(\Sigma w_i F_i)$ of the designated sections forming each of the Q identical weight sections in step S353, the GUI control unit 211 supplies the section length $w_q/(\Sigma w_i F_i)$ of the designated sections to the display control unit 218 (FIG. 43). The processing proceeds to step S354. The GUI control unit 211 sets (changes) the section length of the designated sections dividing the movable range of the scrub bar 53 displayed in the viewer 51 to the section length calculated in step S353. The processing proceeds to step S355.

For example, as shown in FIG. 51, when type information is displayed in the Fy-file display section 311, in step S355, the display control unit 218 changes the type information displayed in the Fy-file display section 311 as explained with reference to FIG. 59 according to the section length $w_q/(\Sigma w_i F_i)$ of the designated sections supplied from the GUI control unit 211 in step S353. The processing returns to step S351.

On the other hand, when it is judged in step S351 that the operation mode is switched to the weighting-off mode, the processing proceeds to step S356. The GUI control unit 211 sets (changes) the section lengths of each of the designated sections allocated to the frame to an identical length 1/F and supplies the section length 1/F to the display control unit 218. The processing proceeds to step S357. As described above, F represents a total number of frames forming a moving image to be subjected to scrub.

For example, as shown in FIG. 51, when the type information is displayed in the Fy-file display section 311, in step S357, the display control unit 218 changes the type information displayed in the Fy-file display section 311 according to the section length 1/F supplied from the GUI control unit 211 in step S356. The processing returns to step S351.

In the Fy-file display section 311, display allocation range information representing an allocation range, which is a range of frames allocated to the front designated section to the end designated section in the movable range of the scrub bar 53, is displayed. It is possible to allocate a front frame to an end frame in the allocation range represented by the allocation range information to the front designated section to the end designated section in the movable range of the scrub bar 53.

Figure 61:
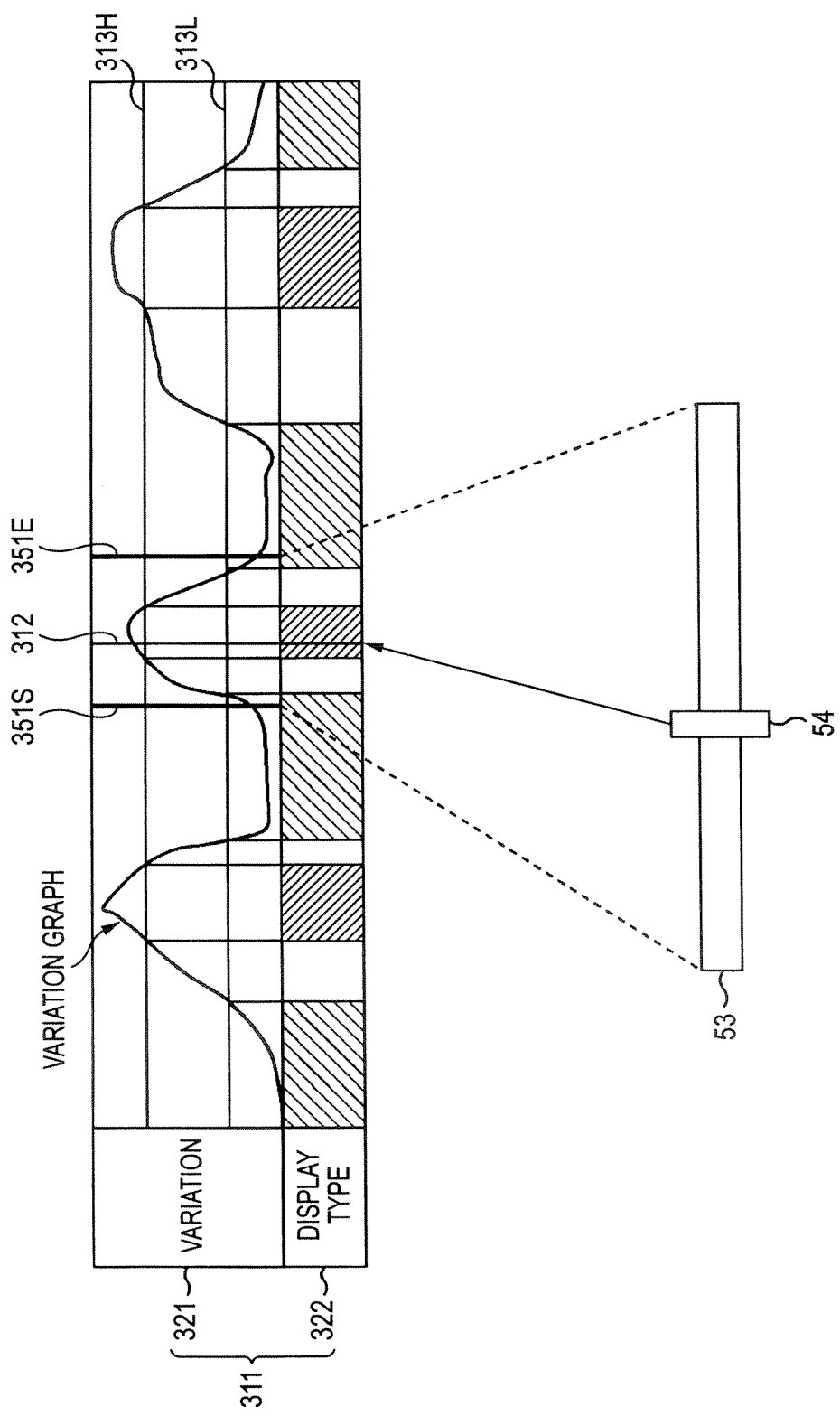
FIG. 61 is a diagram showing an example of display of the Fy-file display section 311.

FIG. 61 is a diagram showing an example of display of the Fy-file display section 311 in which range designation indicators 351S and 351E serving as allocation range information are displayed.

As explained with reference to FIG. 51, the Fy-file display section 311 in FIG. 61 includes the graph display section 321 and the type-information display section 322. The variation graph, the type information, the position indicator 312, and the threshold indicators 313H and 313L are displayed in the Fy-file display section 311.

Moreover, in the Fy-file display section 311 in FIG. 61, the range designation indicators 351S and 351E representing an allocation range, which is a range of frames allocated to the front designated section to the end designated section in the movable range of the scrub bar 53, are displayed.

A state in which the front designated section to the end designated section in the movable range of the scrub bar 53 are allocated to the front frame to the end frame of the moving image to be subjected to scrub is referred to as a default allocation state. In the default allocation state, as explained with reference to FIG. 49, if length in the horizontal direction of the area of the Fy-file display section 311 in which the variation graph is displayed and length of the movable range of the scrub bar 53 are set to the same length by multiplying length in the horizontal direction of the area of the Fy-file display section 311, in which the variation graph is displayed, by a predetermined number, a position of the position indicator 312 displayed in the Fy-file display section 311 and a position of the scrub dial 54 coincide with each other.

Therefore, it may be considered that the front frame to the end frame of the moving image to be subjected to scrub correspond to the respective positions in the horizontal direction of the area of the Fy-file display section 311 in which the variation graph is displayed. The position indicator 312 is displayed in a position corresponding to the frame (the frame of interest) displayed in the viewer 51 among the positions in the horizontal direction of the area of the Fy-file display section 311 in which the variation graph is displayed.

The range designation indicators 351S and 351E are GUIs of segments extending in the vertical direction and parallel to the signal indicator 312. The range designation indicators 351S and 351E are displayed in the graph display section 321 of the Fy-file display section 311. Moreover, the user can move the range designation indicators 351S and 351E in the horizontal direction in the area in which the variation graph of (the graph display section 321 of) the Fy-file display section 311 by operating the keyboard 2 or the mouse 3.

However, movement of the range designation indicator 351S further to the right side than the range designation indicator 351E, in other words, movement of the range designation indicator 351E further to the left side than the range designation indicator 351S is limited. Therefore, it is possible to move the range designation indicator 351S in a range from the left end of the area of the Fy-file display section 311 in which the variation graph is displayed to a position of the range designation indicator 351E. It is possible to move the range designation indicator 351E in a range from a position of the range designation indicator 351S to the right end of the area of the Fy-file display section 311 in which the variation graph is displayed.

According to the range designation indicators 351S and 351E, among the frames forming the moving image to be subjected to scrub, frames in a range (an allocation range) from a frame corresponding to a position of the range designation indicator 351S to a frame corresponding to a position of the range designation indicator 351E are allocated to the front designated section to the end designated section in the movable range of the scrub bar 53.

Therefore, when the scrub dial 54 is located at the left end of the movable range, a frame corresponding to a position of the range designation indicator 351S is set as a frame of interest displayed on the viewer 51. When the scrub dial 54 is located at the right end of the movable range, a frame corresponding to a position of the range designation indicator 351E is set as a frame of interest displayed in the viewer 51.

In a state in which the range designation indicator 351S is located at the left end of the area of the Fy-file display section 311 in which the variation graph is displayed and the range designation indicator 351E is located at the right end of the area of the Fy-file display section 311 in which the variation graph is displayed, the front designated section the end designated section in the movable range of the scrub bar 53 are allocated to the front frame to the end frame of the moving image to be subjected to scrub. Therefore, this state is the default allocation state.

In the default allocation state, when the scrub dial 54 is located at the end of the movable range, the front frame of the moving image to be subjected to scrub is set as a frame of interest displayed in the viewer 51. When the scrub dial 54 is located at the right end of the movable range, the end frame of the moving image to be subjected to scrub is set as a frame of interest displayed in the viewer 51.

In the default allocation state, as described above, the front designated section to the end designated section in the variable range of the scrub bar 53 are allocated to the front frame to the end frame of the moving image to be subjected to scrub.

Therefore, for example, when the number of frames of the moving image to be subjected to scrub is large, a section length of designated sections is short. Thus, even when the scrub dial 54 is moved a little, a frame set as a frame of interest displayed in the viewer 51 substantially changes before and after the movement of the scrub dial 54 (a frame allocated to a designated section in which the scrub dial 54 after the movement is located is apart a larger number of frames from a frame allocated to a designated section, in which the scrub dial 54 before the movement is located). As a result, it may be difficult to find a frame of a desired image.

Thus, the range designation indicator 351S or 351E is moved to allocate frames in a range (an allocation range) from a frame corresponding to a position of the range designation indicator 351S to a frame corresponding to a position of the range designation indicator 351E among the frames forming the moving image to be subjected to scrub to the front designated section to the end designated section in the movable range of the scrub bar 53. This makes it possible to easily find a frame of a desired image.

By moving the range designation indicator 351S or 351E, it is possible to set, as an allocation range (a range of frames allocated to the front designated section to the end designated section in the movable range of the scrub bar 53), rather than the entire range, a part of a range from a frame corresponding to a position of the range designation indicator 351S to a frame corresponding to a position of the range designation indicator 351E among the frames forming the moving image to be subjected to scrub, i.e., a front frame to an end frame forming the moving image to be subjected to scrub.

By setting a part of the range of the moving image to be subjected to scrub as an allocation range, compared with the case in which the entire range is set as an allocation range, the number of frames allocated from the front designated section to the end designated section in the movable range of the scrub bar 53 is reduced. As a result, a section length of the designated sections is increased.

Therefore, it is possible to prevent a frame set as a frame of interest displayed in the viewer 51 from substantially changing before and after the movement of the scrub dial 54 because of shortness of a section length of the designated sections. As a result, it is possible to easily find a frame of a desired image.

When there is no motion in an image near a frame allocated to a designated section in which the scrub dial 54 is located, even if a frame set as a frame of interest displayed in the viewer 51 substantially changes before and after the movement of the scrub dial 54, an image displayed in the viewer 51 does not change. Thus, even if the frame set as the frame of interest displayed in the viewer 51 substantially changes before and after the movement of the scrub dial 54, this does not hinder the user from finding a desired image.

On the other hand, when there is intense motion of an image near a frame allocated to a designated section in which the scrub dial 54 is located, when a frame set as a frame of interest displayed in the viewer 51 substantially changes before and after the movement of the scrub dial 54, an image displayed in the viewer 51 substantially changes. Thus, if the frame set as the frame of interest in the viewer 51 substantially changes before and after the movement of the scrub dial 54, this hinders the user from finding a desired image.

Therefore, it is effective to set a section of frames having intense motion of images of the moving image to be subjected to scrub as an allocation range (it is possible to easily find a frame of a desired image by setting a section of frames having intense motion of images of the moving image to be subjected to scrub as an allocation range).

In the Fy-file display section 311, if motion information is stored in an Fy file as a variation, a graph of the motion information (a motion information graph or a variation graph) is displayed and type information representing a display type determined on the basis of the motion information is displayed.

The user can easily recognize the section having intense motion of images looking at the motion information graph and the type information displayed in the Fy-file display section 311. Moreover, the user can operate the range designation indicators 351S and 351E to set the section as an allocation range.

Since the range designation indicators 351S and 351E indicate the allocation range that is the range of the frames allocated to the front designated section to the end designated section in the movable range of the scrub bar 53, the range designation indicators 351S and 351E may also be referred to as allocation range information. Further, since the range designation indicators 351S and 351E are operated in designating an allocation range, the range designation indicators 351S and 351E may be referred to as range designation operating means.

The range designation indicator 351S of the range designation indicators 351S and 351E is hereinafter also referred to as a start point indicator 351S as appropriate. The range designation indicator 351E is hereinafter also referred to as an end point indicator 351E as appropriate.

Allocation range setting processing for setting a range (an allocation range) of frames allocated to (designated sections) of the movable range of the scrub bar 53 according to the range start point indicator 351S and the end point indicator 351E as explained with reference to FIG. 61 will be explained with reference to a flowchart in FIG. 62.

In step S371, the GUI control unit 211 (FIG. 43) controls the display control unit 218 to cause the Fy-file display section 311 to display the start point indicator 351S and the end point indicator 351E. The processing proceeds to step S372.

In step S371 performed immediately after the start of the allocation range setting processing, the start point indicator 351S and the end point indicator 351E are displayed in positions at the left end and the right end of the area of the Fy-file display section 311 in which the variation graph is displayed, respectively. Alternatively, the start point indicator 351S and the end point indicator 351E are displayed in positions identical with positions of the start point indicator 351S and the end point indicator 351E at the time when execution of the editing program was finished last time.

In step S372, the GUI control unit 211 (FIG. 43) sets a range from a frame corresponding to a position of the start point indicator 351S to a frame corresponding to a position of the end point indicator 351E among the frames forming the moving image to be subjected to scrub. The GUI control unit 211 allocates the frames in the allocation range to the movable range of the scrub bar 53.

If weighting to the length of the designated sections is not taken into account for simplification of the explanation, the GUI control unit 211 divides the movable range of the scrub bar 53 into designated sections having a quotient obtained by dividing the length of the movable range of the scrub bar 53 by the number of frames in the allocation range. The GUI control unit 211 allocates the frames in the allocation range to the front designated section to the end designated section in the movable range.

The processing proceeds from step S372 to step S373. The GUI control unit 211 judges whether movement of the start point indicator 351S or the end point indicator 351E (FIG. 61) is started, i.e., whether the user has operated the keyboard 2 or the mouse 3 to move the start point indicator 351S or the end point indicator 351E.

When it is judged in step S373 that the movement of both the start point indicator 351S and the end point indicator 351E is not started, the processing returns to step S373.

When it is judged in step S373 that the movement of the start point indicator 351S or the end point indicator 351E is started, this means that the user has operated the keyboard 2 or the mouse 3 to move the start point indicator 351S or the end point indicator 351E and an operation signal corresponding to the operation is supplied from the keyboard 2 or the mouse 3 to the GUI control unit 211. In this case, the GUI control unit 211 calculates, according to the operation signal from the keyboard 2 or the mouse 3, a position to which the start point indicator 351S or the end point indicator 351E is moved. The GUI control unit 211 supplies information representing the position to the display control unit 218. The processing proceeds to step S374.

In step S374, the display control unit 218 causes the start point indicator 351S or the end point indicator 351E in a position corresponding to the information from the GUI control unit 211 instead of the position where the indicator was displayed immediately before the step. The processing proceeds to step S375.

In step S375, the GUI control unit 211 judges whether the movement of the start point indicator 351S or the end point indicator 351E is finished, i.e., whether the user has finished the operation of the keyboard 2 or the mouse 3 for moving the start point indicator 351S or the end point indicator 351E.

When it is judged in step S375 that the operation for moving the start point indicator 351S or the endpoint indicator 351E is not finished, this means that the user continues to operate the keyboard 2 or the mouse 3 to move the start point indicator 351S or the end point indicator 351E and an operation signal corresponding to the operation is supplied from the keyboard 2 or the mouse 3 to the GUI control unit 211. In this case, the GUI control unit 211 calculates, according to the operation signal from the keyboard 2 or the mouse 3, a position to which the start point indicator 351S or the end point indicator 351E is moved and supplies information representing the position to the display control unit 218. The processing returns to step S374. Thereafter, the same processing is repeated.

According to the processing in steps S373 to S375, the start point indicator 351S or the end point indicator 351E is moved in the horizontal direction in accordance with the operation for moving the start point indicator 351S or the end point indicator 351E.

On the other hand, when it is judged in step S375 that the operation for moving the start point indicator 351S or the end point indicator 351E is finished, this means that the user has finished the operation of the keyboard 2 or the mouse 3 for moving the start point indicator 351S or the end point indicator 351E and an operation signal corresponding to the operation for moving the start point indicator 351S or the end point indicator 351E is not supplied from the keyboard 2 or the mouse 3 to the GUI control unit 211. In this case, the GUI control unit 211 recognizes a position (in the horizontal direction) of the start point indicator 351S or the end point indicator 351E after the movement. The processing returns to step S372. The GUI control unit 211 sets a range from a frame corresponding to a position of the start point indicator 351S to a frame corresponding to a position of the end point indicator 351E among the frames forming the moving image to be subjected to scrub as an allocation range. The GUI control unit 211 allocates frames in the allocation range to the movable range of the scrub bar 53. Thereafter, the same processing is repeated.

As described above, the user can easily change a range (an allocation range) of frames to be subjected to scrub (frames allocated to the movable range of the scrub bar 53) among the frames forming the moving image by operating the start point indicator 351S or the end point indicator 351E serving as the GUI.

Figure 62:
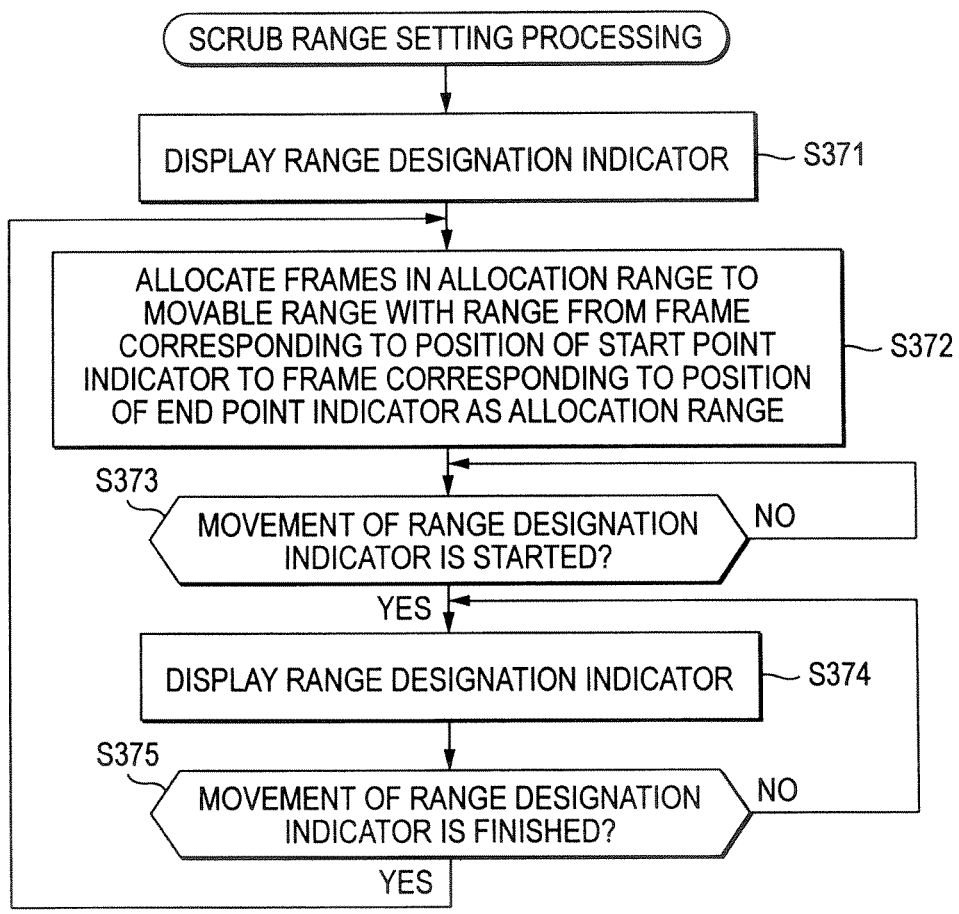
FIG. 62 is a flowchart for explaining allocation range setting processing.

The allocation range setting processing in FIG. 62 ends when, for example, the editing program ends.

In scrub, it is possible to change a size of an image of a frame displayed in the viewer 51 according to, for example, a display type for the frame.

Figure 63:
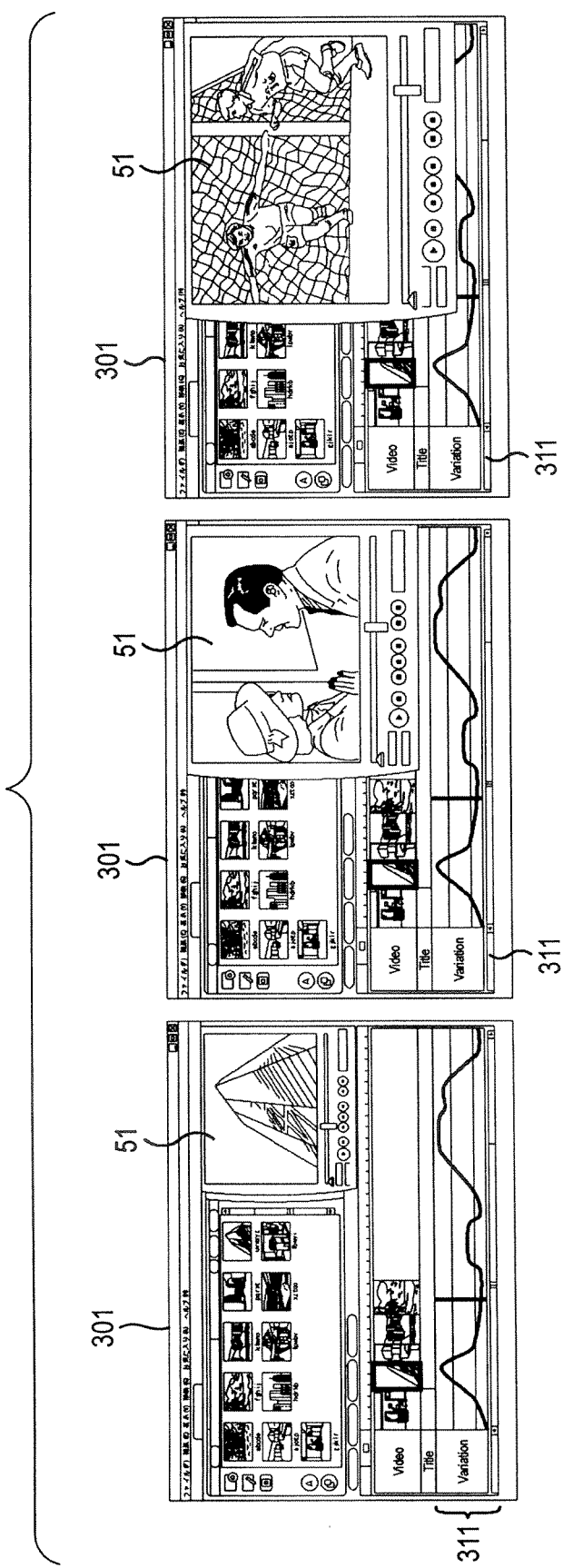
FIG. 63 is a diagram showing an example of display of the viewer 51.

FIG. 63 is a diagram showing an example of display of the viewer 51 at the time when a size of an image of a frame displayed in the viewer 51 is changed according to a display type for the frame.

The still image type V1, the normal type V2, or the high display rate/low resolution type V3 explained with reference to FIG. 20 is determined as the display type for the frame on the basis of, for example, motion information.

A first diagram from the left in FIG. 63 shows an example of display at the time when an image of a frame of the still image type V1 is displayed in the viewer 51.

In the editing system in FIG. 43, for example, a default size is set in advance for the image of the frame of the still image type V1. The viewer 51 displays the image of the frame of the still image type V1 with diagonal length or horizontal and vertical lengths adjusted to the default size set in advance.

A second diagram from the left in FIG. 63 shows an example of display at the time when an image of a frame of the normal type V2 is displayed in the viewer 51.

In the editing system in FIG. 43, for example, a size 1.5 times as large as the default size is set for the image of the frame of the normal type V2. The viewer 51 displays the image of the frame of the normal type V2 with diagonal length or horizontal and vertical lengths adjusted to the size 1.5 times as large as the default size.

A third diagram from the left (a first diagram from the right) in FIG. 63 shows an example of display at the time when an image of a frame of the high display rate/low resolution type V3 is displayed in the viewer 51.

In the editing system in FIG. 43, for example, a size twice as large as the default size is set for the image of the frame of the high display rate/low resolution type V3. The viewer 51 displays the image of the frame of the high display rate/low resolution type V3 with length of diagonal length or horizontal and vertical lengths adjusted to the size twice as large as the default size.

Since the image of the frame of the normal type V2 has a certain degree of motion, by displaying the image of the frame of the normal type V2 in the large size as described above, the user can check details of the motion of the image.

Since the image of the frame of the high display rate/low resolution type V3 has intense motion, by displaying the image of the frame of the high display rate/low resolution type V3 in the larger size, the user can also check details of the motion of the image.

Moreover, as described above, by displaying an image in the size different for each of the display types, the user can easily recognize a display type for a frame of an image displayed in the viewer 51 and a degree of motion as well.

In FIG. 63, an image is displayed in the size different for each of the display types determined on the basis of motion information. Besides, for example, it is also possible to display an image in a size different for each of display types determined on the basis of fineness information.

When an image is displayed in the size different for each of the display types determined on the basis of fineness information, for example, by displaying an image of a display type determined on the basis of fineness information with a larger degree of fineness in a larger size, the user can easily check details of the image.

In the processing of scrub explained with reference to FIG. 48, in displaying an image in step S222, it is possible to display the image in a size corresponding to a display type.

Figure 64:
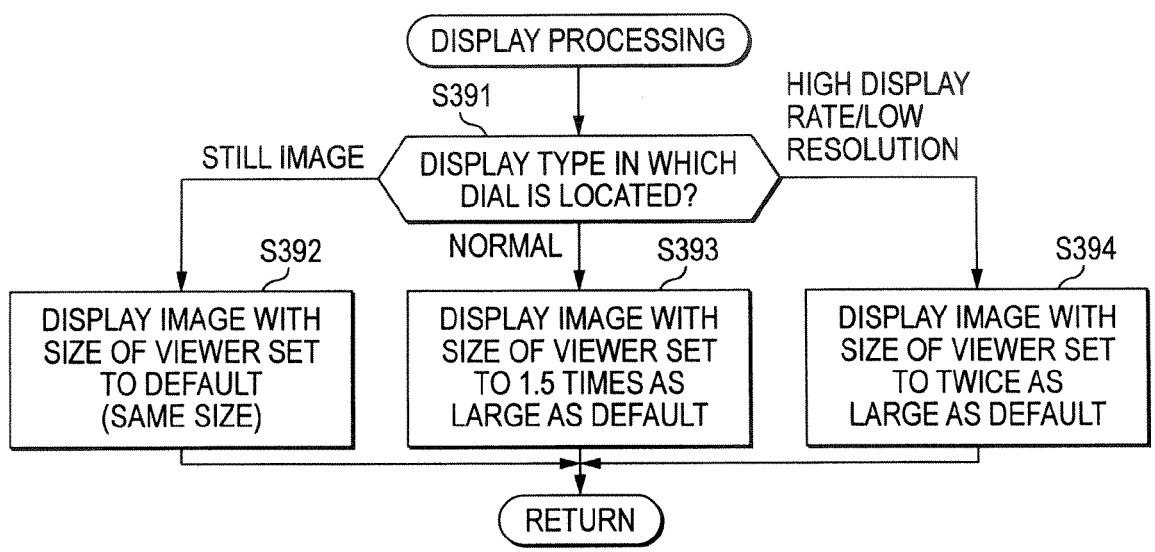
FIG. 64 is a flowchart for explaining display processing.

The processing (display processing) in step S222 in FIG. 48 for displaying an image in a size corresponding to a display type will be explained with reference to a flowchart in FIG. 64.

For example, the still image type V1, the normal type V2, or the high display rate/low resolution type V3 explained with reference to FIG. 20 is determined as the display type as described above. As explained with reference to FIG. 63, a default size is set for an image of a frame of the still image type V1. For example, a size 1.5 times as large as the default size is set for an image of a frame of the normal type V2. Moreover, for example, a size twice as large as the default size is set for an image of a frame of the high display rate/low resolution type V3.

In step S391, the display control unit 218 (FIG. 43) judges which of the still image type V1, the normal type V2, and the high display rate/low resolution type V3 a display type for a frame (a frame of interest) allocated to a designated section, in which the scrub dial 54 is located, supplied from the display-type acquiring unit 215 (FIG. 43) is.

When it is judged in step S391 that the display type for the frame of interest is the still image type V1, the processing proceeds to step S392. The display control unit 218 causes the viewer 51 to display an image corresponding to the image data stored in the frame buffer 218A (FIG. 43) in the default size as shown in the first diagram from the left in FIG. 63.

When it is judged in step S391 that the display type for the frame of interest is the normal type V2, the processing proceeds to step S393. The display control unit 218 causes the viewer 51 to display an image corresponding to the image data stored in the frame buffer 218A in the size 1.5 times as large as the default size as shown in the second diagram from the left in FIG. 63.

When it is judged in step S391 that the display type for the frame of interest is the high display rate/low resolution type V3, the processing proceeds to step S394. The display control unit 218 causes the viewer 51 to display an image corresponding to the image data stored in the frame buffer 218A in the size twice as large as the default size as shown in the third diagram from the left in FIG. 63.

When an image is displayed in a size larger than the default size, a size of the viewer 51 is also increased. As a result, a part of the area of the edition window 301 that is visible when the viewer 51 is displayed in the default size becomes invisible behind the viewer 51 having the increased size. Thus, when the size of the viewer 51 is increased, it is possible to display an image in the viewer 51, for example, in a semitransparent state. In this case, it is possible to prevent a part of the area of the edition window 301 that is visible when the viewer 51 is displayed in the default size from becoming invisible behind the viewer 51 having the increased size.

It is possible to change a size of (an image displayed in) the viewer 51 according to a display size as described above only when the scrub dial 54 is operated (e.g., dragged) and set the size to the default size when the operation of the scrub dial 54 is stopped.

Moreover, it is possible to change the size of the image according to not only a display type for the frame of interest but also operation of the scrub dial 54 by the user.

In general, in searching for a desired image, the user operates the scrub dial 54 to move quickly when the user is not so interested in an image displayed in the viewer 51. Conversely, when the user is interested in the image, the user operates the scrub dial 54 to move slowly.

Thus, when the scrub dial 54 is moved quickly, it is possible to display an image in the default size. When the scrub dial 54 is moved slowly, it is possible to display an image in a size larger than the default size. In this way, the user can easily find a desired image.

In FIG. 63, since a size of the entire viewer 51 is changed, a size of the scrub bar 53 is changed. However, when the size of the scrub bar 53 is changed during operation thereof, it may be difficult to operate the scrub bar 53. Thus, it is desirable not to change the size of the scrub bar 53 (e.g., it is desirable to change a size of only the display section 52 (FIG. 3) of the viewer 51).

The invention explained above, scrub is performed. However, the invention is also applicable when variable speed reproduction (n-times speed reproduction) other than scrub is performed.

In this embodiment, as means operated when a frame displayed in the viewer 51 is designated, the scrub bar 53 having the scrub dial 54 is adopted and a frame displayed in the viewer 51 is designated according to a position of the scrub dial 54. Besides, it is possible to designate a frame displayed in the viewer 51 by operating, for example, a (real) so-called jog dial, shuttle ring, or the like (not a GUI).

In this embodiment, a variation (motion information or fineness information) representing a degree of change in image data of a moving image is calculated for each of frames, a display type is determined for each of the frames on the basis of the variation, and the various kinds of processing for scrub are performed using the display type. Besides, for example, when sound data accompanies a moving image, it is possible to determined a display type on the basis of a level (power) itself of the sound data or a value representing a degree of change in the sound data. For example, in a frame in which the level of the sound data changes from small to large (there is a climax of sound), it is highly likely that an image of an interesting scene is shown. Thus, for example, when motion information is large to some extent, it is possible to determine a display type having a high display rate as a display type for the frame in which the level of the sound data changes from small to large. For example, when fineness information is large to some extent, it is possible to determine a display type having a high resolution as a display type for the frame.

In this embodiment, assuming that the optical disk 7 is a professional disc in which main data and proxy data are recorded, scrub is performed using the main data and the proxy data recorded in the optical disk 7, i.e., image data having two kinds of resolutions. Besides, it is possible to perform scrub using, for example, image data having one kind of resolution or three or more kinds of resolutions.

In this embodiment, in order to cope with the problem of seek, the display-type determining unit 93 in FIG. 22 (the display-type determining unit 233 in FIG. 44) judges whether frames having a variation equal to or larger than a threshold or smaller than the threshold continue by the minimum limit number of frames N (judgment on continuity). However, if it is unnecessary to cope with the problem of seek, it is possible to determine a display type according to whether a variation is equal to or larger than a threshold or smaller than the threshold.

In this embodiment, a variation is calculated for each of frames and a display type is determined for each of the frames on the basis of the variation. However, it is also possible to calculate a variation for every plural frames. It is also possible to determine a display type for every plural frames.

Figure 65:
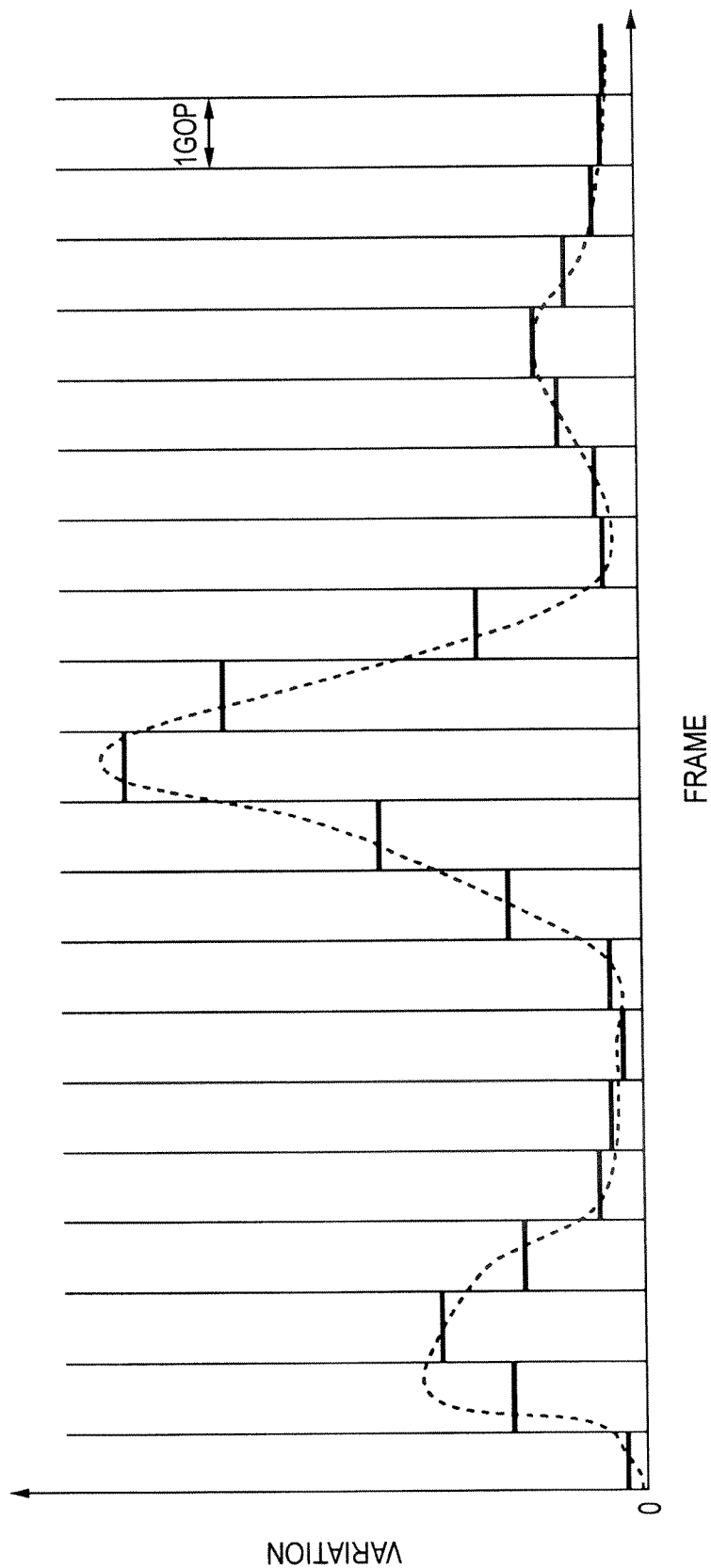
FIG. 65 is a graph of a variation in each frame forming one GOP.

FIG. 65 is a graph of a variation for, for example, (a unit of) each of frames forming one GOP as plural frames. In FIG. 65, the abscissa indicates a frame and the ordinate indicates a variation.

In FIG. 65, a bold line indicates a variation for each of the frames forming the one GOP. As the variation for each of the frames forming the one GOP, it is possible to adopt, for example, an average of variation in all the frames forming the one GOP, a variation in I pictures among the frames forming the one GOP, or the like.

As shown in FIG. 65, when a variation for each of the frames forming the one GOP is calculated, it is possible to determine a display type for (a unit of) each of the frames forming the one GOP on the basis of the variation in the same manner as the determination of a display type for each of frames from a variation for each of the frames.

It is possible to determine, for example, a display type for each of the frames forming the one GOP as the plural frames on the basis of not only a variation for each of the frames forming the one GOP but also a variation for each of frames.

FIG. 66 is a diagram of an Fy file in which both a variable for each of frames and a display type for each of the frames are stored.

For example, when one GOP is formed by fifteen frames, it is possible to determine, for example, a display type used in the fifteen frames forming the one GOP at a highest ratio as a display type for each of the fifteen frames forming the one GOP.

In this case, for example, in one GOP formed by a first frame to a fifteenth frame from the top shown in the Fy file in FIG. 66, the display type V2 is used at a highest ratio among the display types V1, V2, and V3 for each of the frames. Thus, the display type V2 is determined as a display type for the one GOP.

For example, concerning the ninth frame from the top shown in the Fy file in FIG. 66, a display type for each of the frames is V1 but a display type for one GOP is V2.

As described above, when a variation and a display type are determined for, for example, each of the frames forming one GOP as plural frames and stored in the Fy file, it is possible to reduce a capacity (a file size) of the Fy file compared with that in the case in which a variation and a display type for each of frames are stored in the Fy file. Further, it is possible to reduce burdens of processing necessary for analysis of the Fy file (file parse).

In the case in which image data is encoded in the MPEG system at the time of creation of an Fy file, when a variation and a display type for each of frames forming one GOP are determined, it is possible to include the variation and the display type in a GOP header in a stream obtained as a result of the encoding in the MPEG system.

In this embodiment, since image data is encoded in the MPEG system and recorded in the optical disk 7, the decoder 216 of the editing system in FIG. 43 needs to decode the image data in the MPEG system. In the MPEG system, for example, with fifteen frames set as one GOP, each of the frames is encoded as a picture of one of picture types, namely, an I (Intra) picture, a P (Predictive) picture, and a B (Bidirectionally Predictive) picture. The P picture and the B picture among the I, P, and B pictures are encoded using the I or P picture encoded earlier as a reference image (an image as a basis for generating a predicted image). Thus, it is possible to decode the P picture and the B picture only after decoding the reference image.

For example, when one GOP is formed by fifteen frames and each of the fifteen frames is represented by I, P, or B indicating a picture type and a number indicating a display order, it is possible to represent an arrangement of the fifteen frames of the one GOP as, for example, B1, B2, I3, B4, B5, P6, B7, B8, P9, B10, B11, P12, B13, B14, and P15.

In the GOP formed by the fifteen frames B1 to P15, for example, the P picture P6 sixth from the top is encoded using the I picture I3 third from the top as a reference image. The P picture P9 ninth from the top is encoded using the P picture P6 sixth from the top as a reference image. The P picture P12 twelfth from the top is encoded using the P picture P9 ninth from the top as a reference image. The P picture P15 fifteenth from the top is encoded using the P picture P12 twelfth from the top as a reference image. The B picture B13 thirteenth from the top is encoded using the P picture P12 twelfth from the top and the P picture P15 fifteenth from the top as a reference image.

In this case, for example, when the B picture B13 thirteenth from the top is set as a frame of interest displayed in the viewer 15, it is possible to decode the B picture B13 thirteenth from the top only after decoding the I picture I3 third from the top, decoding the P picture P6 sixth from the top with reference the I picture I3 third from the top, decoding the P picture P9 ninth from the top with reference to the P picture P6 sixth from the top, decoding the P picture P12 twelfth from the top with reference to the P picture P9 ninth from the top, and decoding the P picture P15 fifteenth from the top with reference to the P picture P12 twelfth from the top. This is because it may be impossible to refer to the P picture P12 twelfth from the top and the P picture P15 fifteenth from the top before the respective pictures are decoded in this way. Therefore, the decoding of the B picture B13 takes time.

Thus, the P pictures P6, P9, P12, and P15 referred to for the decoding of the other pictures are stored in a separate file called a P-to-I file as I pictures I6, I9, I12, and I15, respectively. The decoder 216 can perform decoding with reference to the pictures stored in the P-to-I file when necessary. In this case, for example, it is possible to decode the B picture B13 in a short time with reference to the I pictures I12 and I15 stored in the P-to-I file.

In the series of processing described above, the processing performed by the CPU 22 (FIG. 2) executing the programs can be performed by dedicated hardware as long as available.

It should be understood by those skilled in the art that various modifications, combinations, sub-combinations, and alterations may occur depending on design requirements and other factors insofar as they are within the scope of the appended claims or the equivalents thereof.

What is claimed is:

1. A data processing apparatus that processes image data of a moving image, the data processing apparatus comprising:
    acquiring means for acquiring variations, the variations representing degrees of change on a frame by frame basis in the image data;
    display-type determining means for dividing the image data of the moving image into sections based on comparing the variations in the frames with a plurality of predetermined thresholds and judging the continuity of the variations in the frames, and for determining, on the basis of the variations and for each section, which way of a plurality of different ways of displaying frames the image data is to be displayed for the respective section; and
    display control means for causing a display to display type information representing the plurality of different ways of displaying frames and position information representing a position of each section in the image data.

2. A data processing apparatus that processes image data of a moving image, the data processing apparatus comprising:
    circuitry configured to:
        acquire variations representing degrees of change on a frame by frame basis in the image data;
        divide the image data of the moving image into sections based on comparing the variations in the frames with a plurality of predetermined thresholds and judging the continuity of the variations in the frames;
        determine, on the basis of the variations and for each section, which way of a plurality of different ways of displaying frames the image data is to be displayed for the respective section, and
        cause a display to display type information representing the plurality of different ways of displaying frames and position information representing a position of each section in the image data.

3. The data processing apparatus according to claim 2, wherein the plurality of different ways of displaying frames represent different resolutions in displaying frames or display rates in displaying frames.

4. The data processing apparatus according to claim 3, wherein
    the variations are fineness information representing a degree of spatial change in a picture, and
    the circuitry, when the fineness information of a subject picture indicates that a degree of spatial change is larger than a predetermined threshold of the plurality of predetermined thresholds, determines that a corresponding section will be displayed with a higher resolution/low display rate having a higher resolution with respect to an unmodified moving image resolution or a lower display rate with respect to an unmodified moving image display rate.

5. The data processing apparatus according to claim 3, wherein
    the variations are motion information representing degrees of temporal change between frames, and
    the circuitry, when the motion information of a subject picture indicates that a degree of temporal change is larger than a predetermined threshold of the plurality of predetermined thresholds, determines that a corresponding section will be displayed with a lower resolution/high display rate having a lower resolution with respect to an unmodified moving image resolution or a higher display rate with respect to an unmodified moving image display rate.

6. The data processing apparatus according to claim 3, wherein the plurality of different ways of displaying frames include displaying frames as a still image, and
    the section is displayed as a still image for frames having a smaller variation with respect to variation occurring in an unmodified display of moving images.

7. The data processing apparatus according to claim 2, wherein the circuitry is configured to:
    determine which way of the plurality of different ways of displaying frames the image is to be displayed for each of the respective sections on the basis of a comparison result obtained by comparing the variations in the frames and the plurality of predetermined thresholds, and
    cause the display to further display a graph representing the variations in the frames in time series together with threshold information representing the plurality of predetermined thresholds.

8. The data processing apparatus according to claim 7, wherein
    the threshold information is moved according to operation by a user, and
    the circuitry is configured to determine an updated way of the plurality of different ways of displaying frames that the image is to be displayed on the basis of a comparison result obtained by comparing the variations in the frames and thresholds represented by threshold information after the movement.

9. The data processing apparatus according to claim 8, wherein the circuitry is configured to cause the display to display updated type information when the updated way of the plurality of different ways of displaying frames is determined by the circuitry.

10. The data processing apparatus according to claim 7, wherein
    fineness information representing a degree of spatial change in a frame and motion information representing a degree of temporal change in a frame relative to another frame are stored in a file as the variations, and
    the circuitry is configured to cause the display to display a graph representing the fineness information in time series, a graph representing the motion information in time series, or both the graph representing the fineness information in time series and the graph representing the motion information in time series.

11. The data processing apparatus according to claim 10, wherein the circuitry is configured to select the graph representing the fineness information in time series, the graph representing the motion information in time series, or both the graph representing the fineness information in time series and the graph representing the motion information in time series to be displayed.

12. The data processing apparatus according to claim 2, wherein
    a bar on which a dial is movable is caused to be displayed by the circuitry, frames are allocated in time series to subsections, the subsections dividing up a movable range of the bar on which the dial is movable, and the circuitry is configured to cause the display to display position information representing a position of a frame allocated to a subsection in which the dial is located.

13. The data processing apparatus according to claim 12, wherein the circuitry is configured to cause the display to further display allocation range information representing an allocation range that is a range of frames in time series allocated from a front subsection to an end subsection in the movable range, the allocation range information is moved according to operation by a user, and a front frame and an end frame in the allocation range represented by the allocation range information are allocated to the front subsection and to the end subsection in the movable range.

14. The data processing apparatus according to claim 2, wherein the plurality of different ways of displaying frames include: displaying as a still picture, displaying the frames unmodified, and displaying the frames with a higher display rate than the unmodified display of the frames.

15. A data processing method of a data processing apparatus for processing image data of a moving image, the data processing method comprising the steps of:

acquiring variations, the variations representing degrees of change on a frame by frame basis in the image data;

dividing, by circuitry of the data processing apparatus, the image data of the moving image into sections based on comparing the variations in the frames with a plurality of predetermined thresholds and judging the continuity of the variations in the frames;

determining, by the circuitry on the basis of the variations and for each section, which way of a plurality of different ways of displaying pictures the image data is to be displayed for the respective section; and causing a display to display type information representing the plurality of different ways of displaying pictures and position information representing a position of each section in the image data.

16. A non-transitory computer readable medium having stored thereon a program that when executed by a computer causes the computer to implement a data processing method of processing image data of a moving image, the data processing method comprising the steps of:

acquiring variations, the variations representing degrees of change on a frame by frame basis in the image data;

dividing, by the computer, the image data of the moving image into sections based on comparing the variations in the frames with a plurality of predetermined thresholds and judging the continuity of the variations in the frames;

determining, by the computer on the basis of the variations and for each section, which way of a plurality of different ways of displaying pictures the image data is to be displayed for the respective section; and causing a display to display type information representing the plurality of different ways of displaying pictures and position information representing a position of each section in the image data.

17. A data processing apparatus that processes image data of a moving image, the data processing apparatus comprising: circuitry configured to:

acquire variations, the variations representing degrees of change on a frame by frame basis in the image data;

divide the image data of the moving image into sections based on comparing the variations in the frames with a plurality of predetermined thresholds and judging the continuity of the variations in the frames;

determine, on the basis of the variations and for each section, which way of a plurality of different ways of displaying frames the image data is to be displayed for the respective section;

cause a display to display type information representing the plurality of different ways of displaying frames and position information representing a position of each section in the image data; and determine a first way of displaying frames for a first section and a second way of displaying frames for a second section, wherein the first way of displaying frames corresponds to less variation in respective frames than the second way of displaying frames, wherein the different ways of displaying frames are respectively represented on a timeline representing an entire time length of the image data, and wherein the different ways of displaying frames are mapped to the timeline in a weighted fashion such that the second way of displaying frames is represented on a greater portion of the timeline than the first way of displaying frames.

18. A data processing method of a data processing apparatus for processing image data of a moving image, comprising:

determining a variation value for each frame of a plurality of frames in the image data of the moving image;

comparing each variation value with a plurality of different thresholds;

categorizing, by circuitry of the data processing apparatus, each frame into one of a plurality of categories based on the comparison with the plurality of different thresholds;

grouping, by the circuitry, frames of the plurality of frames into section group when each of the frames in the section group has a same category of the plurality of categories; and displaying the section groups on a time axis together with a variation graph.

* * * * *